United States Patent
Yoshida et al.

(10) Patent No.: US 6,788,889 B2
(45) Date of Patent: Sep. 7, 2004

(54) DISTANCE MEASURING APPARATUS

(75) Inventors: Hideo Yoshida, Saitama (JP); Yoshikazu Mihara, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/329,368

(22) Filed: Dec. 27, 2002

(65) Prior Publication Data

US 2003/0123872 A1 Jul. 3, 2003

(30) Foreign Application Priority Data

Dec. 27, 2001 (JP) .............................. 2001-396792

(51) Int. Cl.[7] ................................................. G03B 3/10
(52) U.S. Cl. ........................ 396/123; 396/50; 396/122
(58) Field of Search ................................ 396/121–123, 396/50

(56) References Cited

U.S. PATENT DOCUMENTS

| | | | | | |
|---|---|---|---|---|---|
| 5,121,151 A | * | 6/1992 | Kawabata et al. | .......... | 396/122 |
| 5,574,523 A | * | 11/1996 | Nakayama et al. | ......... | 396/435 |
| RE36,895 E | * | 10/2000 | Tsuru et al. | ................... | 396/50 |

FOREIGN PATENT DOCUMENTS

| JP | 2620235 B2 | 3/1997 |
|---|---|---|
| JP | 2772028 B2 | 4/1998 |

* cited by examiner

Primary Examiner—Russell Adams
Assistant Examiner—Arthur Smith
(74) Attorney, Agent, or Firm—Birch, Stewart, Kolasch & Birch, LLP

(57) ABSTRACT

In multi-point distance measurement, the distance of a distance measurement object is three-way divided into a very short distance range, a short distance range and a moderate to long distance range, and if the distance of an object located at a very short distance is measured in any one of the endmost distance measurement areas of a plurality of distance measurement areas, and all the distances measured in other distance measurement areas belong to the moderate to long distance, the distance belonging to the very short distance range is not employed, and the shortest distance of distances belonging to the moderate to long distance range is employed as a measured distance. On the other hand, if any of the distances measured in other distance measurement areas belongs to the short distance range which is closer than the moderate to long distance range, the distance belonging to the very short distance range is employed, thereby reducing the frequency of erroneous distance measurement. If of five distance measurement areas including left, left middle, middle, right middle and right areas, the left area corresponds to the very short distance range, and other distance measurement areas correspond to the moderate to long distance range, for example, the distance in the moderate to long distance range is employed as the measured distance.

3 Claims, 80 Drawing Sheets

SHORT DISTANCE

LONG DISTANCE

ALL AREAS SELECTED
SIGNAL LEVEL IS REDUCED,
ERROR OCCURS,
AND REARWARD LIGHT IS
BROUGHT INTO FOCUS.

ONLY MIDDLE AREA SELECTED
SIGNAL LEVEL IS INCREASED,
AND MAIN SUBJECT IS
BROUGHT INTO FOCUS

PEAK SELECTED AREA
SETTING DATA (D0 TO D111)

L

| D15 ... D8 | D7 ... D0 |
| D31 ... D24 | D23 ... D16 |
| D47 ... D40 | D39 ... D32 |
| D63 ... D56 | D55 ... D48 |

R

| D79 ... D72 | D71 ... D64 |
| D95 ... D88 | D87 ... D80 |
| D111 ... D104 | D103 ... D96 |

PAEK SELECTED AREA NUMBER DATA (D112 TO D118)

FIG.23

| | SR1 | SR2 | SL1 | SL2 | DR | DL |
|---|---|---|---|---|---|---|
| AREA (1) | LMSR | RMSR | LMSL | RMSL | RMWR | RMWL |
| AREA (2) | LSR | RSR | LSL | RSL | LWR | LWL |
| AREA (3) | MSR | MSR | MSL | MSL | MWR | MWL |
| AREA (4) | LMSR | LMSR | LMSL | LMSL | LMWR | LMWL |
| AREA (5) | RMSR | RMSR | RMSL | RMSL | RMWR | RMWL |
| AREA (6) | LSR | LMSR | LSL | LMSL | LMWR | LMWL |
| AREA (7) | RMSR | RSR | RMSL | RSL | RWR | RWL |

FIG.38

COMPARISON OF DISTANCE
MEASUREMENT TIME (mSec)

| | PRESENT INVENTION | CONVENTIONAL METHOD(1) | CONVENTIONAL METHOD(2) | Δ(1) | Δ(2) |
|---|---|---|---|---|---|
| READING TIME | 24.535 | 15.232 | 15.232 | 9.303 | 9.303 |
| f(n) CALCULATION TIME PER CALCULATION | 1.200 | 2.964 | 1.200 | -1.764 | 0.000 |
| f(n) TOTAL CALCULATION (41 TIMES, 5 AREAS) | 246.000 | 607.620 | 246.000 | -361.620 | 0.000 |
| TOTAL | 270.535 | 622.852 | 261.232 | -352.317 | 9.303 |

\* CONVENTIONAL METHOD (2) REFERS TO THE CASE
WHERE TWO-PIXEL DIFFERENCE IS NOT CALCULATED

\* Δ(1) IS DIFFERENCE BETWEEN PRESENT INVENTION AND
CONVENTIONAL METHOD(1), AND Δ(2) IS DIFFERENCE
BETWEEN PRESENT INVENTION AND CONVENTIONAL METHOD (2)

SMALL DIFFERENCE OF MINIMUM VALUES AND
NORMAL RESULT OF DISTANCE MEASUREMENT
FIG.39(A)
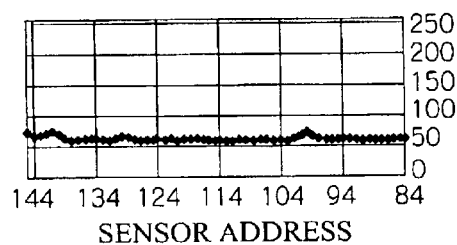
FIG.39(B)
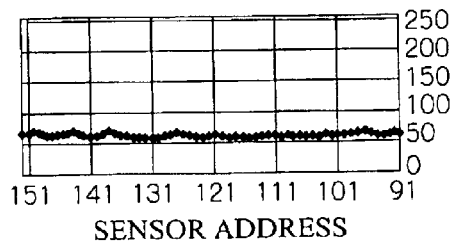
FIG.39(C)   CALCULATION OF CORRELATION VALUES
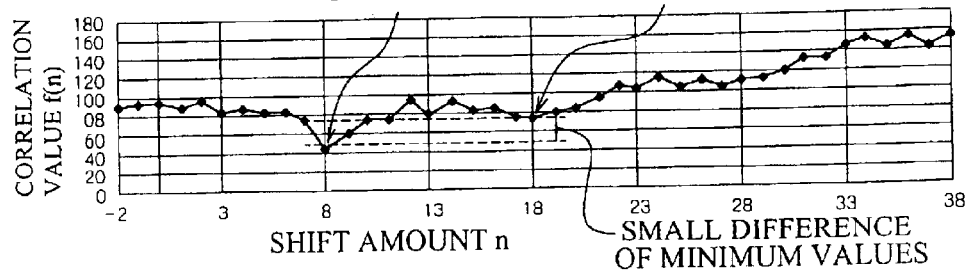

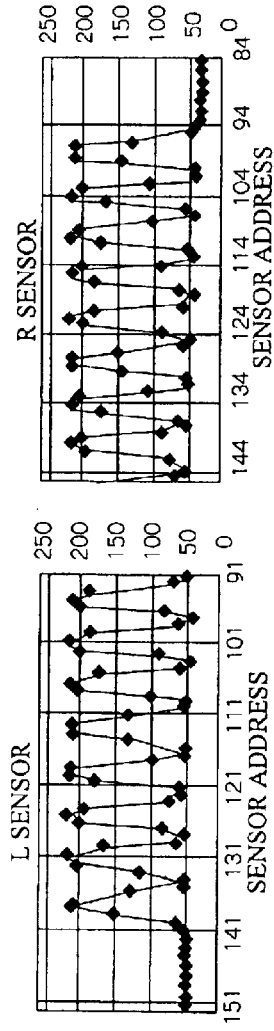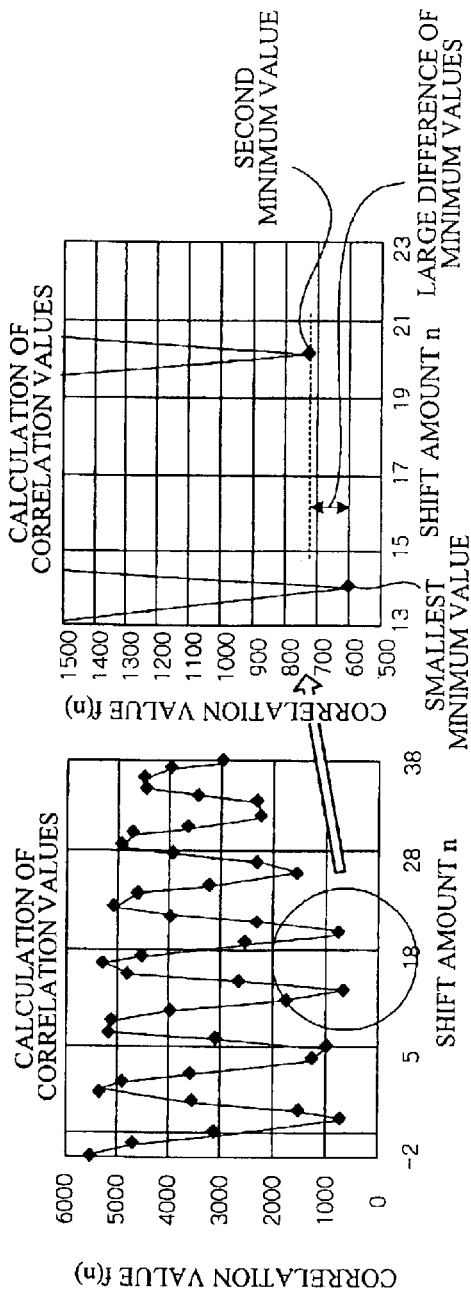
FIG.40(A)
FIG.40(B)
FIG.40(C)
FIG.40(D)

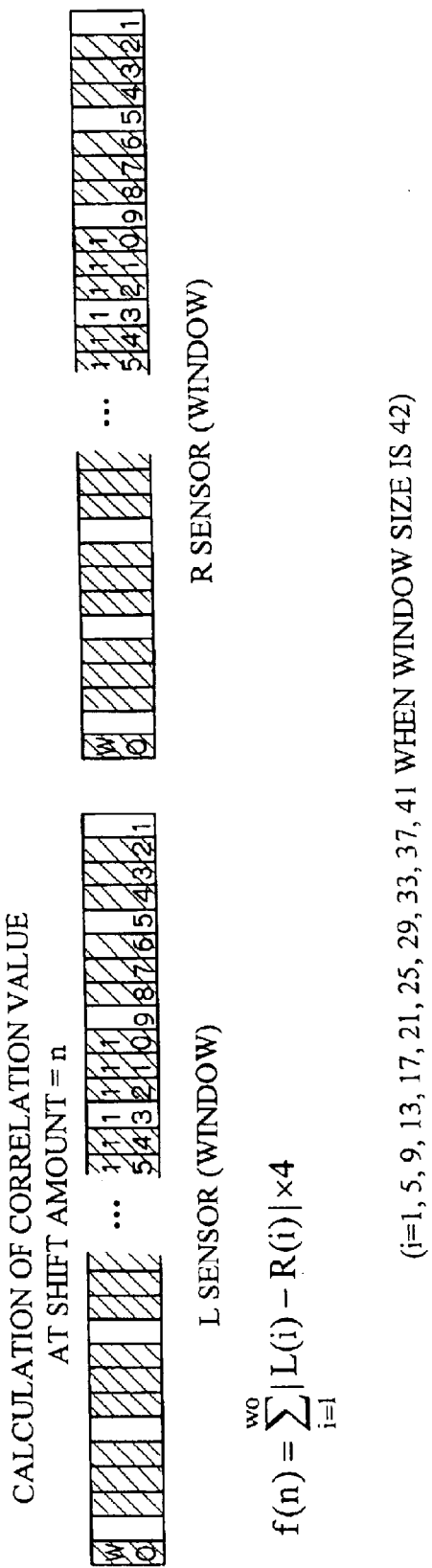

| n | N1 | N2 |
|---|----|----|
| -2 | 0 | 0 |
| 2 | 2 | 2 |
| 6 | 4 | 4 |
| 10 | 6 | 6 |
| 14 | 8 | 8 |
| . | . | . |
| . | . | . |
| . | . | . |
| 38 | 20 | 20 |

| n | N1 | N2 |
|---|----|----|
| -1 | 1 | 0 |
| 0 | 1 | 1 |
| 36 | 19 | 19 |
| 37 | 20 | 19 |

NEW METHOD

NO CONTRAST EXISTING IN EMPLOYED SENSOR

SHIFT AMOUNT = -2

SHIFT AMOUNT n
THE SHIFT AMOUNT = -2(SMALLEST VALUE)
DOES NOT PROVIDE MINIMUM VALUE

SHIFT AMOUNT = LARGEST VALUE

THE SHIFT AMOUNT = 38 (LARGEST VALUE)
DOES NOT PROVIDE MINIMUM VALUE

SHIFT AMOUNT = -1 f(nmin-1)>f(nmin+1)
CALCULATION POSSIBLE

SHIFT AMOUNT = -1 f(nmin-1)≦f(nmin+1)
CALCULATION IMPOSSIBLE

SHIFT AMOUNT= LARGEST VALUE-1 f(nmin-1)>f(nmin+1)
CALCULATION IMPOSSIBLE

SHIFT AMOUNT= LARGEST VALUE-1 f(nmin-1)≦f(nmin+1)
CALCULATION POSSIBLE

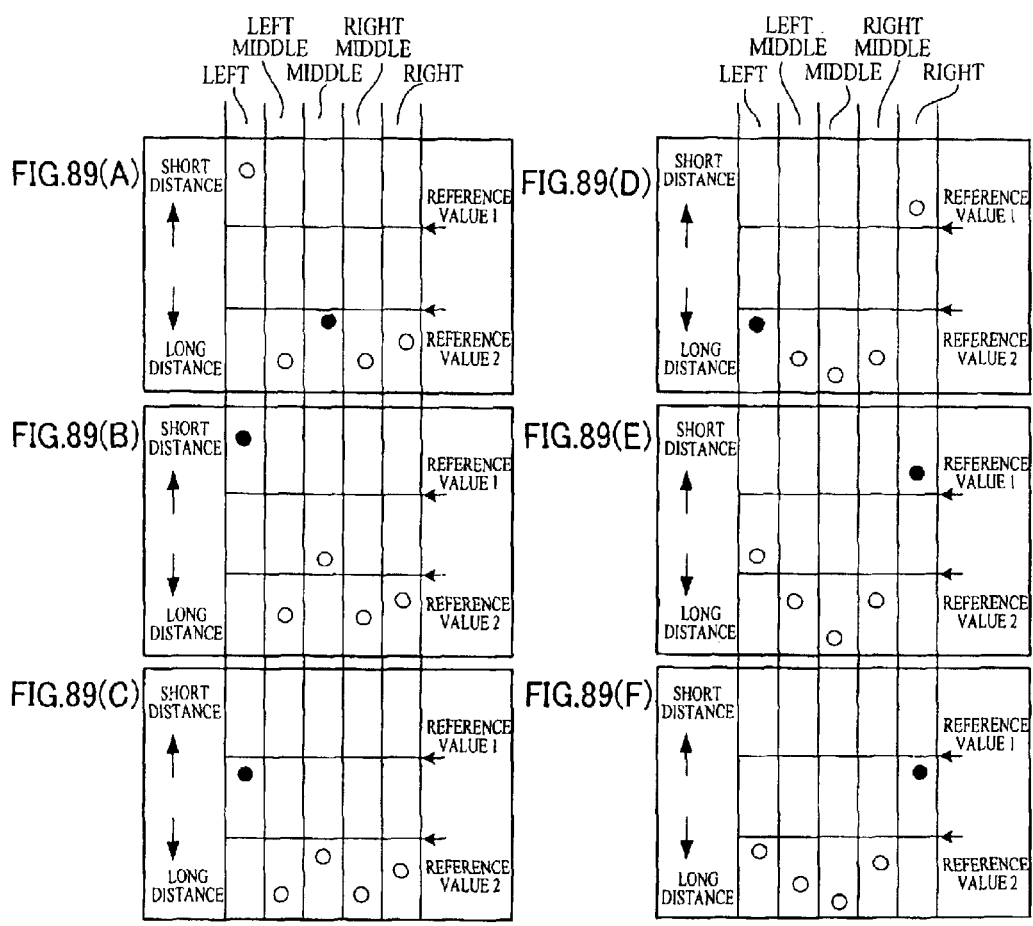
※ RESULTS OF DISTANCE MEASUREMENT FOR EACH AREA
(○: NOT EMPLOYED, ●: EMPLOYED)

DISTANCE MEASURING APPARATUS

BACKGROUND OF THE INVENTION

1. Field of the Invention

This nonprovisional application claims priority under 35 U.S.C. §119(a) on Patent Application No. 2001-396792 filed in JAPAN on Dec. 27, 2001, which is herein incorporated by reference.

The present invention relates to a distance measuring apparatus, and particularly to a distance measuring apparatus which carries out so called multi-point distance measurement with a plurality of distance measurement areas.

2. Description of the Related Art

In distance measuring apparatuses of cameras, for example, distance measurement apparatuses employing so called a multi-point distance measurement method in which a plurality of areas are set in a shooting range, distances of a distance measurement object are measured for respective distance measurement areas, and any one of the distances is employed as a measured distance have been known.

In multi-point distance measurement, the shortest distance of distances determined for a plurality of distance measurement areas is generally employed as a measured distance, but there are problems such that an undesired object located at a short distance may exist in the area around the shooting range, and in this case, the distance of the undesired object is employed as a measured distance. Thus, it is proposed in Japanese Patent No. 2620235 and Japanese Patent No. 2772028 that if an object located at a distance shorter than a predetermined distance is measured in a distance measurement area around the shooting range, the distance measured in the distance measurement area is not employed.

However, even if an object located at a distance shorter than a predetermined distance is detected in a distance measurement area around the shooting range, the object is not necessarily an undesired object for a photographer, and thus determining whether or not the distance is to be employed as a measured distance according only to whether it is shorter than a predetermined distance or not may result in erroneous distance measurement.

SUMMARY OF THE INVENTION

The present invention has been devised in view of the above situations, and the object thereof is to provide a distance measuring apparatus in which a suitable distance is employed as a measured distance from distances measured for a plurality of distance measurement areas, thereby preventing erroneous distance measurement.

In order to attain to the above-mentioned object, the present invention is directed to a distance measuring apparatus in which a plurality of distance measurement areas are set in an image formation range of a sensor on which an image of a distance measurement object is formed, distances of the distance measurement object are measured for respective distance measurement areas according to signals obtained from the sensor, and any one of the measured distances for respective distance measurement areas is employed as a measured distance, the distance measuring apparatus comprising: an employed distance selecting device in which the distance of the distance measurement object is three-way divided into a very short distance range, a short distance range and a moderate to long distance range, and a condition of whether a result of measuring distances of the distance measurement object is consistent with a case where only the distance measured in any one of distance measurement areas located at ends of the plurality of distance measurement areas belongs to the very short distance range and all the distances measured in other distance measurement areas belong to the moderate to long distance range is set up, wherein: if the condition is not satisfied, a closest distance of all distances measured for the plurality of distance measurement areas is employed as the measured distance, and if the condition is satisfied, a closest distance of the distances belonging to the moderate to long distance range of distances measured for the plurality of distance measurement areas is employed as the measured distance.

According to the present invention, even if the distance of an object located at the very short distance is measured in any one of the endmost distance measurement areas of a plurality of distance measurement areas, it is not determined according only to the above fact that the distance belonging to the very short distance range is not employed as a measured distance, but instead it is determined that the distance belonging to the very short distance range is not employed as a measured distance only when all the distances measured in other distance measurement areas belong to the moderate to long distance range, and then the shortest distance of distances belonging to the moderate to long distance range is employed as a measured distance. On the other hand, if any of the distances measured in other distance measurement areas belongs to the short distance range which is closer than the moderate to long distance range, the object located at the very short distance is likely one of the desired objects for shooting, and therefore the distance belonging to the very short distance range is employed. In this way, a suitable distance can be employed as a measured distance from distances of the distance measurement object measured in a plurality of distance measurement areas, thus making it possible to reduce the frequency of erroneous distance measurement. Furthermore, the plurality of distance measurement areas are not necessarily arranged in the horizontal direction, but may be arranged in the vertical direction or in the horizontal and vertical directions, and the above described endmost distance measurement areas refer to distance measurement areas located at the left and right ends for the horizontal direction, and refer to distance measurement areas located at the upper and lower ends for the vertical direction.

Preferably, the very short distance range is a range in which a short distance warning is given.

Preferably, the plurality of distance measurement areas set in the image formation range of the sensor are changed depending on an angle of view. For example, five distance measurement areas are set in the left-to-right direction for the wide angle of view, and three distance measurement areas are set in the left-to-right direction for the tele angle of view.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 13 shows an aspect of a peak selected area set in AF data acquirement processing;

FIG. 18 is an explanatory diagram used for explanation of peak selected area setting data;

FIG. 19 is an explanatory diagram used for explanation of peak selected area setting data;

FIG. 23 is an explanatory diagram used for explanation of the procedure for generating peak selected area setting data;

FIG. 38 shows a comparison of distance measurement time between the new method (present invention) and the conventional method;

FIGS. 39(A), 39(B) and 39(C) are explanatory diagrams used for explanation of minimum value determination processing;

FIGS. 40(A), 40(B), 40(C) and 40(D) are explanatory diagrams used for explanation of minimum value determination processing;

FIG. 41 shows cell positions i of employed cells in an R window and an L window in three-i-interval calculation;

FIGS. 89(A) to 89(F) are explanatory diagrams used for explanation of area selection processing.

DETAILED DESCRIPTION OF THE PREFERRED EMBODIMENTS

The preferred embodiments when the distance measuring apparatus according to the present invention is applied to, for example, a camera will be described in detail below, with reference to the accompanying drawings.

Figure 1:
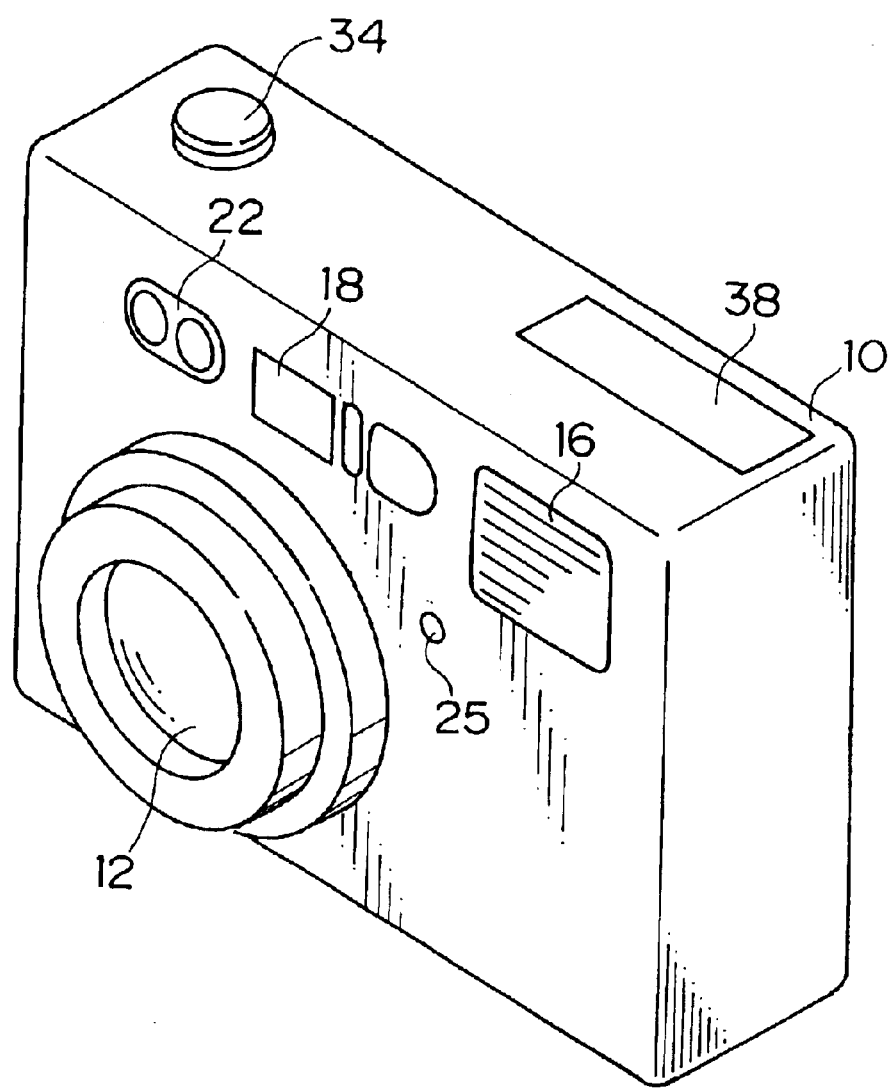
FIG. 1 is a front perspective view of a camera to which the present invention is applied.

FIG. 1 is a front perspective view of a camera to which the present invention is applied. As shown in FIG. 1, a camera 10 is provided with a zoom lens barrel 12 comprising a shooting lens for forming a subject image on a silver film, an flash light emitting window 16 through which flash light is emitted, a finder window 18 through which a photographer observes a subject, an AF window 22 containing a passive type AF sensor for measuring the subject distance, a photometry window 25 containing a photometry sensor for measuring luminance of the subject, a shutter button 34 to be operated when the photographer indicates shutter release and the like.

Figure 2:
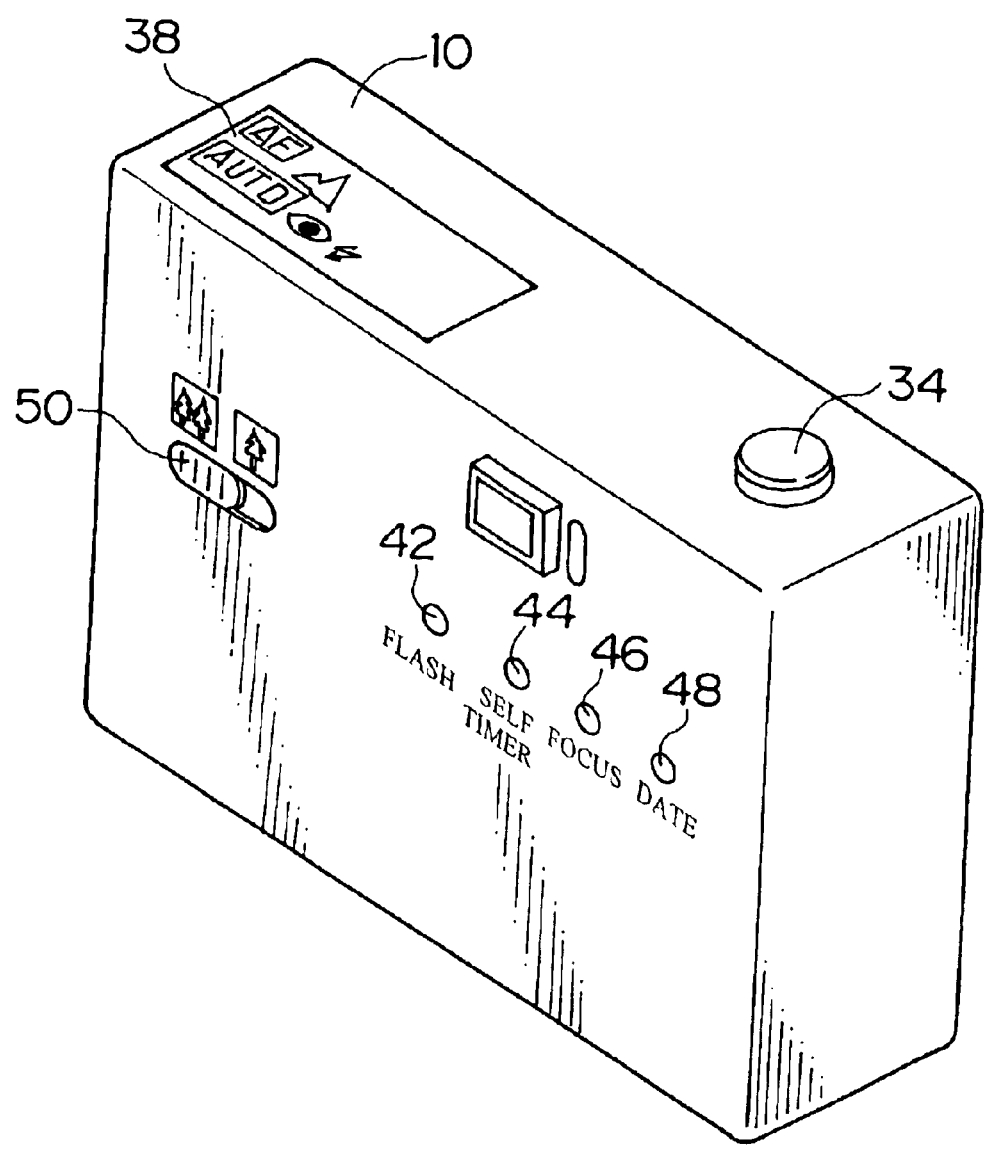
FIG. 2 is a rear perspective view of the camera to which the present invention is applied.

FIG. 2 is a rear perspective view of the camera 10. As shown in FIG. 2, the camera 10 is provided with an LCD display panel 38 displaying defined shooting modes, date information and the like, a flash button 42 for setting the flash light emission mode, a self timer button 44 for setting the self timer mode, a focus button 46 for setting the mode of focus, a date button 48 for setting the date and time, and a zoom button 50 for indicating the shooting angle of view in the wide direction or the tele direction.

For example, by operating the flash button 42, switching can be performed among modes relating to the electric flash, and modes selectable by the flash button 42 include an auto mode in which flash light is automatically emitted when the subject is dark, a red eye alleviating mode in which preliminary light emission is performed prior to proper light emission, a forced light emission mode in which flash light is forcefully emitted, a light emission prohibiting mode in which no flash light is emitted, and a night view portrait mode in which flash light is emitted to shoot man and night view. Also, by operating the focus button 46, switching can be performed among modes relating to the focus, and modes selectable by the focus button 46 include an auto focus mode in which the focus is automatically adjusted, a distant view mode for shooting a distant view, and a macro mode for macro shooting.

Figure 3:
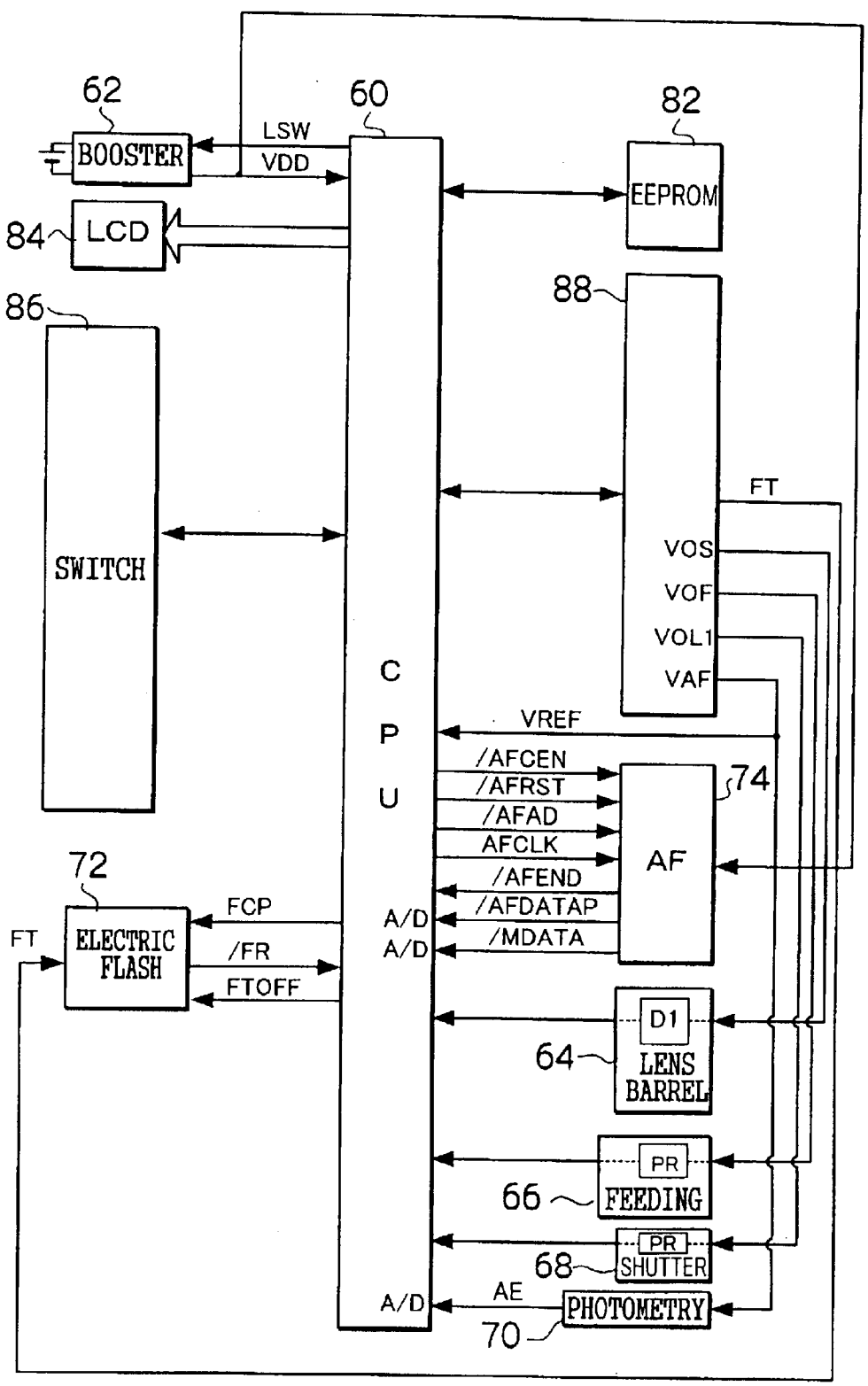
FIG. 3 is a block diagram showing a control unit of the camera to which the present invention is applied.

FIG. 3 is a block diagram showing a control unit of the camera 10. As shown in FIG. 3, the camera 10 is provided with a CPU 60 (information processing device) controlling the camera 10 in general, and is capable of acquiring information from each unit shown below, and also controlling each unit shown below according to instructions from the CPU 60. Furthermore, the CPU 60 shown in FIG. 3 may be an Application Specific Integrated Circuit (ASIC) constituted by peripheral circuits such as a CPU core unit and I/O, a watchdog timer and an A/D converter.

Also, as shown in FIG. 3, the camera 10 is provided with a regulator 62 raising the voltage of a battery and stabilizing the same to supply power to the CPU 60 and other peripheral circuits, a lens barrel drive unit 64 motor-driving the zoom lens barrel 12 to change the zoom position and focus position and outputting position information of zoom position and focus position to the CPU 60, and a film feeding drive unit 66 driving a film feeding motor to feed a film.

Also, the camera 10 is provided with a shutter drive unit 68 opening and closing a shutter during exposure to expose the film to light, a photometry sensor 70 measuring the light volume of a subject according to external light captured via the photometry window 25 of FIG. 1, an electric flash device 72 emitting flash light by means of light emission energy with which a main capacitor is charged, and a passive type AF sensor 74 acquiring data required for distant measurement in the auto focus from the subject light captured through the AF window 22 of FIG. 1.

Also, the camera 10 is provided with a programmable ROM 82 (recording device such as EEPROM) recording in a rewritable way various kinds of information such as parameters and data regarding the control of the camera 10, processing programs and information about distance measurement, and an LCD drive unit 84 outputting to the LCD display panel 38 signals for displaying graphics, characters, digits and the like consistent with respective modes according to instructions from the CPU 60.

Operations of various kinds of buttons such as the shutter button 34, the flash button 42, the self timer button 44, the focus button 46, the date button 48 and the zoom button 50 shown in FIG. 2 are provided to the CPU 60 as on/off signals from switches each provided for each of the buttons. These switches are shown as a switch unit 86 in FIG. 3. Furthermore, for the shutter button 34, the half-press condition (SP1 is in ON position) and the full-press condition (SP2 is in ON position) are detected separately.

Furthermore, a driver 88 shown in FIG. 3 is capable of controlling a zoom drive motor and a focus drive motor provided in the lens barrel drive unit 64 according to the command from the CPU to drive a film feed motor provided in the film feeding drive unit 66. Also, the driver 88 is capable of outputting reference voltage and drive power to an A/D conversion circuit and a photometry sensor 70 according to the command from the CPU 60. Also, the driver 88 is capable of outputting to the shutter drive unit 68 control signals for a shutter being opened and closed during exposure of the film to light according to the command from the CPU 60, and outputting to the electric flash device 72 signals providing instructions to emit/stop flash light.

Figure 4:
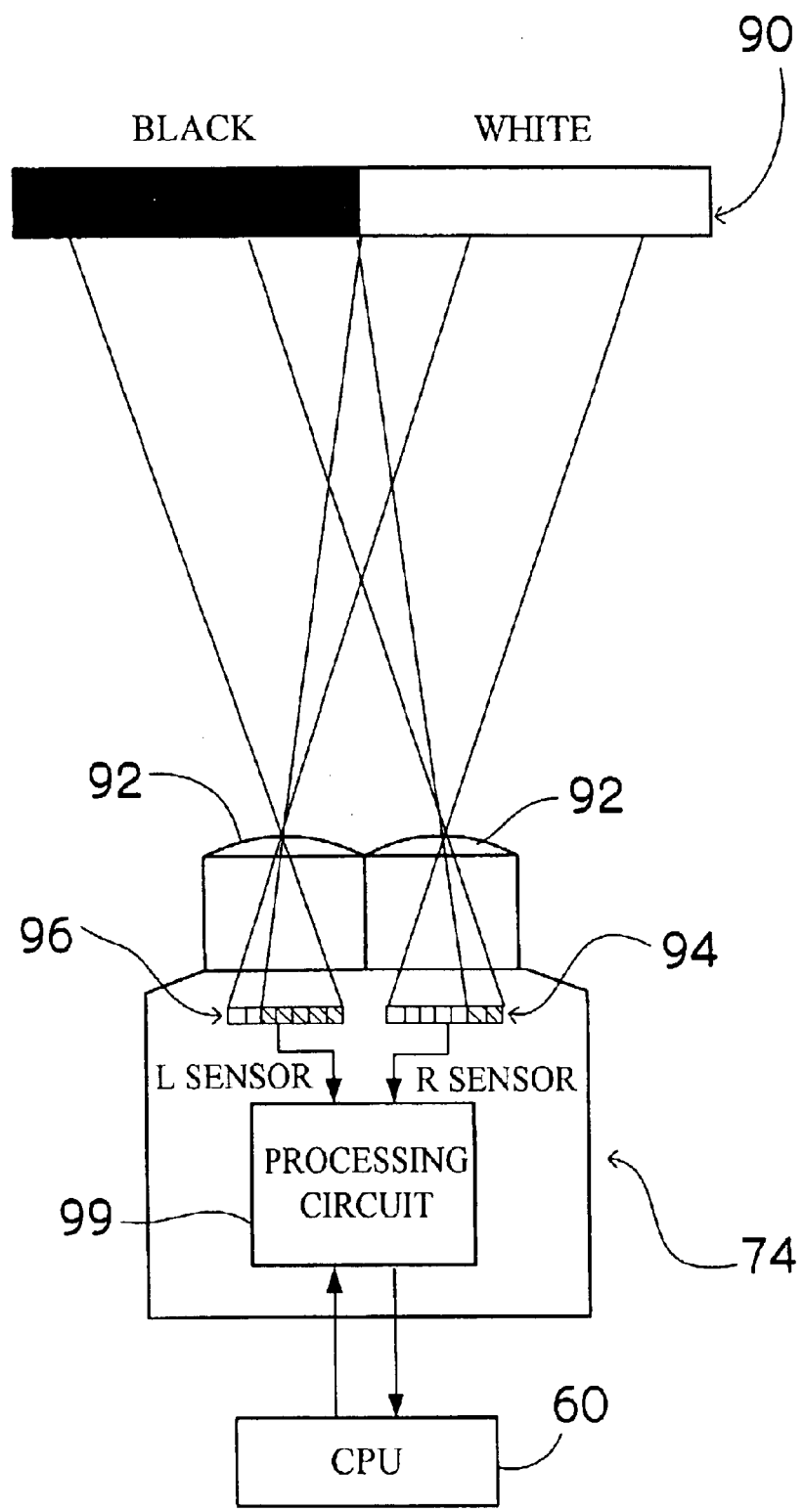
FIG. 4 shows the configuration of an AF sensor using a passive method.

FIG. 4 shows the configuration of the AF sensor 74 in the passive method. As shown in FIG. 4, the AF sensor 74 is provided with a lens 92 for forming on the light receiving surfaces of left and right sensors the images of a subject 90 each having, for example, black and white colors, a right side R (right) sensor 94 and a left side L (left) sensor 96 subjecting to photoelectric conversion the images formed on the light receiving surfaces to output the converted images as luminance signals, and a processing circuit 99 carrying out sending/receiving of various kinds of data with the CPU 60, and controlling the R sensor 94 and the L sensor 96 and processing data. Furthermore, for example, the R sensor 94, the L sensor 96 and the processing circuit 99 are mounted on the same substrate.

The R sensor 94 and the L sensor 96 are for example CMOS line sensors, and are constituted by a plurality of lineally arranged cells (light-receiving elements). Furthermore, the cells of the R sensor 94 and the L sensor 96 are given sensor numbers of 1, 2, 3, . . . , 233, 234, respectively, in the left-to-right order in FIG. 4. However, five cells on each of left and right sides of the R sensor 94 and the L sensor 96 are not used as they are dummy cells, and therefore the effective sensor area corresponds to sensor numbers of 6 to 229. Luminance signals appropriate to the amounts of received light are outputted in association with the sensor numbers in succession from the cells of the R sensor 94 and the L sensor 96 to the processing circuit 99.

The processing circuit 99 switches the AF sensor 74 between operation and non-operation states according to instruction signals from the CPU 60, acquires control data about operation contents from the CPU 60 in the operation state, and then starts processing such as integration processing according to the control data. As described later in detail, the integration processing is processing in which luminance signals of the cells obtained from the R sensor 94 and the L sensor 96 are integrated (added) for each cell to generate the value of integrated luminance signals (value of integrated light amounts) for each cell. Furthermore, provided that the data outputted from the light receiving cell of the AF sensor 74 as a value indicating the integration value of luminance signals for each cell is sensor data, the value that the processing circuit 99 actually generates is a value obtained by subtracting the integration value of luminance signals for each cell from a predetermined reference value (reference voltage VREF), and any sensor data hereinafter refers to this value. Thus, the larger the amount of received light, the smaller value the sensor data has. However, the sensor data outputted from the AF sensor 74 is a value according to the signals with outputs from the cells being integrated for each cell, and if the sensor data is data indicating features of the subject shot by the AF sensor 74 (e.g., data indicating the contrast of the subject), at least processing described below can be applied in the same manner. Also, in the description below, the term of mere "integration" or "integration processing" refers to integration or integration processing for obtaining sensor data (integration value of luminance signals).

Also, it is determined that sensor data sufficient for distance measurement to end the integration processing, when, for example, sensor data of any cell in a peak selected area described later, designated by the CPU 60, in the respective sensor areas (effective cells) of the R sensor 94 and the L sensor 96 reaches a predetermined integration end value, that is, when the peak value (minimum value) of the sensor data in the peak selected area reaches the integration end value. At this time, the processing circuit 99 outputs a signal indicating the end of integration (integration end signal) to the CPU 60. Furthermore, instead of the integration end condition in the AF sensor 74 such that integration is ended when the peak value of sensor data reaches the integration end value as described above, the integration condition such that integration is ended when the average value of sensor data in the peak selected area reaches a predetermined value, for example, may be employed, or other conditions may be employed as integration end conditions.

Figure 5:
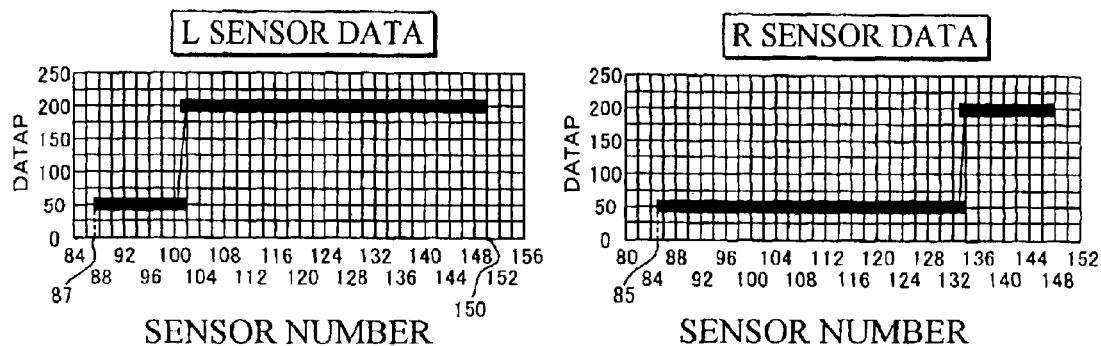
FIG. 5 illustrates a sensor image (AF data) where the distance between the AF sensor and a subject is small.
Figure 6:
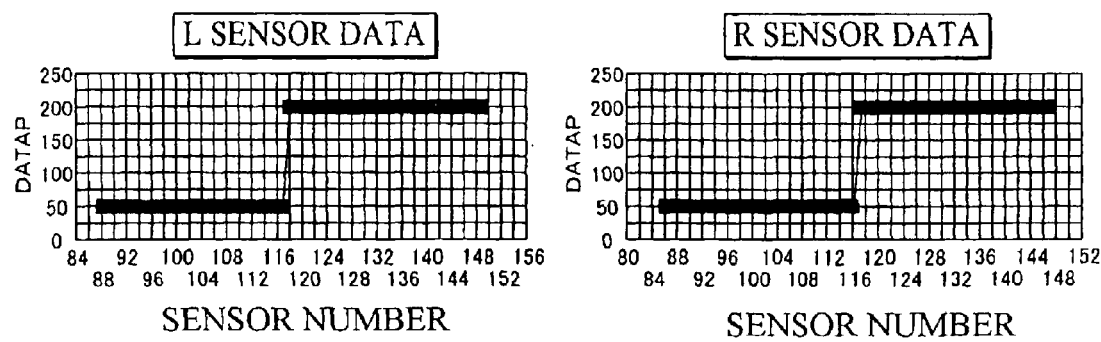
FIG. 6 illustrates a sensor image (AF data) where the distance between the AF sensor and a subject is large.

Upon the end of integration, the CPU 60 acquires sensor data of the cells obtained by integration processing from the processing circuit 99 with the sensor data being brought into correspondence with sensor numbers. In this way, the CPU 60 recognizes images formed by the R sensor 94 and the L sensor 96 (hereinafter referred to as sensor images). Then, as described in detail later, correlation values are calculated between the respective sensor images of the R sensor 94 and the L sensor 96 (or after processing for extracting the contrasts of the sensor images is carried out), and the amount of deviation between the sensor images when correlation reaches the highest level is determined to calculate the distance from the subject 90 (principle of triangulation). FIGS. 5 and 6 illustrate sensor images (sensor data) when the distance between the AF sensor 74 and the subject 90 is small and large, respectively. When the distance from the subject 90 is small, the sensor data with sensor numbers of 87 to 101 have luminous values (50) and the sensor data with sensor numbers of 101 to 150 have dark values (200) for the L sensor 96, as shown in FIG. 5. For the R sensor 94, since it is placed at a location different from that of the L sensor 96, the sensor data with sensor numbers of 85 to 133 have luminous values (50) and the sensor data with sensor numbers of 133 to 148 have dark values (200).

On the other hand, when the distance from the subject 90 is large (for example infinite distance), the sensor data with sensor numbers of 87 to 117 have luminous values (50) and the sensor data with sensor numbers of 118 to 150 have dark values (200) for the L sensor 96, as shown in FIG. 6. On the other hand, since the R sensor 94 is placed at a location different from that of the L sensor 96 but the subject is located at a great distance, the sensor data with sensor numbers of 85 to 116 have luminous values (50) and the sensor data with sensor numbers of 117 to 148 have dark values (200). In this case, the CPU 60 may determine that the amount of deviation between the sensor images of the R sensor 94 and the L sensor 96 is almost zero, and therefore the subject is located at an infinite distant. In contrast to this, as shown in FIG. 5, the amount of deviation between the sensor images is greater when the distance from the subject is small.

Quantitatively, the subject distance can be calculated from the amount of deviation between the sensor images in consideration of the space between the R sensor 94 and the L sensor 96 and the distance between each sensor and the lens 92, the pitches (e.g., 12 μm) of the cells of the R sensor 94 and the L sensor 96. The amount of deviation between the sensor images can be determined by calculating the correlation value between the sensor images of the R sensor 94 and the L sensor 96, as described in detail below.

The processing of AF distance measurement for using the AF sensor 74 having the above-described configuration to measure the distance of the subject, and bringing the subject into focus will now be described.

When the user sets the processing mode of the camera 10 to the imaging mode and half-presses the shutter button 34, the CPU 60 acquires from the switch unit 86 an ON signal of SPI indicating that the shutter button 34 has been half-pressed. If the ON signal of SPI has been acquired, the CPU 60 sets an AE appropriate to the luminance of the subject for imaging the subject, and starts AF distance measurement processing for identifying the subject and bringing the subject into focus.

Figure 7:
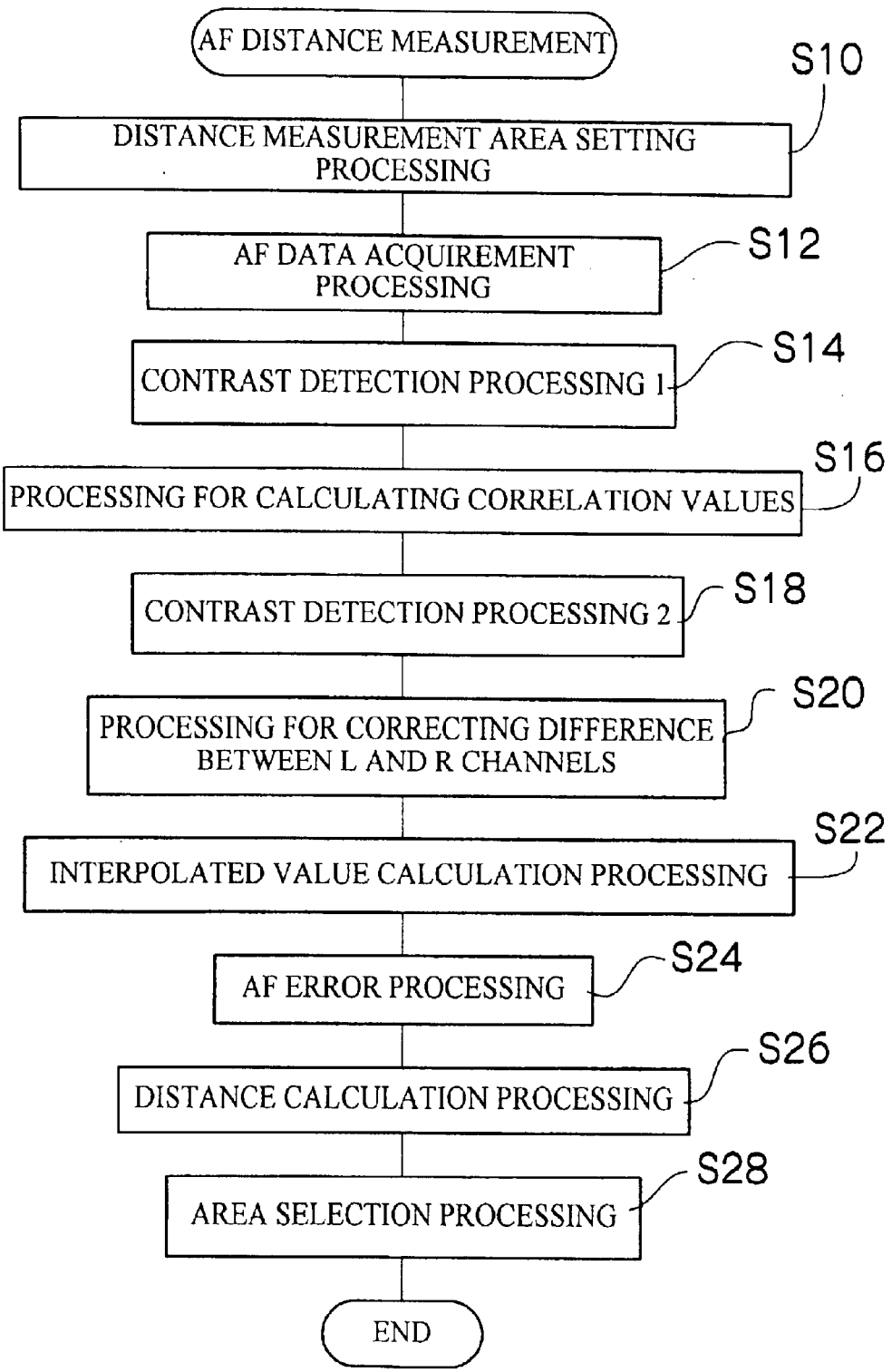
FIG. 7 is a flow chart showing the outlined processing procedure of AF distance measurement in a CPU.

FIG. 7 is a flow chart showing a general outline of procedures of AF distance measurement processing in the above-described CPU 60.

Step S10 (Distance Measurement Area Setting Processing)

The shooting lens can change the focus distance by driving the zoom lens barrel 12 while the lens 92 causing the AF sensor 74 to form sensor images is a fixed-focus lens. Then, an arrangement is made so that the distance measurement area is varied depending on the lens position (angle of view) of the shooting lens. That is, if the shooting lens is in the tele position, the distance measurement area is narrowed.

Figure 8:
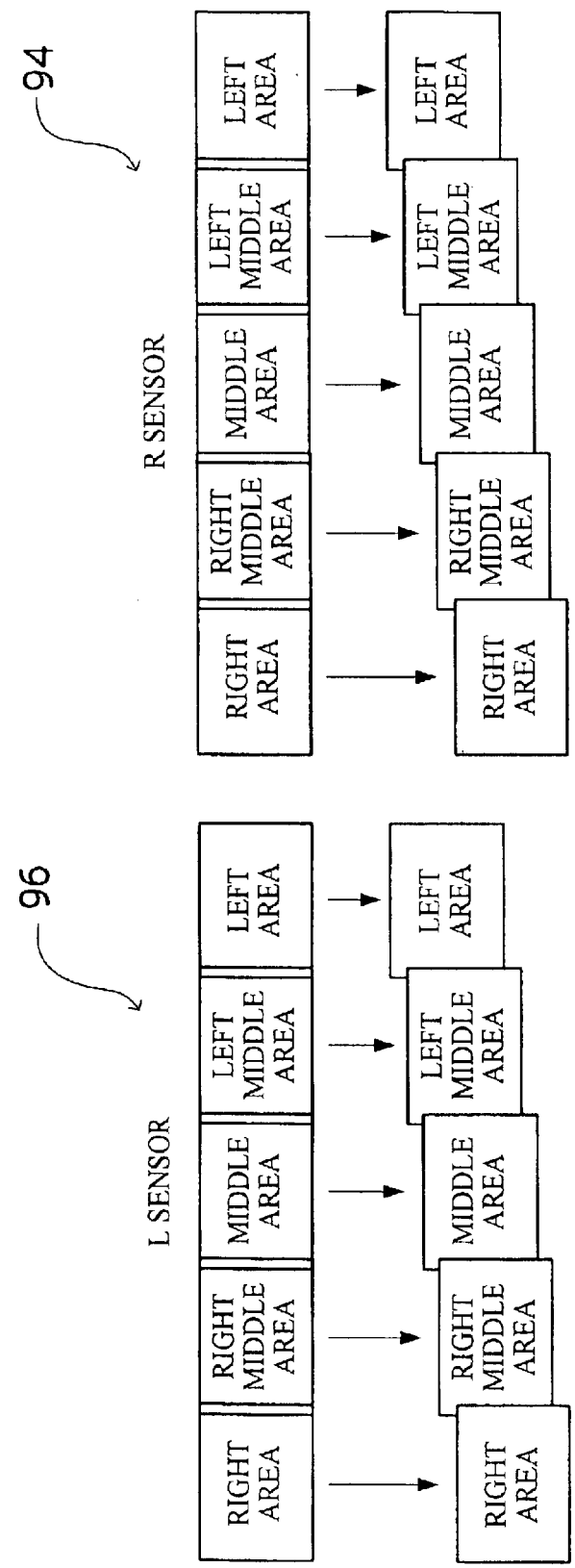
FIG. 8 shows divided areas in sensor areas of an R sensor and an L sensor.

Here, as shown in FIG. 8, processing such as correlation values are calculated in five-way divided area units for the sensor areas of the R sensor 94 and the L sensor 96, respectively, and the subject distance is calculated for each area. Provided that the area divided in this way is hereinafter referred to as a divided area, the divided area is constituted by "right area", "right middle area", "middle area", "left middle area" and "left area". Also, each divided area shares a partial area (cells) with its adjacent divided area. In calculation of correlation values or the like, correlation values are calculated individually between the corresponding divided areas of the R sensor 94 and the L sensor 96 (between the divided areas having the same area name). Furthermore, the divided areas are areas obtained by dividing the sensor area by five in this embodiment, but it may be divided by a number other than five.

Figure 9:
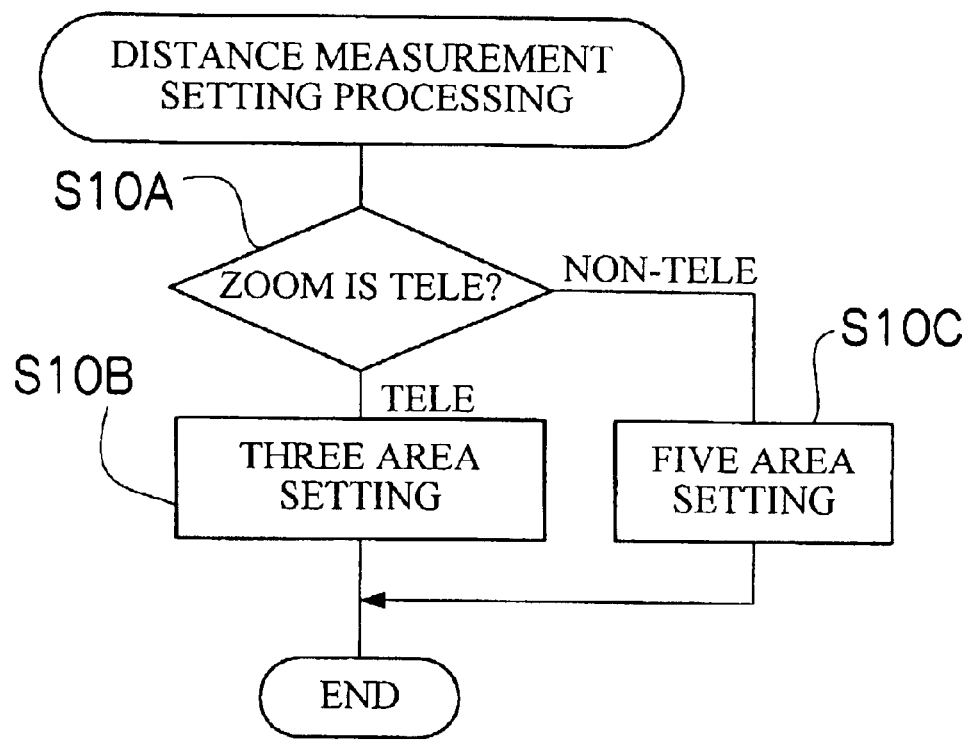
FIG. 9 is a flow chart showing the procedure of distance measurement area setting processing.

The distance measurement area is an area to be used for distance measurement, in the sensor areas of the R sensor 94 and the L sensor 96, and the above-described divided areas are used for determining the distance measurement area. The distance measurement area setting processing will be described in detail in conjunction with the flow chart of FIG. 9.

First, the CPU 60 acquires from the lens barrel drive unit 64 information about the currently set zoom position (set angle of view) to determine whether the zoom position is on the tele side or on the wide side (non-tele side) of the predetermined zoom position (step S10A). For example, when the zoom changeable range is divided into six regions of Z1 to Z6, it is determined that the zoom position is on the tele side if the current zoom position is set in the region Z6 located on the tele end side, and it is determined that the zoom position is on the non-tele side if the current zoom position is set in any of other regions of Z1 to Z5. Furthermore, the mode is set to the macro mode, it is determined that the position is on the non-tele side.

Figure 10:
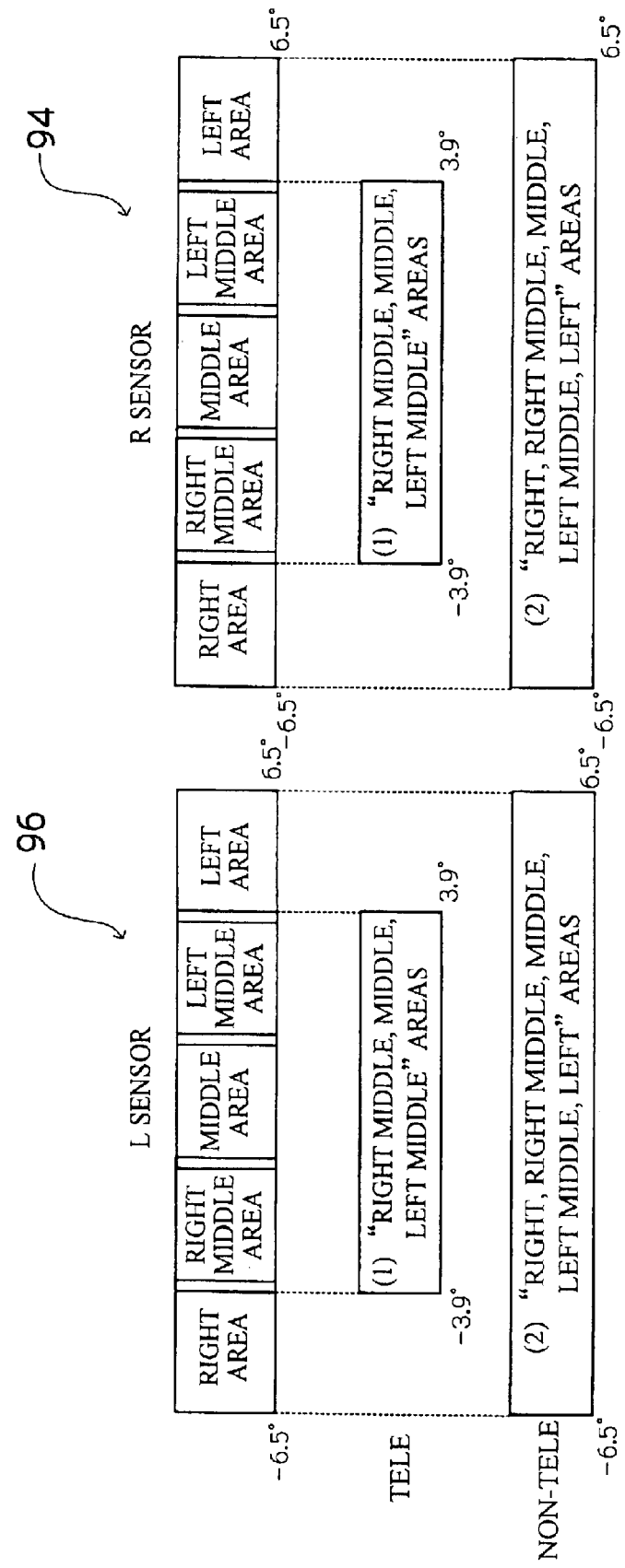
FIG. 10 shows distance measurement areas in three area setting and five area setting.

If it is determined that the zoom position is on the tele side, the distance measurement area for use in distance measurement, in the sensor areas of the R sensor 94 and the L sensor 96 (range with the angle of view being ±6.5°) is limited to a range corresponding to the angle of view of the shooting lens (range with the angle of view being ±3.9°) as shown in FIG. 10. That is, if it is determined that the zoom position is on the tele side, an area (1) constituted by the three divided areas of "right middle area", "middle area" and "left middle area" situated in the middle part of the entire sensor (five areas) of the R sensor 94 and the L sensor 96 is set as a distance measurement area (three area setting) (step S10B). On the other hand, if it is determined that the zoom position is on the non-tele side, an area (2) constituted by five divided areas of "right area", "right middle area", "middle area", "left middle area" and "left area" is set as a distance measurement area (five area setting)(step S10).

Step S12 (AF Data Acquisition Processing)

In step S12 of FIG. 7, the method of acquiring AF data (described later) is varied depending on the luminance of the subject.

Specifically, the sensor sensitivity of the AF sensor 74 (gain of luminance signal) is set at low sensitivity when the luminance of the subject is ultra high or high luminance, and integration processing is carried out individually in the "middle area", "left middle area" and "right middle area" constituting the distance measurement area (see area (1) in FIG. 10) if the distance measurement area is set by three area setting, and integration processing is carried out individually in the "middle area", "left middle and left area" and "right middle and right area" constituting the distance measurement area (see area (2) in FIG. 10) if the distance measurement area is set by five area setting. The "left middle and left area" refers to an area constituted by "left middle area" and "left area", and the "right middle and right area" refers to an area constituted by "right middle area" and "right area". In addition, the sensitivity of the AF sensor 74 can be switched in two levels between high sensitivity and low sensitivity.

Figure 11A:
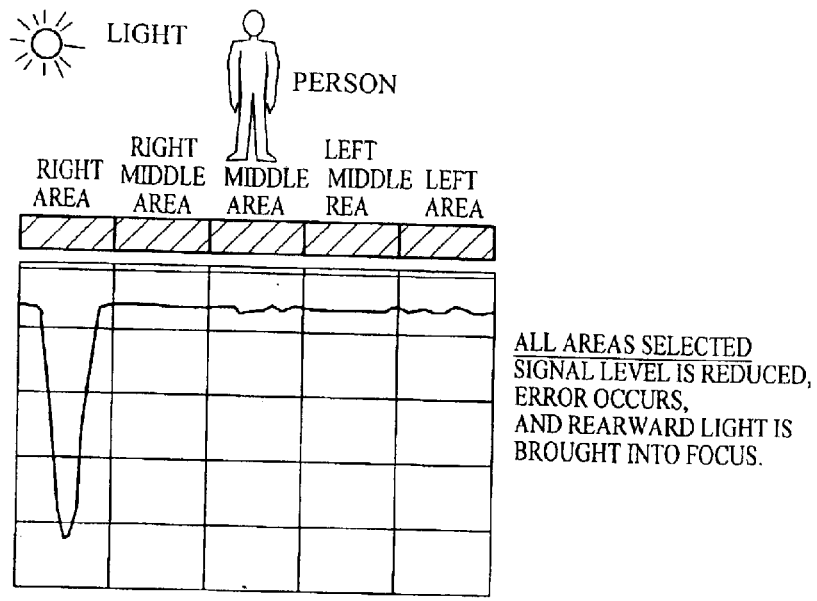
FIGS. 11(A) and 11(B) are explanatory diagrams used for explanation of effects where the distance measurement area is divided to perform integration processing individually.
Figure 11B:
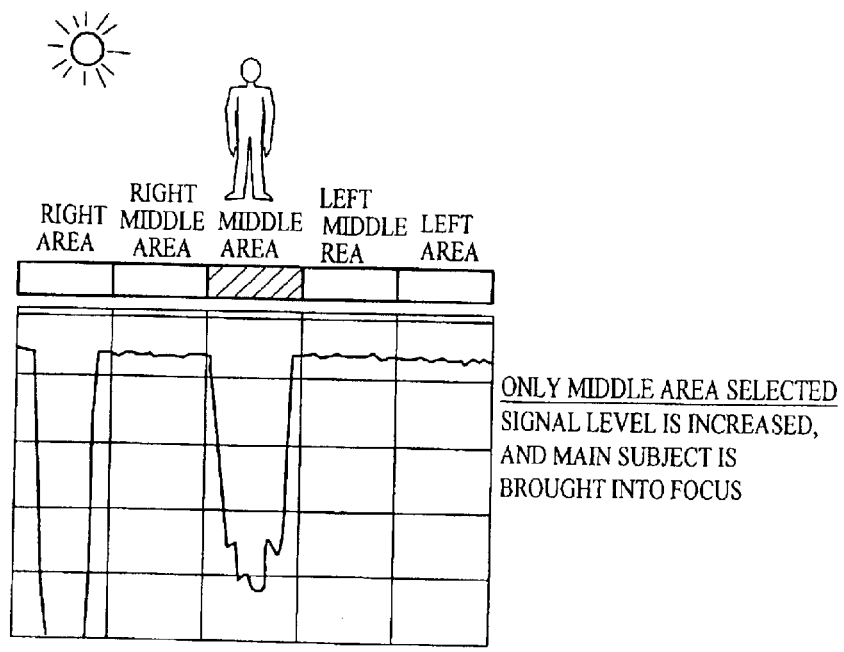

Here, carrying out integration processing individually in the "middle area", "left middle" (or "left middle and left area") and "right middle area" (or "right middle and right area") constituting the above-described distance measurement area means acquiring the sensor data in the "middle area" when any sensor data in the "middle area" reaches an integration end value, and subsequently resetting the sensor data to start integration, and acquiring the sensor data in the "left middle area" (or left middle and left area) when sensor data of any cell in the "left middle area" (or left middle and left area) reaches an integration end value, and then resetting the sensor data to start integration, and acquiring the sensor data in the "right middle area" (or right middle and right area) when sensor data of any cell in the "right middle area" (or right middle and right area) reaches an integration end value. By carrying out individually integration processing in plurality of areas, in this way, effective sensor data can be acquired from other areas even if light of high luminance or the like comes in any area, and sensor data in that area is inappropriate. For example, assume that there exist in the distance measurement area a person as a main subject as shown in FIGS. 11(A) and 11(B) and light of high luminance behind the person when the distance measurement area is set by five area setting. At this time, if integration processing is carried out with the entire area of the distance measurement area considered as a selected area (peak selected area), for example, the signal level of sensor data in the right area corresponding to the light of high luminance becomes appropriate as shown in FIG. 11(A), and the signal level of sensor data in the middle area corresponding to the person as a main subject decreases. As a result, when the subject distance is determined for each divided area, it is determined that distance measurement is impossible for the middle area, and consequently problems occur such that the light behind the person is brought into focus. In contrast to this, if integration processing is carried out individually with the distance measurement area divided into a plurality of areas as described above, the signal level of sensor data corresponding to the person as a main subject becomes appropriate in the integration processing in the middle area as shown in FIG. 11(B), and consequently the person can be brought into focus.

Also, in the case where the luminance of the subject is moderate luminance, the sensor sensitivity of the AF sensor 74 is set at low sensitivity, and integration processing in the distance measurement area set by three area setting or five area setting is carried out at the same time. For example, in the case of three area setting, integration processing in the "middle area", "left middle area" and "right middle area" constituting the distance measurement area (see area (1) in FIG. 10) is carried out at the same time, and when sensor data of any cell in the "middle area", "left middle area" and "right middle area" reaches an integration end value, the sensor data in the "middle area", "left middle area" and "right middle area" is acquired at the same time.

In addition, in the case where the luminance of the subject is low luminance, the sensor sensitivity of the AF sensor 74 is set at high sensitivity, and integration processing in the distance measurement area set by three area setting or five area setting is carried out at the same time. Furthermore, if the sensor data of the cells in the distance measurement area does not reach an integration end value even after integration time reaches predetermined time, the integration is ended, followed by switching the sensor sensitivity of the AF sensor 74 to low sensitivity to start integration, and causing supplemental light for auto focus to be emitted from the electric flash device 72 (AF pre-light emission). In this case, integration processing in the distance measurement area set by three area setting or five area setting is carried out at the same time.

Furthermore, here, data outputted from the light receiving cell of the AF sensor is defined as sensor data, and image data that is used after contrast detection processing 1 described below is set not only as sensor data itself but also as sensor data subjected to contrast extraction processing and the like, and therefore in the processing carried out after the contrast detection processing 1, sensor data directly used for processing and sensor data subjected to contrast extraction processing and the like are collectively referred to as AF data.

Step S14 (Contrast Detection Processing 1)

In step S14 of FIG. 7, whether the AF data acquired in step S12 has contrast required for distance measurement or not is determined. If it is determined that the AF data does not have contrast required for distance measurement (low contrast determination), it is determined that distance measurement is impossible.

Here, in the case where three areas are set as the distance measurement area in the distance measurement area setting processing in step S10, the above-described contrast determination is made for each of the divided areas, namely the right middle area, middle area and left middle area, and processing such as calculation of correlation values using AF data of the divided area for which low contrast determination has been made is not carried out. In a similar way, in the case where five areas are set as the distance measurement area, the above-described contrast determination is made for each of the divided areas, namely the right area, right middle area, middle area, left middle area and left area, and processing such as calculation of correlation values using AF data of the divided area for which low contrast determination has been made is not carried out.

Step S16 (Processing for Calculating Correlation Values)

In step S16 of FIG. 7, correlation values are calculated between the sensor images (AF data) captured from the R sensor 94 and the L sensor 96 of the AF sensor 74, respectively, and the amount of deviation between the sensor images (the amount of shift between left and right AF data) when correlation is at the highest level is determined. The distance of the subject can be determined from this amount of shift between left and right AF data.

Furthermore, in the case where three areas are set as the distance measurement area, correlation values are calculated for each of the divide areas, namely the right middle area, middle area and left middle area, and in the case where five areas are set as the distance measurement area, correlation values are calculated for each of the divided areas, namely the right area, right middle area, middle area, left middle area and left area; however, calculation of correlation values is not carried out in the divided area for which low contrast determination has been made (it has been determined that distance measurement is impossible).

The above-described correlation calculation will now be described referring to FIG. 12.

Figure 12:
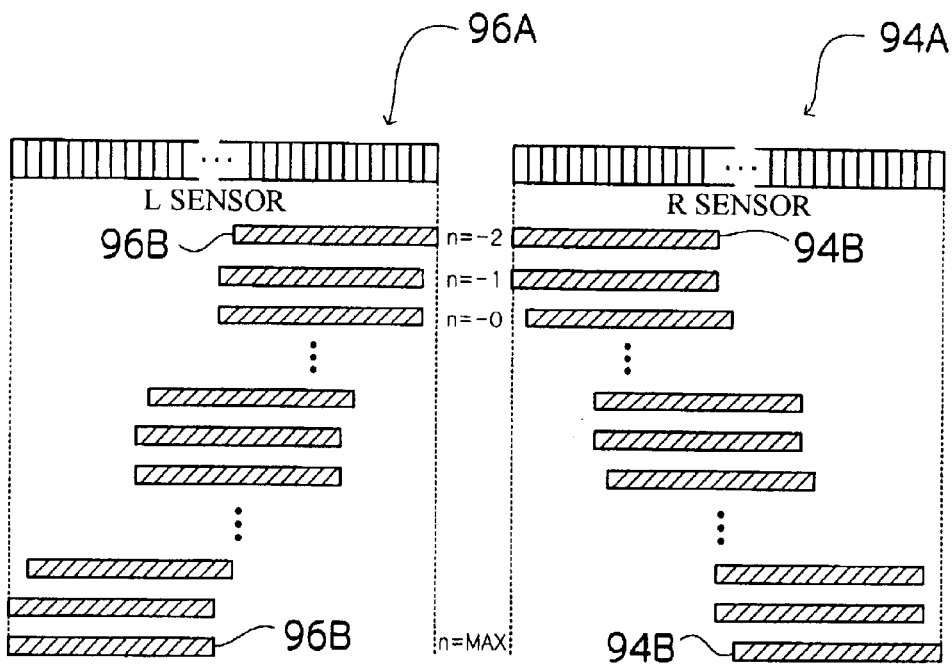
FIG. 12 is an explanatory diagram used for explanation of calculation of correlation values.

In FIG. 12, reference characters 94A and 96A designate sensors (employed sensors) of certain divided areas in the R sensor 94 and the L sensor 96, respectively. Also, reference characters 94B and 96B designate an R window and an L window for extracting AF data for use in calculation of correlation values from the AF data of the employed sensors 94A and 96A, respectively.

Here, provided that the amount of shift between the R window 94B and the L window 96B is n (n=−2, −1, 0, 1, ..., MAX (=38)), the R window 94B is located in the left end of the employed sensor 94A, and the L window 96B is located in the right end of the employed sensor 96A when n=−2 holds. The L window 96B is shifted by one cell to the left from the right end of the employed sensor 96A when n=−1 holds, and the R window 94B is shifted by one cell to the right from the left end of the employed sensor 94A when n=0 holds, and in the same manner, the R window 94B and the L window 96B are shifted by one cell in an alternative manner as n is incremented by one. When n=MAX holds, the R window 94B is located in the right end of the employed sensor 94A, and the L window 96B is located in the left end of the employed sensor 96A.

Now, provided that the correlation value when the amount of shift between the R window 94B and the L window 96B equals n is f(n), the correlation value f(n) can be expressed by the following equation (1):

$$f(n) = \sum_{i=1}^{wo} |L(i) - R(i)| \quad (1)$$

where i is a number indicating the position of the cell in the window (i=1, 2, ... wo (=42), and R(i) and L(i) are AF data obtained from cells in the same cell position in the R window 94B and the L window 96B, respectively. That is, as shown in the equation (1), the correlation value f(n) is the total sum of absolute values of differentials of AF data obtained from cells in the same cell position in the R window 94B and the L window 96B, and approaches zero as the correlation becomes higher.

Thus, the correlation value f(n) is determined with the amount of shift n being varied, and then the distance of the subject can be determined from the amount of shift for the smallest correlation value f(n) (highest correlation). Furthermore, images of the subject are formed on the R sensor 94 and the L sensor 96 so that the correlation reaches the highest level for the amount of shift n=0 when the subject is at an infinite distance, and the correlation is at the highest level for the amount of shift n=MAX when the subject is at an extremely close distance. In addition, the computing equation for determining correlation is not limited to the above-described equation (1), and other computing equations may be used. In that case, there may be cases where the correlation value increases as correlation becomes higher, and in these cases, the relative magnitude of the correlation value in the description below is reversed, and this embodiment is applied in the computing equation. For example, the minimum value of correlation values calculated from the above-described equation (1) becomes the maximum value, and the expression of "small or large" and the like may be reversed to the expression of "large or small" and the like.

Step S18 (Contrast Detection Processing 2 )

Whether AF data in the divided area has contrast required for distance measurement or not is determined in step S14 of FIG. 7, while whether AF data in the window range when the amount of shift n is such that the correlation is at the highest level has contrast required for distance measurement or not is determined in step S18. Then, if it is determined the AF data has low contrast, it is determined that distance measurement is impossible, and distance measurement according to the amount of shift n at that point is not carried out.

Step S20 (L, R Channel Difference Correction Processing)

In step S20 of FIG. 7, the minimum values of left and right AF data obtained from the AF sensor 74, within the window range with correlation being at the highest level, are compared. Then, if the absolute of the difference between the minimum values of left and right AF data is equal to than or greater than a first reference value and smaller or equal to a second reference value, AF data of the channel not exceeding the dynamic range is corrected. Furthermore, if the correlation value is small when the correlation is at the highest level, it can be determined that the result of calculation of correlation values is reliable even if AF data is not corrected, and therefore correction of AF data may be omitted unless the correlation value with the correlation being at the highest level is equal to or greater than a third reference value.

Also, if AF data has been corrected, correlation values are calculated again to determine the minimum correlation value. Then, the minimum correlation value after correction is compared with the minimum correlation value before correction, and the amount of shift for the correlation value of higher consistence is employed.

Step S22 (Interpolated Value Calculation Processing)

In step S22 of FIG. 7, the correlation value f(n) with the correlation being at the highest (smallest minimum value) is determined, and thereafter the smallest minimum value and the correlation values before and after the smallest minimum value are used to calculate an interpolated value with the amount of shift being equal to or smaller than 1 (equal to or smaller than 1 pitch of the cell of the AF sensor 74).

Provided that the amount of shift for which the smallest minimum value has been obtained is n, according to the smallest minimum value and correlation values in a plurality of amounts of shift before and after the amount of shift n (at least three correlation values), the intersection point of two straight lines passing through these correlation values and intersecting each other is such a manner to form a V-shape, and the above-described interpolated value is determined as a differential value of the position of the intersection point and the amount of shift n.

Step S24 (AF Error Processing)

In step S24 of FIG. 7, if it is determined that distance measurement is impossible in all the distance measurement areas set by three area setting or five area setting, the shooting lens is set so that a preset subject distance is brought into focus.

That is, if supplemental light for auto focus is emitted and it is determined that error occurs due to insufficient AF data in all the distance measurement areas, the shooting lens is set so that the infinite distance is brought into focus.

Also, if supplemental light for auto focus is emitted and it is determined that error occurs due to insufficient AF data in all the distance measurement areas, switching may be made to an flash light-reachable fixed-focus set distance depending on the film sensitivity. For example, the fixed-focus set distance is 6 m in the case of the film sensitivity of ISO400 or higher, and the fixed-focus set distance is 3 m in the case of the film sensitivity lower than ISO400. In addition, switching may be made among different fixed-focus set distances to be brought into focus depending on the type of error.

Step S26 (Distance Calculation Processing)

In step S26 of FIG. 7, the subject distance is calculated according to the amount of shift n when the correlation value of the smallest minimum value is obtained by the calculation of correlation values in step S16 and the interpolated value computed in step S22. Furthermore, the subject distance is calculated for all the distance measurement areas set by three area setting or five area setting.

Step S28 (Area Selection Processing)

If no error occurs during AF distance measurement processing, three subject distances are calculated in the case of three area setting, and five subjects are calculated in the case of five area setting. When a plurality of subject distances are calculated, the shortest subject distance is essentially employed in step S28.

Furthermore, five subject distances are calculated in the case of five area setting, and if of these subject distances, the subject distance corresponding to one of the left area and right area is a very short distance, and all the subject distances corresponding to other areas are moderate or longer distances, the result of the very short distance is not employed, but the shortest subject distance of the moderate or longer subject distances is employed.

Detailed Description of AF Data Acquirement Processing (Step S112 in FIG. 7)

The AF data acquirement processing in step S12 of FIG. 7 will now be described in detail.

Figure 13:
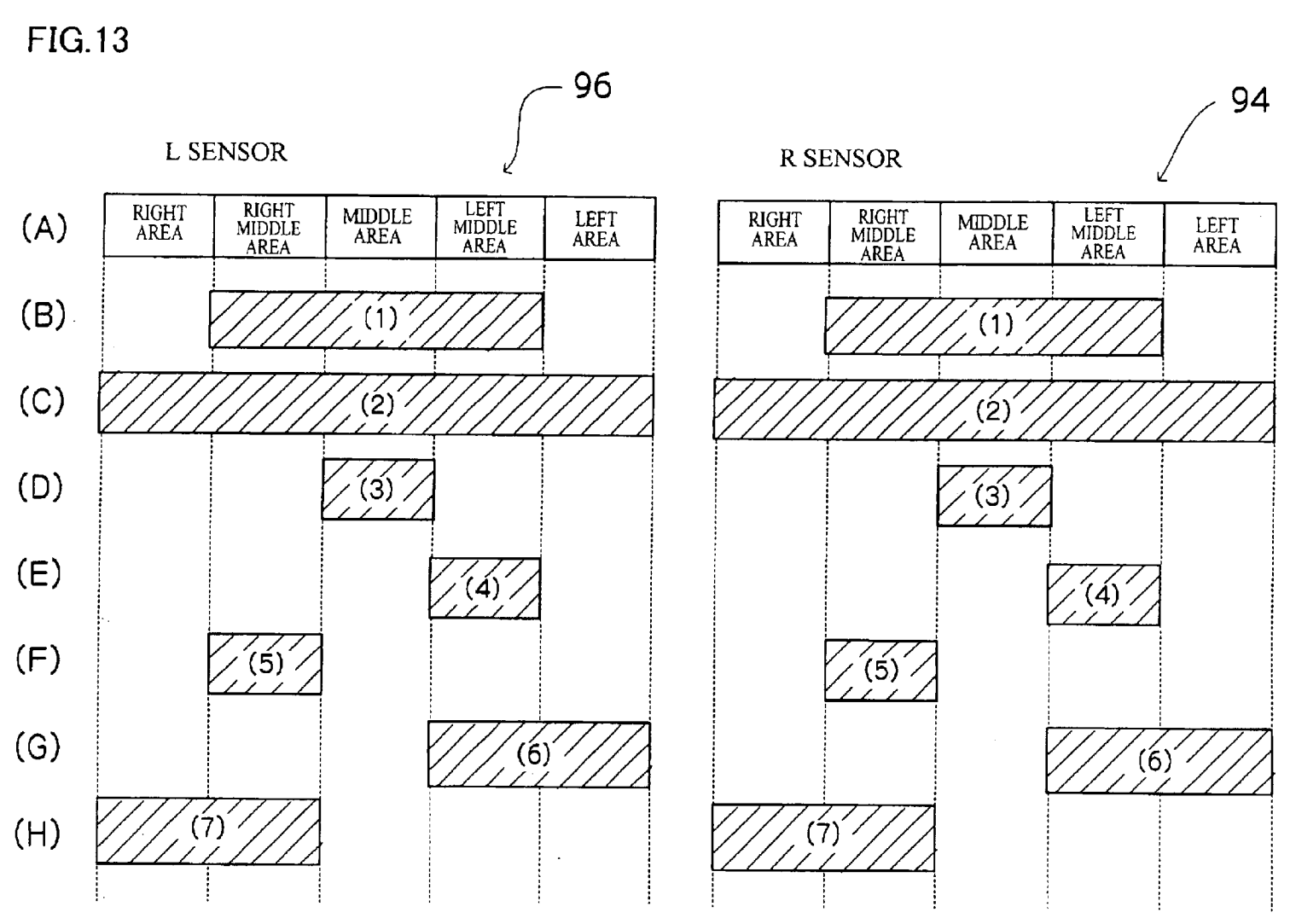

For describing the peak selected area first, the peak selected area means the range of cells in which whether the peak value (smallest value) of sensor data has reached an integration end value or not is monitored in integration processing in the AF sensor 74. FIG. 13 shows an aspect of the peak selected area set in AF data acquirement processing described below. The peak selected area is constituted as its units by divided areas described with FIG. 8, and the divided areas of the R sensor 94 and the L sensor 96 are shown at (A) in FIG. 13. In contrast to this, peak selected areas are shown at (B) to (H) in FIG. 13, the peak selected area is switched among areas (1) to (7).

The area (1) shown at (B) in FIG. 13 is constituted by three divided areas of "middle area", "right middle area" and "left middle area" in the R sensor 94 and the L sensor 96, and the area (2) shown at (C) in FIG. 13 is constituted by five divided areas of "middle area", "right middle area", "right area", "left middle area" and "left area" in the R sensor 94 and the L sensor 96. Furthermore, the area (1) is equivalent to the area (1) in the case of three area setting shown in FIG. 10, and area (2) is equivalent to the area (2) in the case of five area setting shown in FIG. 10. The areas (3), (4) and (5) shown in at (D), (E) and (F) in FIG. 13 are "middle area", "left middle area" and "right middle area" in the R sensor 94 and the L sensor 96, respectively, the area (6) shown at (G) in FIG. 13 is constituted by the left middle area and left area in the R sensor 94 and the L sensor 96, and the area (7) shown at (H) in FIG. 13 is constituted by the right middle area and right area in the R sensor 94 and the L sensor 96.

Figure 14:
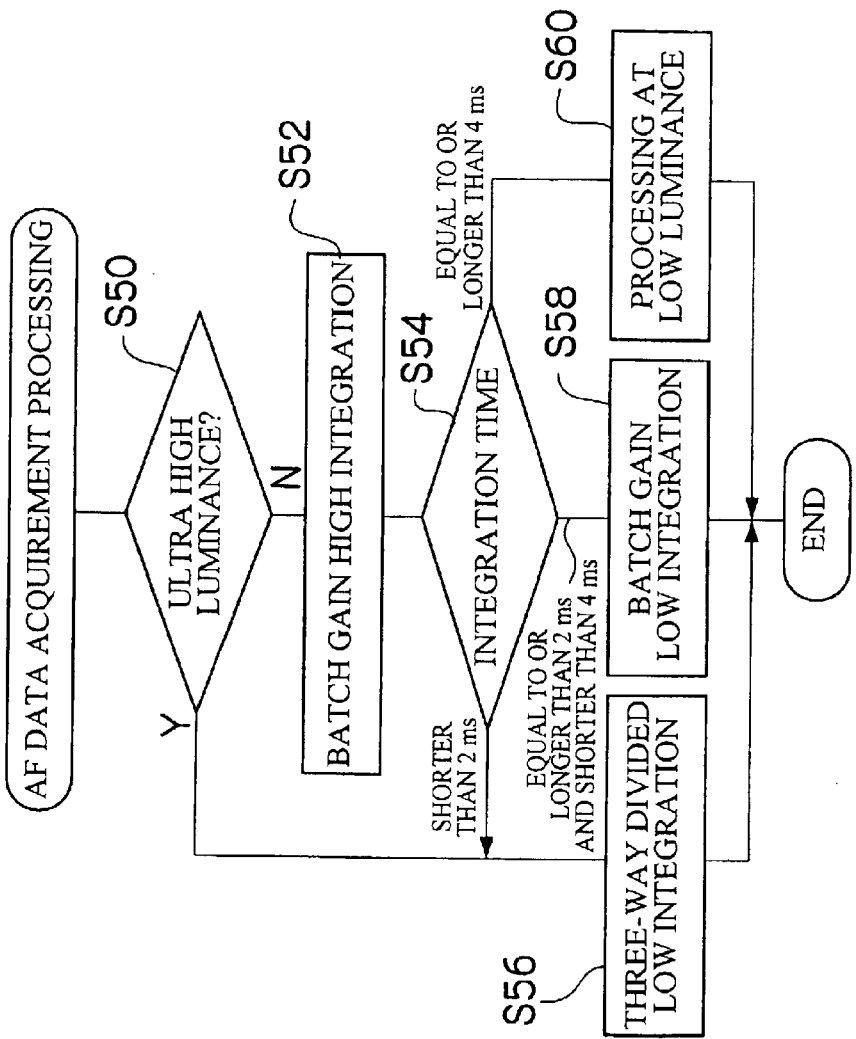
FIG. 14 is a flow chart showing the procedure of AF data acquirement processing.

FIG. 14 is a flow chart showing the procedure of AF data acquirement processing. First, the CPU 60 references to the signal output of the amount of light outputted by the photometry sensor 70 to determine whether the amount of light obtained from the subject is equal to or larger than a predetermined threshold considered as ultra high luminance or not is determined (step S50). If the result of determination is NO, the CPU 60 causes the AF sensor 74 (processing circuit 99 of AF sensor 74) to start processing of batch gain high integration (step S52). In the description below, even in the case of processing that is performed by the processing circuit 99 of the AF sensor 74, the processing circuit 99 will not precisely be mentioned, but only the AF sensor 74 will be mentioned.

The batch gain high integration is processing in which the area having the same range as the distance measurement area set by the distance measurement area setting processing in step S10 of FIG. 7 is set as the peak selected area, and the sensor sensitivity of the AF sensor 74 is set at high sensitivity, and sensor data in the cells in the distance measurement area is acquired at the same time. In the case where the distance measurement area is set by three area setting in the above-described distance measurement area setting processing (the zoom position is on the tele side), the peak selected area is set to the area (1) shown at (B) in FIG. 13. On the other hand, in the case where the distance measurement area is set by five area setting (the zoom position is on the non-tele side), the peak selected area is set to the peak selected area (2) shown at (C) in FIG. 13. Furthermore, the batch gain high integration is integration processing for acquiring sensor data when the subject luminance is low luminance, but it is also processing for determining whether the subject luminance is high luminance or moderate luminance or low luminance as apparent from the description presented later. Other methods for determining the subject luminance may be employed instead of this batch gain high integration processing in step S52.

After batch gain high integration by the AF sensor 74 is started, the CPU 60 waits until an integration end signal indicating the end of integration is outputted from the AF sensor 74. Then, the CPU 60 determines whether the time period between the instant at which the integration processing is started and the instant at which the integration processing is ended (integration time) is shorter than 2 ms, or equal to or longer than 2 ms and shorter than 4 ms, or equal to or longer than 4 ms (integration processing is not ended even after an elapse of 4 ms) (step S54).

If the amount of integration time is shorter than 2 ms, it is determined that the subject has high luminance to reset sensor data of the AF sensor 74, and then switching is made to three-way divided low integration described in detail later (step S56). If the amount of integration time is equal to or longer than 2 ms and shorter than 4 ms, it is determined that the subject has moderate luminance to reset sensor data of the AF sensor 74, and then switching is made to batch gain low integration described in detail later (step S58). If the amount of integration time is equal to or longer than 4 ms, it is determined that the subject has low luminance to carry out processing associated with low luminance described in detail later (step S60).

Here, if the result is YES in the step S50, that is, it is determined that the subject has ultra high luminance, processing of three-way divided gain low integration is carried out as in the case where integration is ended within 2 ms (step S56).

The processing of three-way divided gain low integration in step S56 is processing by the CPU 60 in which the sensor sensitivity of the AF sensor 74 is set at low sensitivity, and the distance measurement area set in the above-described distance measurement area setting processing is three-way divided, and the AF sensor 74 is made to carry out integration processing with the divided areas being set as the peak selected area one after another.

That is, in the case where the distance measurement area is set by three area setting in the distance measurement setting processing in step 10 of FIG. 7 (the zoom position is on the tele side), the distance measurement area is constituted by the "middle area", "left middle area" and "right middle area". This distance measurement area is three-way divided into the divided areas of "middle area", "left middle area" and "right middle area", and integration processing is carried out with the divided areas being set as the peak selected area one after another. In the aspect of peak selected areas shown in FIG. 13, the areas (3), (4) and (5) at (D), (E) and (F) in FIG. 13, respectively, are set as the peak selected area one after another. Specifically, as shown in the flow chart of FIG. 15, the middle area (area (3)) is first set as the peak selected area (step S80), the sensor sensitivity of the AF sensor 74 is set at low sensitivity (step S82), and integration processing is started (step S84). When this integration processing is ended, the CPU 60 acquires the sensor data of the area (3) (step S86). Then, because the distance measurement area is set by three area setting (step S88), the left middle area (area (4)) is subsequently set as the peak selected area (step S90), the sensor sensitivity of the AF sensor 74 is set at low sensitivity (step S92), and integration processing is started (step S94). When this integration processing is ended, the CPU 60 acquires the sensor data of the area (4) (step S96). Then, the right middle area (area (5)) is set as the peak selected area (step S98), the sensor sensitivity of the AF sensor 74 is set at low sensitivity (step S100), and integration processing is started (step S102). When this integration processing is ended, the CPU 60 acquires the sensor data of the area (5) (step S104), and the processing of three-way divided gain low integration is ended. In this way, the sensor data of each divided area in the distance measurement area required for subsequent distance measurement calculation is acquired.

On the other hand, in the case where five area setting is employed in the above-described distance measurement area setting processing (the zoom position is on the tele side), the distance measurement area is constituted by the "middle area", "left middle area", "left area", "right middle area" and "right area". This distance measurement area is three-way divided into the areas (3), (6) and (7) at (D), (G) and (H) in FIG. 13, respectively, and integration processing is carried out with the areas (3), (6) and (7) being set as the peak selected area one after another. Specifically, for describing in conjunction with the flow chart of FIG. 15, as in the case of the above-described three area setting, the central area (area (3)) is first set as the peak selected area (step S80), the sensor sensitivity of the AF sensor 74 is set at low sensitivity (step S82), and integration processing is started (step S84). When this integration processing is ended, the CPU 60 acquires the sensor data of the area (3) (step S86). Then, because the distance measurement area is set by five area setting (step S88), the left middle area and left area (area (6)) is subsequently set as the peak selected area (step S106), the sensor sensitivity of the AF sensor 74 is set at low sensitivity (step S108), and integration processing is started (step S110). When this integration processing is ended, the CPU 60 acquires the sensor data of the area (6) (step S112). Then, the right middle area and right area (area (7)) is subsequently set as the peak selected area (step S114), the sensor sensitivity of the AF sensor 74 is set at low sensitivity (step S116), and integration processing is started (step S118). When this integration processing is ended, the CPU 60 acquires the sensor data of the area (7) (step S120), and the processing of three-way divided gain low integration is ended. In this way, the sensor data of each divided area in the distance measurement area required for subsequent distance measurement calculation is acquired.

Furthermore, in the above description, the distance measurement area is three-way divided into the areas (3), (6) and (7) in the case where the distance measurement area is set by five area setting, but the present invention is not limited thereto, and it is also possible to five-way divide the distance measurement area and carry out integration processing to acquire sensor data with the divided areas being set as the peak selected area one after another. That is, the number of areas into which the distance measurement area is divided should not be limited to the case of this embodiment, but may be freely changed.

The processing of batch gain low integration in step S58 of FIG. 14 is processing by the CPU 60 in which the peak selected area employed in the batch gain high integration in step S52 is not changed while the sensor sensitivity of the AF sensor 74 is switched from high sensitivity to low sensitivity, and the AF sensor 74 is made to carry out integration processing.

That is, in the case where the distance measurement area is set by three area setting in the above-described distance measurement area setting processing (the zoom position is on the tele side), the AF sensor 74 is made to carry out integration processing with the area (1) shown at (B) in FIG. 13 being set as the peak selected area and the sensor sensitivity of the AF sensor 74 being set at low sensitivity. On the other hand, in the case where the distance measurement area is set by five area setting in the above-described distance measurement area setting processing (the zoom position is on the non-tele side), the AF sensor 74 is made to carry out integration processing with the area (2) shown at (C) in FIG. 13 being set as the peak selected area and the sensor sensitivity of the AF sensor 74 being set at low sensitivity.

When the above-described integration processing is ended, the CPU 60 acquires the sensor data in the distance measurement area from the AF sensor 74. In this way, the sensor data of respective divided areas in the distance measurement area required for distance measurement is acquired.

The processing for low luminance in step S60 of FIG. 14 is processing in which the processing of batch gain high integration in step S52 is continued within the limits of maximum acceptable integration time until integration processing is ended.

The maximum acceptable integration time is varied depending on the shooting mode, and in the case where the shooting mode is set to the light emission prohibiting mode, transmission processing is continued within the limits of 200 ms (maximum acceptable integration time) even after 4 ms are elapsed as time of the batch gain high integration in the above-described step S52. If integration processing is normally ended within 200 ms (integration is ended after the peak value of sensor data in the peak selected area reaches an integration end value (the same shall apply hereinafter)), the sensor data at that time is acquired from the AF sensor 74. On the other hand, if integration processing is not normally ended even after elapse of 200 ms, the integration processing is forcefully ended according to the instruction signal from the CPU 60, and the sensor data at that time is acquired from the AF sensor 74.

Also, in the case where the shooting mode is not the light emission prohibiting mode, first, transmission processing is continued within the limits of 100 ms (maximum acceptable integration time) even after 4 ms are elapsed as time of the batch gain high integration in the above-described step S52. If integration processing is normally ended within 100 ms, sensor data is acquired from the AF sensor 74 at that time. On the other hand, if integration processing is not normally ended even after the amount of integration time reaches 100 ms, the integration processing is forcefully ended according to the instruction signal from the CPU 60. Then integration processing is started again with AF preliminary light emission being provided by emission of supplemental light from the electric flash device 72. Furthermore, in the case where the mode is set to a mode like the night view portrait mode in which night view and the frontward person are shot at the same time, the maximum integration time of batch gain high integration is 25 ms rather than 100 ms in order to prevent problems such that the night view is brought into focus, and if integration processing is not normally ended even after the amount of integration time reaches 25 ms, the integration processing is forcefully ended, and then integration processing is started together with AF preliminary light emission. Furthermore, the processing in which integration is carried out with AF preliminary light emission being provided is hereinafter referred to as preliminary light emission processing.

In the case where integration processing with preliminary light emission processing is started, the peak selected area employed in the batch gain high integration in step S52 is not changed while the sensor sensitivity of the AF sensor 74 is switched from the high sensitivity to low sensitivity, and the AF sensor 74 is made to start integration processing. Also, the AF preliminary light emission is carried out by intermittent pulse light emissions with a predetermined upper limit imposed on the number of preliminary light emissions. In this way, if integration processing is normally ended before the number of preliminary light emissions reaches the upper limit, the sensor data at that time is acquired from the AF sensor 74. On the other hand, if integration processing is not normally ended even after the number of preliminary light emissions reaches the upper limit, the integration processing is forcefully ended, and the sensor data at that time is acquired from the AF sensor 74.

Furthermore, in the above-described embodiment, the distance measurement area is divided into a plurality of areas (peak selected areas) to acquire sensor data for each area only if the subject luminance is high or ultra high luminance, but the distance measurement area may be divided into a plurality of areas to acquire sensor data for each area as in the case of high luminance and the like even if the subject luminance is moderate or low luminance.

Also, in the above-described embodiment, the level of subject luminance is classified into ultra high luminance, high luminance, moderate luminance and low luminance to carry out sensor data acquirement processing corresponding to each level, but the present invention is not limited thereto, and the level of subject luminance may be classified more precisely or roughly than the above-described embodiment to carry out sensor data acquirement processing corresponding to each level of subject luminance.

Figure 16:
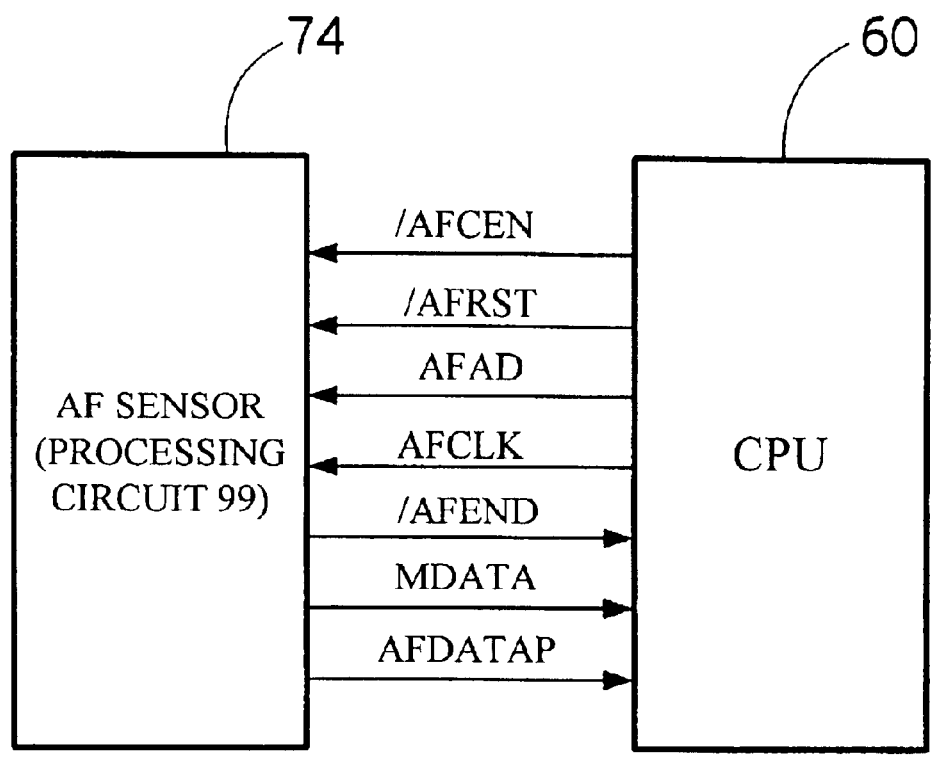
FIG. 16 shows signal lines between the CPU and the AF sensor.

Processing operations of the CPU 60 and the AF sensor 74 (processing circuit 99) in carrying out the above-described AF data acquirement processing will now be described in detail. As shown in FIG. 16, various kinds of signals are sent/received through a plurality of signal lines between the CPU 60 and the AF sensor 74. Signal lines for signals sent from the CPU 60 to AF sensor 74 include /AFCEN through which signals for switching the AF sensor 74 to the operation or non-operation state are sent, /AFRST through which signals providing instructions to set control data are sent, AFAD through which signals indicating the contents of control data are sent, and AFCLK through which READ/WRIGHT-clock pulses are sent. Signal lines for signals sent from the AF sensor 74 to the CPU 60 include /AFEND through which signals indicating that integration procession has been ended are sent, MDATA through which the peak value (minimum value) of sensor data in the peak selected area is sent as analog data, and AFDATAP through which sensor data of the cells of the R sensor 94 and the L sensor 96 is sent as analog data. Furthermore, the types of signals sent from the respective signal lines are hereinafter identified by the names of signal lines (such as /AFCEN signal and /AFRST signal).

Figure 17:
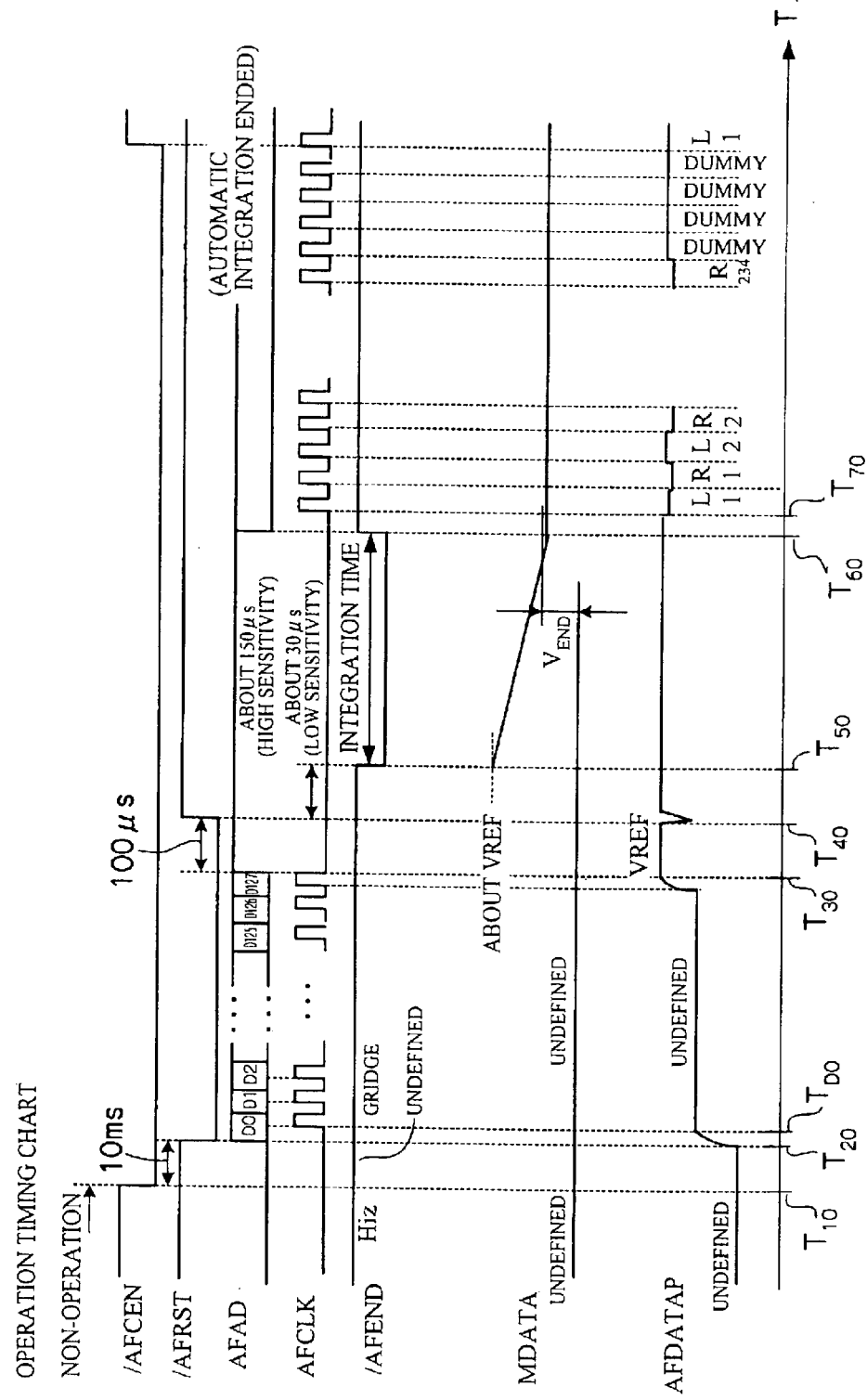
FIG. 17 is an operation timing chart showing operation timing concerning the sending/receiving of signals between the CPU and the AF sensor.

Operation timing of sending/receiving of the above-described signals in the CPU 60 and the AF sensor 74 will be described in conjunction of the operation timing chart of FIG. 17. When the CPU 60 sets the /AFCEN signal to 1 (High level), the AF sensor 74 is in the non-operation state, and when the CPU 60 switches the /AFCEN signal to 0 (Low level), the AF sensor 74 is switched to the operation state (see Time T10).

When predetermined time (10 ms) elapses after the AF sensor 74 is switched to the operation state, the CPU 60 switches the /AFRST signal from 1 to 0 to provide instructions the AF sensor 74 to set control data (see Time T20). Then, the CPU 60 sends to the AF sensor 74 control data by the AFAD signal, and the clock pulse by the AFCLK signal (see the period between Time T20 and T30). When the /AFRST signal is switched from 1 to 0, the AF sensor 74 reads the signal level of AFAD signal in synchronization with the clock pulse given by the AFCLK signal. In this way, data such as peak selected areas and sensor sensitivity required for integration processing is set in the AF sensor 74. Furthermore, as control data, 128 bit data of D0 to D127 expressed by 1 or 0 is sent in time sequence, and the contents of control data will be described later.

When the final data (D127) is sent by the AFAD signal (see Time T30), and 100 $\mu$s elapse (see Time T40), the CPU 60 switches the /AFRST signal from 0 to 1 to provide instructions to start integration processing. Thereby, after 150 $\mu$s if the sensor sensitivity is set at high sensitivity, or after 30 $\mu$s if the sensor sensitivity is set at low sensitivity, the AF sensor 74 starts light reception by the cells of the R sensor 94 and the L sensor 96 and starts integration of luminance signals outputted one after another from the cells (see Time T50). At the same time, the AF sensor 74 switches the /AFEND signal from 1 to 0 to inform the CPU 60 of the fact that integration has been started. Also, the AF sensor 74 outputs the peak value of sensor data in the peak selected area by the MDATA signal.

When the peak value of sensor data reaches a predetermined integration end value VEND (e.g., 0.5V) after integration processing is started, the AF sensor 74 ends the integration of luminance signals, and switches the /AFEND signal from 0 to 1 (see Time T60). Furthermore, the /AFEND signal being switched from 0 to 1 is an integration end signal.

The CPU 60 detects the amount of integration time by detecting the time period over which the /AFEND signal is set at 0 (period between Time T50 and T60), and detects that integration has been ended from the fact that the /AFEND signal has been switched from 0 to 1.

When the integration is ended, the CPU 60 sends the clock pulse to the AF sensor 74 by the AFCLK signal to instruct the AF sensor 74 to read sensor data (see Time T70). Furthermore, there are the automatic end mode in which the AF sensor 74 automatically ends integration when the peak value of sensor data in the peak selected area reaches an integration end value and the external end mode in which integration is ended according to instructions from an external source (CPU 60) irrespective of whether the peak value of sensor data reaches the integration end value or not, and the CPU 60 sends the clock pulse with the AFAD signal kept being set at 1 in the former case, and sends the clock pulse after switching the AFAD signal to 0 to end the integration in the AF sensor 74 in the latter case. Also, even in the former case, the CPU 60 may switch the AFAD signal from 1 to 0, thereby forcefully ending the integration in the AF sensor 74.

The AF sensor 74 sends the sensor data obtained by carrying out integration for each cell to the CPU 60 as analog data, from the sensor number 1 to sensor number 234 of the L sensor 96 and the R sensor 94 in an alternative manner, in synchronization with the clock pulse given by the AFCLK signal. In this way, the CPU 60 acquires sensor data from the AF sensor 74.

The contents of control data sent/received by the AFAD signal will now be described. As described above, the control data is comprised of 128 bit data of D0 to D127 each expressed by 1 or 0 (see period between Time T20 and T30 in FIG. 17). Of these, data of D0 to D111 are peak selected area setting data indicating peak selected areas to be set in the AF sensor 74, and data of D112 to D118 are peak selected area number data indicating the number of peak selected areas. Furthermore, details of the peak selected area setting data and peak selected area number data will be described later.

Also, data of D119 to D120 are dummy data (0), and data of D121 is sensitivity data indicating sensor sensitivity to be set. In this embodiment, the sensor sensitivity can be switched in two levels of high sensitivity and low sensitivity, and the data of D121 expressed by 1 indicates that the sensor sensitivity is set at high sensitivity while the data of D121 expressed by 0 indicates that the sensor sensitivity is set at low sensitivity.

Data of D122 is integration mode data indicating modes regarding the end of integration, and the data of D122 expressed by 1 indicates that the mode is set to the external end mode in which integration is ended according to instructions from an external source, while the data of D122 expressed by 0 indicates that the mode is set to the automatic end mode in which the AF sensor 74 automatically ends integration processing when the sensor data in the peak selected area reaches a predetermined integration end value (integration end voltage) VEND.

Data of D123 is automatic integration end voltage setting data for setting of the integration end value VEND in the case of automatic end mode, and in this embodiment, the data of D123 expressed by 1 indicates that the voltage is set at voltage L while the data of D123 expressed by 0 indicates that the voltage is set at voltage H.

Data of S124 to D126 are VREF selection data for setting of reference voltage VREF. Eight types of reference voltage can be set by three bit data. Data of D127 is end data indicating end of control data, and is always set at 1.

Figure 18:
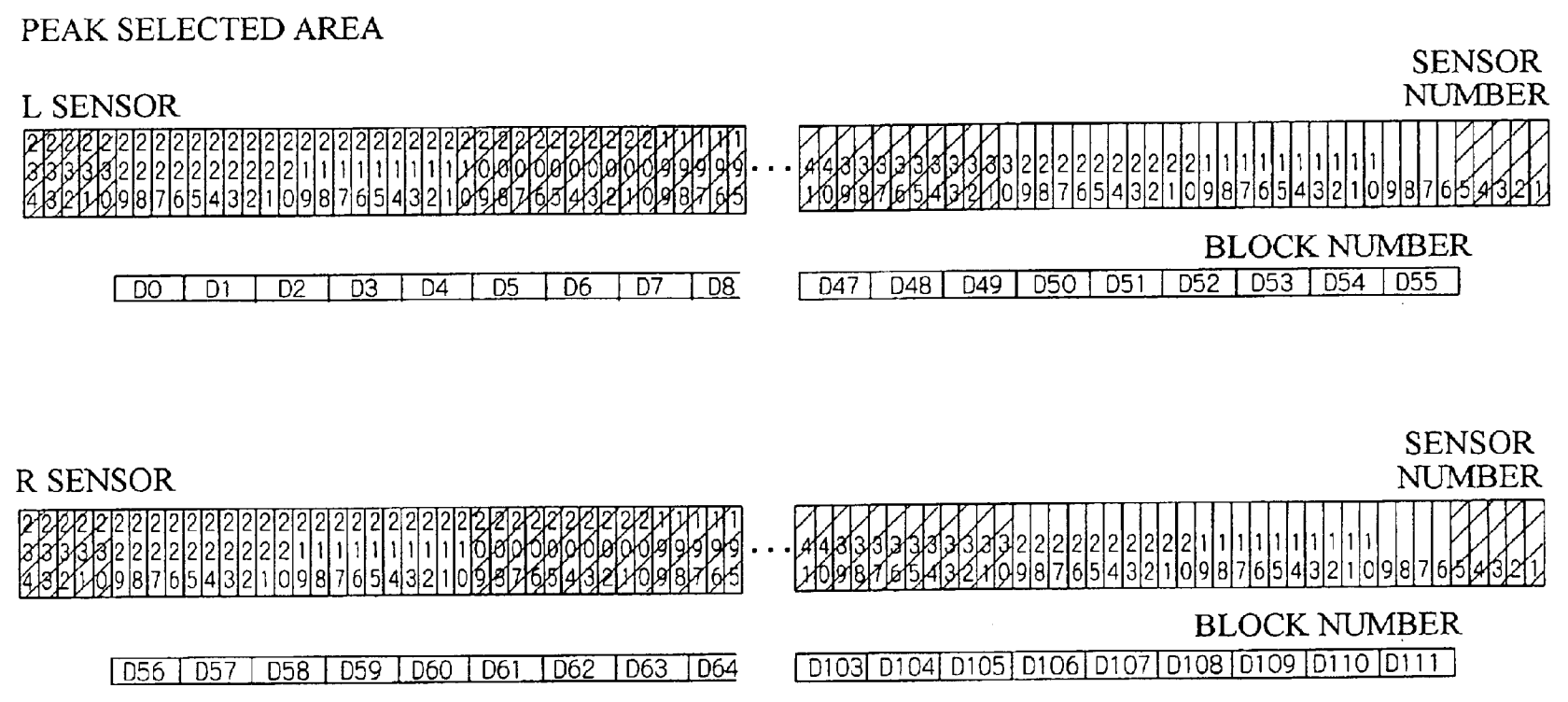

The peak selected area setting data of D0 to D111 and the peak selected area number data of D112 to 118 will now be described in detail. The R sensor 94 and the L sensor 96 are each constituted by 234 cells having sensor numbers 1 to 234, respectively, as shown in FIG. 18. The five cells on the left and right ends of each of the sensors 94 and 96 (sensor numbers 1 to 5, and sensor numbers 230 to 234) are dummy cells, and actually effective cells (effective pixels) are 224 cells with sensor numbers of 6 to 229.

In processing of the CPU 60 and the AF sensor 74, the cells with sensor numbers of 6 to 229 in the effective pixel range are managed in block units with adjacent four blocks constituting one block, and as shown in FIG. 18, cells with sensor numbers of 229 to 6 of the L sensor 96 are sequentially given block numbers D0, D1, . . . , D55 (the number of blocks: 56) with four cells constituting one block, and cells with sensor numbers of 229 to 6 of the R sensor 94 are sequentially given block numbers D56, D57, . . . , D111 (the number of blocks: 56) with four cells constituting one block.

Data of D0 to D111 sent/received as control data between the CPU 60 and the AF sensor 74 correspond to the block numbers allocated in this way, and when the peak selected area setting data of D0 to D111 are arranged as shown in FIG. 19, setting data for the L sensor 96 are the data of D0 to D55 not surrounded by the dotted line while setting data for the R sensor 94 are the data of D56 to D111 surrounded by the dotted line. For example, setting data D0 and D56 represent setting data for sensor numbers 226 to 229 of the L sensor 96 and the R sensor 94, respectively, and setting data D55 and D111 represent setting data for sensor numbers 6 to 9 of the L sensor 96 and the R sensor 94, respectively.

The peak selected area setting data D0 to D111 indicate whether four cells with their block numbers corresponding to the setting data are set as cells in the peak selected area or not, and the four cells with their block numbers corresponding to the setting data are set as cells in the peak selected area when the setting data is expressed by 1, while the four cells with their block numbers corresponding to the setting data are set as cells outside the peak selected area when the setting data is expressed by 0. For example, if the setting data D0 is expressed by 1, cells 229, 228, 227 and 226 of the L sensor 96 are set as cells in the peak selected area.

Figure 20A:
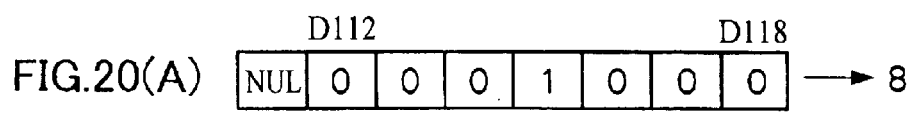
FIGS. 20(A) and 20(B) are explanatory diagrams used for explanation of peak selected area number data.
Figure 20B:
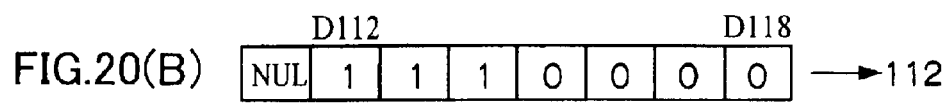

Also, peak selected area number data D112 to D118 sent/received as control data together with peak selected area setting data are data in which the number of blocks set as the peak selected area by peak selected area setting data is expressed by binary digits, and as shown in FIGS. 20(A) and 20(B), the number of blocks set as the peak selected area is expressed by 7 bit data with D112 being the most significant bit and D118 being the least significant bit. As shown in FIG. 20(A), the number of blocks set as the peak selected area is 8 if only the data of D115 is expressed by 1, and as shown in FIG. 20(B), the number of blocks set as the peak selected area is 112 if the data of D112 to D114 are expressed by 1 and the data of D115 to D118 are expressed by 0.

The procedure for generating peak selected area setting data will now be described. The peak selected area is set as any one of areas (1) to (7) as shown in FIG. 13. The peak selected area setting data in setting the areas (1) to (7) are set as the peak selected area is generated as follows.

Figure 21:
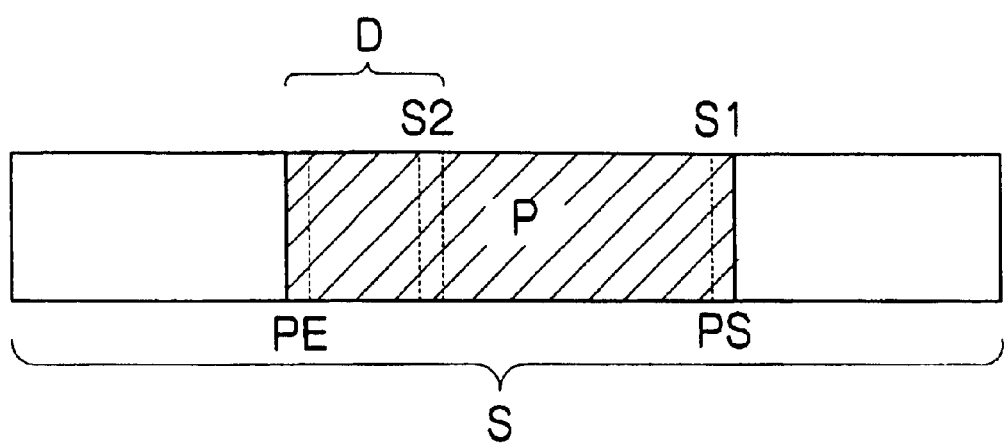
FIG. 21 is an explanatory diagram used for explanation of the procedure for generating peak selected area setting data.

For example, as shown in FIG. 21, in the case where the area P (shown by diagonal lines) is set as the peak selected area in the sensor area S of the R sensor 94 or the L sensor 96, the sensor numbers of right and left ends of the area P are determined, and the cells whose sensor numbers between the sensor numbers of the cells of right and left ends of the area P are set as cells in the peak selected area.

Assume here that the sensor number of each cell indicates the address of each cell, and particularly the address of the right end of the area P is a peak selection start address PS while the address of the left end is a peak selection end address PE.

On the other hand, assume that as information for identifying the area P, the address S1 of the right end of the area P, the address S2 of a predetermined cell in the area P, and the number of cells (sensors) D existing between the cell of address S2 and the left end cell of the area P are given in advance as reference data. At this time, the peak selection start address PS and the peak selection end address PE of the area P can be determined with the following equations (2) and (3):

$$PS = S1 \quad (2)$$

$$PE = S2 + D - 1 \quad (3)$$

Furthermore, the peak selection start address PS, the peak selection end address PE and reference data S1, S2 and D for the area set as the peak selected area in the R sensor 94 are identified as PSR, PER, SR1, SR2 and DR, and the peak selection start address PS, the peak selection end address PE and reference data S1, S2 and D for the area set as the peak selected area in the L sensor 96 are identified as PSL, PEL, SL1, SL2 and DL.

For giving specific explanation as to the case where the areas (1) to (7) shown in FIG. 13 are set as the peak selected area, the addresses of the right ends of divided areas of the R sensor 94 and the L sensor 96, and the numbers of employed sensors (cells) in the divided areas are used as reference data in setting the areas (1) to (7) as the peak selected area.

Figure 22:
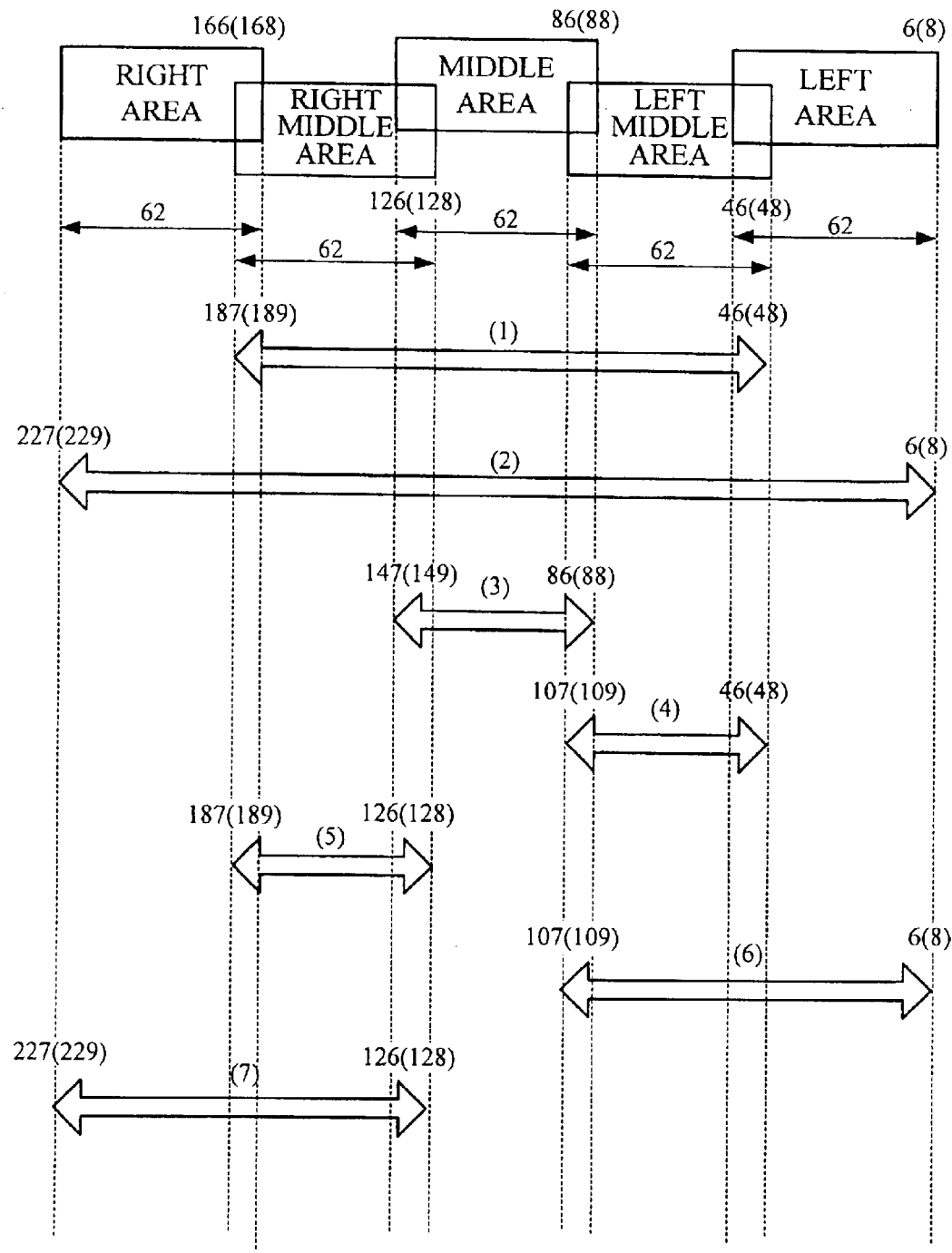
FIG. 22 is an explanatory diagram used for explanation of the procedure for generating peak selected area setting data.

Examples of specific values of the addresses of the right end cells of divided areas employed for the R sensor 94 and the L sensor 96 and the numbers of employed sensors in the divided areas in this embodiment are shown in FIG. 22. Furthermore, values without parentheses are shown for the R sensor 94 while values with parentheses are shown for the L sensor 96.

If the area (1) is set as the peak selected area, for example, the reference data SR1, SR2 and DR for the R sensor 94 are the address 46 of the right end cell of the left middle area, the address 126 of the right end cell of the right middle area, and the number of employed sensors 62 of the right middle area, respectively. The reference data SL1, SL2 and DL for the L sensor 96 are the address 48 of the right end cell of the left middle area, the address 128 of the right end cell of the right middle area, and the number of employed sensors 62 of the right middle area, respectively. When these reference data are substituted into the above-described equations (2) and (3), the peak selection start addresses PSR and PSL, and the peak selection end addresses PER and PEL of the area (1) in the R sensor 94 and the L sensor 96 are calculated. That is, these data are calculated as follows:

PSR=46

PER=126+62−1=187

PSL=48

PEL=128+62−1=189

Thus, if the area (1) is set as the peak selected area, it is determined that the cells having sensor numbers of 46 to 187, respectively, are set as cells in the peak selected area for the R sensor 94, and it is determined that the cells having sensor numbers of 48 to 189, respectively, are set as cells in the peak selected area for the L sensor 96.

In the case where the areas (2) to (7) other than the area (1) are set as the peak selected area, the peak selection start addresses PSR and PSL, and the peak selection end addresses PER and PEL can be calculated in the same manner as described above. That is, in the peak selected area to be set, the addresses of the right end in the divided area at the right end are reference data SR1 and SL1, and the addresses of the right end in the divided area at the left end are reference data SR2 and SL2. Also, the numbers of employed sensors in the divided area located at the left end thereof are DR and DL. By substituting these values into the above-described equations (2) and (3), the peak selection start addresses PSR and PSL, and the peak selection end addresses PER and PEL when the areas (2) to (7) are set as the peak selected area can be calculated. As shown in FIG. 22, PSR=6, PER=227, PSL=8 and PEL=229 hold in the case of area (2), PSR=86, PER=147, PSL=88 and PEL=149 hold in the case of area (3), PSR=46, PER=107, PSL=48 and PEL=109 hold in the case of area (4), PSR=126, PER=187, PSL=128 and PEL=189 hold in the case of area (5), PSR=6, PER=107, PSL=8 and PEL=109 hold in the case of area (6) and PSR=126, PER=227, PSL=128 and PEL=229 hold in the case of area (7).

Furthermore, the addresses of the right end cells of divided areas of right area, right middle area, middle area, left middle area and left area are referred to as RSR, RMSR, MSR, LMSR and LSR, respectively, and the numbers of employed sensors of the divided areas are referred to as RWR, RMWR, MWR, LMWR and LWR, respectively, in the R sensor 94, and also the addresses of the right end cells of divided areas of right area, right middle area, middle area, left middle area and left area are referred to as RSL, RMSL, SL, LMSL and LSL, respectively, and the numbers of employed sensors of the divided areas are referred to as RWL, RMWL, MWL, LMWL and LWL, respectively, in the L sensor 96. The addresses and the numbers of sensors to be substituted for the above-described SR1, SR2, SL1, SL2, DR and DL correspond thereto when the areas (1) to (7) are set as the peak selected area, as shown in FIG. 23.

When the peak selection start address PS and the peak selection end address PE of the area set as the peak selected area are obtained in the way described above, then the range of the peak selected area is determined by block numbers D0 to D55 and D56 to D111 with four cells constituting one block as shown in FIG. 18. At this time, four cells of the block number including the peak selection start address PS and the peak selection end address PE are cells in the peak selected area.

Then, if the block numbers of the left ends of the peak selected areas are peak selection start block numbers DSL and DSR, and the block numbers of the right ends of the peak selected areas are peak selection end block numbers DEL and DER, for the L sensor 96 and the R sensor 94, DSL, DEL, DSR and DER are determined by the following equations (4) to (7):

$$DSL = INT((229-PEL)/4) \quad (4)$$

$$DEL = 55 - INT((PSL-6)/4) \quad (5)$$

$$DSR = 56 + INT((229-PER)/4) \quad (6)$$

$$DER = 111 - INT((PSR-6)/4) \quad (7)$$

Here, DSL is made to be equal to 0 if DSL calculated with the equation (4) is smaller than 0, DEL is made to be equal to 55 if DEL calculated with the equation (5) is larger than 55, DSR is made to be equal to 56 if DSR calculated with the equation (6) smaller than 56, and DER is made to be equal to 111 if DER calculated with the equation (7) is larger than 111.

Since the peak selected area corresponds to the range of block numbers from DSR to DER for the R sensor 94, and corresponds to the range of block numbers from DSL to DEL for the L sensor 96, peak selected area setting data D0 to D111 are set at 1 in those ranges and are set at 0 in other ranges.

Also, at this time, provided that the number of peak selected areas is DPS, the number of peak selected area DPS is determined by the following equation (8):

$$DPS=DEL-DSL+1+DER-DSR+1 \qquad (8)$$

Peak selected area number data D112 to D118 are obtained by being expressed by binary digits.

Figure 24:
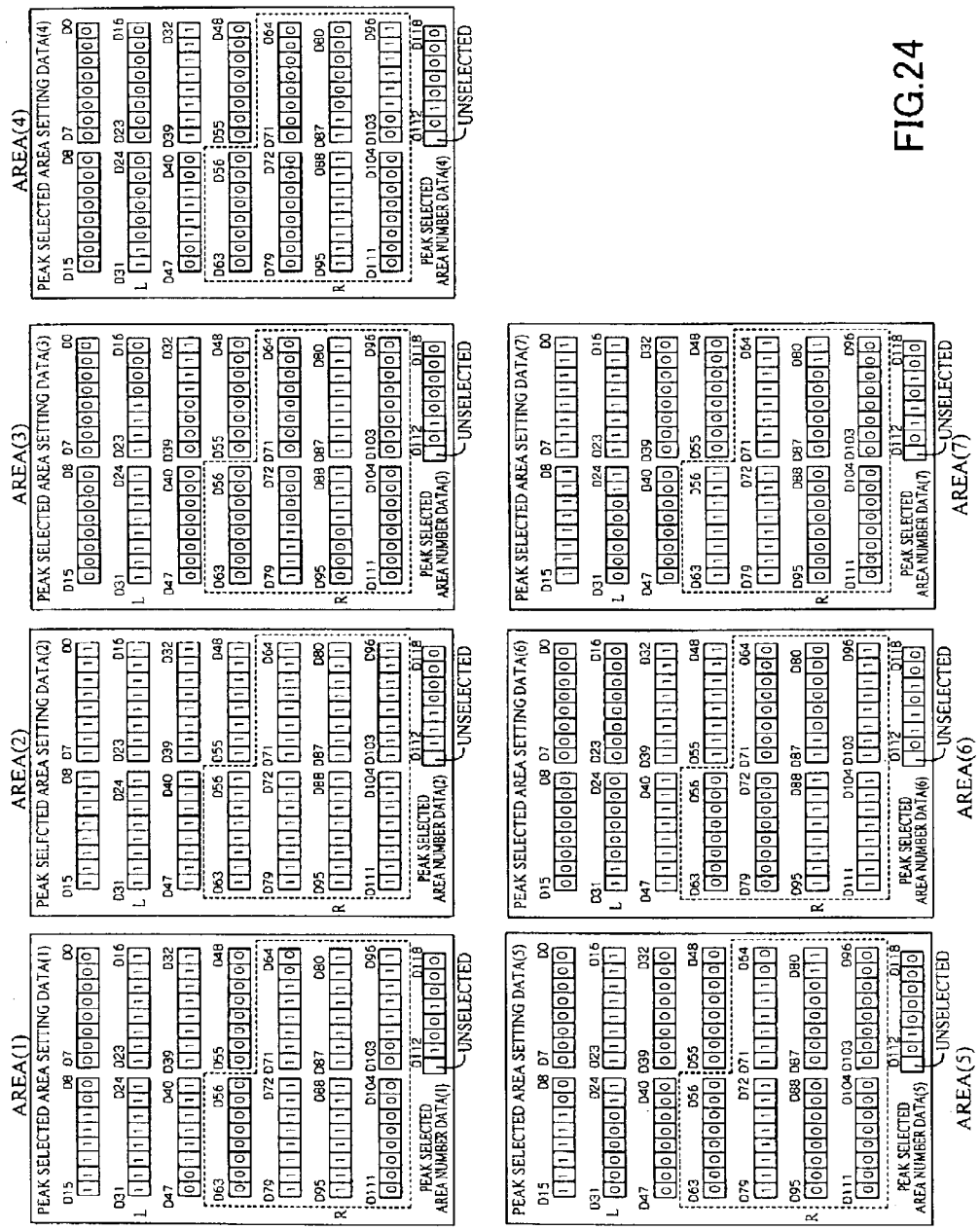
FIG. 24 is an illustrative view showing peak selected area setting data and peak selected area number data.

FIG. 24 shows peak selected area setting data D0 to D111 and peak selected area number data D112 to D118 generated by the above-described equations (4) to (8) from examples of values shown in FIG. 22 if the areas (1) to (7) of FIG. 13 are set as the peak selected area. For example, if the area (1) is set as the peak selected area, peak selection start addresses PSR and PSL are 46 and 48, respectively, and peak selection end addresses PER and PEL are 187 and 189, respectively, and therefore when these values are substituted into the above-described equations (4) to (7), peak selection start block numbers DSL and DSR are 10 and 66, respectively, peak selection end block numbers DEL and DER are 45 and 101, respectively. Thus, as shown in the peak selected area setting data D0 to D111 for the area (1) of FIG. 24, data of D0 to D9 are expressed by 0, data of D10 to D45 are expressed by 1, data of D46 to D55 are expressed by 0, data of D56 to D65 are expressed by 0, data of D66 to D101 are expressed by 1, and data of D102 to D111 are expressed by 0. Also, from the above-described equation (8), the number of peak selected areas in the area (1) is 112, as shown in peak selected area number data D112 to D118 for the area (1) of FIG. 24, the data values thereof are 1001000, respectively.

When the areas (1) to (7) are set as the peak selected area as above, peak selected area setting data D0 to D111 and peak selected area number data D112 to D118 are generated using as reference data address information indicating the ranges of divided areas, and therefore it is not necessary to record in advance a large volume of data as shown in FIG. 24 in the memory, thus making it possible to save the memory. Furthermore, in the embodiment described above, the right end address of each divided area and the number of employed sensors are referenced as address information indicating the range of each divided area, but peak selected area setting data D0 to D111 and peak selected area number data D112 to D118 may be generated using as reference data the right and left addresses of each divided area as address information indicating the range of each divided area. Also, the peak selected area setting data D0 to D111 and the peak selected area number data D112 to D118 may be generated using any address information other than the address information described above as long as it indicates the range of each divided area.

Processing to be carried out when the /AFEND signal is not normally outputted from the AF sensor 74 will now be described. In the integration processing in step S52, step S56 and step S58 of FIG. 14, integration is usually started to switch the /AFEND signal from 1 to 0 (see Time T50) after predetermined time elapses (after 150 μs if the sensor sensitivity is high, and after 30 μs if the sensor sensitivity is low) after the /AFRST signal is switched from 0 to 1 as shown in FIG. 17 (see Time T40). When the peak value of sensor data in the peak selected area reaches the integration end value, the /AFEND signal is switched from 0 to 1 (see Time T60). The CPU 60 detects as an integration end signal the switching of the /AFEND signal from 0 to 1, and recognizes the end of integration.

On the other hand, if the subject luminance is low, or the subject luminance exceeds a certain level of luminance, or connection error for the /AFEND signal occurs, there may be cases where the /AFEND signal is not normally outputted even after maximum acceptable integration time elapses.

The reason why the /AFEND signal is not normally outputted (the /AFEND signal is not switched from 0 to 1) when the subject luminance is low is that the peak value of sensor data does not reach the integration end value. For example, if the subject is luminous, the /AFEND signal is switched from 0 to 1 (an integration end signal is outputted), because the peak value of sensor data in the peak selected area before maximum acceptable integration time elapses after the /AFEND signal is switched from 1 to 0 (after integration processing is started) as shown at (A) in FIG. 26 (see MDATA signal). In contrast to this, if the subject is dark, the /AFEND signal is not switched from 0 to 1 and thus the integration end signal is not outputted, because the peak value of sensor data in the peak selected area does not achieve the integration end value before maximum acceptable integration time elapses after the /AFEND signal is switched from 1 to 0 as shown at (C) in FIG. 26 (see MDATA signal). Furthermore, a signal for forcefully ending integration processing (setting as AFAD ="L" at (B) in FIG. 26) is given from the CPU 60 to the AF sensor 74 when maximum acceptable integration time is reached, and thus integration processing is ended when maximum acceptable integration time elapses according to that signal to switch the /AFEND signal from 0 to 1.

On the other hand, the reason why the /AFEND signal is not normally outputted (the /AFEND signal is not switched from 1 to 0, and the /AFEND signal is not switched from 0 to 1) when the subject luminance exceeds a certain level of luminance is related to problems associated with the property of the AF sensor 74. That is, in the case where the subject luminance is extremely high even if integration processing is normally carried out and the peak value of sensor data reaches the integration end value, there may be cases where the /AFEND signal is not normally outputted due to the property of the AF sensor 74, and for example, the /AFEND signal may take on the following output form (in particular, it tends to occur during gain high sensitivity integration in step S32 in FIG. 14). If the subject luminance exceeds a certain level of luminance, the /AFEND signal which would be otherwise switched to 0 is not switched to 0 at the time when integration is started after predetermined time elapses after the /AFEND signal is switched from 0 to 1 as shown at (A) in FIG. 25. In this case, the /AFEND signal is not switched from 0 to 1, and thus the integration end signal is not outputted even at the time when integration processing is ended, as a matter of course. On the other hand, if the level of subject luminance is further increased, the /AFEND signal is normally outputted as shown at (B) in FIG. 25, but there may be cases where switching of the /AFEND signal from 1 to 0 and from 0 to 1 cannot normally be recognized because integration time is extremely short. If the level of subject luminance is still further increased to beyond the limit of sensor operation, the /AFEND signal is not switched to 0 once it is switched 1 to 0 even after integration is ended as shown at (C) in FIG. 25, and the integration end signal is not outputted.

In this way, if the subject luminance exceeds a certain level of luminance (particularly integration is carried out at high sensitivity (S52)), there are cases where the /AFEND signal is not normally outputted as the luminance level becomes higher, with the following three possible cases being considered:

(a) the /AFEND signal is not switched from 1 to 0;
(b) the time interval between the time when the /AFEND signal is switched from 1 to 0 and the time when the /AFEND signal is switched from 0 to 1 is very small; or
(c) the /AFEND signal is switched from 1 to 0, but thereafter the /AFEND signal is not switched from 0 to 1.

In the case where the /AFEND signal is not switched from 1 to 0, it is presumed that the subject luminance exceeds a certain level of luminance (in this case, it can also be considered that connection error of the /AFEND signal occurs can also be considered), and then whether the subject luminance has actually exceeded the certain level of luminance is determined using MDATA shown later.

Also, in the case where the subject luminance is higher than a certain level of luminance, and the time interval between the time when the /AFEND signal is switched from 1 to 0 and the time when the /AFEND signal is switched from 0 to 1 is very small, thus making it impossible to normally recognize the /AFEND signal in the CPU, the CPU recognizes that the /AFEND signal is not switched from 1 to 0, and therefore it is presumed that the subject luminance exceeds a certain level of luminance, and then whether the subject luminance has actually exceeded the certain level of luminance is determined using MDATA shown later.

In the case where the level of subject luminance is further increased, and /AFEND signal is switched from 1 to 0, and thereafter the /AFEND signal is not switched from 0 to 1, whether the subject luminance is low and integration is ended because maximum acceptable integration time is just reached, or the subject luminance is ultra high and the /AFEND signal is not switched from 0 to 1 cannot be determined (because the sensor peak (the value of MDATA shown later) is minimum in either case).

Then, if it is determined that the distance measurement object has ultra high luminance by the photometry sensor in step S50 of FIG. 14, processing in step S52 of FIG. 14 (sensitivity high integration) is not carried out, but three-way divided gain low integration in step S56 is carried out to prevent the erroneous determination described above.

It is also assumed that the /AFEND is not switched from 1 to 0 due to some circuit problems.

Here, the following two cases can be considered:
(a) connection error of /AFEND signal alone (integration is normally carried out, but the start and end of integration cannot be determined); and
(b) integration operation error of circuit (connection error of signals other than /AFEND signal, wherein integration is not carried out due to connection error of any of $V_{CC}$, GND, /AFCEN, /AFRST and AFCLK, and integration is not carried out due to failure of the AF sensor and the like).

Also in the case of connection error of the /AFEND signal, the /AFEND signal is switched from 1 to 0, and thus the /AFEND signal is not normally outputted. Therefore, if the /AFEND signal is not switched from 1 to 0, it is presumed not only that the subject luminance exceeds a certain level of luminance as described above, but also that connection error of the /AFEND signal occurs. Then, whether sensor data satisfies integration end conditions or not is determined using MDATA shown later. If connection error of the /AFEND signal occurs, and the value of MDATA is equal to or greater than MC_JDG at (B) in FIG. 26 (almost equal to the initial value (VREF)) (the subject luminance is extremely low, and little signal accumulation is achieved), it is determined that distance measurement is impossible.

Figure 26:
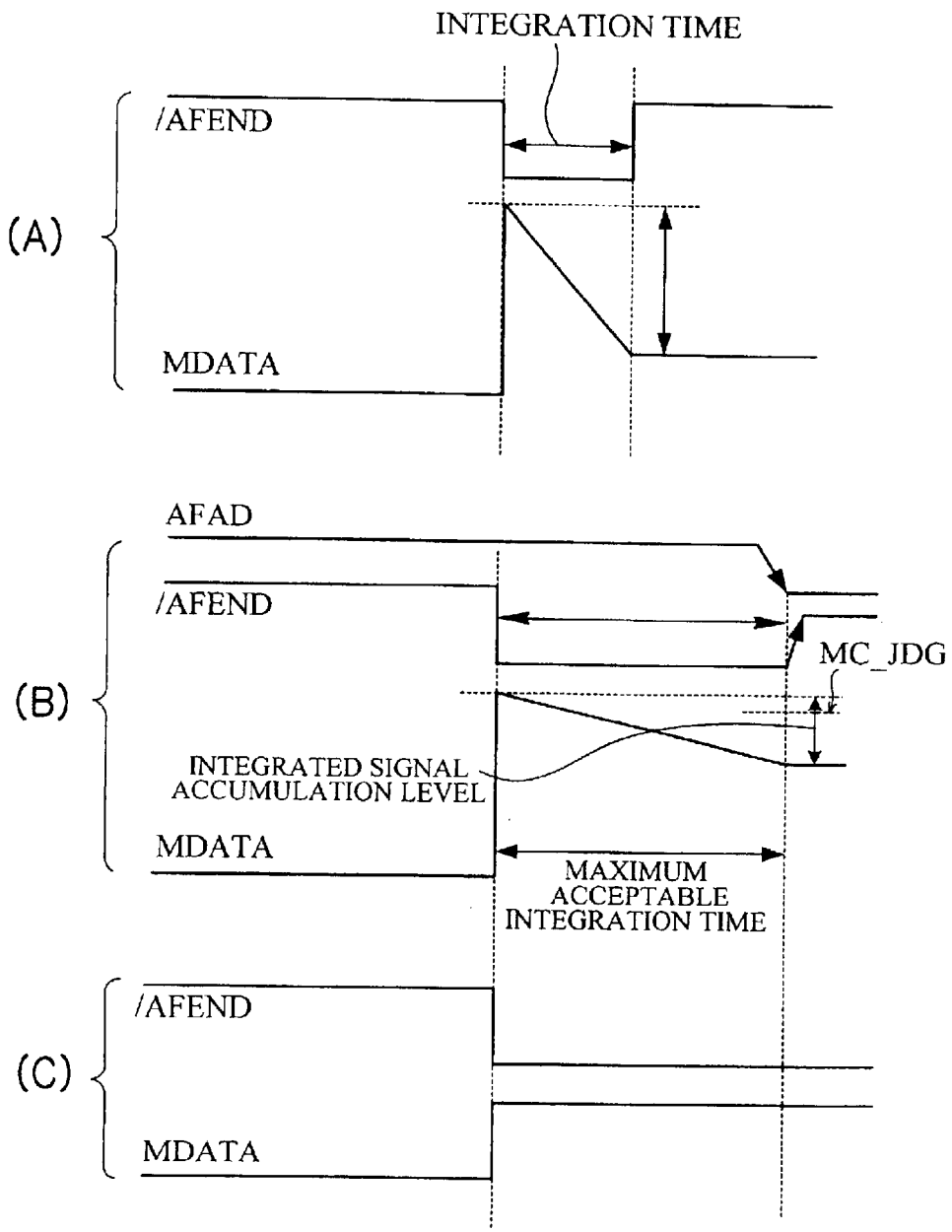
FIG. 26 illustrates the conditions of a /AFEND signal and a MDATA signal where the subject is luminous and where the subject is dark.

Also, if connection error of the /AFEND signal, and the value of MDATA is smaller than MC_JDG at (B) in FIG. 26 (the subject luminance is not extremely small, and some degree of signal accumulation is achieved), distance measurement is continued.

Also, in the case of integration operation error of circuit, the /AFEND signal is not switched from 1 to 0, and the /AFEND signal is not normally outputted. Therefore, if the /AFEND signal is not switched from 1 to 0, it is presumed not only that the subject luminance exceeds a certain level of luminance as described above, but also that integration operation error of circuit occurs. Then, whether sensor data satisfies integration end conditions or not is determined using MDATA shown later. In the case of integration operation error of circuit, the value of MDATA almost equals the initial value (VREF) (integration is not carried out). In this case, it is determined that distance measurement is impossible.

On the other hand, if the /AFEND signal is not switched from 1 to 0 due to the fact that the subject luminance exceeds a certain level of luminance, the value of MDATA is about 0.6 V (integration is ended), and in this case, distance measurement is continued.

Furthermore, in terms of expression, the case where low subject luminance results in lacking of signal amount of sensor data belongs to the category where integration processing is not normally performed. Also, it is actually determined that distance measurement is impossible due to lacking of signal amount only if the peak value of sensor data has not changed at all or has very slightly changed since start of integration processing, and otherwise it is determined that integration processing is normally carried out, and it is not determined that distance measurement is impossible because there may be cases where distance measurement is possible.

Figure 25:
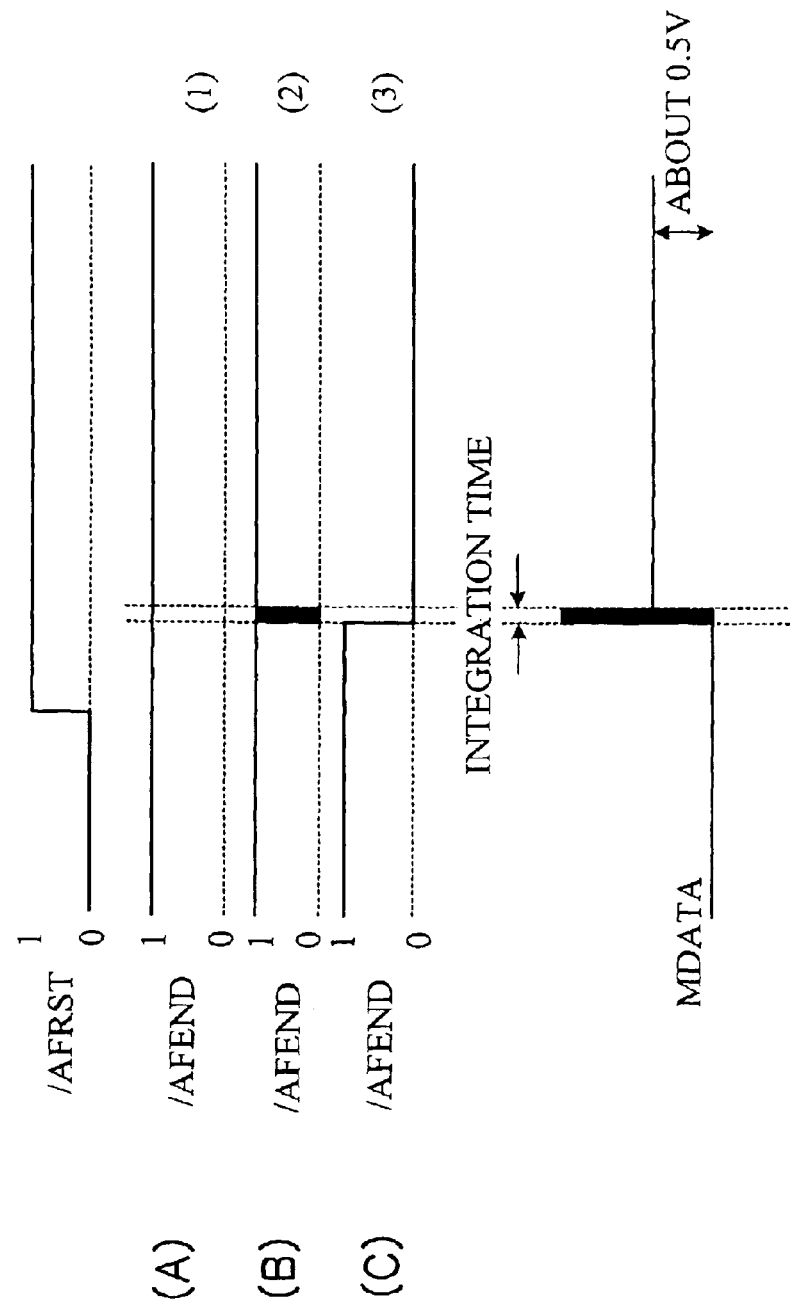
FIG. 25 shows an output form where a /AFEND signal is not normally outputted.

As described above, if an integration start signal or integration end signal is not normally outputted from the /AFEND signal even after integration time reaches fixed time, whether integration processing is normally carried out or not is determined using the MDATA signal. Because the MDATA signal is such that the peak value in the peak selected area is outputted as analog data, the peak value of sensor data in the peak selected area is normally outputted from the MDATA signal even though the /AFEND signal is not normally outputted as shown in FIG. 25 as long as integration is carried out, and thus whether integration processing is normally carried out or not can easily be determined.

For specifically describing operations of the CPU 60, the CPU 60 reads the MDATA signal if it does not detect switching of the /AFEND signal from 0 to 1, which indicate start of integration, from the AF sensor 74, before fixed time (e.g., 500 μs) elapses after the /AFRST signal is switched from 0 to 1 (see Time T40 in FIG. 17) during performance of batch gain high integration in step S52 of FIG. 14. If the value of MDATA signal reaches the integration end value, then it is determined the switching of the /AFEND signal from 1 to 0 has not been detected because the subject luminance is high (ultra high), and processing proceeds to three-way divided gain low integration as in the case of integration time being shorter than 2 ms (see steps S54 and S56 of FIG. 14). On the other hand, if the value of MDATA signal is equal to or greater than a predetermined value, namely the value of MDATA signal has not been changed at all from the value when integration was started (value of the above-described reference voltage VREF), or the value of MDATA signal can be considered to be equivalent to a value that has not been changed at all, it is determined that distance measurement is impossible due to integration operation error of circuit. Otherwise, integration processing is continued as usual. Subsequent processing is not described here because it has been described with the flow chart of FIG. 14.

Figure 15:
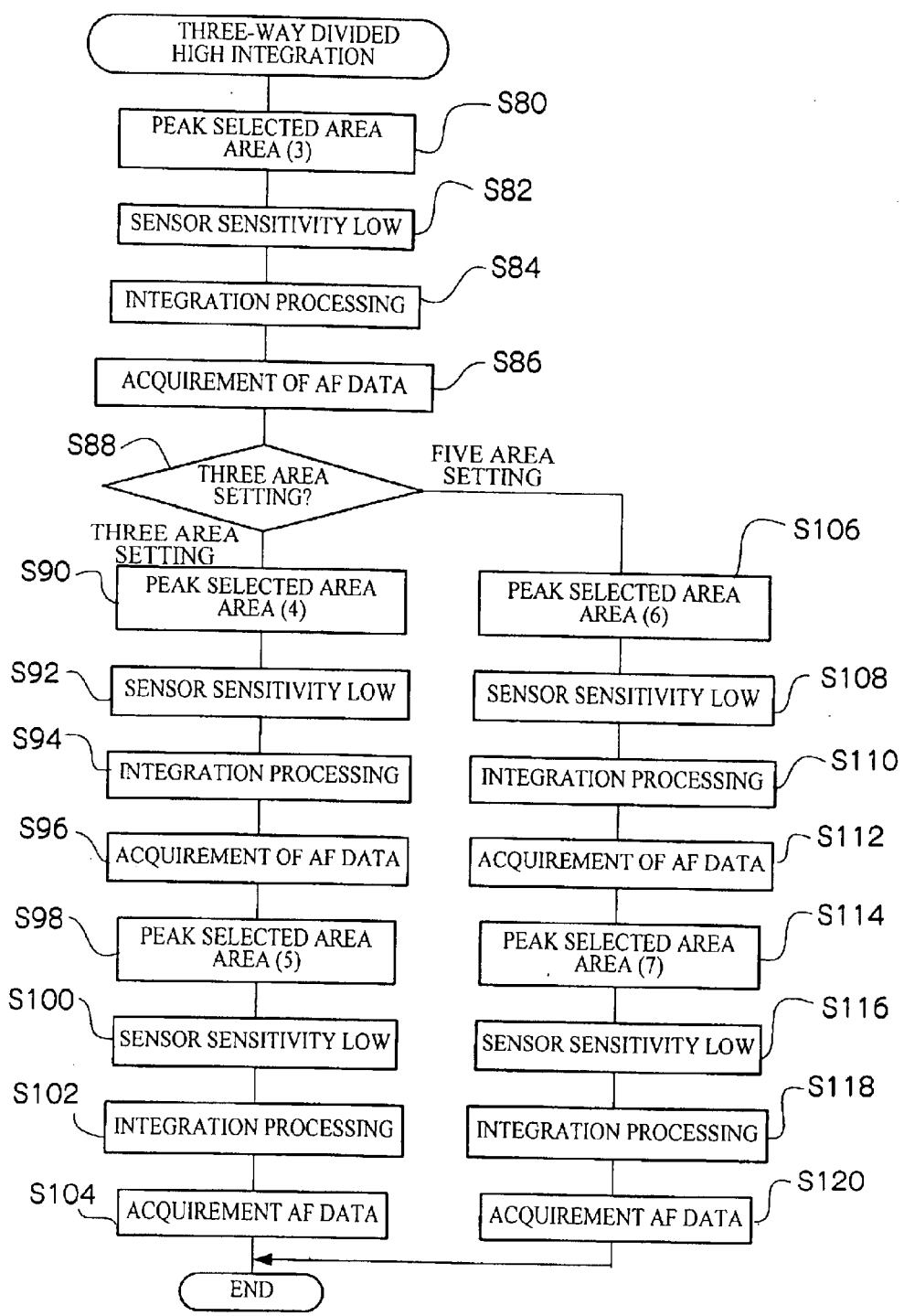
FIG. 15 is a flow chart showing the processing procedure of three-way divided gain high integration.

During performance of three-way divided gain low integration in step S56 of FIG. 14 (during performance of integration processing in steps S84, S94, S102, S110 and S118 of FIG. 15), the CPU 60 reads the MDATA signal if it does not detect switching of the /AFEND signal from 1 to 0, which indicates the start of integration, from the AF sensor 74, before fixed time (e.g., 500 μs) elapses after the /AFRST signal is switched from 0 to 1, in the same manner as described above. At this time, if the value of MDATA signal is equal to or greater than a predetermined value (MC_JDG at (B) in FIG. 26), namely the value of MDATA signal has not been changed at all from the value when integration was started (value of the above-described reference voltage VREF), or the value of MDATA signal can be considered to be equivalent to a value that has not been changed at all, it is determined that distance measurement is impossible (due to integration operation error of circuit) with respect to divided areas constituting the peak selected area in the integration processing at that time. On the other hand, if switching of /AFEND signal from 1 to 0, which indicates the start of integration, is detected from the AF sensor 74 before the fixed time elapses, integration is continued within the limits of maximum acceptable integration time. If switching of the /AFEND signal from 0 to 1, which indicates the end of integration, is not detected from the AF sensor 74 before maximum acceptable integration time elapses, the MDATA signal is read at the time when the maximum acceptable integration time is reached. At this time, if the value of MDATA is equal to or greater than a predetermined value (MC_JDG at (B) in FIG. 26, namely the value of MDATA signal has not been changed at all from the value when integration was started (value of the above-described reference voltage VREF), or the value of MDATA signal can be considered to be equivalent to a value that has not been changed at all, it is determined that distance measurement is impossible (sensor data is considered as ineffective data) due to lacking of signal amount of sensor data with respect to divided areas constituting the peak selected area in the integration processing at that time. Otherwise, it is determined that integration processing has normally been carried out, and considering that sensor data so far accumulated in the CPU 60 as effective data, the sensor data at that time is read. Furthermore, if the value of MDATA signal does not reach the integration end value even after the maximum acceptable integration time lapses, the integration processing is still continued, and therefore the CPU 60 forcefully stops integration processing in the AF sensor 74 (switches /AFAD signal from 1 to 0) before reading sensor data.

During performance of batch gain low integration in step S58 of FIG. 14, the CPU 60 reads the MDATA signal if it does not detect switching of the /AFEND signal from 0 to 1, which indicates the end of integration, from the AF sensor 74, before fixed time (e.g., 500 μs) elapses after the /AFRST signal is switched from 0 to 1, in the same manner as described above. At this time, if the value of MDATA signal is equal to or greater than a predetermined value, namely the value of MDATA signal has not been changed at all from the value when integration was started (value of the above-described reference voltage VREF), or the value of MDATA signal can be considered to be equivalent to a value that has not been changed at all, it is determined that distance measurement is impossible (due to integration operation error of circuit). Furthermore, in batch gain low integration, the entire distance measurement area is set as the peak selected area, and therefore distance measurement is impossible (distance measurement itself is impossible) in all the divided areas constituting the distance measurement area. On the other hand, if switching of the /AFEND signal from 1 to 0, which indicates the start of integration, is detected from the AF sensor 74 before the above-described fixed time elapses, integration processing is continued within the limits of maximum acceptable integration time. If switching of the /AFEND signal from 0 to 1, which indicates the end of integration, is not detected from the AF sensor 74 before maximum acceptable integration time elapses, the MDATA signal is read at the time when the maximum acceptable integration time is reached. At this time, if the value of MDATA signal is equal to or greater than a predetermined value, namely the value of MDATA signal has not been changed at all from the value when integration was started (value of the above-described reference voltage VREF), or the value of MDATA signal can be considered to be equivalent to a value that has not been changed at all, it is determined that distance measurement is impossible due to lacking of signal amount of sensor data (sensor data is considered as ineffective data). Otherwise, it is determined that integration processing has normally been carried out, and considering that sensor data so far accumulated in the CPU 60 as effective data, the sensor data at that time is read. Furthermore, in the same manner as described above, if the value of MDATA signal does not reach the integration end value even after the maximum acceptable integration time lapses, the integration processing is still continued, and therefore the CPU 60 forcefully stops integration processing in the AF sensor 74 (switches /AFAD signal from 1 to 0) before reading sensor data.

Processing for reading sensor data by the CPU 60 will now be described. As shown in the timing chart of FIG. 17, when detecting that the /AFEND signal sent from the AF sensor 74 has been switched from 0 to 1, and integration has been thus ended, for example, the CPU 60 sends the clock pulse to the AF sensor 74 by the AFCLK signal, and starts reading sensor data. From the AF sensor 74, sensor data for each cell is sequentially outputted as analog data by the AFDATAP signal in synchronization with the clock pulse and subjected to A/D conversion, and is thereafter inputted in the CPU 60.

Specifically, sensor data of the cells of the L sensor 96 and the R sensor 94 are sequentially outputted from the sensor number 1 to the sensor number 234 by the AFDATAP signal in an alternative manner, and is read by the A/D conversion circuit of the CPU 60. Furthermore, after the sensor data of all the cells of the L sensor 96 and the R sensor 94 are sent, several dummy data are sent.

The speed at which sensor data is read with the clock pulse will now be described. In the case where a certain selected area is set for the AF sensor 74 and have the above-described integration processing carried out as described above, sensor data to be actually used by the CPU 60 in subsequent processing of distance measurement calculation, of sensor data of the cells accumulated by the AF sensor 74 with the integration processing, is limited to the sensor data of the cells in the range of the peak selected area constituted by one or more divided areas, and sensor data of the cells in other ranges is not necessary. Also, as described above, even within the range of the peak selected area, the peak selected area is set for the AF sensor 74 in block units with adjacent four cells constituting one block (see the above description about block numbers D0, D1, ..., D55, and block numbers D56, D57, ..., D111), and therefore cells of which sensor data do not need to be acquired actually exist even in blocks of both ends of the peak selected area. In addition, necessary sensor data are limited to those in the peak selected area in this embodiment, but depending on aspects of distance measurement, but they are not necessarily sensor data in the peak selected area, and sensor data of cells outside the peak selected area may be necessary. Provided that the range of cells generating sensor data necessary in subsequent processing carried out by the CPU is referred to as a data acquirement range, and the range of cells generating sensor data unnecessary in subsequent processing carried out by the CPU 60 is referred to as a data non-acquirement range, the CPU 60 does not output fixed-period clock pulses, but makes an adjustment so that the period T2 over which sensor data of cells in the data acquirement range is transported is shorter than the period T1 over which sensor data of cells in the data non-acquirement range is transported to reduce the time for reading unnecessary sensor data, as shown in FIG. 27.

For example, provided that the period of stable time of the AFDATAP signal ("H") is 16 $\mu$s, and the period during performance of A/D conversion ("L") is 18 $\mu$s in transporting sensor data of cells in the data acquirement range, the clock period ("H") is 2 $\mu$s and the clock period ("L") is 2 $\mu$s in transporting sensor data of cells in the data non-acquirement range. It is possible to acquire more suitably the values of sensor data of cells through the A/D circuit with clock pulses of ("H") 16 $\mu$s and ("L") 18 $\mu$s periods, while it may be impossible to acquire suitably the values of sensor data of cells with clock pulses of 2 $\mu$s period. However, since sensor data in the data non-acquirement range is unnecessary, no problems occur in transporting sensor data in the data non-acquirement range with clock pulses of ("H") 2 $\mu$s and ("L") 2 $\mu$s periods.

Figure 27:
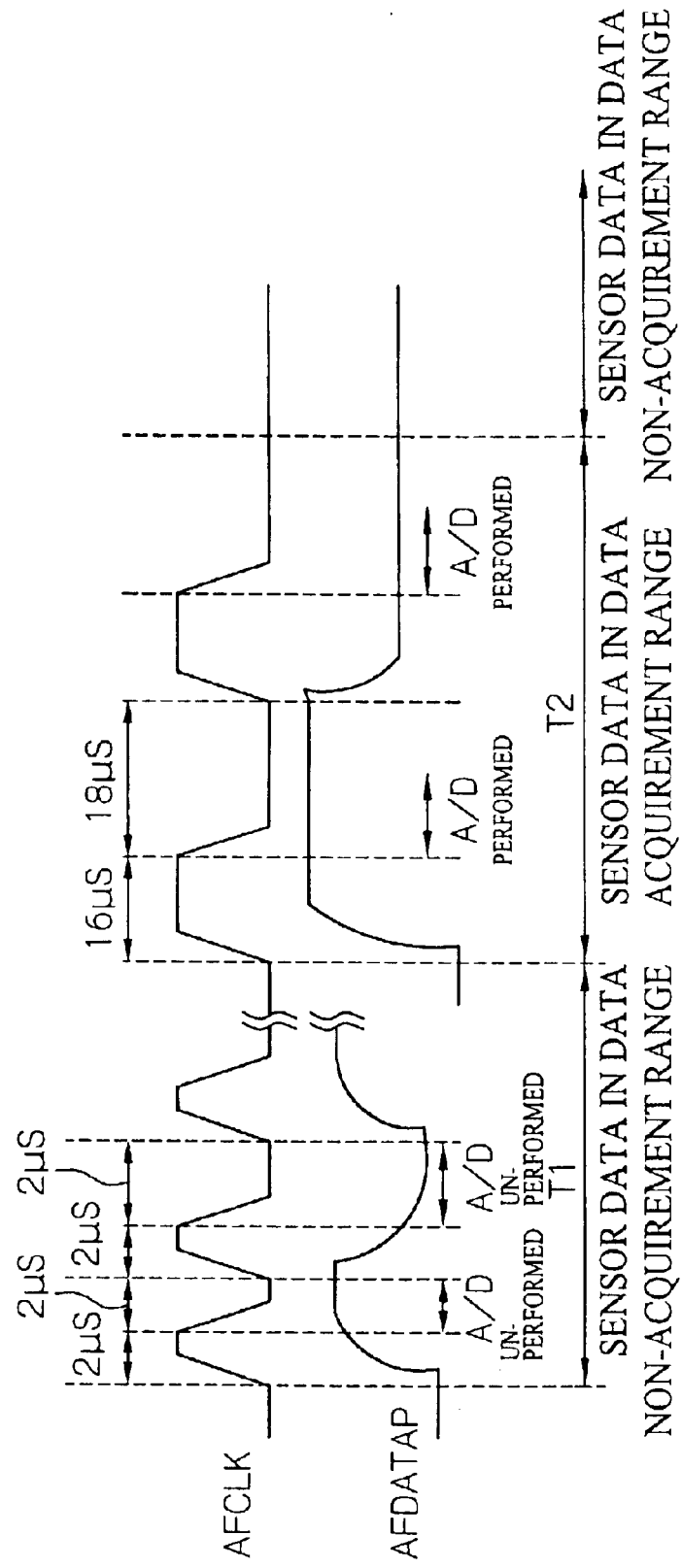
FIG. 27 is an explanatory diagram used for explanation of Processing for reading AF data.

Also, as shown in FIG. 27, in the case where all sensor data in the data acquirement range is completely transported, the output of the AFCLK signal (clock pulse) is stopped, and sensor data in the data non-acquirement range after the data acquirement range from being read even if all sensor data in the data non-acquirement range is not transported, whereby the time for reading sensor data can further be reduced.

Furthermore, in the case where a transition is made from transportation of sensor data in the data non-acquirement range to transportation of sensor data in the data acquirement range, the clock period is switched to ("H") 16 $\mu$s and ("L") 18 $\mu$s, beginning with a cell immediately before the cell for which transportation of sensor data in the data acquirement range is started, in consideration of stability of clock pulses and the like. However, instead of making a transition to the clock period at the time when sensor data in the data acquirement range beginning with a cell immediately before the cell for which transportation of sensor data in the data acquirement range is started as described above, the transition may be made in synchronization with the start of transportation of sensor data in the data acquirement range, or may be made beginning with a cell two or more before the cell for which transportation of sensor data in the data acquirement range is started.

Processing for generating AF data from sensor data will now be described. Provided that data outputted from the light receiving cell of the AF sensor 74 is sensor data, the case where the sensor data outputted from the AF sensor 74 is acquired through the A/D conversion circuit, and the A/D converted value of acquired sensor data itself is defined as AF data for use in subsequent processing in the CPU 60, and the case where sensor data subjected to predetermined processing for improving accuracy of distance measurement is defined as AF data can be considered. In the former case, it is not necessary to carry out special processing for generating AF data in the CPU 60, and processing for acquiring sensor data is equivalent to processing for acquiring AF data, while in the latter case, special processing for generating AF data is carried out in the CPU 60 after sensor data is acquired. As an example of the latter case, sensor data subjected to contrast extraction processing can be AF data for use in subsequent processing, and processing for subjecting sensor data to contrast extraction processing to generate AF data will be described below.

The contrast extraction processing is calculation processing in which when attention is focused on a cell with a certain number (address i), for example, a difference between the sensor data of the focused cell and the sensor data of the cell with sensor number of (i+m) separated from the focused cell by m cells (m pixels) is calculated. In other words, it is processing in which for each of sensor data obtained from the R sensor 94 and the L sensor 96, a difference between the sensor data and the sensor data shifted by m pixels is calculated. That is, provided that the sensor data of the cell of sensor number (i) in the R sensor 94 is R(i), and the sensor data of the cell of sensor number (i) in the L sensor 96 is L(i), calculation is performed according to the following formula (9) for the sensor data of the R sensor 94, and calculation is performed according to the following formula (10) for the sensor data of the L sensor 96:

$$R(i)-R(i+m) \qquad (9)$$

$$L(i)-L(i+m) \qquad (10)$$

The difference data obtained in this way indicates the contrast of the sensor image formed by each cell of the AF sensor 74. Furthermore, in this specification, calculation processing for calculating data indicating the contrast from the difference of sensor data by two pixels is referred to as two-pixel difference calculation.

The value of the cell interval m of two sensor data of which difference is calculated may be a desired set value, but m=2 is applied in the following description. However, since charges accumulated with cells of even sensor numbers and charges accumulated with cells of odd sensor numbers in the AF sensor 74 are transported through different channels and processed, the above-described difference data is preferably determined from sensor data of cells of the same channel, and an even number is desired as the value of m. Furthermore, the number of data determined from the above-described equations (9) and (10) is reduced by m compared to the number of sensor data acquired from the AF sensor 74 in the CPU 60, but a required number of AF data can be secured by enlarging in advance the above-described data acquirement range allowing for reduction in the number of data by m.

In the conventional methods, difference data obtained from the above-described equations (9) and (10) is used as AF data, but in this embodiment, the difference data further subjected to processing for adding +255 to the data and processing for dividing the data by 2 is used as AF data. That is, provided that AF data corresponding to the sensor number i of the R sensor 94 is AFR(i), and AF data corresponding to the sensor number i of the L sensor 96 is AFL(i), values obtained from the following equations (11) and (12) are defined as AF data if m=2 holds:

$$AFR(i)=(255+R(i-1)-R(i+1))/2 \qquad (11)$$

$$AFL(i)=(255+L(i-1)-L(i+1))/2 \qquad (12)$$

Figure 28:
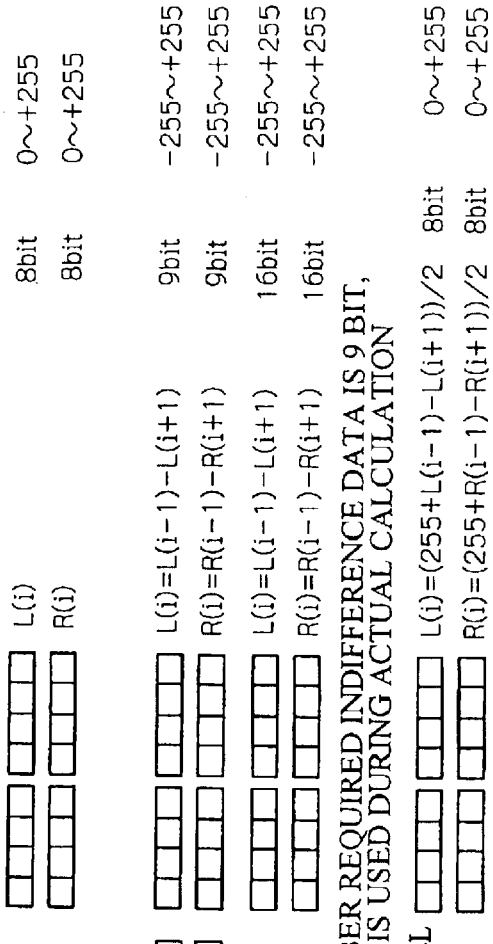
FIGS. 28(A), 28(B) and 28(C) are explanatory diagrams used for explanation of conventional method and new method for two-pixel difference data.

Here, the purpose of defining as AF data the values obtained from the equations (11) and (12) instead of simply using as AF data the difference data obtained from the equations (9) and (10) is to prevent increased RAM consumption and prolonged time for calculation such as calculation of correlation values. For example, assume that sensor data of each cell is obtained as 8 bit data. In this case, the values of the sensor data R(i) and L(i) are in the range of from 0 to +255 as shown in FIG. 28(A). In contrast to this, if difference data obtained from the equations (9) and (10) is used as AF data (this case is called conventional method), the value of AF data is in the range of from −255 to +255, and provides 9 bit data as shown in FIG. 28(B). The data is processed in byte units in use of RAM and calculation in RAM, and therefore 9 bit data is processed as 16 bit (2 byte data).

Figure 29:
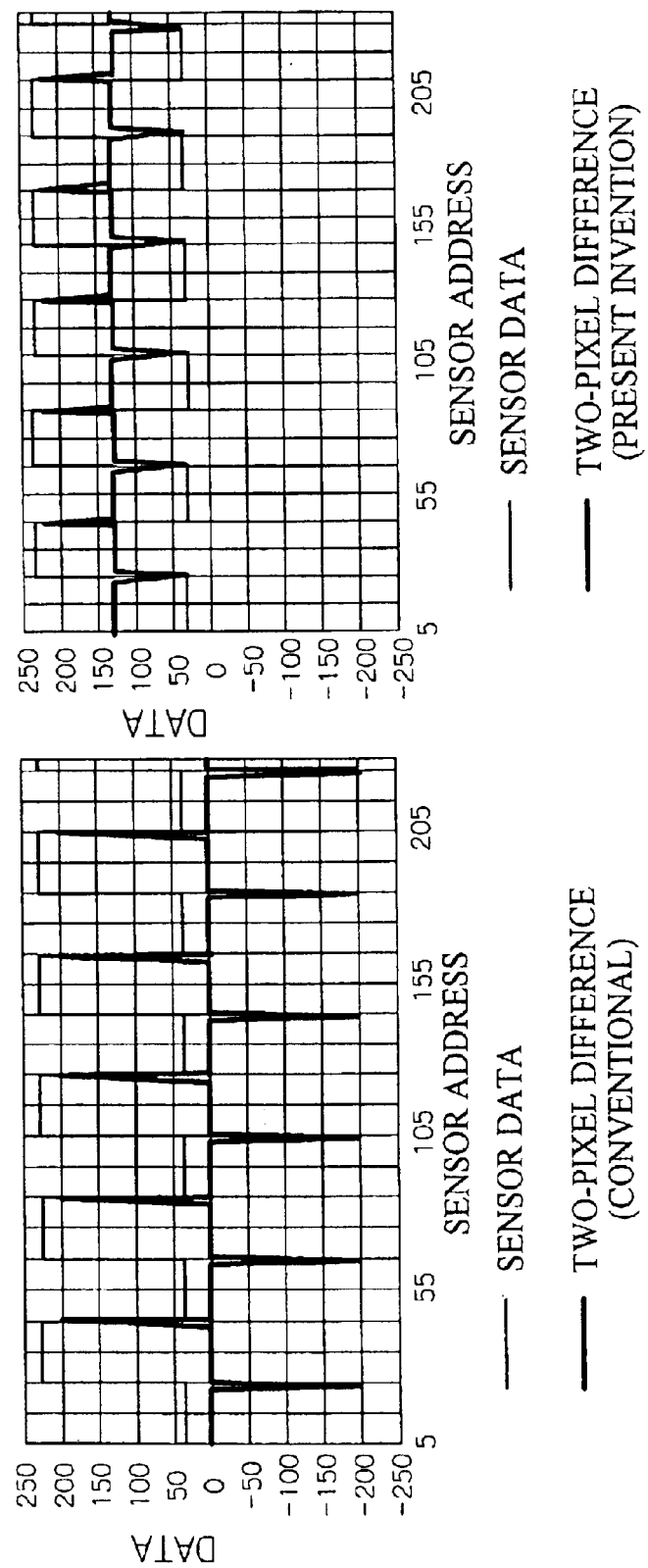
FIGS. 29(A) and 29(B) illustrate two-pixel difference data (AF data) obtained in the conventional method and the new method.

On the other hand, if difference data obtained from the equations (11) and (12) is used as AF data (this case is called new method), the value of AF data is in the range of from 0 to +255, and provides 8 bit data as shown in FIG. 28(C). Thus, the data is processed as 1 byte data in use of RAM and calculation in RAM. The values of AF data generated by the new method and the values of AF data generated by the conventional method according to the same sensor data are illustrated in FIGS. 29(A) and 29(B).

By generating AF data so that the AF data has the same number of bits as the sensor data as in the new method, the RAM consumption level is reduced, and also the amount of processing time in subsequent processing such as calculation of correlation values is reduced. Furthermore, the new method using the equations (11) and (12) has divided by 2 the value resulting from calculation of difference data by the conventional method using the equations (9) and (10), and may have reduced distance measurement accuracy, but it has been shown that this causes no problems from a practical viewpoint.

Figure 30:
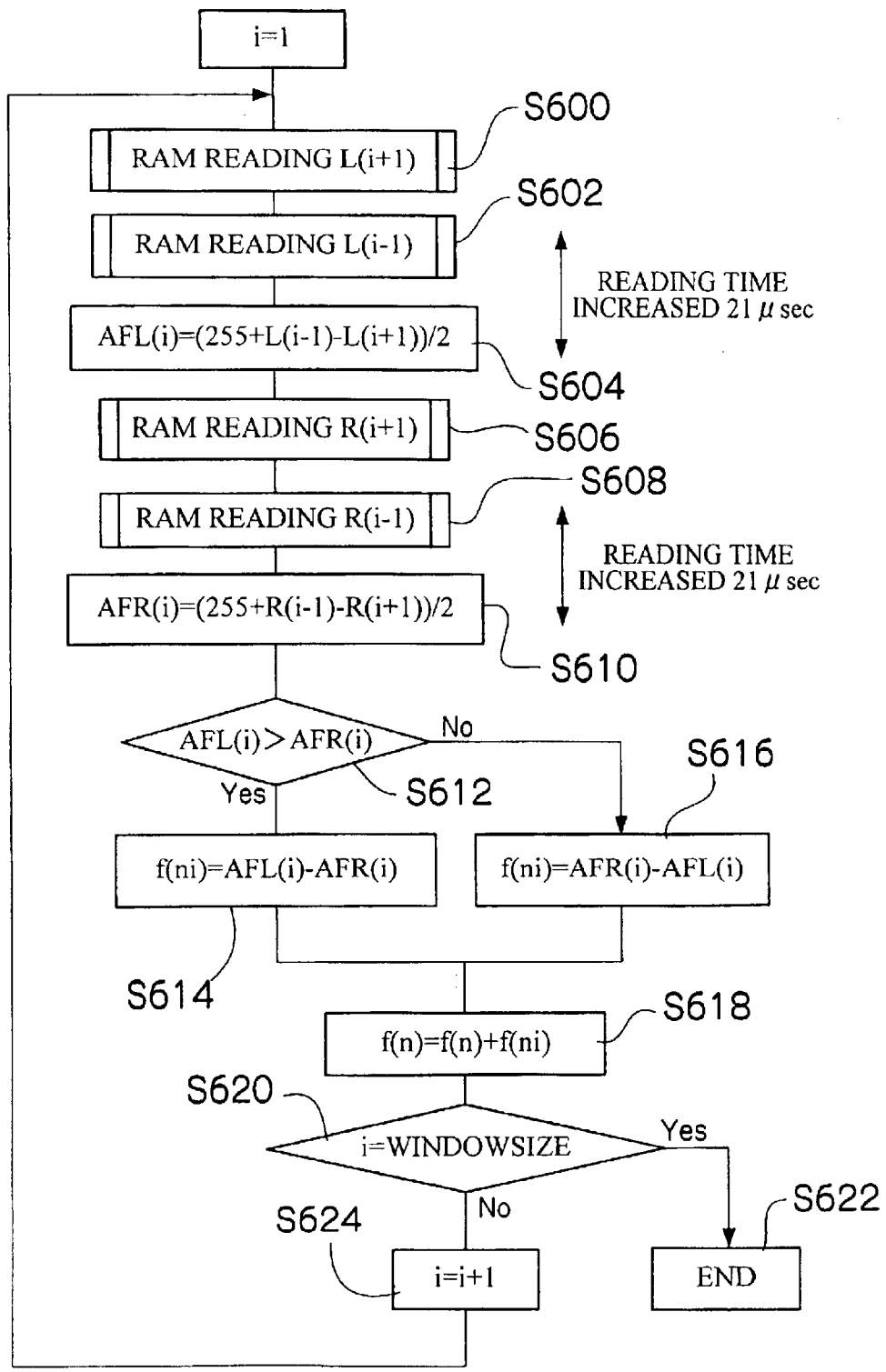
FIG. 30 is a flow chart showing the processing procedure for calculating correlation values where AF data is generated during calculation of correlation values.

Processing for generating AF data by the new method will now be described specifically. In the conventional method, when sensor data of each cell in the distance measurement area is read from the AF sensor, the read sensor data is directly stored in the RAM. Then, when processing such as calculation of correlation values using AF data (image) is started, the AF data (image) is read from the RAM, so that necessary difference data is generated by calculation of the equations (9) and (10) is generated one after another during performance of the processing. For example, in processing for calculating correlation values using AF data (image), the R window 94B and the L window 96B are shifted by one cell as shown in FIG. 12 while the correlation value is calculated by AF data (image) within each window for each shift amount n (if the number of employed sensors is 62 and the window size is 42, n=−2, −1, 0, 1, . . . , MAX (=38) holds). Therefore, AF data (image) of the same cell is repeatedly used, and each time it is used, the AF data (image) is read from the RAM, and difference data is generated by two-pixel difference calculation. The processing procedure for calculating correlation values for each shift amount n (n=−2, −1, 0, 1, . . . , MAX (=38) holds) when difference data is generated during calculation of correlation values in this way is shown in FIG. 30. First, sensor data L(i+1) and L(i−1) are read from the RAM assuming that i=1 holds (steps S600 and S602). Here, the i represents the cell position i in the R window 94B and the L window 96B. Then, the difference data AFL(i)=(255+L(i−1)−L(i+1))/2 is calculated according to the equation (12) (step S604). Similarly, sensor data R(i+1) and R(i−1) are read from the RAM (steps S606 and S608). Then, the difference data AFR(i)=(255+R(i−1)−R(i+1))/2 is calculated according to the equation (11) (step S610). Next, with f(ni) being substituted for the right side |L(i)−R(i)| in the equation (1) for determining the correlation value f(n), whether AFL(i)>AFR(i) holds or not is determined (step S612). If the result of determination is YES, f(ni) is made to be equal to L(i)−R(i) (step S614). If the result of determination is NO, f(ni) is made to be equal to R(i)−L(i) (step S616). Subsequently, f(ni) is added to the value of the left side f(n) of the equation (1) (initial value 0), and the resulting value is defined as a new value of f(n). That is, f(n) is made to be equal to f(n)+f(ni) (step S618).

Next, whether i=(window size wo(=42)) is attained or not is determines (step S620), and if the result of determination is YES, this processing is ended (step S622). On the other hand, if the result of determination is NO, i is made to be equal to i+1 (step S624), and processing returns to the above-described step S600 where processing is repeated beginning with step S600. The above-described processing is calculation for each shift amount n, and the calculation processing is repeated for each shift amount n (n=−2 to 38) beginning with i=1 and ending with i=wo.

In this way, in the case where difference data is generated during performance of processing for calculating correlation values using AF data (image), two-pixel difference calculation should be carried out in an overlapping manner because AF data (image) in the same cell is repeatedly used as shown in FIG. 12. Thus, much time is required for the calculation, resulting in the problem such that longer time is required for distance measurement.

Figure 31:
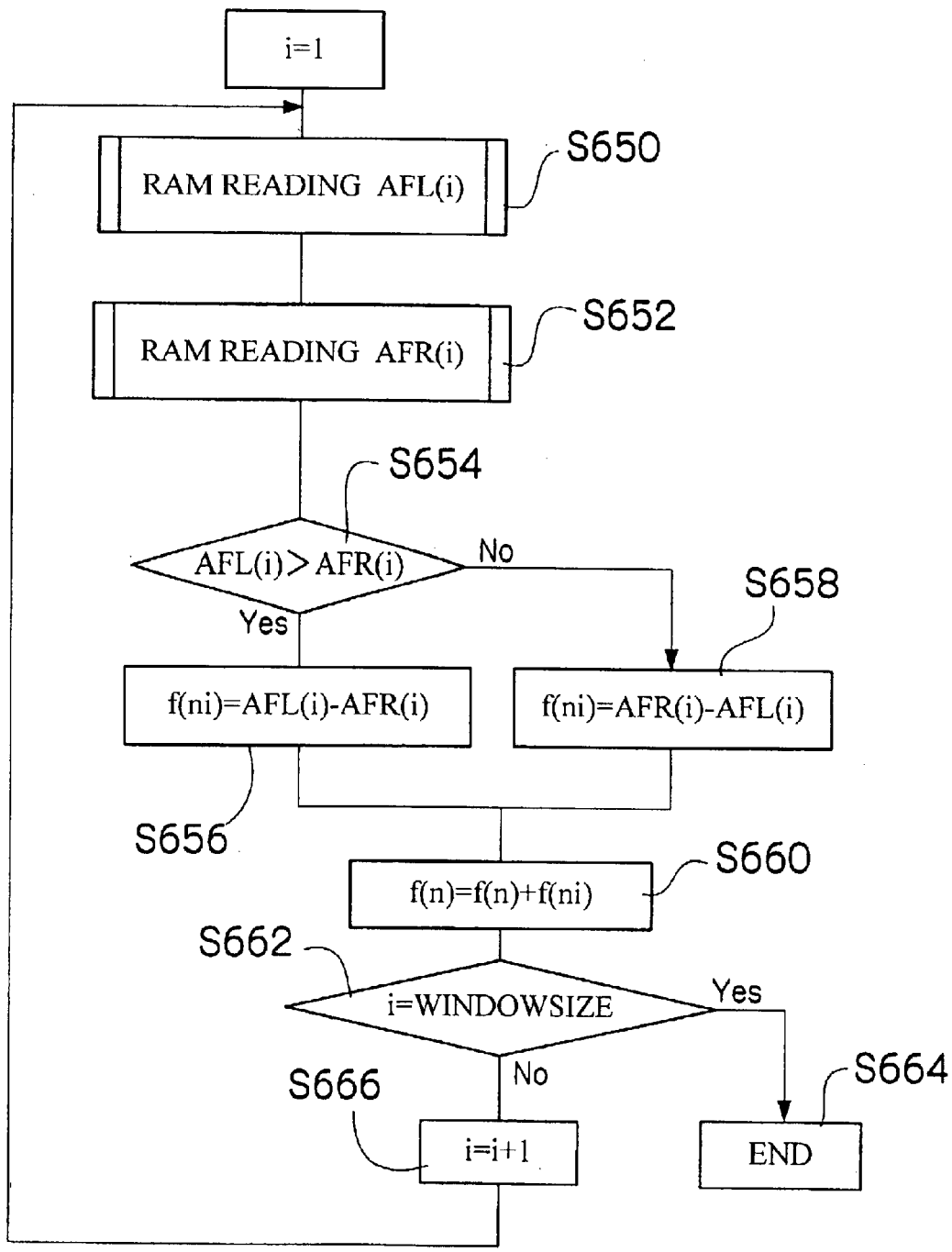
FIG. 31 is a flow chart showing the processing procedure for calculating correlation values where AF data is generated in advance and stored in a RAM before correlation values are calculated.

In this embodiment, for eliminating the above-described problem, AF data (difference) is generated before processing using difference data is started, and the generated AF data (difference) is stored in the RAM. In FIG. 31 is shown the processing procedure for calculating correlation values where AF data (difference) is generated before correlation values are calculated and stored in the RAM. First, AF data (difference), AFL(i) and AFR(i) are read out from the RAM assuming that i=1 (step S650 and S652). Here, the i represents the cell position i in the R window 94B and the L window 96B. Next, with f(ni) being substituted for the right side |L(i)−R(i)| in the equation (1) for determining the correlation value f(n), whether AFL(i)>AFR(i) holds or not is determined (step S654). If the result of determination is YES, f(ni) is made to be equal to L(i)−R(i) (step S656). If the result of determination is NO, f(ni) is made to be equal to R(i)−L(i) (step S658). Subsequently, f(ni) is added to the value of the left side f(n) of the equation (1) (initial value 0), and the resulting value is defined as a new value of f(n). That is, f(n) is made to be equal to f(n)+f(ni) (step S660).

Next, whether i=(window size wo(=42)) is attained or not is determines (step S662), and if the result of determination is YES, this processing is ended (step S664). On the other hand, if the result of determination is NO, i is made to be equal to i+1 (step S666), and processing returns to the above-described step S650 where processing is repeated beginning with step S650.

By generating AF data (difference) in advance and storing the same in the RAM, in this way, necessary AF data (difference) should only be read from the RAM during performance of processing using AF data (difference), and thus time required for processing for generating difference data is significantly reduced. When the processing time in calculation of correlation values shown in FIGS. 30 and 31 is compared, the processing of FIG. 31 can reduce time required for calculating correlation values by an amount of time (2×21 μs) required for the processing in steps S602 and S604, and S608 and S610 of FIG. 30. In the case of five areas under the setting in which the number of employed sensors is 62 and the window size is 42, the number of calculation times for the i described above is (i=1 to 42→42)×(n=−2 to 38→41)×5 areas=42×41×5=8610. Thus, the total distance measurement time can be reduced by 8610×(2×21 μs)≈362 ms. Furthermore, in the case where AF data (difference) is generated in advance and stored in the RAM, processing time for generating AF data (difference) from sensor data is required in addition to the time for calculating correlation values, and this will be described later.

For the aspect for carrying out two-pixel difference calculation, two possible aspects are considered. The first aspect is such that the sensor data read from the AF sensor 74 is stored in the RAM on a temporary basis (AF data (image)), and thereafter the AF data (image) is read from the RAM and difference data is generated using the equations (11) and (12) to carry out two-pixel difference calculation. The second aspect is such that at the time when sensor data required for calculation of the equations (11) and (12) is obtained for the sensor data with the sensor number of i when the sensor data is sequentially read from the AF sensor 74, the difference calculation (11) and (12) is carried out, and the results of difference calculation sequentially generated are stored in the RAM (AF data (difference)). The processing for reading sensor data in the first aspect is same as processing for reading sensor data when two-pixel difference calculation is not performed and when AF data (image) is generated during performance of processing such as calculation of correlation values because the processing is performed independently of processing for generating difference data. For the processing for reading sensor data in the second aspect, two-pixel difference calculation is carried out while sensor data is read, and in relation thereto, the amount of time required for reading sensor data is increased. However, if considering that two-pixel difference calculation is carried out, it cannot be the that the first aspect is more advantageous than the second aspect.

Figure 32:
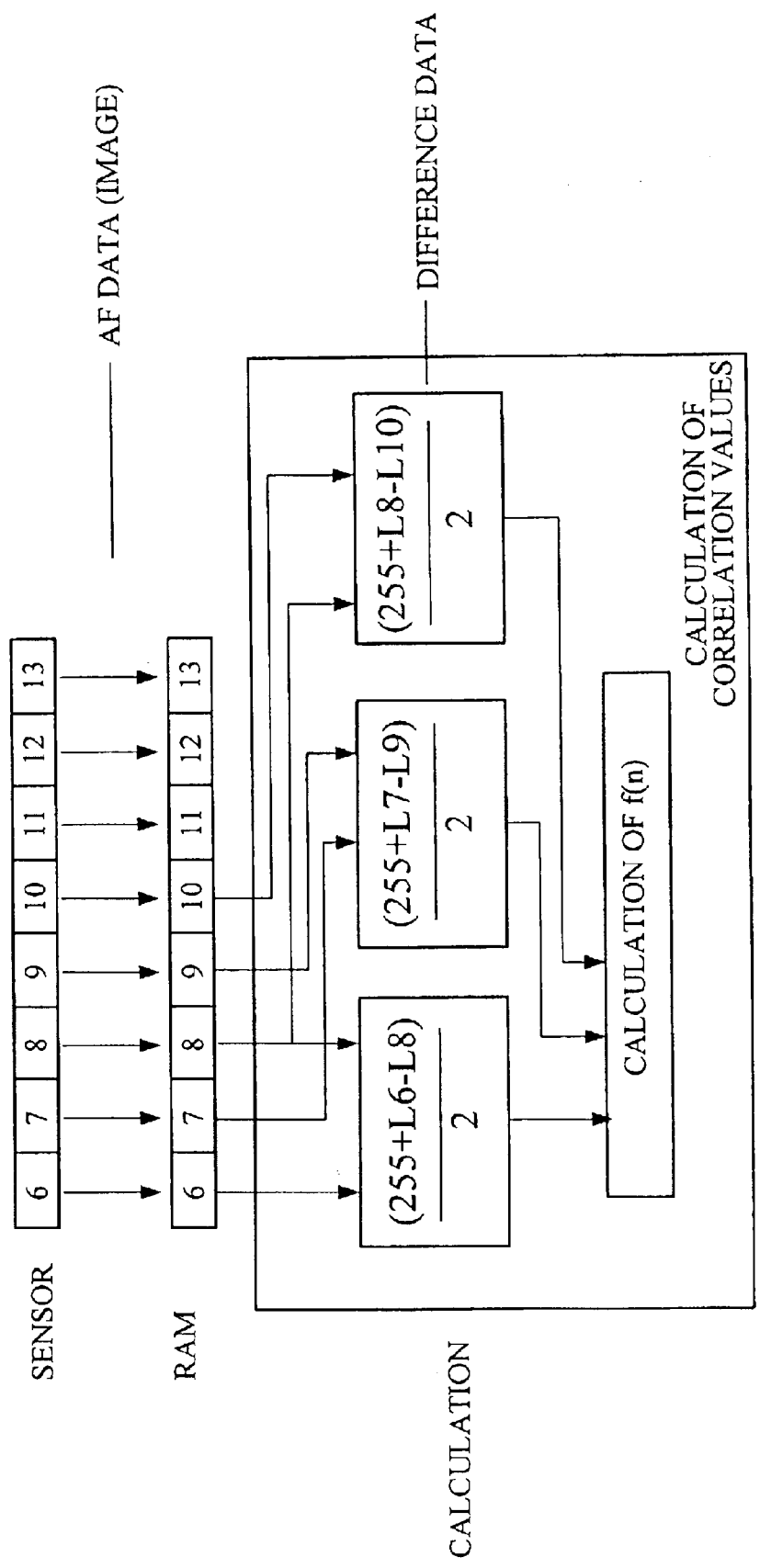
FIG. 32 shows a data flow where AF data is generated during calculation of correlation values.
Figure 33:
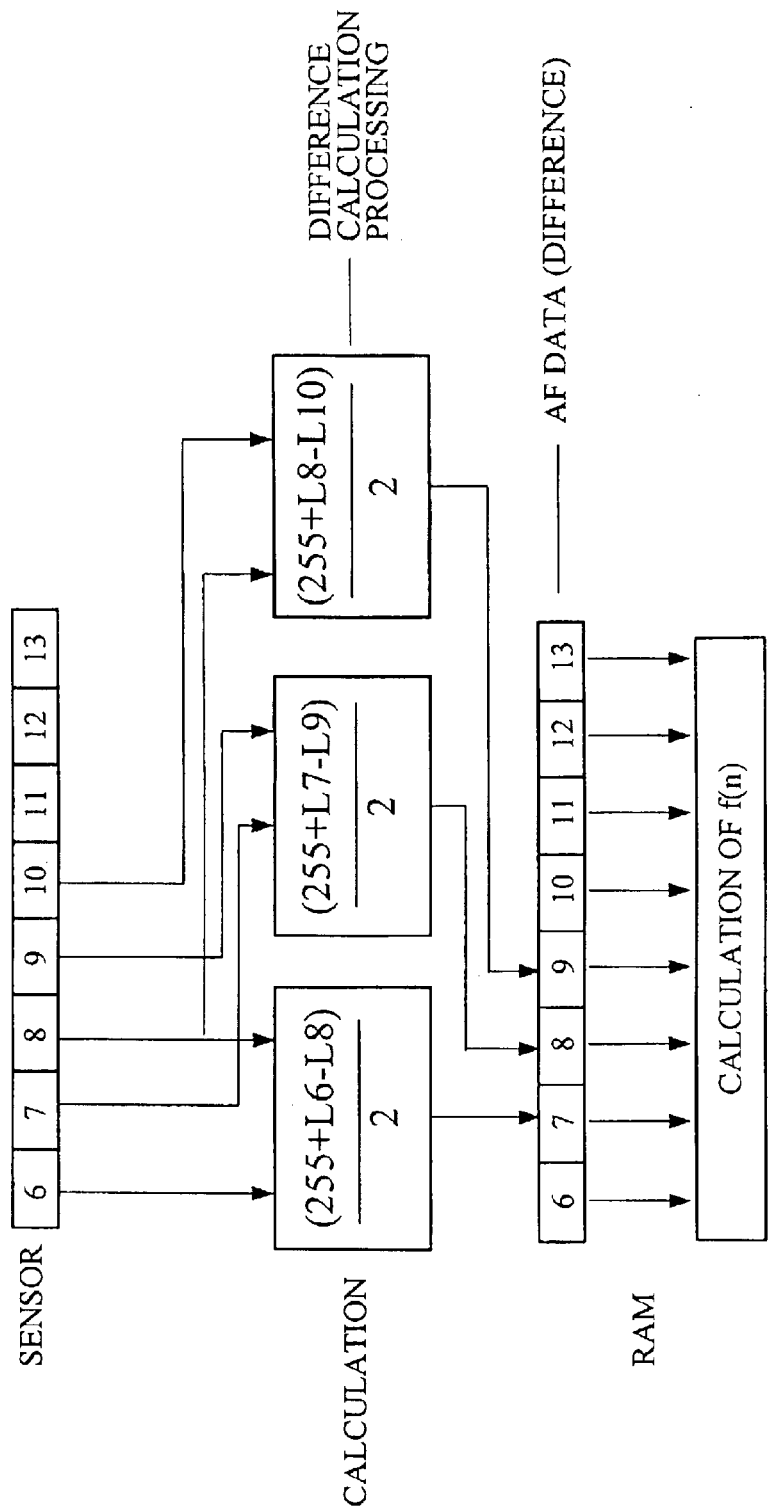
FIG. 33 shows a data flow where AF data is generated in advance and stored in the RAM before correlation values are calculated.

Here, the flow of data when difference data is generated during calculation of correlation values and the like (hereinafter this case is referred to as conventional method) is shown in FIG. 32, and the flow of data when the above-described second aspect is employed as the case where AF data (difference) is generated in advance and stored in the RAM (hereinafter this case is referred to as new method) is shown in FIG. 33. As shown in FIG. 32, sensor data of each cell sequentially read from the AF sensor is stored in the RAM in the case of the new method. Then, during calculation of correlation values, AF data (image) is read from the RAM and difference data is generated with the equation (11) or (12) to calculate the correlation value f(n). On the other hand, for the second aspect of new method, sensor data of each cell sequentially read from the AF sensor is subjected to difference calculation processing with the equation (11) or (12), and is stored in the RAM as AF data (difference), as shown in FIG. 33. Then, during calculation of correlation values, the AF data (difference) stored in the RAM is read and the correlation value f(n) is calculated. Although not shown in FIG. 33, two sensor data are required when sensor data is converted into AF data (difference) with the equation (11) or (12) in the new method, and therefore a memory (RAM) for storing the sensor data previously read from the AF sensor until the two sensor data are read is necessary. However, memory capacity for storing all sensor data is not required. Specifically, the sensor data is read in the order of L(i−1), R(i−1), L(i), R(i), L(i+1) and R(i+1), . . . and therefore if the cell interval m between two sensor data is 2, any RAM capable of storing five sensor data sufficiently serves the purpose. For example, AFL(i) in the equation (12) can be determined from L(i−1) and L(i+1) stored in the RAM at the time when L(i−1), R(i−1), L(i), R(i) and L(i+1) are stored. When the AFL(i) is determined, the sensor data of L(i−1) is deleted because it is hereinafter unnecessary, and then the sensor data R(i+1) read from the AF sensor 74 is stored in the address of the deleted data, whereby the AFR(i) of the equation (11) can be determined from R(i−1) and R(i+1). In this way, five sensor data read from the AF sensor 74 is stored in the RAM, and when new sensor data is read, the sensor data read first in sensor data stored in the RAM is deleted, and the new sensor data is stored in the RAM, thereby making it possible to sequentially create AF data (difference) with a RAM of small capacity.

Figure 34:
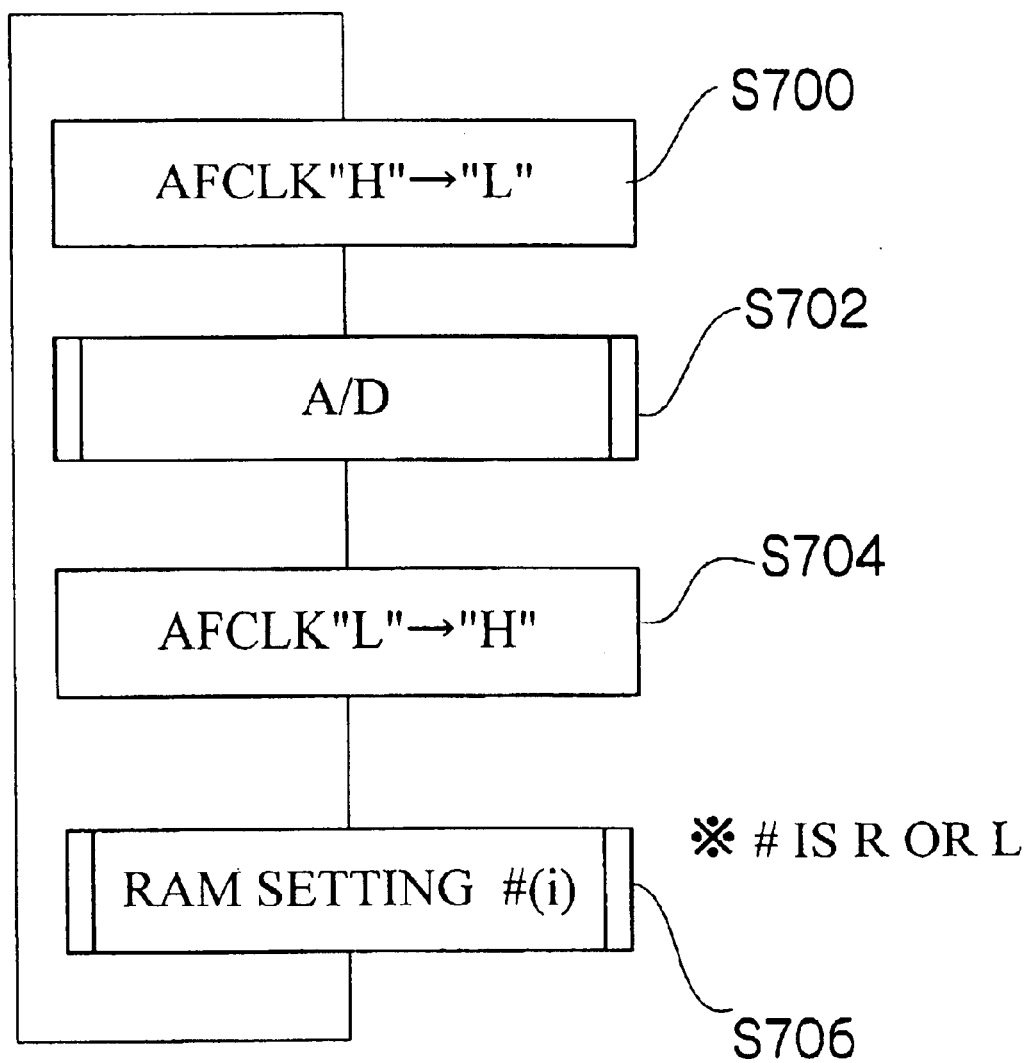
FIG. 34 is a flow chart showing processing for reading sensor data in the conventional method.
Figure 35:
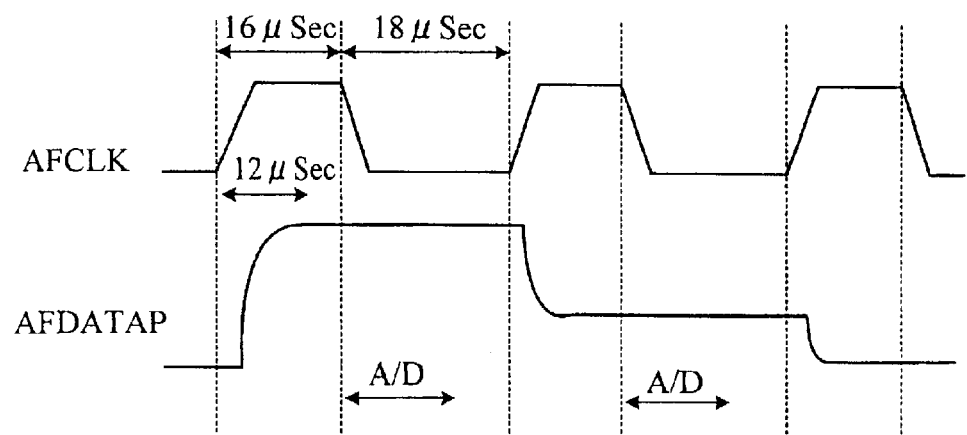
FIG. 35 is a timing chart showing an AFCLK signal and an AFDATAP signal when sensor data is read in the conventional method.

Next, processing for reading sensor data is compared between the case where the conventional method is employed and the case where the second aspect is employed as the new method. FIG. 34 is a flow chart showing processing for reading sensor data in the conventional method, and FIG. 35 is a timing chart showing the AFCLK signal and AFDATAP signal when sensor data is read in the conventional method. For describing processing for reading sensor data in the conventional method with reference to these drawings, first, the AFCLK signal is switched from "H" to "L" (step S700), and the AFDATAP signal indicating sensor data is subjected to A/D conversion (step S702). Then, the AFCLK signal is switched from "L" to "H" (step S704), and the sensor data R(i) or L(i) acquired from the A/D conversion is stored in the RAM (step S706). The above-described processing is repeated. Furthermore, the periods of "H" and "L" of the AFCLK signal are 16 μs and 18 μs, respectively.

Figure 36:
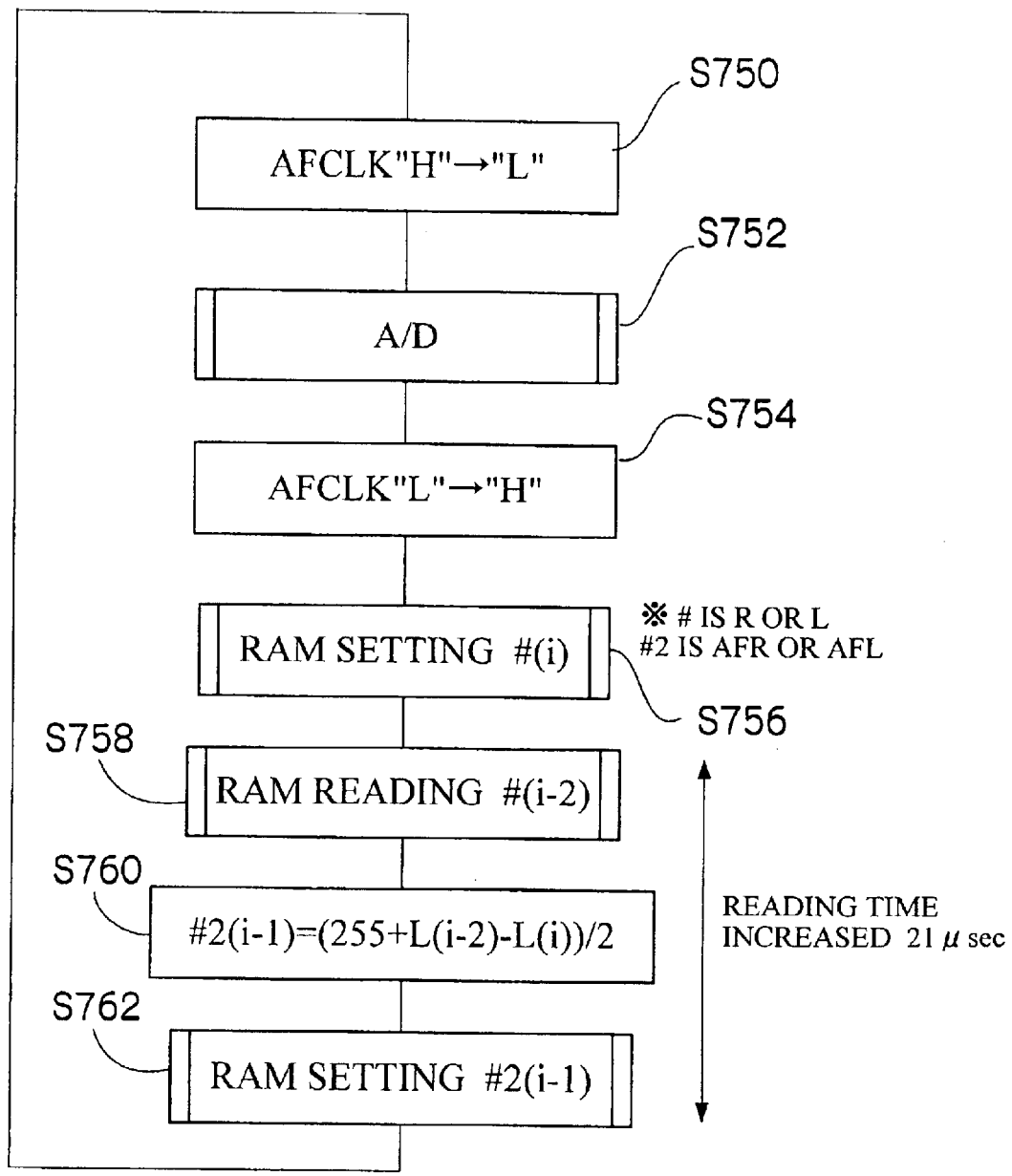
FIG. 36 is a flow chart showing processing for reading sensor data in the new method (present invention)
Figure 37:
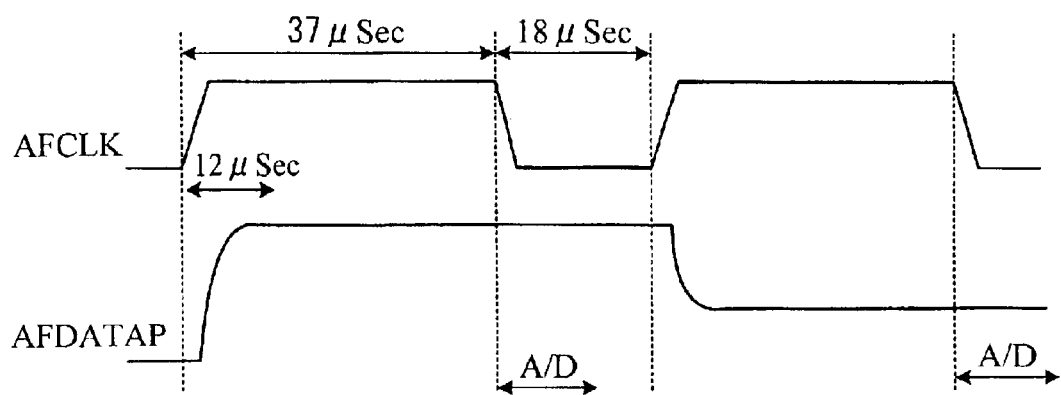
FIG. 37 is a timing chart showing the AFCLK signal and the AFDATAP signal when sensor data is read in the new method (present invention)

On the other hand, FIG. 36 is a flow chart of processing for reading sensor data in the new method (second aspect), and FIG. 37 shows the AFCLK signal and AFDATAP signal when sensor data is read in the new method. For describing processing for reading sensor data in the new method, first, the AFCLK signal is switched from "H" to "L" (step S750), and the AFDATAP signal indicating sensor data is subjected to A/D conversion (step S752). Then, the AFCLK signal is switched from "L" to "H" (step S754), and the sensor data R(i) or L(i) acquired from the A/D conversion is stored in the RAM (step S756). Then, the sensor data R(i−2) or L(i−2) is read from the RAM (step S758), and AF data (difference) AFR(i−1) or AFL(i−1) is calculated using the equation (11) or (12) (step S760), and the calculated AF data (difference) AFR(i−1) or AFL(i−1) is stored in the RAM (step S762). The above-described processing is repeated.

As apparent from the above-described processing for reading sensor data in the new and conventional methods, the new method requires more time for reading one sensor data than the conventional method by the amount of time (21 μs) corresponding to the operations in steps S758, S760 and S762. Furthermore, the processing in steps S758, S760 and S762 is carried out when the AFCLK signal is "H", and therefore as shown in FIG. 37, the period of "H" of the AFCLK signal has a larger amount of time for reading sensor data compared to the conventional method, which is 37 μs. That is, if considering only the amount of time for reading sensor data, the new method is more disadvantageous that the conventional method. However, if comparing the amount of time of entire processing including read of sensor data and calculation of correlation values, for example, between those two methods, the new method allows the processing to be completed in shorter time than the conventional method. A specific example of comparison results obtained by calculation is shown in the table of FIG.

38. In this table, time for reading sensor data, time for calculation of correlation values per calculation, correlation value total calculation time (41 times, five area setting), and total amount of time (time for reading sensor data+ correlation value total calculation time) are shown for each of the new method, the conventional method and the method not involving two-pixel difference calculation (conventional method (2)), and the difference Δ(1) between the new method and the conventional method, and the difference Δ(2) between the new method and the conventional method (2) are also shown.

The time for reading sensor data equals {(time of "H"+ time of "L") of the AFCLK signal}×the number of cells×2 (R sensor 94 and L sensor 96), and in the case of new method, two-pixel difference calculation can not be carried out in the period for reading sensor data equivalent to five cells, and therefore the time for reading sensor data equals (time for reading sensor data equivalent to five cells in the conventional method)+(time for reading sensor data equivalent to remaining cells in the new method). Substitution of the values used in the above description into the equation results in (16+18)×5+(37+18)×{(229−6+1)×2−5}=24535 μs.

On the other hand, for the time for calculation of correlation values per calculation, a measured value is used in the case of new method, and a "measured value+added calculation time" is used in the case of conventional method. The added calculation time is 21 μs×2 as shown in FIG. 30. Furthermore, the time for calculation of correlation values per calculation in the conventional method is 1.2×0.021×2×42=2.964 ms.

As apparent from the table of FIG. 38, the new method requires a lager amount of time for reading all sensor data by about 9 ms than the conventional method. For the calculation of correlation values, however, the new method has the amount of processing time reduced by about 361 ms compared to the conventional method, and therefore the new method has the amount of distance measurement time reduced by as much as 352 ms provided that the amounts of time required for other processing such as determination are the same for both the methods.

In the case where sensor data is subjected to required processing to generate AF data, the generation of AF data is achieved in the CPU 60 in the above description, but the AF data is not necessarily generated in the CPU 60, and the sensor data may be subjected to required processing in the AF sensor 74 to generate AF data, and the generated AF data may be given to the CPU 60. Also, the processing for calculating correlation values described later may be carried out in the AF sensor 74 instead of being carried out in the CPU 60, and the resulting distance signal may be given to the CPU 60.

Detailed Description of Processing for Calculating Correlation Values (step S16 in FIG. 7)

The processing for calculating correlation values in step S16 of FIG. 7 will now be described in detail. As described above in conjunction with FIG. 12, in the processing for calculating correlation values, the CPU 60 calculates the correlation value f(n) (n=−2, −1, 0, 1, . . . , MAX (=38)) according to the equation (1), according to the AF data acquired by the AF data acquirement processing in step S14 of FIG. 7, for each divided area constituting the distance measurement areas of the R sensor 94 and the L sensor 96 of the AF sensor 74. Then, the CPU 60 detects an amount of shift n providing the highest level of correlation for each divided area, according to the calculated correlation value f(n). Furthermore, for the divided area for which it is determined that there exists no contrast therein required for distance measurement in the contrast detection processing 1 in step S14, processing for calculating correlation values is not carried out.

Here, the CPU 60 makes a determination for f(n−1)>f(n)<f(n+1) to calculate a maximum value, and detects the shift amount n with the correlation value f(n) being the smallest minimum value as a shift amount providing the highest level of correlation (shift amount of highest correlation). In many cases, there exists one minimum value of correlation values, and the shift amount of highest correlation is a shift amount n providing the minimum value.

On the other hand, there are cases that a plurality of minimum values exist in the distribution of correlation values f(n) (determination for f(n−1)>f(n)<f(n+1)), and in those cases, the shift amount of highest correlation is in principle a shift amount n providing the smallest minimum value of a plurality of minimum values. In the case where a plurality of minimum values exist, however, erroneous distance measurement may be caused, and therefore whether it is appropriate or not that the shift amount n of the smallest minimum value is employed as the shift amount of highest correlation is determined in minimum value determination processing described below. Furthermore, either the minimum value and its shift amount in the case of one minimum value or the smallest minimum value and its shift amount in the case of a plurality of minimum values is expressed by the smallest minimum value fmin1 (or the smallest minimum value f(nmin1)) and the shift amount nmin1.

The minimum value determination processing will now be described. In the case where two or more minimum values of the correlation value f(n) exist in a certain divided area, the CPU 60 detects the smallest minimum value fmin1 and the second smallest minimum value (second minimum value), and determines a difference between those two minimum values (minimum value difference). Furthermore, the second minimum value is expressed by fmin2, and the minimum value difference is expressed by Δfmin (=fmin2−fmin1). For outline processing of minimum value determination, the shift amount nmin1 of the smallest minimum value fmin1 is employed as the shift amount n of highest correlation if the minimum value difference Δfmin is large. On the other hand, if the minimum value difference Δfmin is small, it is determined that distance measurement Δfmin is impossible because of high possibility of erroneous distance measurement. Furthermore, hereinafter, the shift amount of highest correlation is expressed by nmin, and the correlation value in highest correlation (highest correlation value) is expressed by fmin or f(nmin).

In the case where there exist a plurality of minimum values of the correlation value f(n), determining whether distance measurement is possible or impossible according to whether the minimum value difference Δfmin is large or small with respect to a fixed reference value results in a problem such that it is determined that distance measurement is impossible more than necessary, or the possibility of erroneous distance measurement rises. That is, there may be cases where distance measurement should be possible even if the minimum value difference Δfmin is somewhat small, and where distance measurement should be impossible even if the minimum value difference Δfmin is somewhat large.

For example, the aspect in the former case is shown in FIGS. 39(A), 39(B) and 39(C), and the aspect in the latter case is shown in FIGS. 40(A), 40(B), 40(C) and 40(D). FIGS. 39(A) and 39(B) show examples of AF data obtained from the cells of the middle areas in the R sensor 94 and the L sensor 96 of the AF sensor 74, and as shown on the drawings, AF data obtained from the cells of the middle areas have low contrast. Furthermore, in the description below, the divided area or its sensor (cells) targeted for the purpose of explanation, of divided areas to be subjected to same processing (divided areas constituting the distance measurement area), is called an employed sensor. In this case, the correlation value f(n) calculated by the calculation of correlation values is generally a small value (by comparison with FIGS. 40(A) to 40(D) described later) as shown in FIG. 39(C). Also, in FIG. 39(C), the smallest minimum value fmin1 is detected at the point of shift amount n=8, and the second minimum value fmin2 is detected at the point of shift amount n=18, and the minimum value difference Δfmin therebetween is also small compared to the case of FIGS. 40(A) to 40(D). However, in the case of this aspect of FIGS. 39(A) to 39(C), the shift amount nmin1 of the smallest minimum value fmin1 (=8) is a value appropriately corresponding to the subject distance, and it should be thus determined that distance measurement is possible.

On the other hand, FIGS. 40(A) and 40(B) show examples in which AF data obtained from the employed sensors (middle areas) of the R sensor 94 and the L sensor 96 is periodically changed. Such AF data is obtained when a striped subject is shot, for example. In this case, the correlation value f(n) calculated by the calculation of correlation values is also periodically changed as shown in FIG. 40(C), and becomes generally a large value (by comparison with FIGS. 39(A) to 39(C) described previously). Also, as shown in the enlarged view of FIG. 40(D), the smallest minimum value fmin1 is detected at the point of shift amount n=14, and the second minimum value fmin2 is detected at the point of shift amount n=20, and the minimum value difference Δfmin therebetween is also large compared to the case of FIGS. 39(A) to 39(C). In the case of this aspect of FIGS. 40(A) to 40(D), however, there is the high possibility that the shift amount nmin1 of the smallest minimum value fmin1 (=14) does not correspond to the subject distance appropriately, it should be determined that distance measurement is impossible for this employed sensor.

The CPU 60 appropriately determines that distance measurement should be carried out as in FIGS. 39(A) to 39(C) and distance measurement should not be carried out as in FIGS. 40(A) to 40(D), and specifically the CPU 60 performs determination processing as follows.

First, the smallest minimum value fmin1 and the second minimum value fmin2, of a plurality of detected minimum values in the distribution of correlation values f(n) of the employed sensor, are detected. Then, whether the following inequality (13) holds or not is determined:

$$fmin1 < (\text{reference value } R3) \tag{13}$$

This determination is made to discriminate between the cases of FIGS. 39(A) to 39(C) and FIGS. 40(A) to 40(D), and the reference value R3 is set to an appropriate value to discriminate between these cases. If the inequality (13) holds, namely in the case of FIGS. 39(A) to 39(C), the minimum value difference Δfmin (=fmin2−fmin1) is then determined to determine whether the following inequality (14) holds or not:

$$\Delta fmin < (\text{reference value } R2) \tag{14}$$

The reference value R2 is set to a value smaller than at least the reference value R1 described later in consideration of the case of FIGS. 39(A) to 39(C). If the inequality (14) holds, it is determined that distance measurement is impossible for this employed sensor because the minimum value difference Δfmin is small. If the inequality (14) does not hold, it is determined that distance measurement is possible, and the shift amount nmin1 of the smallest minimum value fmin1 is employed as the shift amount nmin of the highest correlation value fmin.

On the other hand, if the inequality (13) does not hold, namely in the case of FIGS. 40(A) to 40(D), whether the following inequality (15) holds or not is determined:

$$\Delta fmin < (\text{reference value } R1) \tag{15}$$

The reference value R1 is set to a value larger than at least the reference value R2 in consideration of the case of FIGS. 40(A) to 40(D). If the inequality (15) holds, it is determined that distance measurement is impossible for this employed sensor because of high possibility that the subject has a striped pattern or the like as in FIGS. 40(A) to 40(D). If the inequality (15) does not hold, it is determined that distance measurement is possible, the shift amount nmin1 of the smallest minimum value fmin1 is employed as the shift amount nmin of the highest correlation value fmin.

By carrying out the minimum value determination processing as described above, the frequency of occurrence of problems such as erroneous distance measurement is reduced.

A plurality of other aspects for reducing the amount of distance measurement time in the processing for calculating correlation values will now be described. First, the first embodiment for reducing the amount of distance measurement will be described. In the description of step S16 of FIG. 7 (see the equation (1)), the correlation value f(n) (n=−2, −1, 0, 1, . . . , MAX (=38)) is such that absolutes of differences of AF data (hereinafter referred to simply as difference of AF data) in the same cell positions (i=1, 2, . . . , wo (=42)) of the R window 94B and the L window 96B are added for all the cell positions i. In this first embodiment, difference of AF data are added at fixed intervals of cell positions i instead of adding AF data for all the cell positions in determining the correlation value f(n) of each shift amount. For example, differences of AF data are added at intervals of three cell positions i. Furthermore, in the description below, the cell to be computed for which the difference of AF data is added in calculation of the correlation value f(n) is referred to as an employed cell. Also, calculation of correlation values where the cells of cell positions i at intervals of three cell positions are used as the employed cell is referred to as "three-i-interval calculation", and in contrast to this, calculation of correlation values where cells of all the cell positions i are used as the employed cell as in the equation (1) is hereinafter referred to as "normal calculation".

FIG. 41 shows the cell positions i of the employed cells in the R window 94B and L window 96B in the three-i-interval calculation. As shown in FIG. 41, the cells of cell positions i at intervals of three cell positions with the cell position 1 being the first position (=1, 5, 9, 13, . . . ) are employed as employed cells for both the R window 94B and the L window 96B in the three-i-interval calculation. If the window size is 42 (wo=42), the final cell position i of the employed cell is position 41. The computing equation for the correlation value f(n) in this case is expressed by the following equation (16) as in the case of the equation (1), but i is taken at intervals of three cell positions like i=1, 5, 9, 13, 17, 21, 25, 29, 33, 37, 41:

$$f(n) = \sum_{i=1}^{wo} |L(i) - R(i)| \times 4 \quad (16)$$

Furthermore, the cell position i of the employed cell is not necessarily taken at intervals of three cell positions, and the first cell position is not necessarily the position of i=1. Also, a quadruple factor is applied to the equation (1) in the equation (16), and this is because the number of data in the three-i-interval calculation is usually ¼ of that of normal calculation, and the number should be consistent with that of normal calculation.

Figure 42:
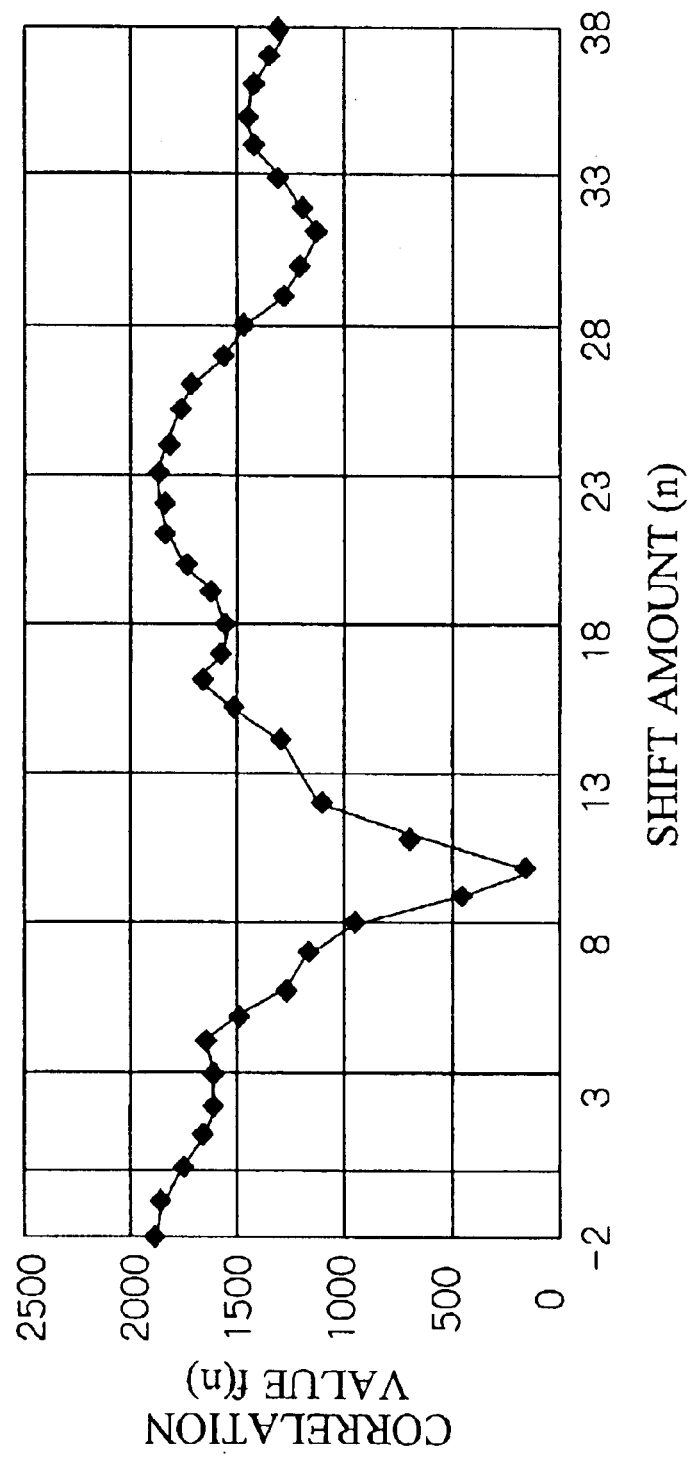
FIG. 42 shows an example of distribution of correlation values calculated by normal calculation.
Figure 43:
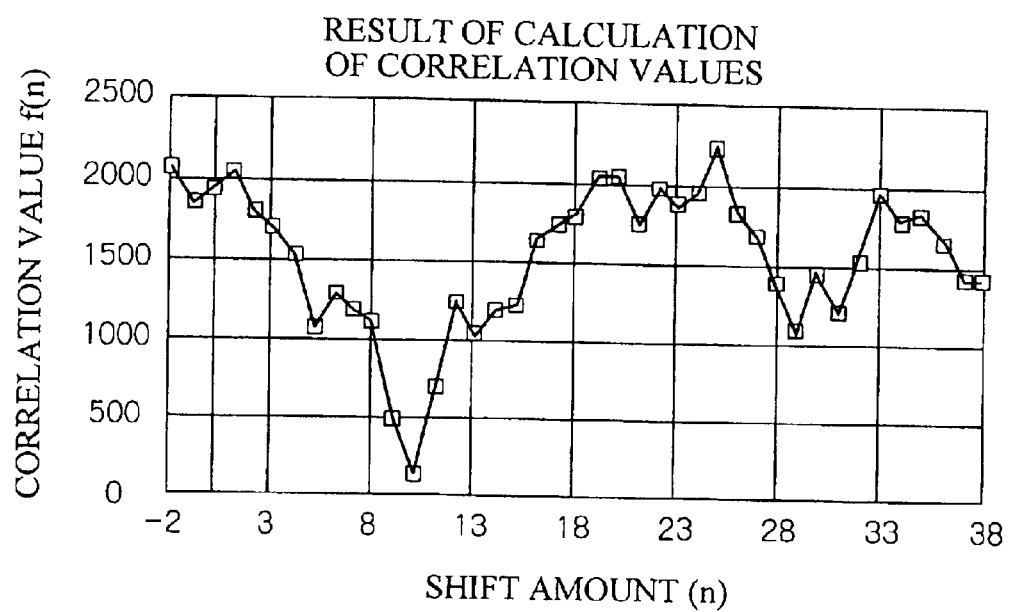
FIG. 43 shows an example of distribution of correlation values calculated by three-i-interval calculation.

Here, examples of calculation results when the correlation value f(n) is determined by the normal calculation and the three-i-interval calculation according to the AF data obtained in the cells of employed sensors are shown in FIGS. 42 and 43, respectively. As apparent from FIGS. 42 and 43, the three-i-interval calculation is not significantly different in general distribution of correlation values f(n) from the normal calculation, and in the three-i-interval calculation, the smallest minimum value is obtained with the same shift amount n (=10) as that in the normal calculation for these examples.

When the correlation value f(n) for each shift amount n is calculated by the three-i-interval calculation as described above, the CPU 60 detects a shift amount n providing the minimum value of the correlation value f(n) as in the case of normal calculation. At this time, as apparent from FIGS. 42 and 43, the correlation value f(n) determined by three-i-interval calculation is more largely varied and less accurate than the correlation value f(n) determined by normal calculation. Therefore, the position of the minimum value in three-i-interval calculation may be different from the position of the minimum value in normal calculation. Thus, in the case where three-i-interval calculation is carried out, the minimum value is defined as a temporary smallest minimum value if one minimum value is detected, and the smallest minimum value is defined as a temporary smallest minimum value if a plurality of minimum values are detected, and then the correlation value f(n) is recalculated by normal calculation around the shift amount of the temporary second minimum value. Furthermore, if a plurality of minimum values are detected, and the difference between the second smallest minimum value (temporary second minimum value) and the temporary smallest minimum value is small, the correlation value f(n) is also recalculated by normal calculation around the shift amount of the temporary second minimum value, and this will be described in detail below. Hereinafter, the temporary smallest minimum value is expressed by Tfmin1, the shift amount at that time is expressed by Tnmin1, and the range in which the correlation value f(n) is recalculated by normal calculation is referred to as a recalculation range.

When calculating again the correlation value f(n) in the recalculation range around the shift amount Tnmin1 by normal calculation, the CPU 60 detects the minimum value of the correlation value f(n) and its shift amount in the recalculation range according to the calculated correlation value f(n) by normal calculation. The minimum value and the shift amount detected by the recalculation are equivalent to the above-described smallest minimum value fmin and its shift amount nmin1 detected when all the correlation values f(n) in the employed sensor are determined by normal calculation, except in cases where it is determined that distance measurement is impossible (described later), and thus are expressed by the smallest minimum value fmin1 and the shift amount nmin1, respectively. Furthermore, it is called a recalculation smallest minimum value fmin1 in the case where the fact that it has been detected by recalculation is emphasized. The recalculation smallest minimum value fmin1 and the shift amount nmin1 detected by this recalculation processing equivalent to the highest correlation value fmin and its shift amount nmin to be detected by processing for calculating correlation values except in cases where it is determined that distance measurement is impossible.

Figure 44:
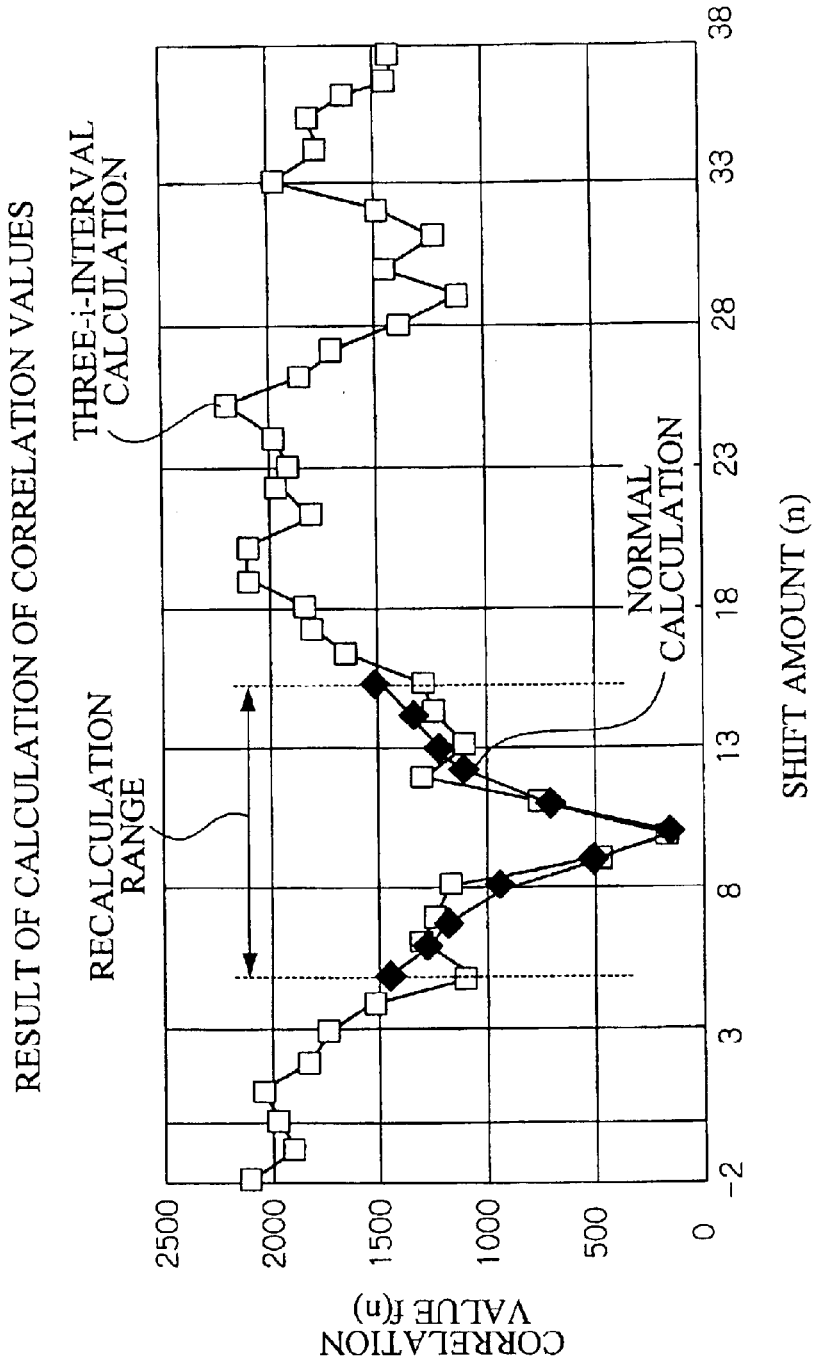
FIG. 44 shows a recalculation range in three-i-interval calculation.

The recalculation range is, for example, a range within ±5 of the shift amount Tnmin1 providing the temporary smallest minimum value Tfmin1. For example, the shift amount Tnmin1 providing the temporary smallest minimum value Tfmin1 equals 10 in the case of FIG. 10, and therefore the recalculation range is a range of shift amount n=5 to 15 as shown in FIG. 44. When recalculation is carried out in this recalculation range, the correlation value f(n) identical to that of FIG. 42 is calculated in the recalculation range as shown in FIG. 44, and therefore the shift amount nmin1 of the smallest minimum value fmin1 to be primarily detected is detected by the recalculation. Furthermore, in this example, the shift amount Tnmin1 of the temporary smallest minimum value Tfmin1 is consistent with the shift amount of nmin1 of the recalculation smallest minimum value fmin1.

Figure 45:
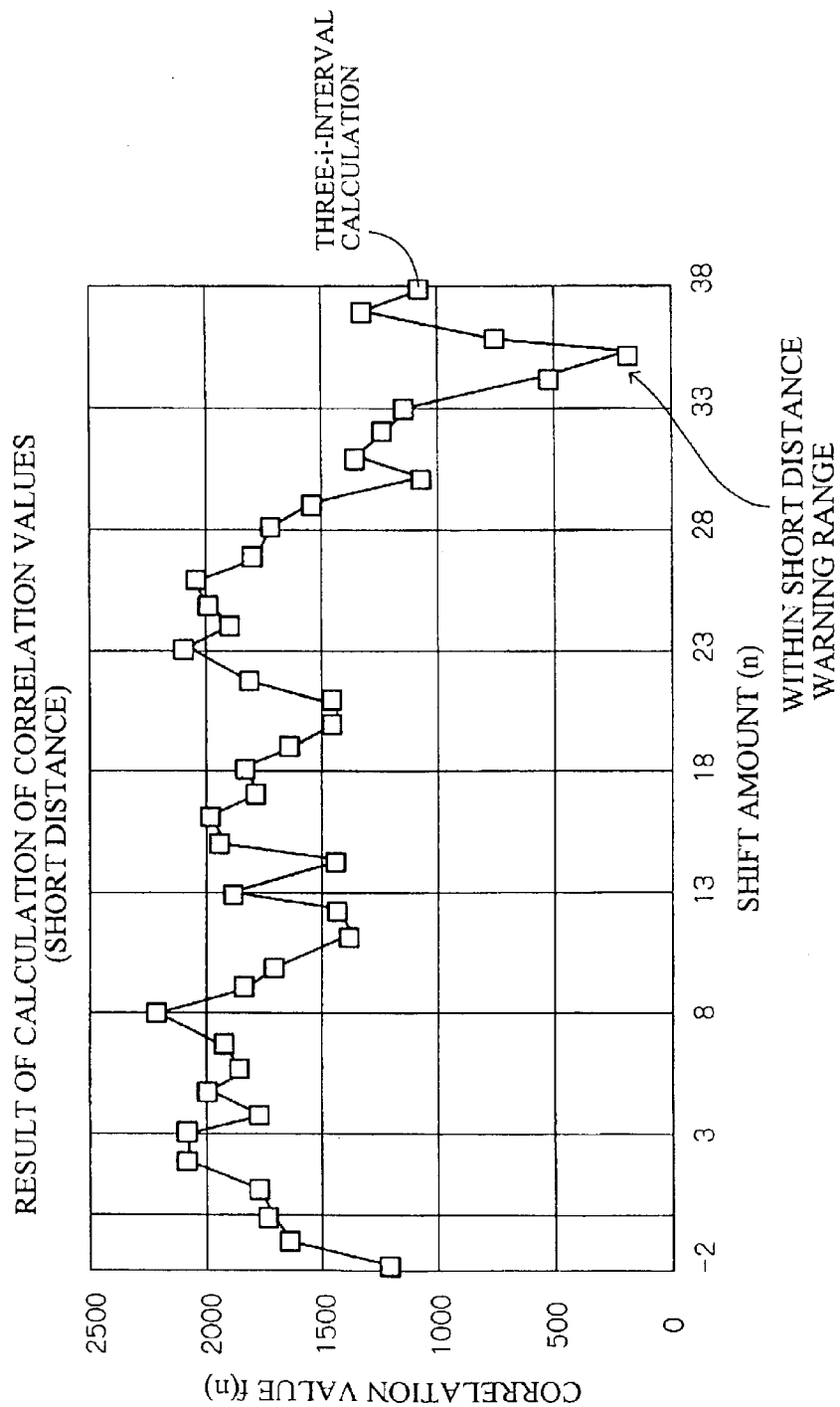
FIG. 45 shows an example of distribution of correlation values where a temporary smallest minimum value detected by three-i-interval calculation is in a short distance warning range.

Here, if the shift amount Tnmin1 of the temporary smallest minimum value Tfmin1 detected by three-i-interval calculation is within the short distance warning range as shown in FIG. 45, the recalculation by normal calculation is not carried out, and a short distance warning is provided assuming that Tnmin1=nmin1 holds. The short distance warning range refers to a short distance range in which focusing cannot be obtained in auto focus, and the above-described recalculation is carried out only when the shift amount Tnmin1 of the temporary smallest minimum value Tfmin1 is outside the short distance warning range.

When detecting the shift amount nmin1 of the recalculation smallest minimum value fmin1 by the correlation value f(n) calculated by recalculation as described above, the CPU 60 compares the shift amount nmin1 with the shift amount Tnmin1 of the temporary smallest minimum value Tfmin1 detected by three-i-interval calculation. These shift amounts are usually consistent with each other, but may not be consistent in some cases. In those cases, because the correlation value f(n) (correlation value f(n) by normal calculation) required in subsequent processing such as interpolated value calculation processing of step S22 of FIG. 7 is insufficient, recalculation of the correlation value f(n) in the insufficient shift amount n is additionally carried out. That is, it is necessary to calculate the correlation value f(n) by normal calculation at least in a fixed shift amount range (e.g., range of within ±5) with respect to the shift amount nmin1 of the recalculation smallest minimum value fmin1 (shift amount nmin of highest correlation), and if the shift amount Tnmin1 of the temporary smallest minimum value Tfmin1 is not consistent with the shift amount nmin1 of the recalculation smallest minimum value fmin1, the correlation value f(n) in the shift amount range required for the shift amount nmin1 of the recalculation smallest minimum value fmin1 is insufficient. In this embodiment, the shift amount range in which the correlation value f(n) by normal calculation is required for the shift amount nmin1 of the recalculation smallest minimum value fmin1 is identical to the recalculation range (range of within ±5).

Then, recalculation of the correlation value f(n) by normal calculation is additionally carried out for shift amounts outside the recalculation range with the correlation value f(n) by normal calculation already calculated, in the shift amount range required for the shift amount nmin1 of the recalculation smallest minimum value fmin1. However, if the difference (difference of shift amount nSA) between the shift amount Tnmin1 of the temporary smallest minimum value Tfmin1 and the shift amount nmin1 of the recalculation smallest minimum value fmin1 is equal to or greater than a predetermined value (e.g., 3), it is determined that distance measurement is impossible because there is the high possibility that the recalculation smallest minimum value fmin1 is not the smallest minimum value to be primarily detected. Furthermore, the case where a minimum value is not detected as a result of recalculation is equivalent to this case, where it is determined that distance measurement is impossible. Also, processing for carrying out recalculation of the wanted correlation value f(n) is referred to as wanted correlation value recalculation processing, and details thereof will be described later.

Figure 46:
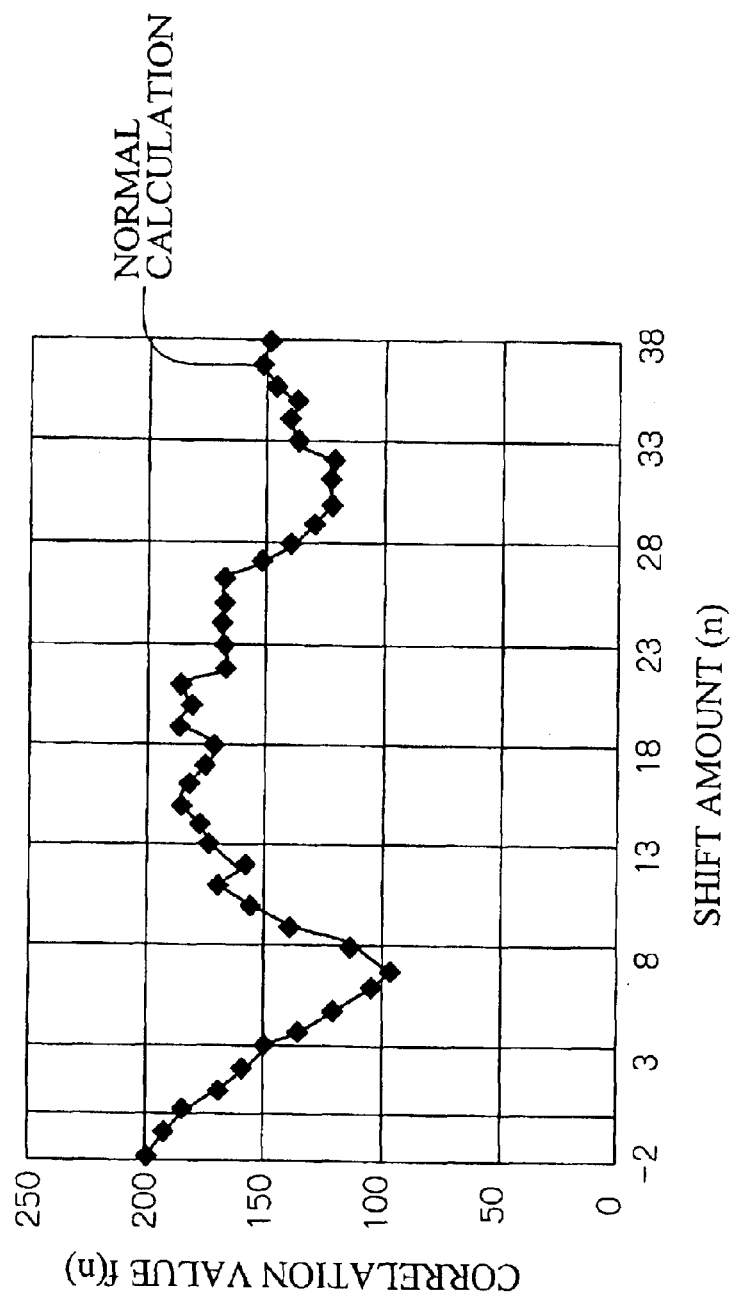
FIG. 46 shows an example of distribution of correlation values where a plurality of minimum values are detected by normal calculation.
Figure 47:
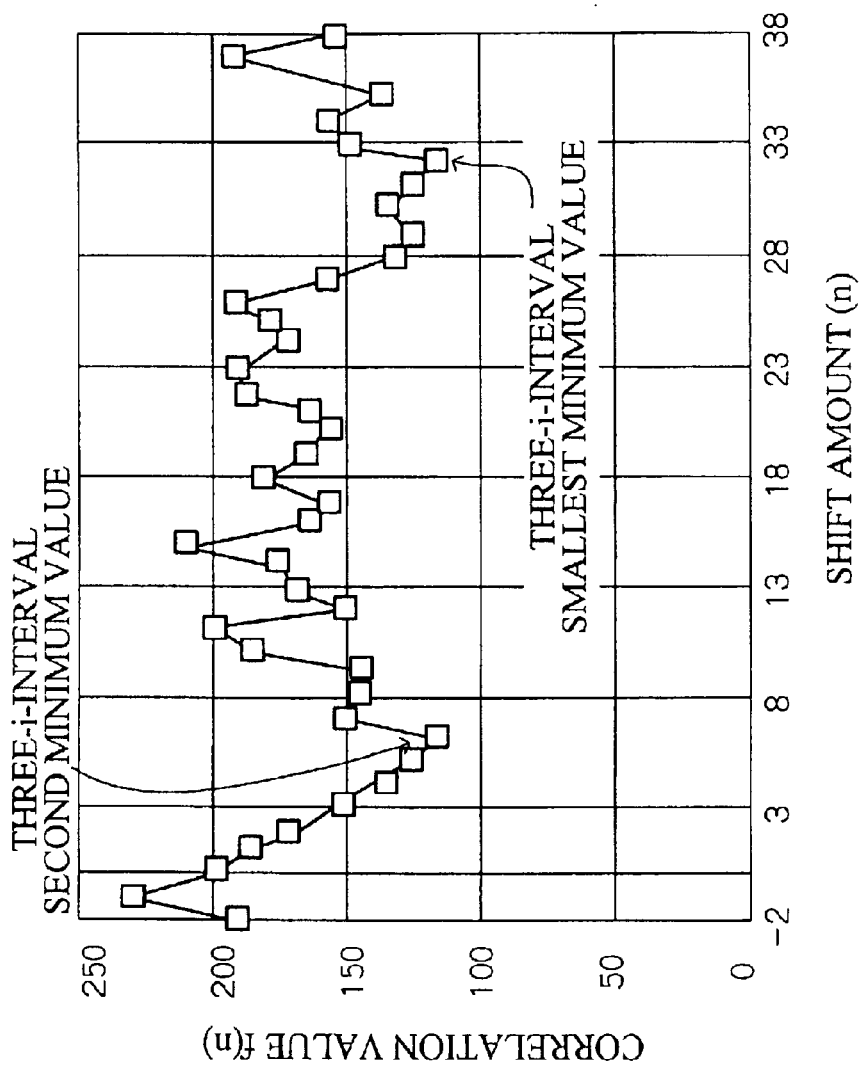
FIG. 47 shows distribution of correlation values obtained when three-i-interval calculation is carried out according to AF data same as the AF data in FIG. 46.

The case will now be described where a plurality of minimum values exist in the correlation value f(n) determined by three-i-interval calculation, and the difference between the smallest minimum value (temporary smallest minimum value Tfmin1) and the second minimum value (temporary second minimum value) is small. For example, if the correlation value f(n) is calculated by normal calculation for all the shift amounts n (n=−2 to MAX (=38)) in the employed sensor, a plurality of minimum values exist, the shift amount nmin1 of the smallest minimum value fmin1 is detected at shift amount n=7, and the shift amount nmin2 of the second minimum value fmin2 is detected at shift amount=32 as shown in FIG. 46. When the correlation value f(n) is calculated by three-i-interval calculation with respect to this AF data, correlation value distribution as shown in FIG. 47 is obtained. In this case, the CPU 60 first detects the smallest minimum value and the second minimum value in the distribution of the calculated correlation value f(n) by three-i-interval calculation as shown in FIG. 47. Furthermore, the smallest minimum value in three-i-interval calculation is expressed by the temporary smallest minimum value Tfmin1 as described above, its shift amount is expressed by Tnmin1, the second minimum value is expressed by the temporary second minimum value Tfmin2, and its shift amount is expressed by Tnmin2. Also, in FIG. 47, the shift amount of the temporary smallest minimum value Tfmin1 is detected at 32, and the shift amount Tnmin2 of the temporary second minimum value Tfmin2 is detected at 6.

If the difference between the temporary smallest minimum value Tfmin1 and the temporary second minimum value Tfmin2 detected three-i-interval calculation (minimum value difference ΔTfmin=Tfmin2−Tfmin1) is equal to or greater than a predetermined reference value, the CPU 60 carries out recalculation (normal calculation) only in the recalculation range for the shift amount Tnmin1 of the temporary smallest minimum value Tfmin1 as described above. On the other hand, if the minimum value difference ΔTfmin is smaller than the above-described reference value, the CPU 60 carries out recalculation in the recalculation range for the shift amount Tnmin1 of the temporary smallest minimum value Tfmin1, and the recalculation range for the shift amount Tnmin2 of the temporary second minimum value Tfmin2. However, if the minimum value difference ΔTfmin is smaller than the above-described reference value, and the shift amount Tnmin1 of the temporary smallest minimum value Tfmin1 and the shift amount Tnmin2 of the temporary second minimum value Tfmin2 are both within the short distance warning range, recalculation is not carried out, and a short distance warning is provided. If at least one of these shift amounts is not within the short distance warning range, recalculation is carried out around both the shift amounts as described above.

Figure 48:
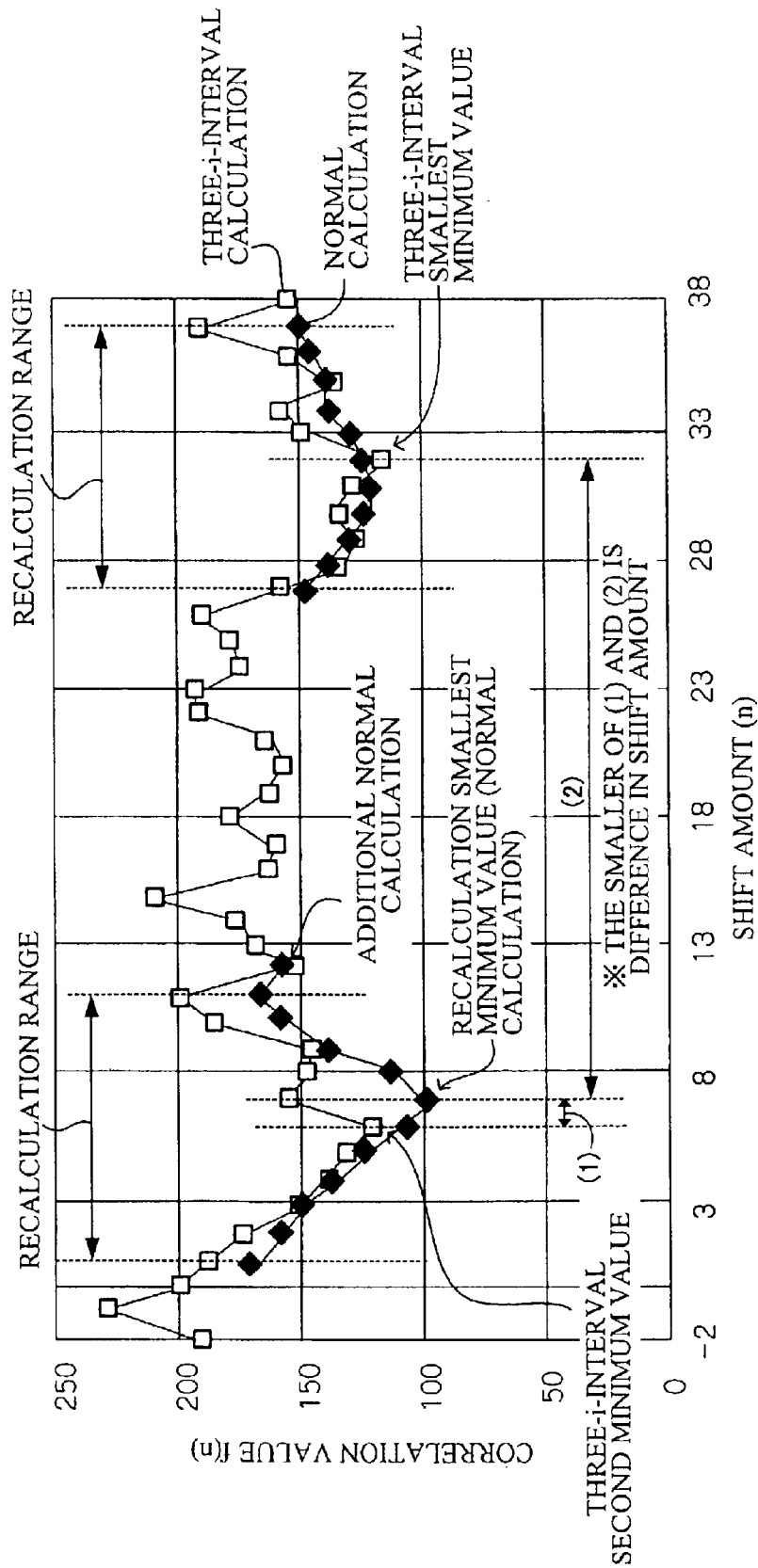
FIG. 48 shows the result of carrying out recalculation for the distribution of correlation values in FIG. 47.

FIG. 48 shows the results of recalculation when it is determined that the minimum value difference ΔTfmin in FIG. 47 is smaller than the above-described reference value. As shown in FIG. 48, recalculation is carried out with the shift amount range of within ±5 with respect to the shift amount Tnmin1 of the temporary smallest minimum amount Tfmin1 (=32) (shift amount n=27 to 37) being the recalculation range, and the correlation value f(n) by normal calculation is calculated in the recalculation range. Also, recalculation is carried out with the shift amount range of within ±5 with respect to the shift amount Tnmin2 of the temporary second minimum amount Tfmin2 (=6) (shift amount n=1 to 11) being the recalculation range, and the correlation value f(n) by normal calculation is calculated in the recalculation range. The correlation value f(n) recalculated in these recalculation ranges is equal to the correlation value f(n) in the corresponding shift amount range in FIG. 46.

When carrying out recalculation around the shift amount Tnmin1 of the temporary smallest minimum value Tfmin1 and the shift amount Tnmin2 of the temporary second minimum value Tfmin2 in this way, the CPU 60 detects the minimum value and its shift amount according to the correlation value f(n) by recalculation (normal calculation), in those recalculation ranges. The smallest minimum value and the second minimum value are expressed by the recalculation smallest minimum value fmin1 and the recalculation second minimum value fmin2, respectively, and their shift amounts are expressed by the shift amount fmin1 and the shift amount fmin2, respectively. The recalculation smallest minimum value fmin1 and its shift amount fmin1, and the recalculation second minimum value fmin2 and its shift amount nmin2 are equivalent to the smallest minimum value fmin1 and its shift amount nmin1, and the second minimum value fmin2 and its shift amount nmin2 detected when all the correlation values f(n) in the employed sensor are determined by normal calculation, except in cases where it is determined that distance measurement is impossible (described later), and the shift amount nmin1 of the smallest minimum value fmin1 is equivalent to the shift amount nmin of the highest correlation value fmin to be detected by processing for calculating correlation values.

The case where a plurality of temporary smallest minimum values exist, and the shift amount Tnmin1 of the temporary smallest minimum Tfmin1 detected by three-i-interval calculation is not consistent with the shift amount nmin1 of the recalculation smallest minimum value fmin1 detected by recalculation will now be described. In this case, the correlation value f(n) by normal calculation is required at least in a fixed shift amount range (e.g., within ±5) with respect to the shift amount nmin1 of the recalculation smallest minimum value fmin1, in the same way as described above, and therefore the wanted correlation value f(n) is additionally recalculated (by normal calculation).

Also, it is determined that distance measurement is impossible if the shift amount difference nSA is equal to or greater than a reference value, and if the shift amount nmin1 of the recalculation smallest minimum value fmin1 is detected in association with recalculation for the shift amount Tnmin1 of the temporary smallest minimum value Tfmin1, the shift amount difference nSA in this case is appropriately considered as a difference between these shift amounts, but if the shift amount nmin1 of the recalculation smallest minimum value fmin1 is detected in association with recalculation for the shift amount Tnmin2 of the temporary second minimum value Tfmin2, the shift amount difference nSA is appropriately considered as a difference between the shift amount Tnmin2 of the temporary second minimum value Tfmin2 and the shift amount nmin1 of the recalculation smallest minimum value fmin1.

Then, the shift amount difference DIS1 (=|Tnmin1−nmin1|) between the shift amount Tnmin1 of the temporary smallest minimum value Tfmin1 and the shift amount nmin1 of the recalculation smallest minimum value fmin1, and the shift amount difference DIS2 (=|Tnmin2−nmin1|) between the shift amount Tnmin2 of the temporary smallest minimum value Tfmin2 and the shift amount nmin1 of the recalculation smallest minimum value fmin1 are determined, and the smaller value of these determined distances is used as the shift amount difference nSA to determine whether distance measurement is possible or not.

In the case of FIG. 48, since the shift amount nmin1 of the recalculation smallest minimum value fmin1 equals 7, the shift amount difference DIS1 equals 1 as indicated with (1), and the shift amount difference DIS2 equals 25 as indicated with (2). Thus, whether distance measurement is possible or not is determined according to the magnitude of shift amount difference DIS1.

Figure 49:
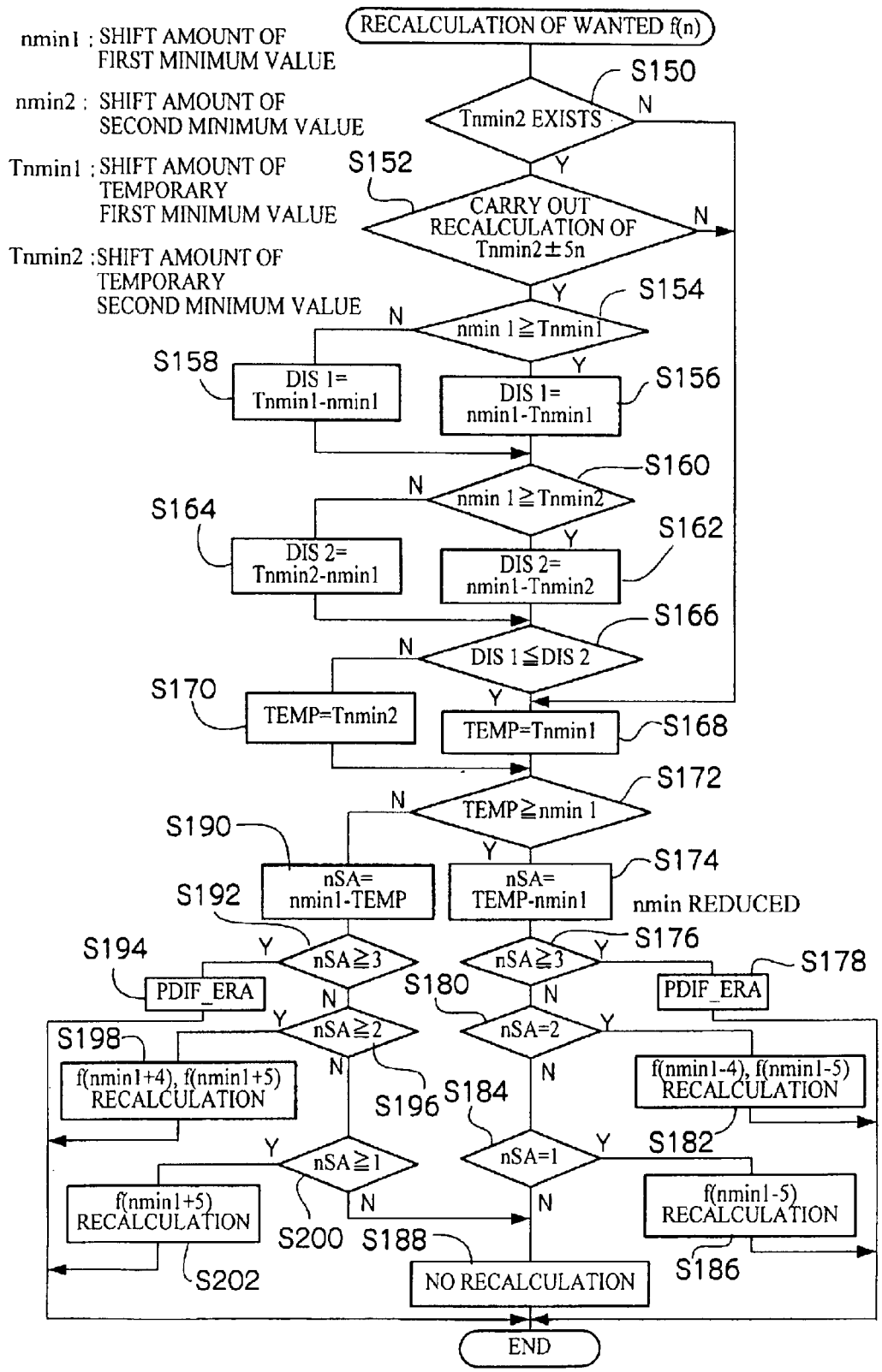
FIG. 49 is a flow chart showing the processing procedure of wanted value recalculation processing.

FIG. 49 is a flow chart showing the procedure of wanted value recalculation processing. Before wanted value recalculation processing is carried out, the CPU 60 calculates the correlation value f(n) by three-i-interval calculation to detect the shift amount Tnmin1 of the temporary smallest minimum value Tfmin1. Also, if the temporary second minimum Tfmin2 exists in addition to the temporary smallest minimum value Tfmin1, the CPU 60 detects its shift amount Tnmin2. Then, the CPU 60 carries out recalculation by normal calculation in the recalculation range to detect the shift amount nmin1 of the recalculation smallest minimum value fmin in the recalculation range.

Subsequently, processing proceeds to wanted value recalculation in FIG. 49. First, whether the shift amount Tnmin2 of the temporary second minimum value Tfmin2 exists or not, namely whether the second minimum value Tfmin2 exists or not is determined (step S150). If the result of determination is NO, processing proceeds to step S168 described later. On the other hand, it the result of determination is YES, then whether or not recalculation has been carried out with the range of shift amounts n of within ±5 with respect to the shift amount Tnmin2 of the temporary second minimum value Tfmin2 being as the recalculation range is determined (step S152). If the result of determination is NO, processing proceeds to step S168 described later. On the other hand, if the result of determination is YES, whether (shift amount nmin1≧shift amount Tnmin1) holds or not is determined (step S154). In the case of YES, the value DIS1 indicating the magnitude of shift amount difference between the temporary smallest minimum value Tfmin1 and the recalculation smallest minimum value fmin1 is made to be equal to nmin1−Tnmin1 (DIS1=nmin1−Tnmin1) (step S156), and in the case of NO, the shift amount difference DIS1 is made to be equal to Tnmin1−nmin1 (DIS1=Tnmin1−nmin1) (step S158).

Then, the CPU 60 determines whether (shift amount nmin1≧shift amount Tnmin2) holds or not (step S160). If the result of determination is YES, the value DIS2 indicating the magnitude of shift amount difference between the temporary second minimum value Tfmin2 and the recalculation smallest minimum value fmin1 is made to be equal to nmin1−Tnmin2 (DIS1=nmin1−Tnmin2) (step S162), and if the result of determination is NO, the shift amount difference DIS2 is made to be equal to Tnmin2−nmin1 (DIS2=Tnmin2−nmin1) (step S164).

Then, whether (DIS1≦DIS2) holds or not is determined (step S166), and if the result of determination is YES, namely it is determined that the recalculation smallest minimum value fmin1 is closer to the temporary smallest minimum value Tfmin1 than the temporary second minimum value Tfmin2, the temporary value TEMP is made to be equal to the shift amount Tnmin1 (step S168). If the result of determination is NO, namely it is determined that the recalculation smallest minimum value fmin1 is closer to the temporary second minimum value Tfmin2 than the temporary smallest minimum value Tfmin1, it is determined that temporary value TEMP=shift amount Tnmis2 holds (step S170). Furthermore, if the result of determination is NO in step S150 or S152, processing proceeds to step S168, where the temporary value TEMP is made to be equal to the shift amount Tnmin1.

Then, the CPU 60 determines whether (TEMP≧nmin1) holds or not, namely whether the shift amount nmin1 of recalculation smallest minimum value fmin1 is on the + or − side with respect to the temporary value TEMP (step S172). If the result of determination is YES, the shift amount difference nSA is made to be equal to TEMP−nmin1 (nSA=TEMP−nmin1) (step S174).

Then, whether (nSA≧3) holds or not is first determined (step S176). If the result of determination is YES, it is determined that distance measurement is impossible (step S178), and this wanted value recalculation processing is ended.

If the result of determination is NO in step S176, whether (nSA=2) holds or not is subsequently determined (step S180). If the result of determination is YES, the correlation values f(nmin1−4) and f(nmin1−5) in the shift amounts n=nmin1 −4 and nmin1−5 are recalculated by normal calculation (step S182).

If the result of determination is NO in step S180, whether (nSA=1) holds or not is then determined (step S184). If the result of determination is YES, the correlation value f(nmin1−5) in the shift amount nmin1−5 is recalculated by normal calculation (step S186).

If the result of determination is NO in step S184, recalculation (recalculation of wanted values) is not carried out (step S188), and the processing of wanted value recalculation is ended.

If the result of determination is NO in step S172, the shift amount difference nSA is made to be equal to nmin1−TEMP (step S190).

Then, whether (nSA≧3) holds or not is first determined (step S192). If the result of determination is YES, it is determined that distance measurement is impossible (step S194), and this wanted value recalculation processing is ended.

If the result of determination is NO in step S192, whether (nSA=2) holds or not is subsequently determined (step S196). If the result of determination is YES, the correlation values f(nmin1−4) and f(nmin1−5) in the shift amounts n=nmin1−4 and nmin1−5 are recalculated by normal calculation (step S198).

If the result of determination is NO in step S196, whether (nSA=1) holds or not is then determined (step S200). If the result of determination is YES, the correlation value f(nmin1−5) in the shift amount n=nmin1−5 is recalculated by normal calculation (step S202).

If the result of determination is NO in step S196, recalculation (recalculation of wanted values) is not carried out (step S188), and the processing of wanted value recalculation is ended.

Furthermore, if the wanted value recalculation range extends to below the minimum value of n (−2) or above the maximum value of n (38), recalculation is not carried out.

By the wanted value recalculation processing, the correlation value f(n) by normal calculation in the shift amount range required for the shift amount nmin of the highest correlation value fmin is obtained.

Figure 50:
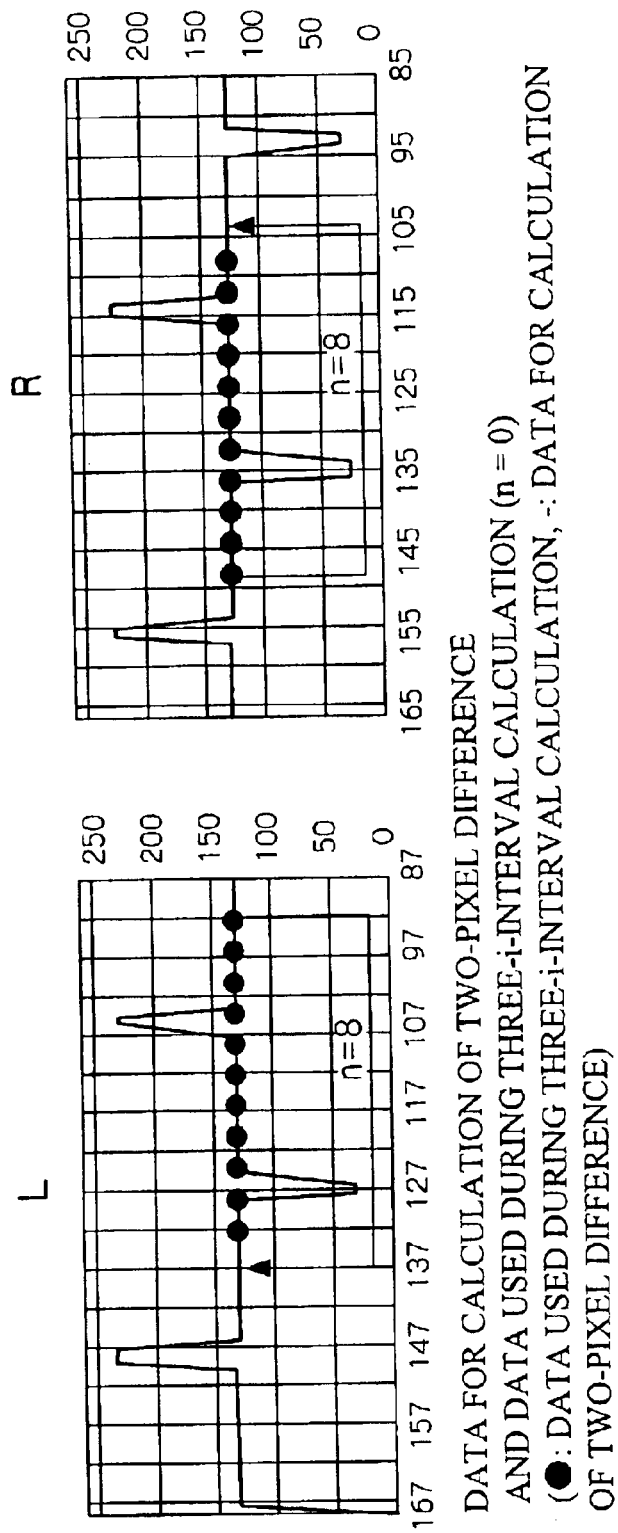
FIGS. 50(A) and 50(B) illustrate AF data for use in three-i-interval calculation at shift amount n=0, of AF data of the R sensor and the L sensor obtained by two-pixel difference calculation.

Erroneous distance measurement specific to three-i-interval calculation and prevention measures therefor will now be described. The erroneous distance measurement specific to three-i-interval calculation is particularly serious when sensor data subjected to contrast extraction processing (two-pixel difference calculation) is used as AF data as described in the section of the "AF data acquirement processing". FIGS. 50(A) and 50(B) illustrate the AF data for use in three-i-interval-calculation in the case of shift amount n=0, of AF data of the R sensor 94 and the L sensor 96 obtained by two-pixel difference calculation. In this case, since the calculation of correlation values uses data at intervals of three positions, sections having contrast cannot be captured. For the shift amounts before and after this, on the other hand, sections having contrast can be captured, and therefore there is the high possibility that the minimum value is provided at shift amount n=0. If the shift amount n is shifted by eight from this state (n=8), the sensor number of AF data for use in three-i-interval-calculation is shifted by four, and therefore all AF data that are used are identical to the AF data when n equals 0 except for endmost one. At this time, if newly added endmost AF data does not have contrast, there is the high possibility that the minimum value is also provided at shift amount n=8.

Figure 51:
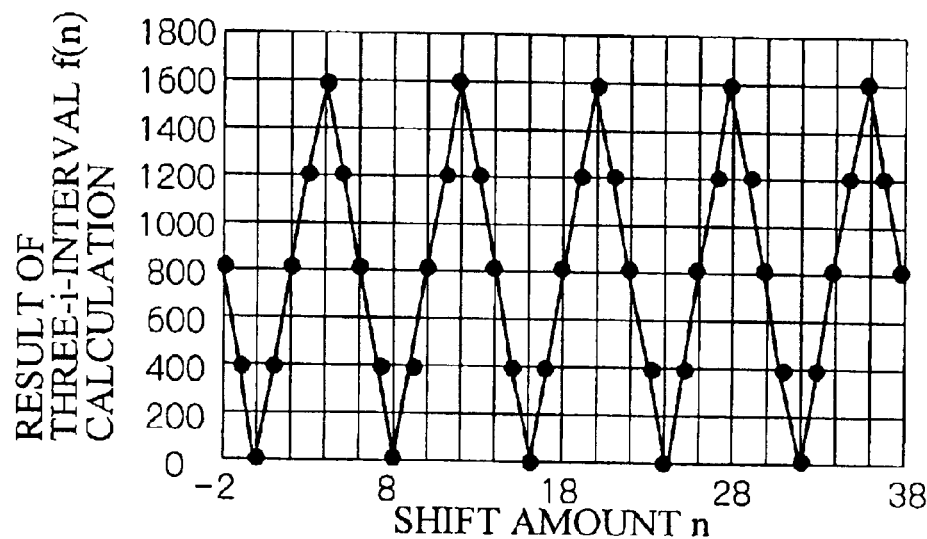
FIG. 51 shows the result of carrying out three-i-interval calculation to calculate the correlation value f(n) in the examples of AF data in FIGS. 50(A) and 50(B)
Figure 52:
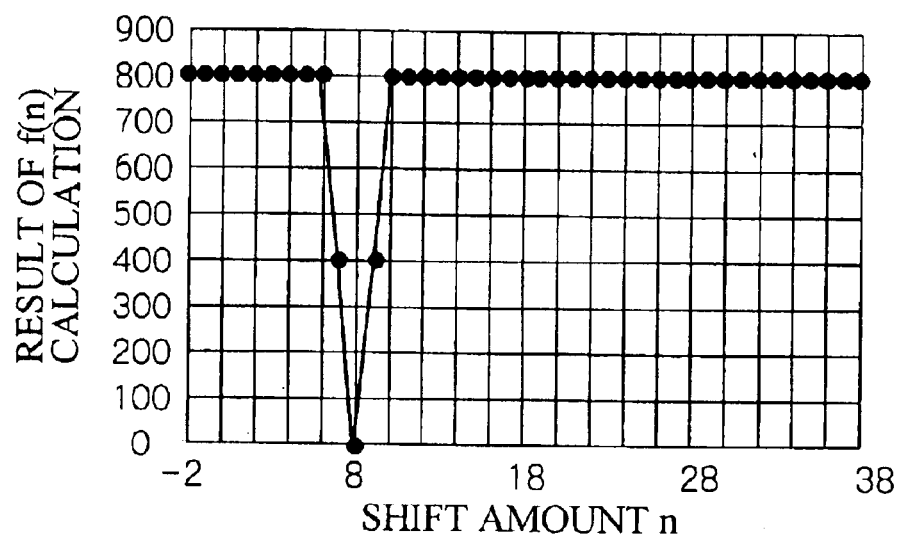
FIG. 52 shows the result of carrying out normal calculation to calculate the correlation value f(n) in the examples of AF data in FIGS. 50(A) and 50(B)

This phenomenon repeatedly appears each time the shift amount is shifted by eight. FIG. 51 shows the results of carrying out three-i-interval-calculation to calculate the correlation value f(n) in the examples of AF data of FIGS. 50(A) and 50(B), and as shown in FIG. 51, the minimum value is detected at shift amount n=0, 8, 16, . . . . Furthermore, distribution of correlation values when normal calculation is carried out in the examples of AF data of FIGS. 50(A) and 50(B) is shown in FIG. 52. In this way, since the minimum value is detected at a position independent of the real minimum value detected in normal calculation, erroneous distance measurement may be caused.

Figures 53, 54A, 54B:
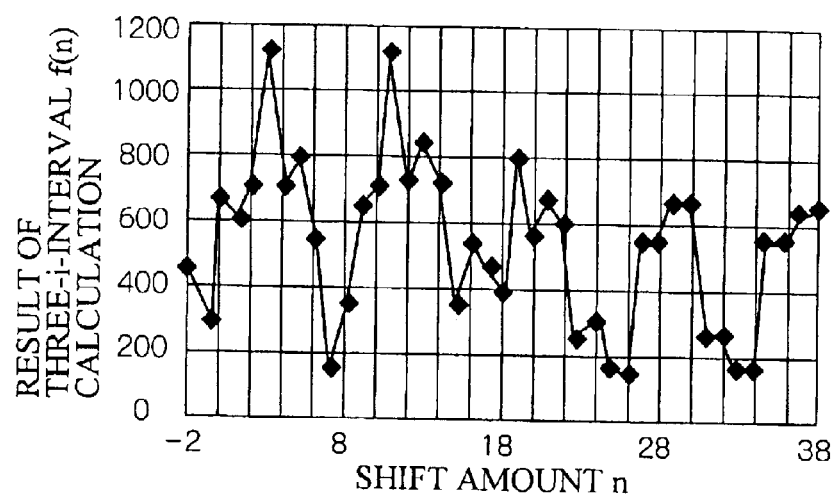
FIG. 53 shows correlation values f(n) determined in three-i-interval calculation where the aspect of sensor data as shown in FIGS. 50(A) and 50(B) is obtained by actual measurement.
FIGS. 54(A) and 54(B) are illustrative views showing examples of employed shift amounts n in three-n-interval calculation.

Also, the correlation value f(n) determined by three-i-interval-calculation when the aspect of sensor data as shown in FIGS. 50(A) and 50(B) is obtained by actual measurement is shown in FIG. 53. In this case, the temporary smallest minimum value Tfmin1 is detected at shift amount Tnmin1=33, and the temporary second minimum value Tfmin1 is detected at shift amount Tnmin2=26. In this actual measurement, there is very little possibility that no sensor data used when the correlation value of a certain shift amount n is calculated as shown in FIGS. 50(A) and 50(B), and some degree of contrast exists, and therefore the minimum value may be shifted by ±1 shift amounts and observed at intervals of 7 and 9 shift amounts instead of repeatedly appearing at intervals of 8 shift amounts.

From the above, if the difference between the temporary smallest minimum value Tfmin1 and the temporary second minimum value Tfmin2 is smaller than a predetermined adjusted value a, and the difference between the shift amount Tnmin1 of the temporary smallest minimum value and the shift amount Tnmin2 of the temporary second minimum value equals an integral multiple of 8 or an integral multiple ±1, correlation value compotation is carried out by the above-described normal calculation, not by three-i-interval calculation. That is, in the case where the following inequality and equation hold:

$$T\!f\text{min}2 - T\!f\text{min}1 < (\text{adjusted value a})$$

and $$|T\!n\text{min}1 - T\!n\text{min}2| = (\text{integral multiple of 8}) \text{ or } \{(\text{integral multiple of 8}) \pm 1\}$$

a switching is made to normal calculation, so that erroneous distance measurement specific to three-i-interval calculation can be prevented. Furthermore, if correlation values are calculated by normal calculation, not by three-i-interval calculation, one of conditions is that the difference between the shift amount Tnmin1 of the temporary smallest minimum value and the shift amount Tnmin2 of the temporary second minimum value should equal an integral multiple of 8 or an integral multiple ±1, but if this condition is generalized without being limited to the case of three-i-interval calculation, the difference between the shift amount Tnmin1 of the temporary smallest minimum value and the shift amount Tnmin2 of the temporary second minimum value should equal an integral multiple of (x+1)×2 or integral multiple of (x+1)×2±1 in the case of x-i-interval calculation in which data is used at intervals of x cell positions i with respect to a certain value x.

The second embodiment for reducing distance measurement time in processing for calculating correlation values will now be described. In the embodiment described above, the correlation value f(n) is calculated for all the shift amounts n (n=−2, −1, 0, 1, . . . , MAX(=38)) in the employed sensor, in both normal calculation and three-i-interval calculation, but in this second embodiment, the correlation value f(n) is calculated for shift amounts n at fixed intervals instead of calculating the correlation value f(n) for all the shift amounts n. For example, the shift amount n is calculated at intervals of three shift amounts. Furthermore, calculation of correlation values with the shift amount n being taken at intervals of three shift amounts is hereinafter referred to as "three-n-interval calculation", while calculation of correlation values with the correlation value f(n) being calculated for all shift amounts n is referred to as "normal calculation" in this second embodiment (different in meaning from the "normal calculation" in the first embodiment). Also, the shift amount n for which the correlation value f(n) is calculated in three-n-interval calculation is referred to as an employed shift amount.

FIG. 54(A) shows examples of employed shift amounts in three-n-interval calculation when the number of sensors in employed sensors (i.e., number of employed sensors) is 62, and the window size is 42, wherein employed shift amounts n are taken at intervals of three shift amounts starting with n=−2 and thus set at n=2, 6, 10, 14, . . . , 38. Furthermore, if referring to FIG. 12, N1 in FIG. 54(A) indicates the shift amount of the L window 96B in each employed shift amount n=−2, 2, 6, . . . with respect to the right end of the employed sensor 96A, and N2 indicates the shift amount of the R window 94B in each employed shift amount with respect to the left end of the employed sensor 94A.

Figure 55:
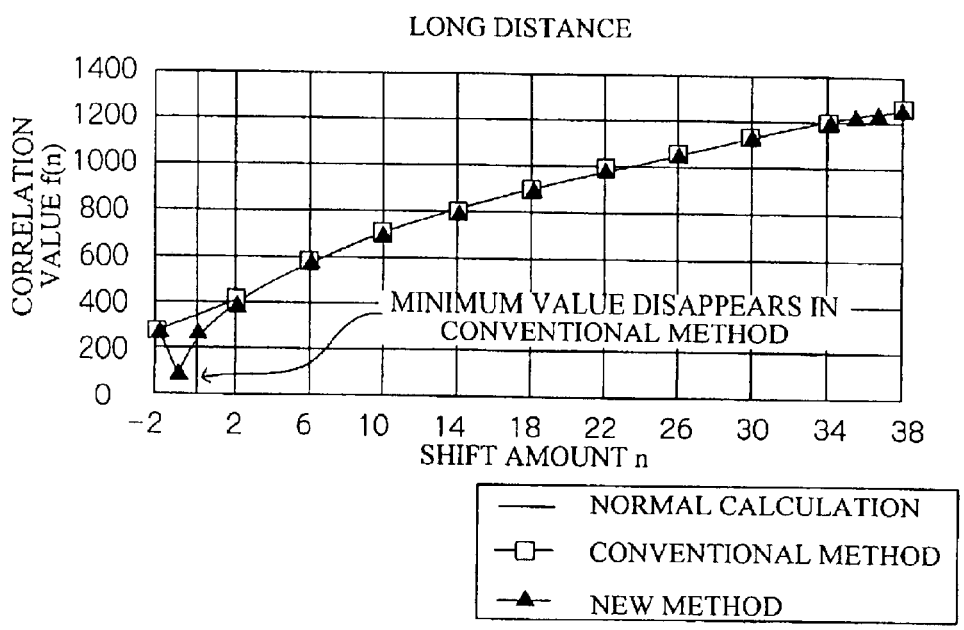
FIG. 55 is an explanatory diagram used for explanation of how to take employed shift amounts n in three-n-interval calculation.
Figure 56:
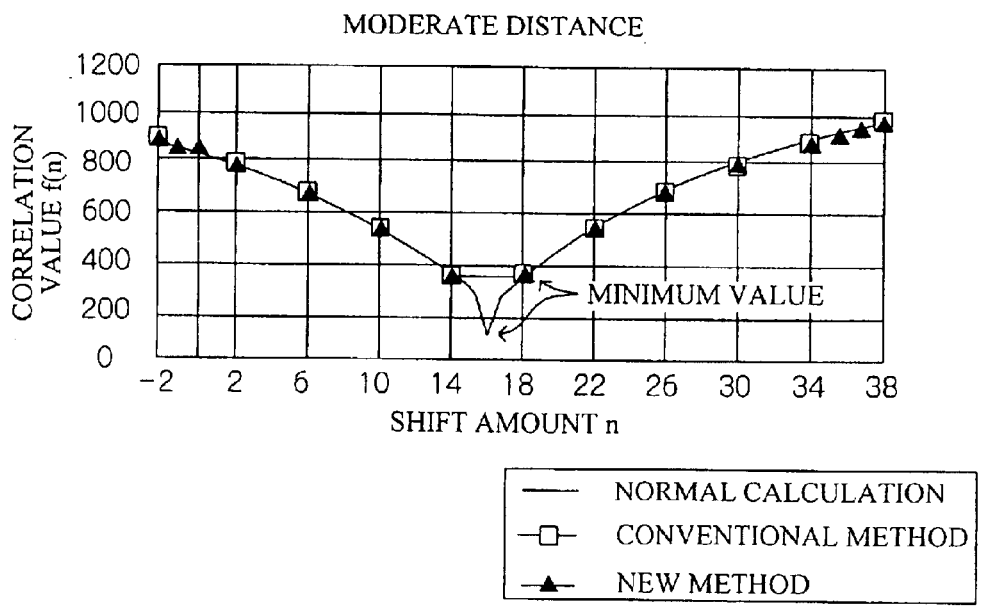
FIG. 56 is an explanatory diagram used for explanation of how to take employed shift amounts n in three-n-interval calculation.
Figures 57, 58:
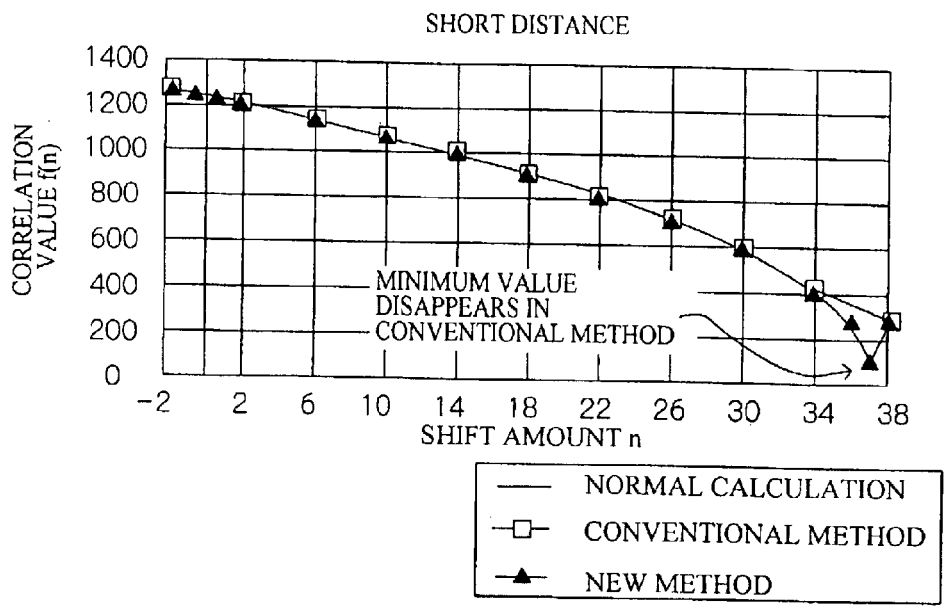
FIG. 57 is an explanatory diagram used for explanation of how to take employed shift amounts n in three-n-interval calculation.
FIG. 58 shows an example of a recalculation range in three-n-interval calculation shown in FIG. 56.

However, it is desirable that the correlation value f(n) is calculated as the employed shift amount for shift amounts n=−1, 0, 36, 37 shown in FIG. 54(B) in addition to the employed shift amounts shown in FIG. 54(A) in three-n-interval calculation as well. FIGS. 55, 56 and 57 are graphs showing the distribution of correlation values when the correlation value is calculated only with the employed shift amounts n (=2, 6, 10, 14, . . . , 38) shown in FIG. 54(A), and the distribution of correlation values when the correlation value f(n) is calculated with the employed shift amounts n (=−1, 0, 36, 37) shown in FIG. 54(B) in conjunction with the employed shift amounts shown in FIG. 54(A), assuming that the smallest minimum value fmin1 is obtained in each of long distance, moderate distance and short distance, in the case where the correlation value f(n) is determined for all the shift amounts n by normal calculation. Furthermore, the distribution of correlation values only with employed shift amounts in FIG. 54(A) is represented by the distribution of connected dots of "hollow square" symbols on FIGS. 55, 56 and 57, and the distribution of correlation values of employed shift amounts n in FIGS. 54(A) and 54(B) is represented by the distribution of connected dots of "solid triangle" symbols on FIGS. 55, 56 and 57.

First, assume that the smallest minimum value fmin1 to be primarily detected by normal calculation exists in the shift amount of long distance, and the smallest minimum value fmin1 exists in the shift amount n=−1, which is different from the employed shift amount in FIG. 54(A). In this case, if the correlation value f(n) is calculated only with the employed shift amounts in FIG. 54(A), the minimum value is not detected around the shift amount n=−1 from the distribution of correlation values calculated thereby as shown in the distribution of correlation values of connected "hollow square" symbols in FIG. 55. In contrast to this, if the correlation value f(n) is calculated in the employed shift amounts n (=−1, 0) in FIG. 54(B), the smallest minimum value is detected at shift amount=−1 as shown in the distribution of correlation values of connected "solid triangle" symbols in FIG. 55, thus eliminating the problem such that the smallest minimum value fmin1 to be primarily detected is not detected on the long distance side.

Similarly, assume that the smallest minimum value fmin1 to be primarily detected by normal calculation exists in the shift amount of short distance, and the smallest minimum value fmin1 exists in the shift amount n=−37, which is different from the employed shift amount in FIG. 54(A). In this case, if the correlation value f(n) is calculated only with the employed shift amounts in FIG. 54(A), the minimum value is not detected around the shift amount n=−37 from the distribution of correlation values calculated thereby as shown in the distribution of correlation values of connected "hollow square" symbols in FIG. 57. In contrast to this, if the correlation value f(n) is calculated in the employed shift amounts n (=36, 37) in FIG. 54(B), the smallest minimum value is detected at shift amount=−37 as shown in the distribution of correlation values of connected "solid triangle" symbols in FIG. 57, thus eliminating the problem such that the smallest minimum value fmin1 to be primarily detected is not detected on the long distance side.

On the other hand, if the smallest minimum value fmin1 to be primarily detected by normal calculation exists in the moderate distance, the problem described above hardly occurs. For example, assume that the smallest minimum value fmin1 by normal calculation exists in a shift amount n=16, which is different from the employed shift amount in FIG. 54(A) as shown by narrow lines in FIG. 56. In this case, if the correlation value f(n) is calculated only with the employed shift amounts in FIG. 54(A), the minimum value is detected at, for example, shift amount n=18 near the shift amount n=16 as shown in the distribution of correlation values of connected "hollow square" symbols in FIG. 56. Generally, if the shift amount nmin1 of the smallest minimum value fmin1 exists in the moderate distance, distribution of correlation values with the correlation value decreasing toward the shift amount n from both sides is provided, and therefore the minimum value is detected at least around the shift amount n of the smallest minimum value fmin1 even if the correlation value f(n) is calculated only with the employed amounts n in FIG. 54(A). If existence of the minimum value is known, the accurate shift amount nmin1 of the smallest minimum value fmin1 detected by normal calculation can be detected by recalculation described later, and therefore sufficiently satisfactory results can be obtained for this three-n-interval calculation processing.

From the above description, it is preferable that in three-n-interval calculation, the correlation value f(n) is calculated not only for the employed shift amounts n shown in FIG. 54(A), but also for the employed shift amounts n shown in FIG. 54(B). Calculation of the correlation value f(n) in the three-i-interval employed shift amounts n as shown in FIG. 54(A), and the particular employed amounts n on the long and short distance sides as shown in FIG. 54(B) is hereinafter referred to as three-n-interval calculation. However, the correlation values may be calculated only with the employed shift amounts n in FIG. 54(A), and if in this case, distribution of correlation values with no minimum values existing therein as shown in FIGS. 55 and 57 is obtained, recalculation described later may be carried out assuming that the minimum value exists in the king or short distance.

When calculating the correlation value f(n) in the employed amount n by three-n-interval calculation as described above, the CPU 60 detects the shift amount n providing the minimum value of the correlation value f(n) from the distribution of correlation values f(n) obtained with the employed amount n. If one minimum value is detected at this time, the minimum value is used as the temporary smallest minimum value Tfmin1, and if a plurality of minimum values are detected, the smallest minimum value is used as the temporary smallest minimum value, and then the correlation value f(n) is recalculated by normal calculation around the shift amount of the temporary smallest minimum value. Furthermore, this recalculation processing may be carried out using a method just identical to the method of recalculation in the three-i-interval calculation described above, and details about the range of recalculation, the method of processing carried out when a plurality of minimum values are detected, wanted value calculation, and the like are not described here. Also, definitions of terms are same as those used in the description of the three-i-interval calculation.

The recalculation range is a range of shift amounts of within ±5 with respect to the shift amount Tnmin1 of the temporary smallest minimum value Tfmin1, for example, and in the example of FIG. 56, the shift amount Tnmin1 providing the temporary smallest minimum value Tfmin1 is 18, and thus the recalculation range corresponds to shift amounts n=13 to 23 as shown in FIG. 58. However, the correlation value f(n) does not need to be recalculated by recalculation for the employed shift amount n for which the correlation value f(n) has already been calculated in three-n-interval calculation, and the correlation value f(n) is not calculated in recalculation for the employed shift amounts n=14, 18, 22 included in the recalculation range as shown in FIG. 58.

When calculating the correlation value f(n) in the recalculation range by the recalculation described above, the CPU 60 detects the shift amount nmin1 of the smallest minimum value fmin1 according to the correlation value f(n) in the recalculation range, and defines the shift amount nmin1 as the shift amount nmin of highest correlation to be detected in calculation of correlation values.

Here, for describing the number of calculations when three-i-interval calculation or three-n-interval calculation is employed, if the number of employed sensors is 62 and the window size is 42, for example, the number of calculations is $^{41}\!/\!_4$=10.25, and is total 21.25 when the number of recalculations is added in three-i-interval calculation. The number of calculations is 15, and is total 23 when the number of recalculations is added in three-n-interval calculation. In contrast to this, the total number of calculations in the case of normal calculation is 41, and it can thus be understood that three-i-interval calculation and three-n-interval calculation have the number of calculations sufficiently reduced and therefore makes it possible to reduce the amount of distance measurement time.

In the case where the shift amount nmin1 of the temporary smallest minimum value Tfmin1 is not consistent with the shift amount nmin1 of the smallest minimum value fmin1 in normal calculation, in three-i-interval calculation in the first embodiment described above, the number of calculations increases to compromise the effect of reducing the amount of time if the shift amount difference between these shift amounts is large. Also, in three-i-interval calculation, accuracy may drop to the extent that the minimum value does not appear because the number of data is one-quarter of that of normal calculation. This phenomenon is often found when the contrast level of AF data is low.

Then, by carrying out three-i-interval calculation if the contrast level of AF data in the employed sensor is equal to or higher than a predetermined reference value, and carrying out normal calculation if the contrast level is lower than a predetermined reference value, this phenomenon will be mostly eliminated. Also, if the contrast level is low, three-n-interval calculation in the second embodiment may be carried out.

Detailed Description of Contrast Detection Processing (Step S14 and step S18 in FIG. 7)

Contrast detection processing 1 in step S14 and contrast detection processing 2 in step S18 in FIG. 7 will now be described in detail. The contrast detection is processing for detecting existence/nonexistence of contrast of the sensor image (AF data) according to the maximum and minimum values of AF data obtained from cells in a predetermined range of the AF sensor 74 (sensor data). In this embodiment, the difference between maximum and minimum values of AF data is used to determine that contrast exists if the contrast level is equal to or higher than a predetermined reference value, and determine that contrast does not exist if the contrast level is lower than the predetermined reference value.

The contrast detection processing 1 in step S14 in FIG. 7 is processing in which contrast detection is carried out using a target range all the cells of the divided area for each area constituting the distance measurement area, namely all the cells of the employed sensor, while the contrast detection processing 2 in step S18 is processing in which contrast detection is carried out with all the cells in the window range in the shift amount nmin1 of the smallest minimum value fmin1 detected by calculation of correlation values being target areas, namely the shift amount nmin of the highest correlation value fmin, in each divided area.

Figure 59:
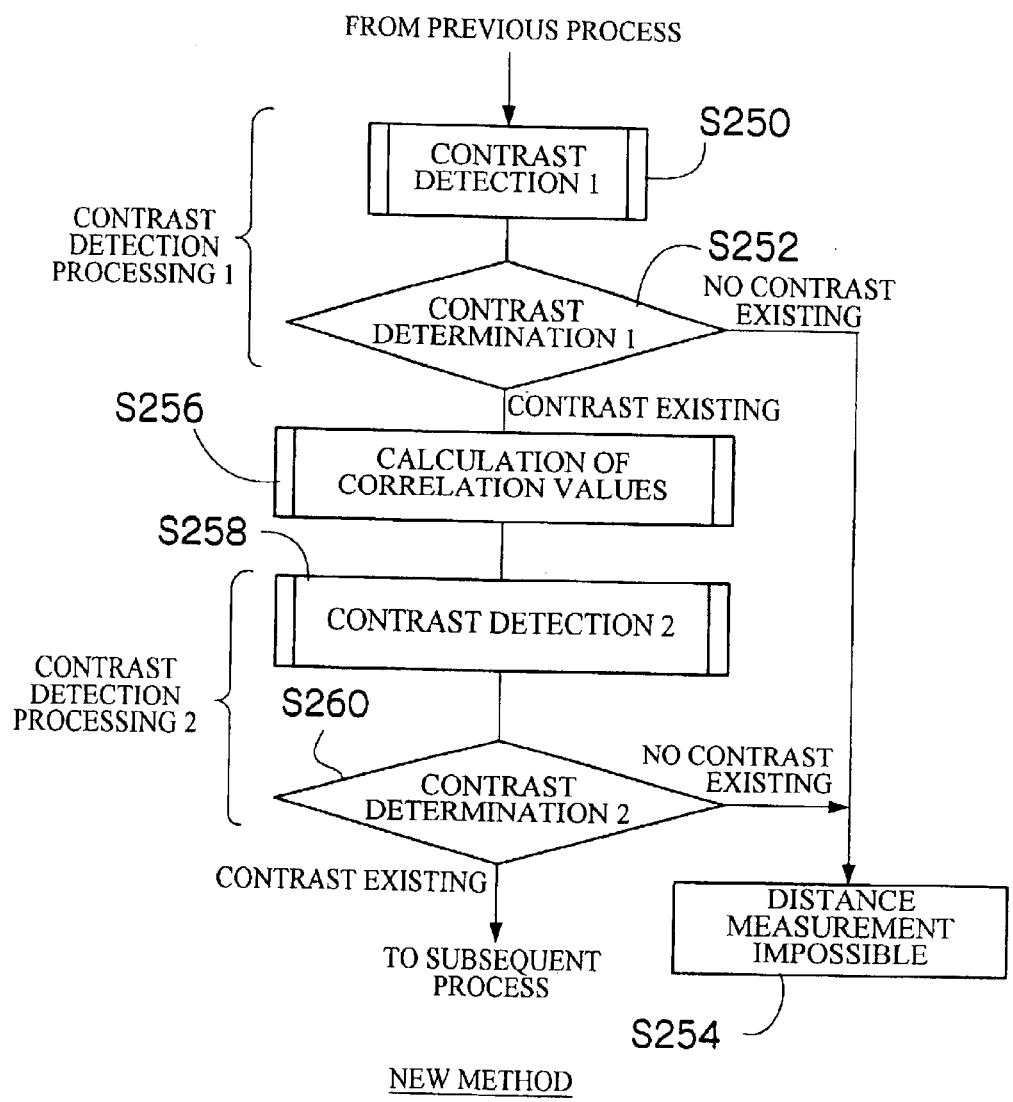
FIG. 59 is a flow chart showing the general procedure of a series of contrast detection processing with contrast detection processing 1 and contrast detection processing 2.

FIG. 59 is the flow chart showing the general procedure of a series of contrast detection processing with contrast detection processing 1 and contrast detection processing 2. When acquiring AF data by AF data acquirement processing in step S12 in FIG. 7, the CPU 60 carries out processing of contrast detection 1 with the divided area of the R sensor 94 and the L sensor 96 constituting the distance measurement area being individual target areas, as a part of contrast detection processing 1 in step S14 in FIG. 7 (step S250).

Now, attention is focused on certain corresponding divided areas of the R sensor 94 and the L sensor 96, and the divided area of the R sensor 94 and the divided area of the L sensor 96 are referred to as the employed sensor of the R sensor 94 and the employed sensor of the L sensor 96, respectively. Then, to carry out contrast detection 1 for those employed sensors, the CPU 60 detects the maximum and minimum values of AF data of all the cells of the employed sensor of the R sensor 94. The maximum value of AF data detected at this time is expressed as RMAX and the minimum value is expressed as RMIN. Similarly, the CPU 60 detects the maximum and minimum values of AF data of all the cells of the employed sensor of the L sensor 96. The maximum value of AF data detected at this time is expressed as LMAX and the minimum value is expressed as LMIN.

The CPU 60 then determines a contrast in the employed sensor of the R sensor 94 using the following formula (17), and determines a contrast in the employed sensor of the L sensor 96 using the following formula (18):

$$R\text{MAX}-R\text{MIN} \tag{17}$$

$$L\text{MAX}-L\text{MIN} \tag{18}$$

The CPU 60 then carries out contrast determination 1 with the contrasts detected by the contrast detection 1 in step S250, as a part of contrast detection processing 1 in step S14 in FIG. 7 (step S252). That is, the CPU 60 determines whether or not the contrast (RMAX−RMIN) in the formula (17) in the employed sensor of the R sensor 94, and the contrast (LMAX−LMIN) in the formula (18) in the employed sensor of the L sensor 96 satisfy the flowing inequalities (19) and (20) with respect to a predetermined reference value R4:

$$R\text{MAX}-R\text{MIN}<R4 \tag{19}$$

$$L\text{MAX}-L\text{MIN}<R4 \tag{20}$$

If at least one of the inequalities (19) and (20) is satisfied, it is determined that contrast does not exist and thus distance measurement in those employed sensors (focuses divided areas) is impossible (step S254). If neither the inequality (19) nor (20) is satisfied, it is determined that contrast exists in those employed sensors.

The CPU 60 then carries out the processing for calculating correlation values in step S16 in FIG. 7 for the divided area for which it is determined that contrast exists in step S252 (step S256).

The CPU 60 then carries out contrast detection 2 with the R window 94B and the L window 96B in the shift amount nmin of highest correlation detected by calculation of correlation values being target areas, as a part of the contrast detection processing 2 in step S18 in FIG. 7 (step S258). Now, attention is focused on certain corresponding divided areas of the R sensor 94 and the L sensor 96, and the divided area of the R sensor 94 and the divided area of the L sensor 96 are referred to as the employed sensor of the R sensor 94 and the employed sensor of the L sensor 96, respectively. Then, to carry out contrast detection 2 for those employed sensors, the CPU 60 detects the maximum and minimum values of AF data in the range of the R window 94B for which the shift amount nmin of highest correlation is obtained in the employed sensor of the R sensor 94. The maximum value detected at this time is expressed as RWMAX, and the minimum value is expressed as RWMIN. Similarly, the CPU 60 detects the maximum and minimum values of AF data in the range of the L window 96B for which the shift amount nmin of highest correlation is obtained in the employed sensor of the L sensor 96. The maximum value detected at this time is expressed as LWMAX, and the minimum value is expressed as LWMIN. The CPU 60 then determines a contrast in the R window 94B using the following formula (21), and determines a contrast in the L window 96B using the following formula (22):

$$RWMAX - RWMIN \qquad (21)$$

$$LWMAX - LWMIN \qquad (22)$$

The CPU 60 subsequently carries out contrast determination 2 with the contrasts with the contrasts determined using the formulae (21) and (22), as a part of the contrast detection processing 2 in step S18 in FIG. 7 (step S260). That is, the CPU 60 determines whether or not the contrast (RWMAX−RWMIN) in the formula (21) in the R window 94B, and the contrast (LWMAX−LWMIN) in the formula (22) in the L window 96B satisfy the flowing inequalities (23) and (24) with respect to a predetermined reference value R4:

$$RWMAX - RWMIN < R4 \qquad (23)$$

$$LWMAX - LWMIN < R4 \qquad (24)$$

If at least one of the inequalities (23) and (24) is satisfied, it is determined that contrast does not exist and thus distance measurement in those employed sensors (focuses divided areas) is impossible (step S254). If neither the inequality (23) nor (24) is satisfied, it is determined that contrast exists in those windows.

Figure 60A:
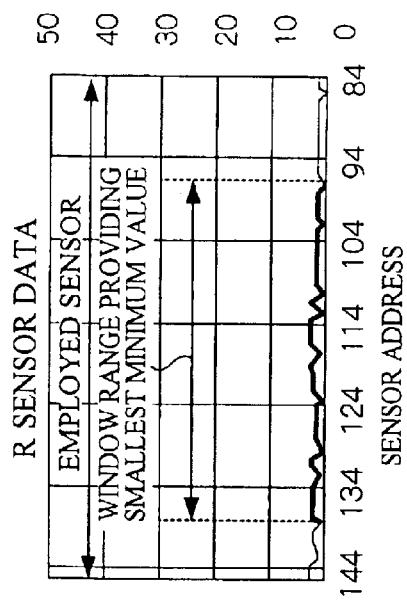
FIGS. 60(A), 60(B) and 60(C) show examples of AF data and distribution of correlation values where it is determined that distance measurement is impossible by contrast detection processing.
Figure 60B:
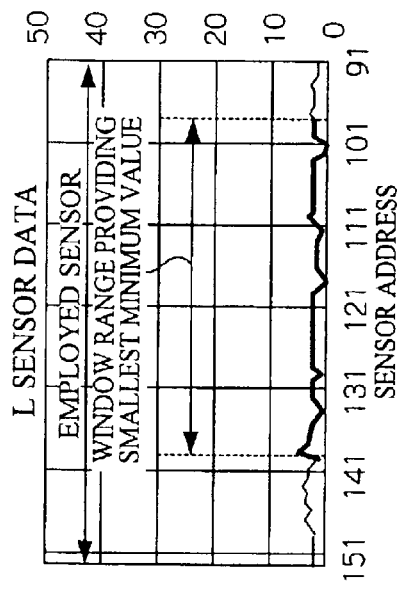
Figure 60C:
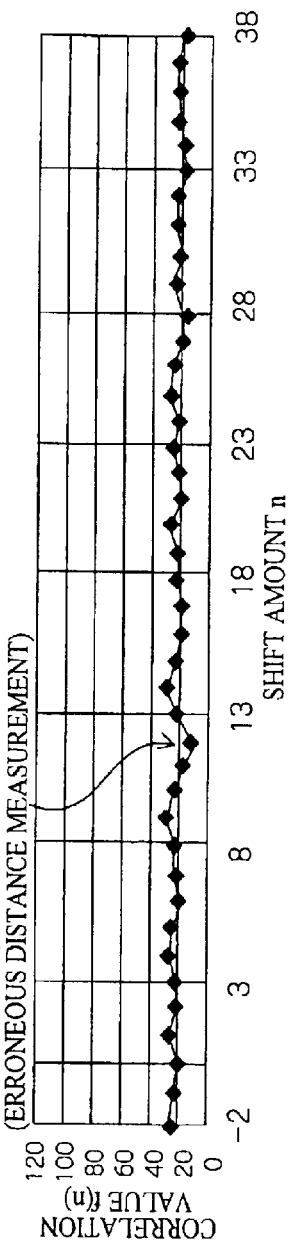

A specific example where it is determined that distance measurement is impossible by the above-described contrast detection processing 1 and contrast detection processing 2 will be described. For example, if attention is focused on as employed sensors the middle areas of the R sensor 94 and the L sensor 96, AF data in the range of all cells of those employed sensors have low contrast as shown in FIGS. 60(A) and 60(B). In this case, when the correlation value f(n) is calculated by calculation of correlation values, the shift amount nmin1 of the smallest minimum value fmin1, namely the shift amount nmin of highest correlation value fmin is detected at shift amount=12. In this case, AF data in the window range in the shift amount nmin (window range providing the highest correlation value) has also low contrast in the employed sensor of the R sensor 94 and the employed sensor of the L sensor 96 as shown in FIGS. 60(A) and 60(B), and there is the high possibility of erroneous distance measurement if the shift amount n=12 is the shift amount nmin of highest correlation as shown in FIG. 60(C).

In this way, if AF data has low contrast in the range of all cells of employed sensor, processing for calculating correlation values is not actually carried out for this sensor, and it is determined that distance measurement is impossible in contrast determination 1 in contrast detection processing 1 (step S252 in FIG. 59). Thus, since calculation of correlation values is not carried out for the employed sensor having AF data with distance measurement being apparently impossible, the amount of distance measurement time is reduced.

Figure 61A:
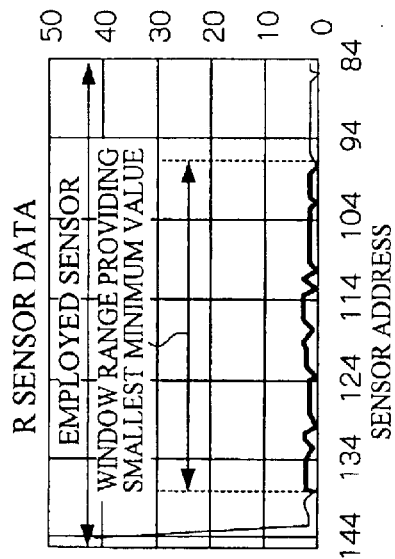
FIGS. 61(A), 61(B) and 61(C) show examples of AF data and distribution of correlation values where it is determined that distance measurement is impossible by contrast detection processing.
Figure 61B:
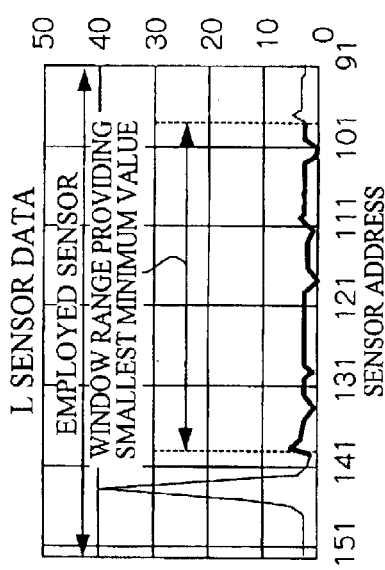
Figure 61C:
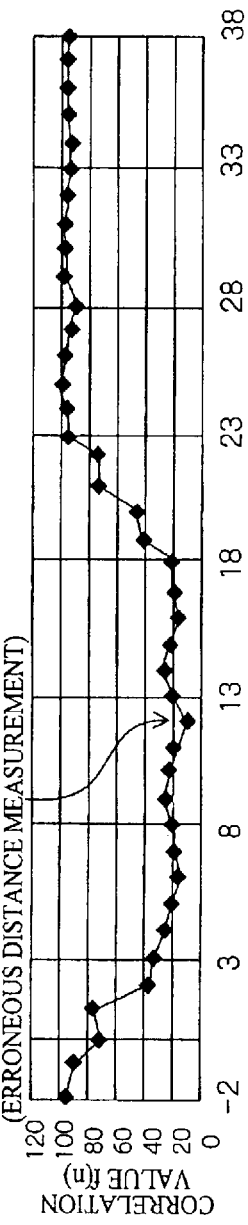

On the other hand, AF data has high contrast in the range of all cells of the employed sensors of the R sensor 94 and the L sensor 96 as shown in FIGS. 61(A) and 61(B). In this case, if the correlation value f(n) is calculated by calculation of correlation values, the shift amount nmin of the highest correlation value fmin is detected at shift amount n=12 as shown in FIG. 61(C). In this case, however, AF data in the window range providing the highest correlation value has low contrast in the employed sensor of the R sensor 94 and the employed sensor of the L sensor 96, and there is the high possibility of erroneous distance measurement if the shift amount n=12 is the shift amount nmin of highest correlation.

In this way, even if it is determined that contrast exists in contrast detection processing 1 with all cells of the employed sensor being the target range, it is determined that distance measurement is impossible in contrast determination 2 in contrast detection processing 2 (step S260 in FIG. 59) in the case where AF data has low contrast in the window range in the shift amount nmin of highest correlation detected by calculation of correlation values. Thus, even if it is determined that distance measurement is possible in contrast detection processing 1, it is appropriately determined that distance measurement is impossible in contrast detection processing 2 in the case where there is the high possibility of erroneous distance measurement such as the case of FIGS. 61(A), 61(B) and 61(C).

In the contrast detection processing described above, contrast detection processing 2 is carried out for the window range providing the shift amount nmin of highest correlation (steps S258 and S260 in FIG. 59) after processing for calculating correlation values is carried out (step S256 in FIG. 59), but processing similar to the contrast detection processing 2 may be carried out before processing for calculating correlation values is carried out instead of carrying out contrast detection processing 2 after processing for calculating correlation values is carried out. For example, assume that it is determined that contrast exists in contrast detection processing 1 with AF data of all cells of a certain divided area as a target. In this case, existence/nonexistence of contrast is then detected for each window range with the window range in all shift amounts n of the divided area being targets. As a result, calculation of correlation values is not carried out for the shift amount n in the window range for which it has been determined that there exists no contrast, and calculation of correlation values is carried out to calculate the correlation value f(n) only for the shift amount n in the window range for which it has been determined that there exists contrast. Then, the shift amount nmin of the highest correlation value fmin is detected in the range of shift amounts n for which the correlation value f(n) has been calculated. In this case, the number of calculations in the calculation of correlation values can be reduced, thus making it possible to reduce the amount of distance measurement time. Furthermore, it is not necessary to carry out contrast detection processing in this case. Also, if it is determined that no contrast exists in the window range in all shift amounts n, calculation of correlation values is not carried out at all, and it is determined that distance measurement is impossible.

In addition, if there is at least one part of window having contrast, calculation of correlation values may be carried out for all the window range.

Detailed Description of Processing for Correcting a Difference Between L and R Channels (Step S20 in FIG. 7)

Processing for correcting a difference between L and R channels in step S20 in FIG. 7 will now be described. The processing for correcting a difference between L and R channels is processing in which the signal amount of AF data acquired from the R sensor 94 of the AF sensor 74 is matched with the signal amount of AF data acquired from the L sensor 96 of the AF sensor 74. This processing is carried out for AF data near the range (±5n) of the R window 94B and the L window 96B for which the highest correlation value is obtained in the divided area for which it has been determined that there exists contrast in the contrast determination 2 of the above-described contrast detection processing 2 (see FIG. 59).

Figure 62:
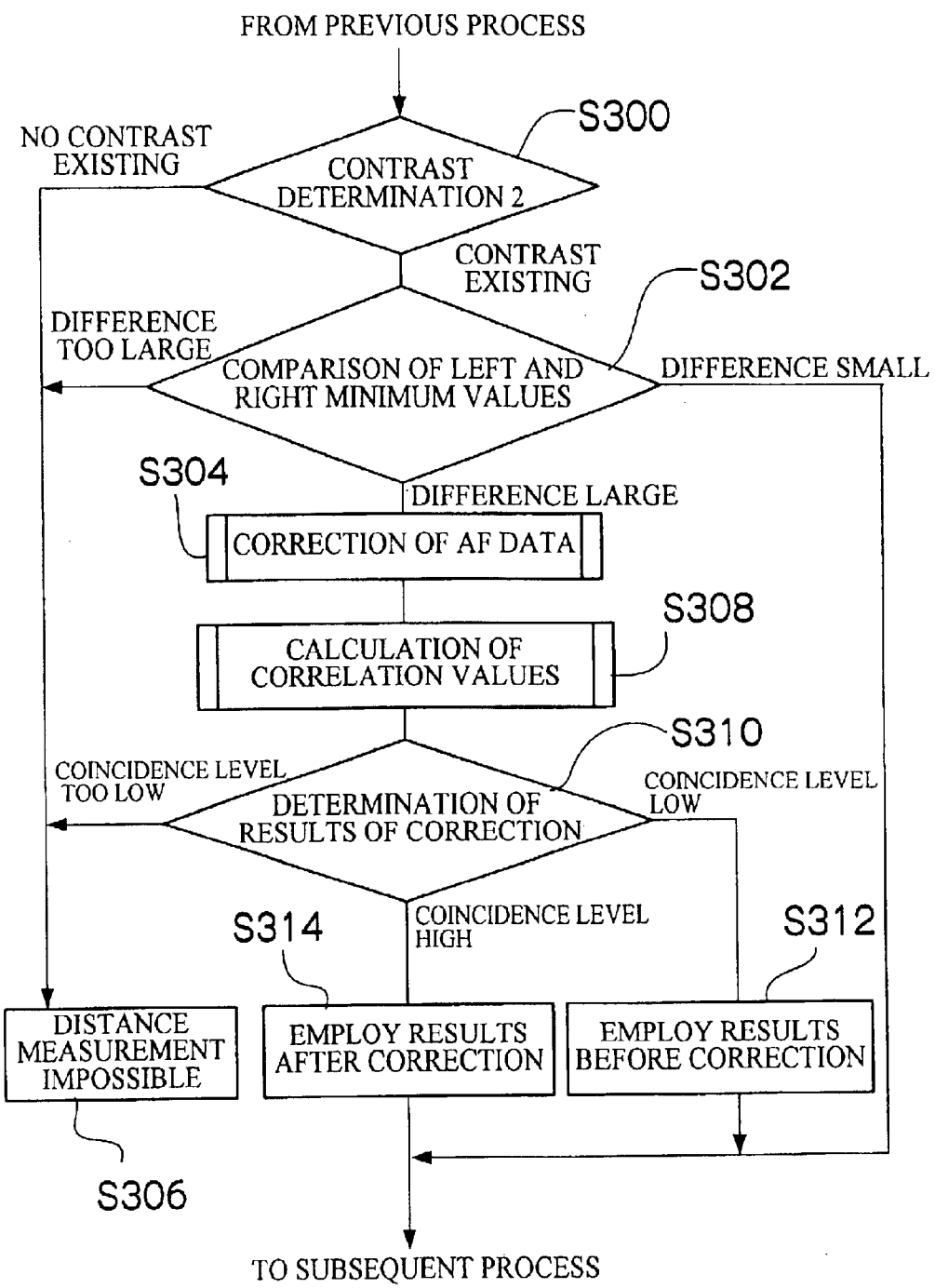
FIG. 62 is a flow chart showing the procedure of processing for correcting a difference between L and R channels in the CPU.

First, the procedure of processing for correcting a difference between L and R channels in the CPU 60 will be described in conjunction with the flow chart of FIG. 62. The processing of contrast determination 2 shown in step S300 in FIG. 62 is equivalent to the contrast determination 2 in step S260 in FIG. 59, and in this determination processing, it is determined that distance measurement is impossible for the divided area for which it has been determined that no contrast exists, and processing proceeds to the processing for correcting a difference between L and R channels described below for the divided area for which it has been determined that contrast exists. For describing this processing below with attention being focused as an employed sensor on a certain divided area for which it has been determined that contras exists, the CPU 60 detects the minimum values of AF data in the range of the R window 94B and the L window 96B providing highest correlation values in the employed sensors, respectively, and compare these minimum values to determine whether the absolute of the difference between these minimum values (difference ΔADMIN between left and right minimum values) is large or small, or too large (step S302), in order to determine whether correction is necessary or not. Alternatively, before or after this determination (between steps S300 and S302, or between steps S302 and S304), whether the highest correlation value in the employed sensor is equal to or larger than a predetermined reference value or not is determined, and it is determined that proper correction is required only if the highest correlation value is equal to or larger than the reference value, and proper correction is not carried out if the highest correlation value is smaller than the reference value. Here, provided that the minimum value of AF data in the R window 94B providing the highest correlation value is RWMIN and the minimum value of AF data in the L window 96B is LWMIN, the difference ΔDMIN between left and right minimum values is calculated from the following equation (25):

$$\Delta DMIN = |LWMIN - RWMIN| \qquad (25)$$

Then, it is determined that the difference ΔADMIN between left and right minimum values is small if the following inequality (26) is satisfied, and it is determined that the difference ΔADMIN between left and right minimum values is large if the following inequality (27) is satisfied, with respect to predetermined reference values R5 and R6 (R5<R6):

$$\Delta DMIN < R5 \qquad (26)$$

$$R6 \geq \Delta DMIN \geq R5 \qquad (27)$$

It is determined that the difference ΔDMIN between left and right minimum values is too large if the following inequality (28) is satisfied.

$$\Delta DMIN > R6 \qquad (28)$$

If it is determined that the difference ΔDMIN between left and right minimum values is small in the above-described determination processing, processing proceeds to next processing without carrying out proper correction, and if it is determined that the difference ΔDMIN between left and right minimum values is large (correction is necessary), processing is proceeds to processing of subsequent step S304 to carry out proper correction. If it is determined that the difference ΔDMIN between left and right minimum values is too large, it is determined that distance measurement is impossible (step S306).

If it is determined that the difference ΔDMIN between left and right minimum values is large, the CPU 60 then corrects AF data in the correction ranges in the employed sensors of the R sensor 94 and the L sensor 96 (step S304). AF data is corrected in such a manner that, for example, a difference between the minimum value of AF data in the employed sensor of the R sensor 94 and the minimum value of AF data in the employed sensor of the L sensor 96 is determined, and the signal amount of one sensor is regulated with respect to that of the other sensor so that the difference is reduced. Details about correction of AF data will be described later. Also, the correction range of AF data is a range of AF data required when the correlation value f(n) in the range of predetermined shift amounts is calculated in calculation of correlation values according to corrected AF data in the processing in subsequent step S308.

When AF data is corrected, the corrected AF data is used to carry out calculation of correlation values (calculation of correlation values after correction) to determine the correction value f(n)' (step S308). Calculation of correlation values after correction of AF data may be carried out for all shift amounts n, but in this embodiment, calculation of correlation values is carried out for the range around the shift amount nmin providing the highest correlation value in the calculation of correlation values before correction of AF data, for example, the range of within ±5 with respect to the shift amount nmin.

The CPU 60 then detects a smallest minimum value fmin' and its shift amount nmin' in the range of shift amounts the correlation value f(n)' has been determined by calculation of correlation values after correction of AF data, according to the correlation value f(n)' obtained by calculation of correlation values after correction of AF data. The CPU 60 then determines whether the coincidence level is low or high, or the coincidence level is too low for AF data of the R sensor 94 and AF data of L sensor 96 after correction, according to the smallest minimum value fmin' (step S310). For example, it is determined that the coincidence level is too low if the smallest minimum value fmin' after correction of AF data satisfies the following inequality (29) with respect to a predetermined reference value R7:

$$fmin' > (\text{reference value } R7) \qquad (29)$$

On the other hand, it is determined that the coincidence level is low if the inequality (29) is not satisfied, and the smallest minimum value fmin' after correction of AF data and the highest correction value fmin before the correction satisfy the following inequality (30):

$$fmin \geq fmin' \qquad (30)$$

It is determined that the coincidence level is high if the inequality (30) is not satisfied, but the following inequality (31) is satisfied:

$$fmin > fmin' \qquad (31)$$

If it is determined that the coincidence level is too low in this determination processing, it is determined that distance measurement is impossible for this employed sensor (step S306). If it is determined that the coincidence level is low, the result of calculation of correlation values before correction of AF data is employed rather than the result of calculation of correlation values after correction of AF data in subsequent processing (step S312). On the other hand, if it is determined that the coincidence level is high, the result of calculation of correlation values after correction of AF data is employed (step S314). In the case where the result of calculation of correlation values after correction of AF data, the terms of correlation value f(n), smallest minimum correlation value fmin and its shift amount nmin used for description of subsequent processing refer to the correlation value f(n)', the smallest minimum value fmin' and its shift amount nnmin' after correction of AF data.

Figure 63:
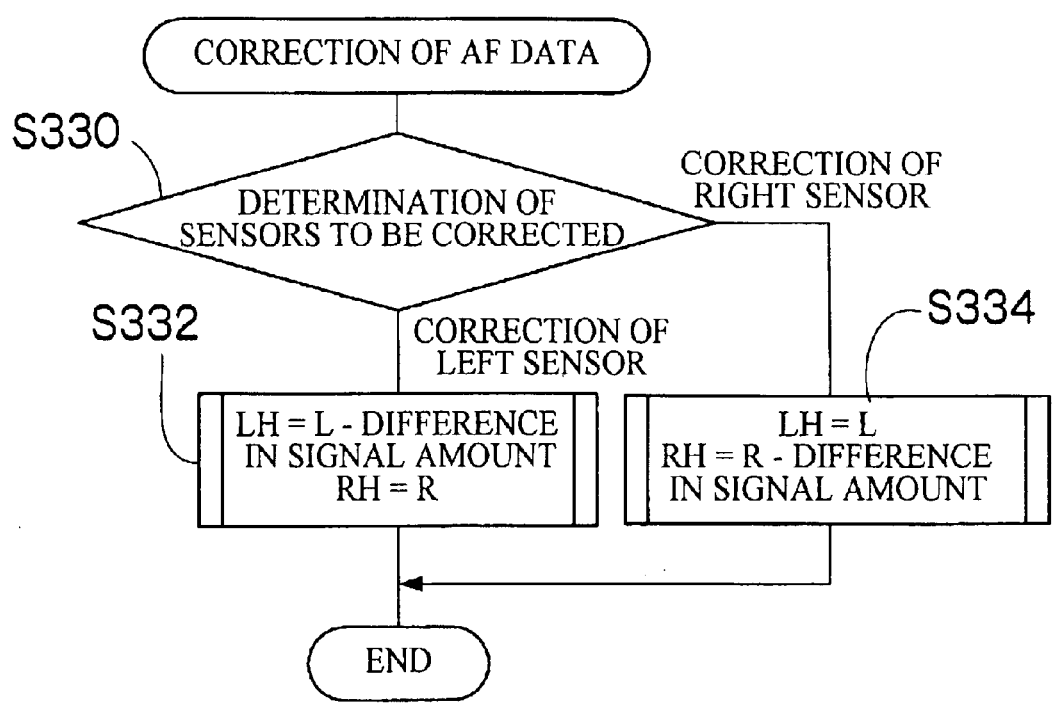
FIG. 63 is a flow chart showing the processing procedure where a difference in signal amount between AF data of the R sensor and AF data of the L sensor is corrected to accomplish correction of AF data.

One example will now be described for correction of AF data in the above-described step S304. FIG. 63 is a flow chart showing the processing procedure where a difference in signal amount between the AF data of the R sensor 94 and the AF data of the L sensor 96 is corrected to accomplish correction of AF data. First, the CPU 60 determines the sensor for correcting AF data (correction sensor), of the R sensor 94 and the L sensor 96 (step S330).

Specifically, the minimum value RMIN of AF data in the R window providing the highest correlation value is compared with the minimum value LMIN in the L window providing the highest correlation value, and the R sensor 94 is considered as the correlation sensor if RMIN>LMIN holds, and the L sensor 96 is considered as the correlation sensor if the RMIN<LMIN holds.

In the case where the L sensor 96 is the correction sensor, AF data is calculated using the following equations provided that uncorrected AF data of the R sensor 94 and the L sensor 96 are R and L, respectively, and corrected AF data are RH and LH, respectively (step S332).

$$LH=L-(\text{difference in signal amount})$$

$$RH=R$$

Here, the difference in signal amount equals (LMIN−RMIN).

On the other hand, in the case where the R sensor 94 is the correction sensor, the AF data is calculated using the following equations (step S334).

$$LH=L$$

$$RH=R-(\text{difference in signal amount})$$

Here, the difference in signal amount equals (RMIN−LMIN).

Figure 64A:
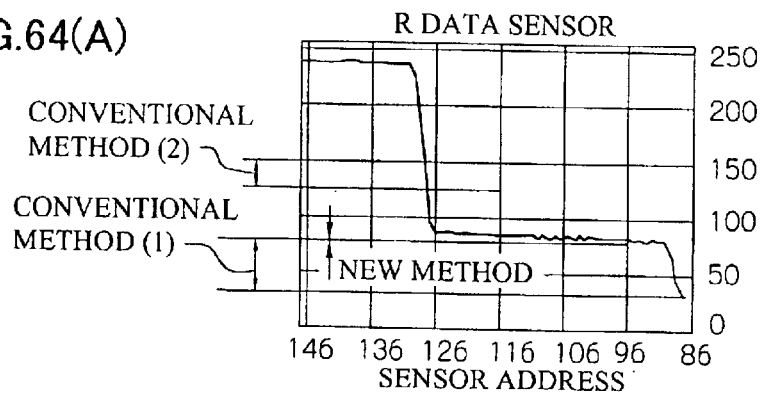
FIGS. 64(A), 64(B) and 64(C) are explanatory diagrams used for explanation of the effect of processing for correcting a difference between L and R channels.
Figure 64B:
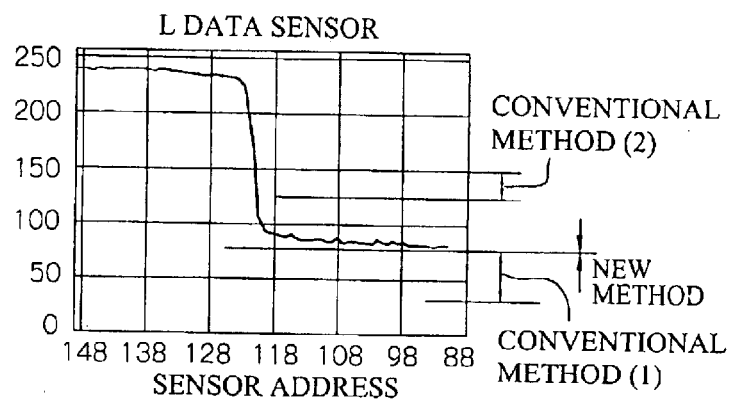
Figure 64C:
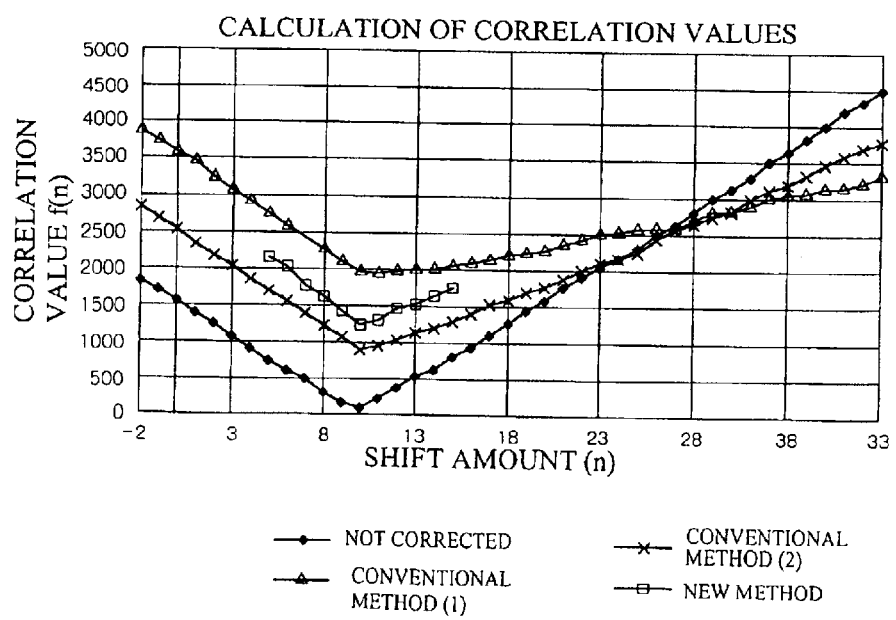

Effects of the above-described processing for correcting a difference between L and R channels will be described. FIGS. 64(A), 64(B) and 64(C) show a comparison between the effect of the processing for correcting a difference between L and R channels shown in FIG. 62, which is considered as new method, and the effect of the conventional method. The new method is different from the conventional method particularly in the content of processing for determining whether correction is performed or not in step S302 in FIG. 62, and a first example of conventional method (this method is referred to as conventional method (1)) is a method in which instead of comparing the minimum values of AF data in the ranges of the R window 94B and the L window 96B providing the highest correlation value as the new method, the minimum value RMIN for all AF data in the employed sensor of the R sensor 94 is compared with the minimum value LMIN for all AF data in the employed sensor of the L sensor 96, and AF data is corrected if the difference between these minimum values is larger than a predetermined value.

A second example of conventional method (this method is referred to as conventional method (2)) is a method in which the average values of AF data in the respective employed sensors of the R sensor 94 and the L sensor 96 are determined, and AF data is corrected if the difference between these average values is larger than a predetermined value. In this method, the AF data of one sensor is corrected so that these average values are closer to each other.

For example, assume that AF data as shown in FIGS. 64(A) and 64(B) are obtained in the employed sensors (e.g., middle areas) of the R sensor 94 and the L sensor 96. This example of AF data shows the case where correction is essentially unnecessary. Then, assume that as a result of carrying out calculation of correlation values for AF data in these employed sensors, the distribution of correlation values before correction of AF data (not corrected) shows the distribution of connected "solid diamond" symbols in FIG. 64(C). Furthermore, in this distribution of correlation values of no correction, the shift amount nmin of highest correlation is detected at shift amount n=10, and the ranges of the R window 94B and the L window 96B at that time correspond to the ranges of distributions of AF data indicated by wide lines in FIGS. 64(A) and 64(B), respectively.

In this case, if whether AF data is corrected or not is determined using the conventional method (1), AF data is consequently corrected (the above-described difference in signal amount is corrected) because there is a difference (difference indicated by "conventional method (1)" in FIG. 64(A)) between the minimum values of AF data in the employed sensors of the R sensor 94 and the L sensor 96 as apparent from the comparison in FIGS. 64(A) and 64(B), and when correlation values are calculated according to the corrected AF data, the distribution of correlation values shows the distribution of connected "hollow triangle" symbols in FIG. 64(C). For the distribution of correlation values obtained after correction of AF data, it is determined that the level of coincidence of signal amount between AF data of the R sensor 94 and AF data of L sensor 96 is low because the smallest minimum value is large, and it is consequently determined that distance measurement is impossible. Furthermore, in the conventional method, calculation of correlation values is not carried out before correction of AF data unlike the new method, and therefore measures such that the result of calculation of correlation values before correction of AF data is not take unlike the new method if it is determined the coincidence level is low. In this way, the conventional method (1) may cause problems such that it is determined that distance measurement is impossible as a result of carrying out correction despite the fact that AF data for which it should not be determined that distance measurement is impossible is obtained.

Also, if whether AF data is corrected or not is determined using the conventional method (2), AF data is consequently corrected (the above-described difference in signal amount is corrected) because there is a difference (difference indicated by "conventional method (2)" in the comparison in FIGS. 64(A) and 64(B)) between the average values of AF data in the employed sensors of the R sensor 94 and the L sensor 96, and when calculation of correlation values is carried out according to the corrected AF data, the distribution of correlation values shows the distribution of correlation values of connected "x" symbols in FIG. 64(C). For the distribution of correlation values obtained after correction of AF data, it is determined that the level of coincidence of signal amount between AF data of the R sensor 94 and AF data of L sensor 96 is low because the smallest minimum value is large as in the case of conventional method (1), and it is consequently determined that distance measurement is impossible. In this way, the conventional method (2) may also cause problems such that it is determined that distance measurement is impossible as a result of carrying out correction despite the fact that AF data for which it should not be determined that distance measurement is impossible is obtained.

If whether AF data is corrected or not using the new method for the conventional methods (1) and (2) described above, correction of AF data is not carried out because there is no difference between the minimum values of AF data in the ranges of the R window 94B and the L window 96B providing the highest correlation value in the employed sensors, and thus it is not necessary to carry out redundant calculation of correlation values. Therefore, problems such as those associated with the conventional methods (1) and (2) are not caused. If correction is carried out, the distribution of correlation values shows the distribution of connected "hollow square" symbols in FIG. 64(C), and it is determined that the coincidence level is low as in the case of conventional methods (1) and (2). For the new method, however, even in this case, it is determined that the result of calculation of correlation values before correction of AF data is employed instead of determining that distance measurement is impossible, and therefore in the case where uncorrected AF data makes distance measurement possible without being corrected, problems such that it is determined distance measurement is impossible even if it is not inappropriate to correct AF data can be prevented.

The case will now be described where in the correction of AF data in step S304, other correction methods are employed in place of the correction of a difference in signal amount shown in the flow chart of FIG. 63. Correction of AF data described here is to correct not only a difference in signal amount of AF data in the employed sensors of the R sensor 94 and the L sensor 96, but also a contrast ratio. The correction is carried out for the AF data of the sensor not exceeding the dynamic range, of AF data of the R sensor 94 and AF data of the L sensor 96. Correction processing will be described specifically below.

First, the contrast correction amount and offset correction amount for use in correction formulae of AF data will be described. Furthermore, the offset correction amount is equivalent to a correction amount for correcting the difference in signal amount. Here, the contrast correction amount is designated by DLVCOMPA, the offset correction amount is designated by DLVCOMPB, and the maximum and minimum values of AF data in the employed sensor of the R sensor 94 are designated by R1MAX and R1MIN, respectively, and the maximum and minimum values of AF data in the employed sensor of the L sensor 96 are designated by L1MAX and L1MIN, respectively, and the minimum values of AF data in the R window 94B and the L window 96B providing the highest correlation are designated by R2MIN and L2MIN, respectively.

The formula for determining the contrast correction amount DLVCOMPA and the offset correction amount DLVCOMPB is varied depending on which is larger the minimum value R2MIN of AF data in the R window 94B or the minimum value L2MIN of AF data in the L window 96B. If the following inequality (32) is satisfied, the contrast correction amount DLVCOMPA and the offset correction amount DLVCOMPB can be determined using the following equations (33) and (34):

$$L2MIN \leq R2MIN \tag{32}$$

$$DLVCOMPA = (R1MAX - R1MIN)/(L1MAX - L1MIN) \tag{33}$$

$$DLVCOMPB = R1MIN - \{(R1MAX - R1MIN)/(L1MAX - L1MIN)\} \times L1MAX \tag{34}$$

On the other hand, if the following inequality (35) is satisfied, the contrast correction amount DLVCOMPA and the offset correction amount DLVCOMPB can be determined using the following equations (36) and (37):

$$L2MIN > R2MIN \tag{35}$$

$$DLVCOMPA = (L1MAX - L1MIN)/(R1MAX - R1MIN) \tag{36}$$

$$DLVCOMPB = L1MIN - \{(L1MAX - L1MIN)/(R1MAX - R1MIN)\} \times R1MAX \tag{37}$$

Now that the contrast correction amount DLVCOMPA and the offset correction amount DLVCOMPB are determined using the above-described formulae, calculation processing for correcting AF data in the correction range in the employed sensor according to the contrast correction amount DLVCOMPA and the offset correction amount DLVCOMPB. Here, the pre-correct AF data of the R sensor 94 and the L sensor 96 are designated by R and L, respectively, and the corrected AF data of the R sensor 94 and the L sensor 96 are designated by RH and LH.

If the following inequality (38) is satisfied, the corrected AF data RH and LH are calculated from the following equations (39) and (40), using the contrast correction amount DLVCOMPA and the offset correction amount DLVCOMPB determined using the equations (33) and (34):

$$L2MIN \leq R2MIN \tag{38}$$

$$LH = DLVCOMPA \times L + DLVCOMPB \tag{39}$$

$$RH = R \tag{40}$$

On the other hand, if the following inequality (41) is satisfied, the corrected AF data RH and LH are calculated from the following equations (42) and (43), using the contrast correction amount DLVCOMPA and the offset correction amount DLVCOMPB determined using the equations (36) and (37):

$$L2MIN > R2MIN \tag{41}$$

$$LH = L \tag{42}$$

$$RH = DLVCOMPA \times R + DLVCOMPB \tag{43}$$

Figure 65:
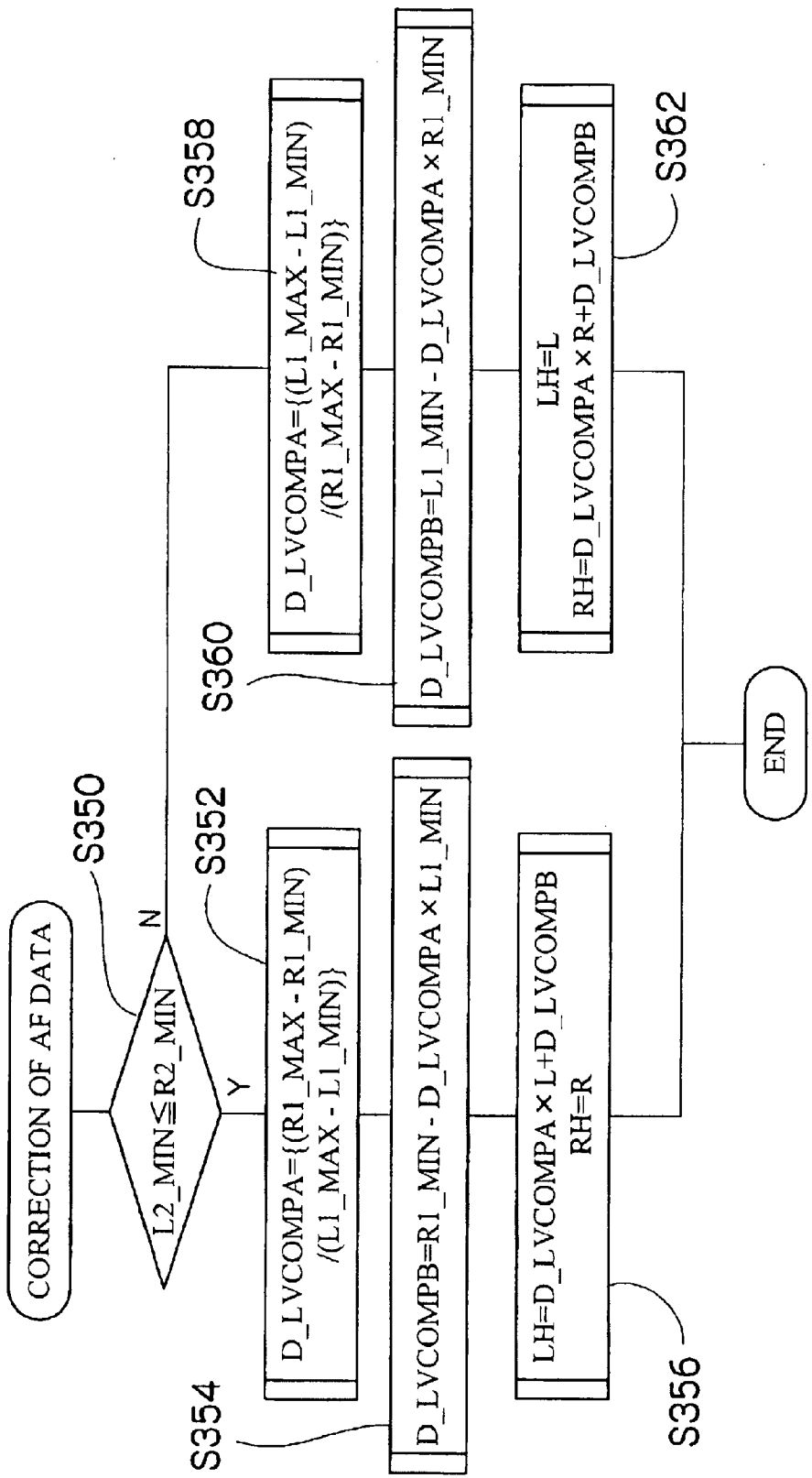
FIG. 65 is a flow chart showing the procedure of AF data correction processing where the difference in signal amount and the contrast ratio are corrected to accomplish correction of AF data in processing for correcting a difference between L and R channels.

The above-described processing procedure for correcting AF data is shown in the flow chart of FIG. 65. The CPU 60 determines whether the above-described inequality (32), namely L2MIN≦R2MIN holds or not, for the minimum values R2MIN and L2MIN of AF data in the R window 94B and the L window 96B providing the highest correlation, by the processing for calculating correction values in step S16 in FIG. 7 (step S350). If the result of determination is YES, then the contrast correction amount DLVCOMPA is calculated using the above-described equation (33), namely DLVCOMPA=(R1MAX−R1MIN)/(L1MAX−L1MIN) (step S352). Also, the offset correction amount DLVCOMPB is calculated using the above-described equation (34), namely DLVCOMPB=R1MIN−{(R1MAX−R1MIN)/(L1MAX−L1MIN)}×L1MIN (step S354).

Then, the corrected AF data RH and LH are calculated using the above-described equations (39) and (40), namely LH=DLVCOMPA×L+DLVCOMPB and RH=R (step S356).

On the other hand, if the result of determination is NO in step S350, the contrast correction amount DLVCOMPA is calculated using the above-described equation (36), namely DLVCOMPA=(L1MAX−L1MIN)/(R1MAX−R1MIN) (step S358). Also, the offset correction amount DLVCOMPB is calculated using the above-described equation (37), namely DLVCOMPB=L1MIN−{(L1MAX−L1MIN)/(R1MAX−R1MIN)}×R1MIN (step S360).

Then, the corrected AF data LH and RH are calculated using the above-described equations (42) and (43), namely LH=L and RH=DLVCOMPA×R+DLVCOMPB (step S362).

Effects of processing for correcting AF data where contrast correction and offset correction (correction of a difference in signal amount) explained here will now be described in comparison with the above-described processing for correcting AF data in which only correction of a difference in signal amount is carried out (see FIG. 63). Furthermore, the former processing refers to the new method, and the latter processing refers to the conventional method (Example 1).

Figure 66B:
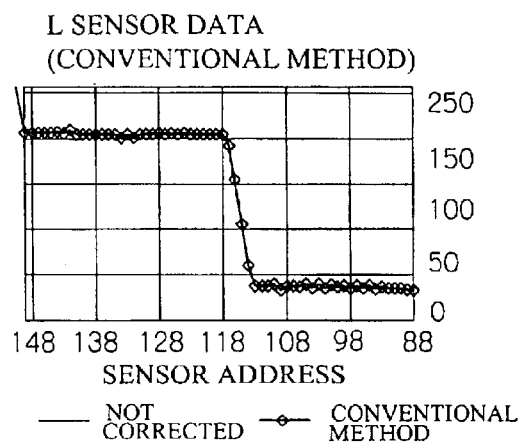
FIGS. 66(A) and 66(B) are explanatory diagrams used for explanation of the effect of AF data correction processing in FIG. 65.
Figure 66A:
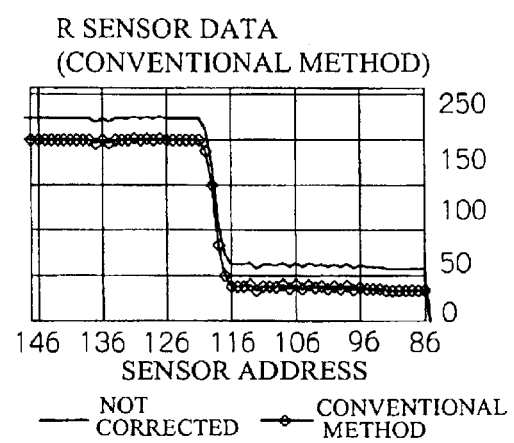

First, examples of results of correction where one of the R sensor 94 and the L sensor 96 is luminous (one of the sensors is exposed to a larger amount of sunlight and the like; that is, there is a difference in signal amount and there is no difference in contrast) will be described. FIGS. 66(A) and 66(B) show the distribution of uncorrected AF data (not corrected) in the employed sensors (middle areas in the drawings) of the R sensor 94 and the L sensor 96, and the distribution of corrected AF data in the conventional method, and the correction is carried out for AF data of the R sensor 94.

Figure 67B:
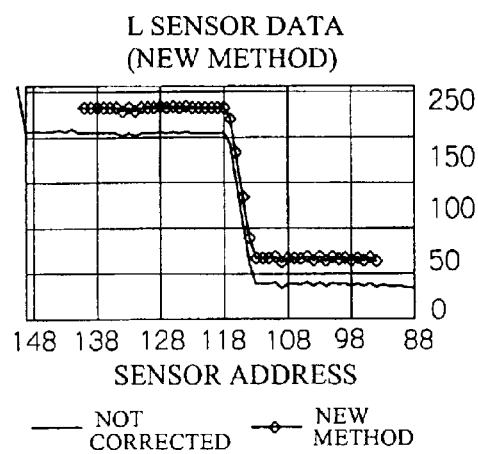
FIGS. 67(A) and 67(B) are explanatory diagrams used for explanation of the effect of AF data correction processing in FIG. 65.
Figure 67A:
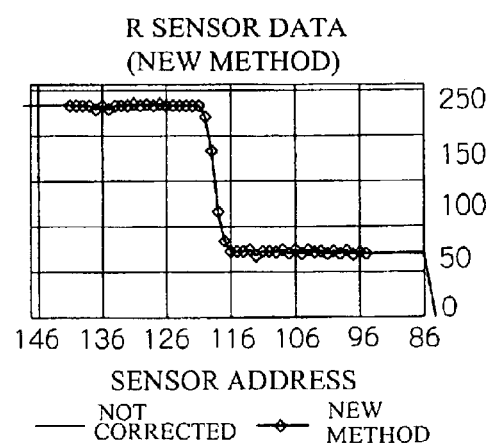

On the other hand, FIGS. 67(A) and 67(B) show the distribution of uncorrected AF data (not corrected) same as those in FIGS. 66(A) and 66(B) and the distribution of corrected AF data in the new method, and the correction is carried out for AF data of the L sensor 96.

Figure 68:
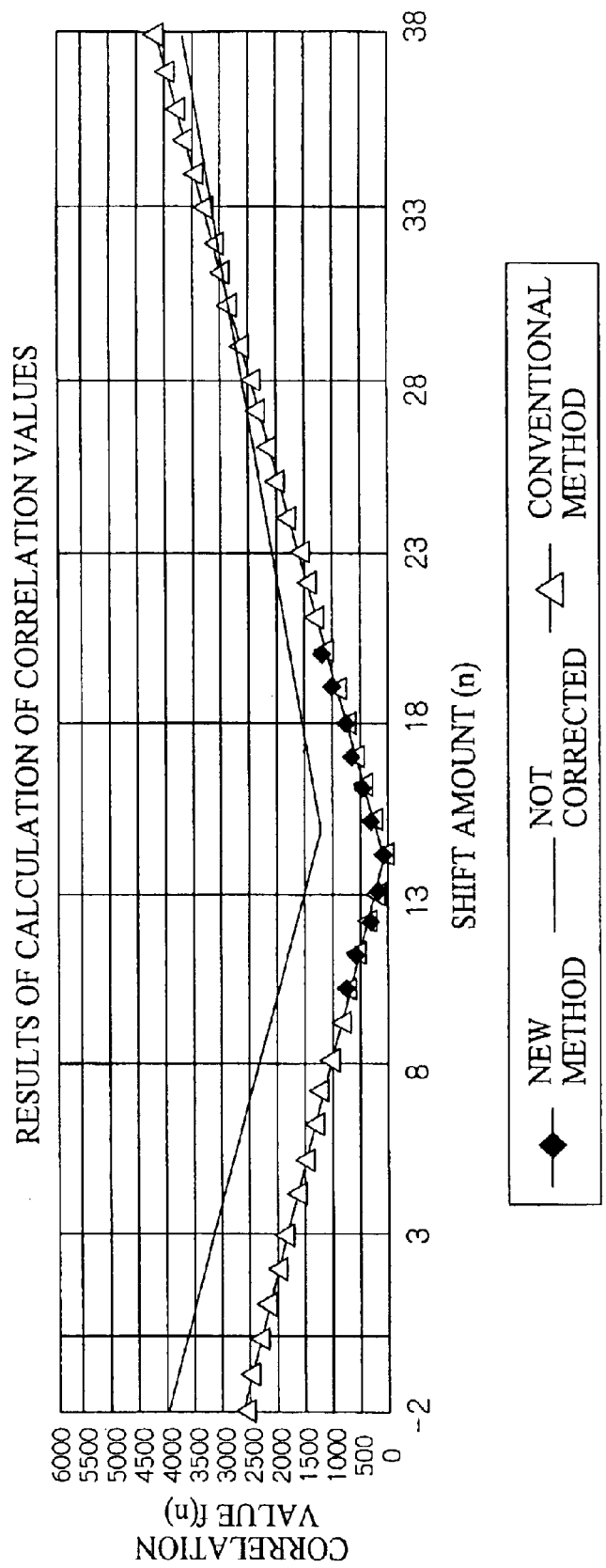
FIG. 68 is an explanatory diagram used for explanation of the effect of AF data correction processing in FIG. 65.

FIG. 68 shows the distribution of correction values where the correction value f(n) is calculated according to the uncorrected AF data in FIGS. 66 and 67, and the corrected AF data in the new and conventional methods.

Figure 69:
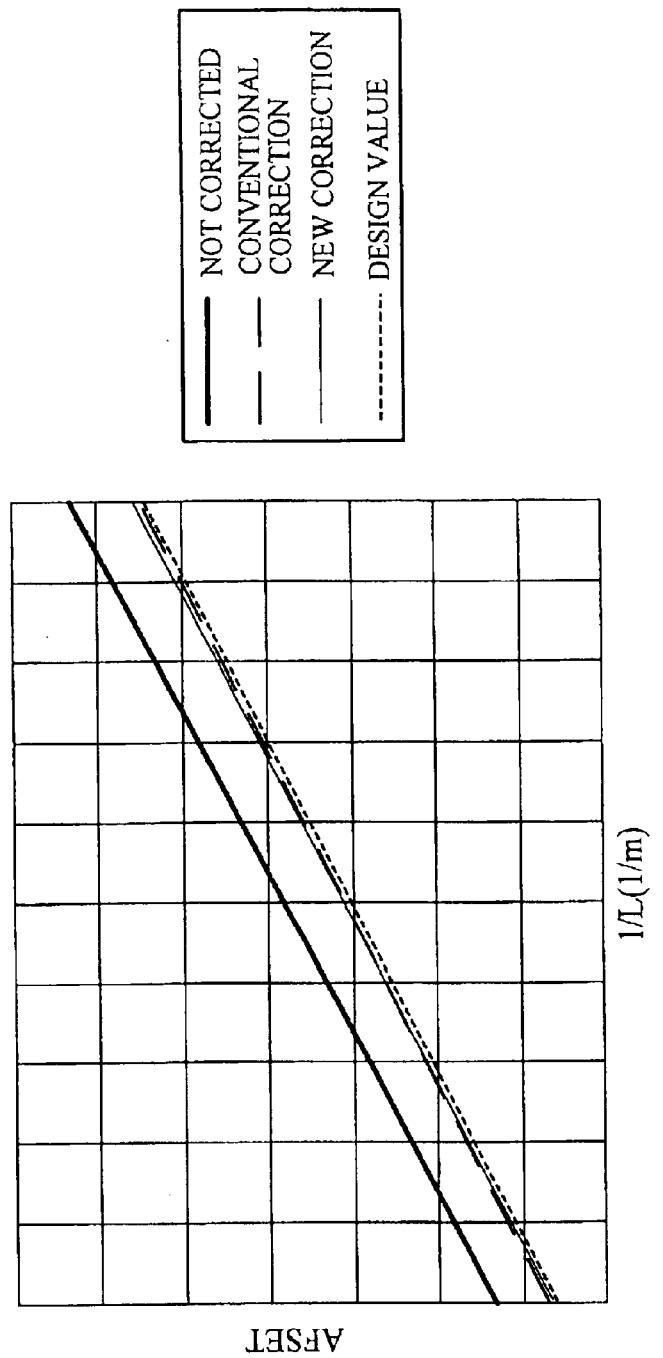
FIG. 69 is an explanatory diagram used for explanation of the effect of AF data correction processing in FIG. 65.

As apparent from the distribution of correction values in FIG. 68, if there is no difference in contrast between AF data of the R sensor 94 and AF data of the L sensor 96 before correction, correction of AF data provides the same results in both the new and conventional methods, and the level of coincidence in signal amount between AF data of the R sensor 94 and AF data of the L sensor 96 is improved compared to the case where AF data is not corrected. FIG. 69 shows the set distance of the shooting lens set by auto focus (vertical axis) relative to the distance of the subject actually placed in very short distance to infinite distance (horizontal axis) for the cases where AF data is not corrected (correction of AF data is not carried out), AF data is corrected by the new method, AF data is corrected by the conventional method, and design values are used. As apparent from FIG. 69, there is a deviation from the design value in the case where correction is not carried out, while the set distance of the shooting lens is almost identical to the design value in the case where AF data is corrected by the conventional or new methods. From the above, if there is no difference of contrast between the R sensor 94 and the L sensor 96, satisfactory results can be obtained in processing for correcting AF data using either the conventional method or the new method.

Figure 70:
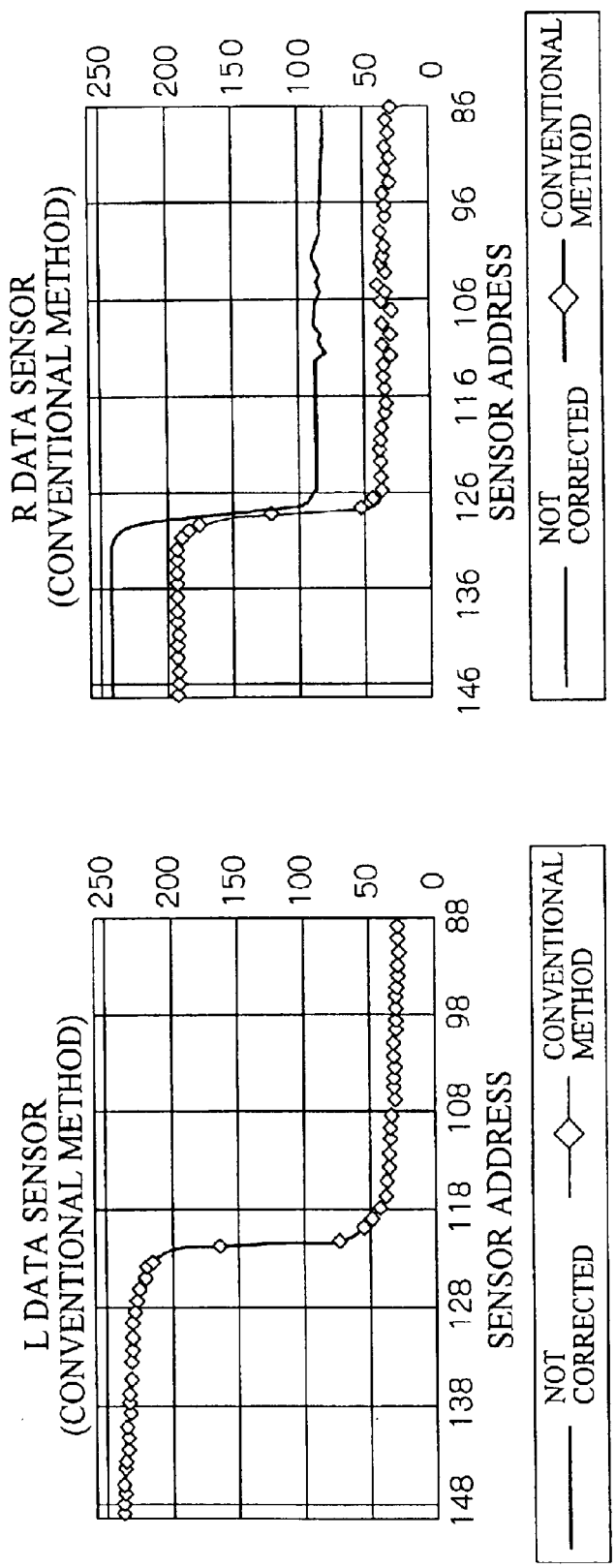
FIGS. 70(A) and 70(B) are explanatory diagrams used for explanation of the effect of AF data correction processing in FIG. 65.

If one of the R sensor 94 and the L sensor 96 is dark (one of the sensors is hidden by fingers or the like; that is, there are a difference in signal amount and a difference in contrast), however, the new method provides more advantageous results than the conventional method. Examples of results of correction in this case will now be described. FIGS. 70(A) and 70(B) show the distribution of uncorrected AF data (not corrected) in the employed sensors (middle areas in the drawings) of the R sensor 94 and the L sensor 96, and the distribution of corrected AF data in the conventional method, and the correction is carried out for AF data of the R sensor 94.

Figure 71:
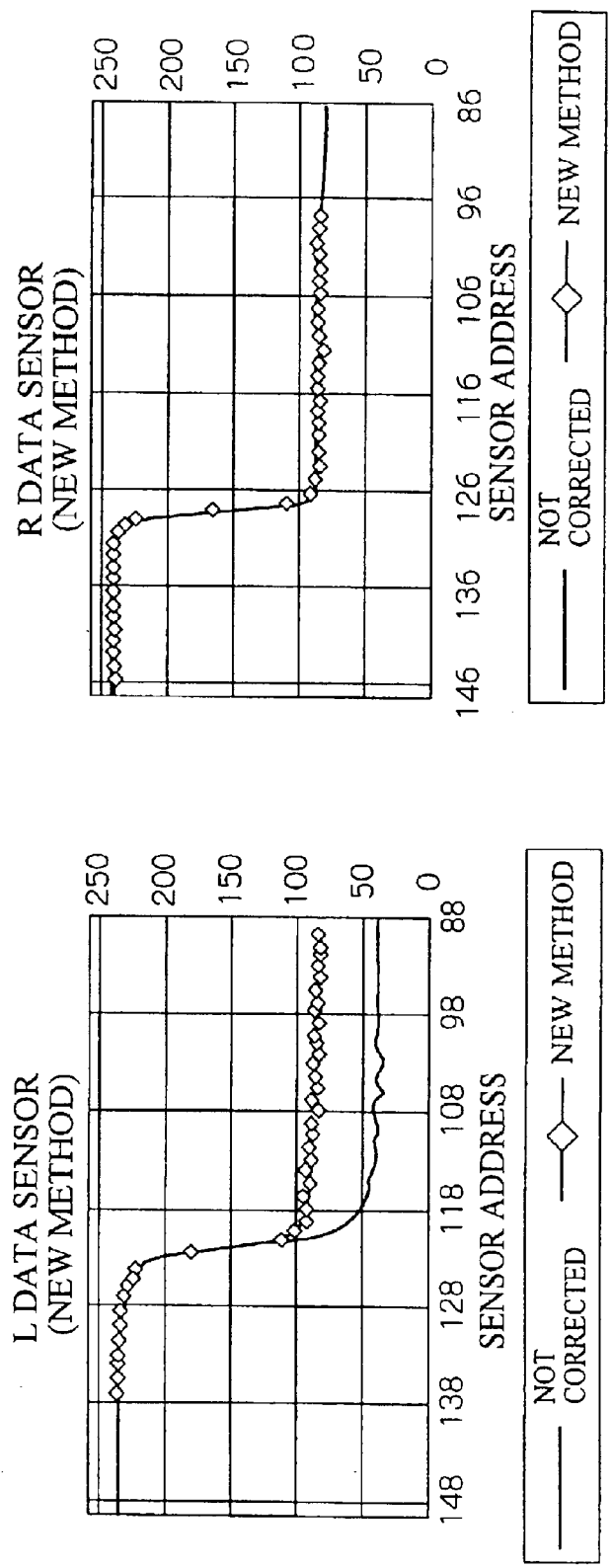
FIGS. 71(A) and 71(B) are explanatory diagrams used for explanation of the effect of AF data correction processing in FIG. 65.

On the other hand, FIGS. 71(A) and 71(B) show the distribution of uncorrected AF data (not corrected) same as those in FIGS. 70(A) and 70(B) and the distribution of corrected AF data in the new method, and the correction is carried out for AF data of the L sensor 96.

Figure 72:
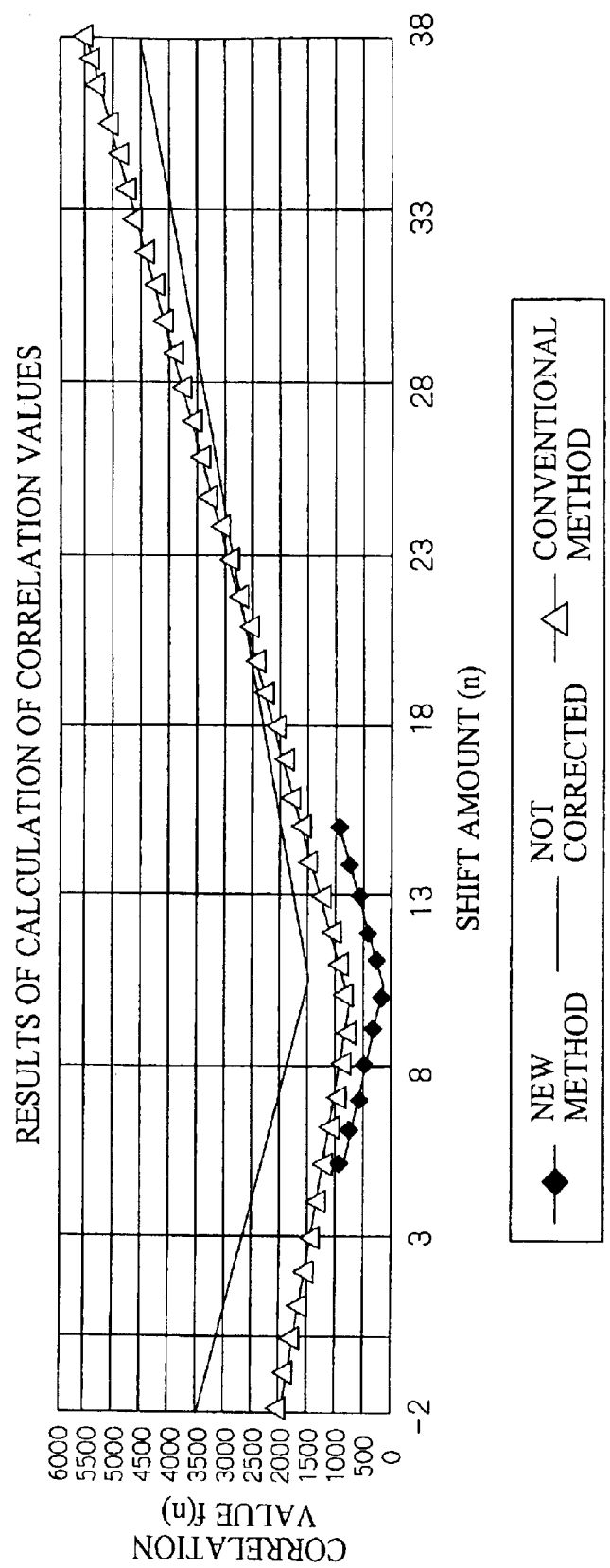
FIG. 72 is an explanatory diagram used for explanation of the effect of AF data correction processing in FIG. 65.

FIG. 72 shows the distribution of correction values where the correction value f(n) is calculated according to the uncorrected AF data in FIGS. 70(A), 70(B), 71(A) and 71(B), and the corrected AF data in the new and conventional methods.

Figure 73:
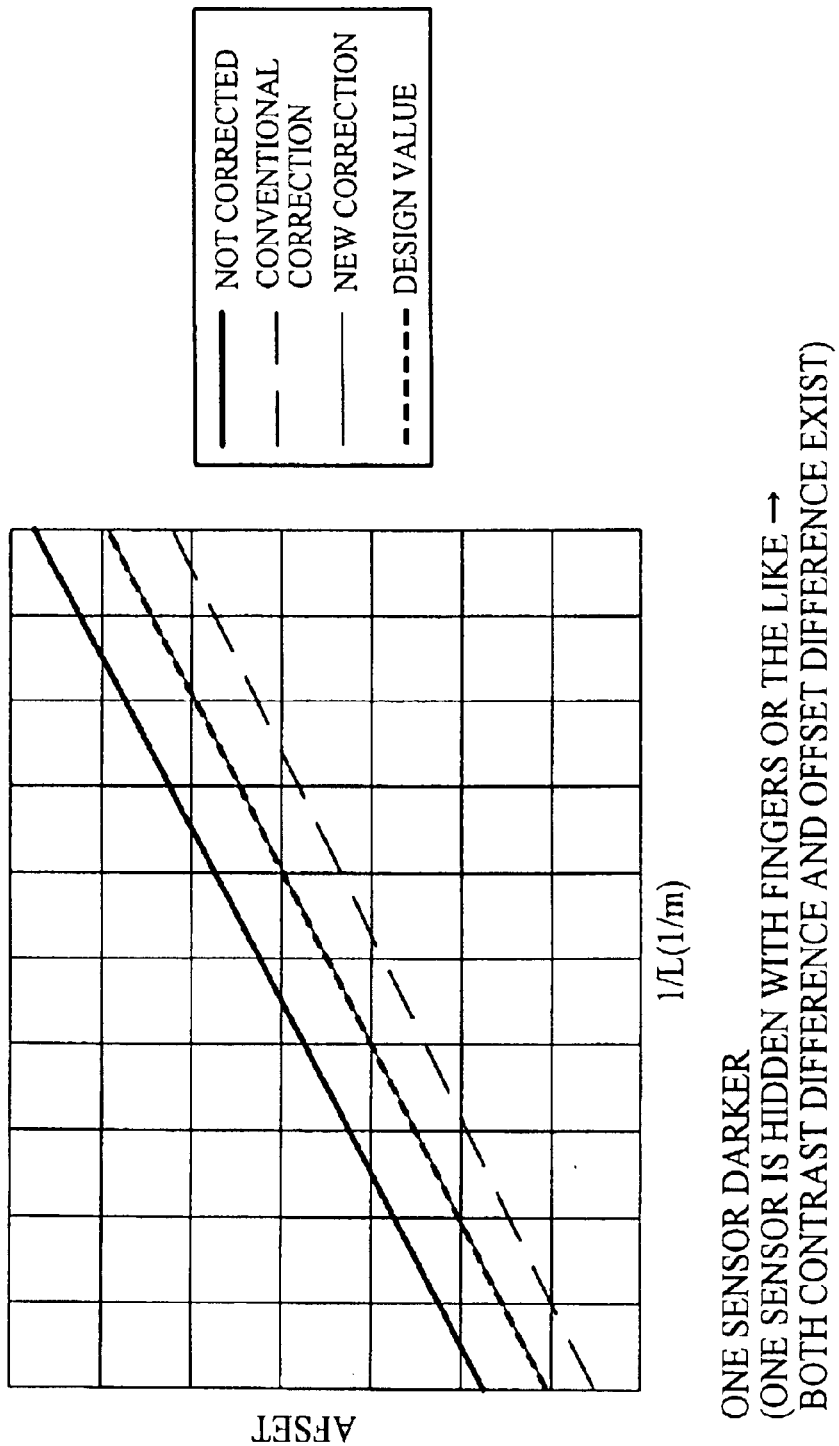
FIG. 73 is an explanatory diagram used for explanation of the effect of AF data correction processing in FIG. 65.

As apparent from the distribution of correction values in FIG. 72, the smallest minimum value with correction of AF data by the new method is smaller than the smallest minimum value with correction of AF data by the conventional method, and the level of coincidence in signal amount between AF data of the R sensor 94 and AF data of the L sensor 96 in the new method is improved compared to the conventional method. FIG. 73 shows the set distance of the shooting lens set by AF (longitudinal axis) relative to the distance of the subject actually placed in very short distance to infinite distance (horizontal axis) for the cases where AF data is not corrected (correction of AF data is not carried out), AF data is corrected by the new method, AF data is corrected by the conventional method, and design values are used. As apparent from FIG. 73, there is a deviation between the set distance of the shooting lens and the design value in the cases where correction is not carried out, and AF data is corrected by the conventional method, while the set distance of the shooting lens is almost identical to the design value in the case where AF data is corrected by the new method. From the above, if there is a difference in contrast between the R sensor 94 and the L sensor 96, the correction of AF data by the new method provides better results than the correction of AF data by the conventional method. Therefore, the new method providing better results irrespective of existence/nonexistence of difference in contrast is more preferable than the conventional method.

Furthermore, R1MAX and R1MIN, and L1MAX and L1MIN in calculation of the contrast correction amount DLVCOMPA and the offset correction amount DLVCOMPB described above are defined as the maximum and minimum values of AF data in the employed sensors of the R sensor 94 and the L sensor 96, respectively, but alternatively they may be defined as the maximum and minimum values of AF data in the ranges of the R sensor 94 and the L sensor 96 in which AF data is corrected. In addition, R2MAX, R2MIN, L2MAX and L2MIN may be used in place of R1MAX, R1MIN, L1MAX and L1MIN. Also, R2MIN and L2MIN in the above-described inequalities are defined as the minimum values of AF data in the R window 94B and the L window 96B providing the highest correlation, respectively, but the minimum values in the range in which AF data is corrected may be used in place of R2MIN and L2MIN.

Minimum Value Determination Processing

Minimum value determination processing will now be described. The processing for calculating correlation values in step S16 in FIG. 7 and the processing for correcting a difference between L and R channels in step S20 in FIG. 7 include processing for detecting the minimum value of the correlation value f(n) from the distribution of correlation values, and in this processing, whether the minimum value exists or not is determined by the minimum value determination processing described here. The correlation value determined to be the minimum value is essentially smaller than both correlation values in shift amounts adjacent on both sides to its shift amount, and the smallest one of minimum values is the smallest minimum value.

If the subject is located at a distance shorter than the close distance in which distance measurement is possible, there exists essentially no minimum value of the correlation value.

Figure 74:
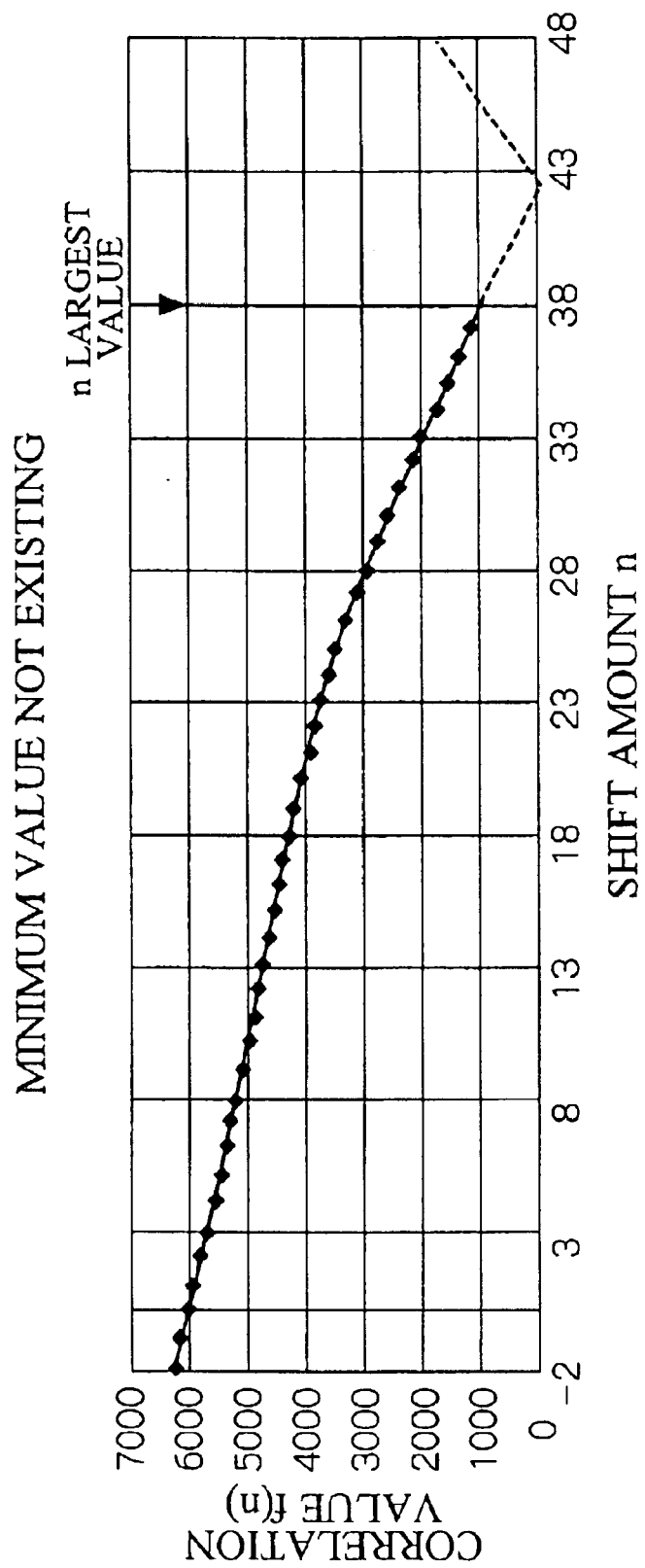
FIG. 74 is an explanatory diagram used for explanation of minimum value determination processing.

FIG. 74 shows one example of distribution of correlation values with the assumption that the correlation value f(n) is calculated up to a shift amount at a distance shorter than the largest shift amount n, 38. In this distribution of correlation values, no minimum value exists in the range of shift amounts n=−2 to 38, and therefore it is determined that distance measurement is impossible with this employed sensor. This determination is reasonable.

Figure 75:
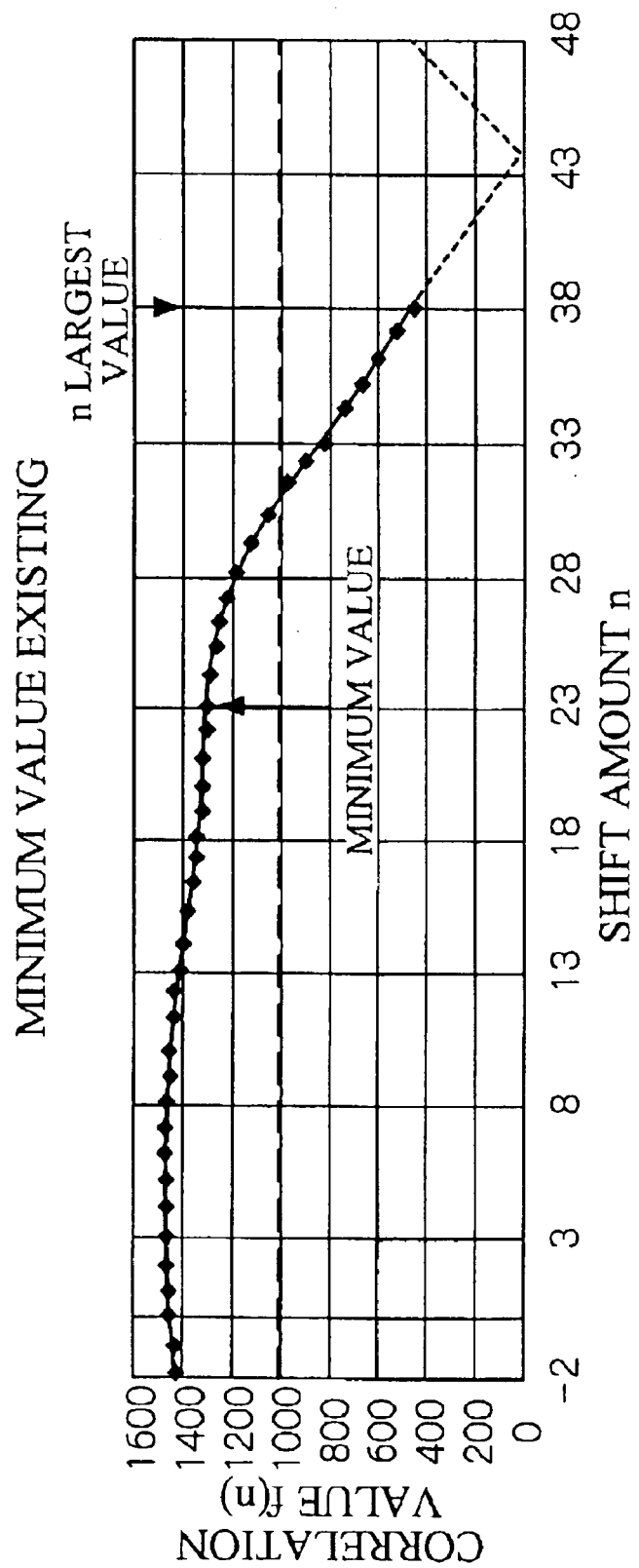
FIG. 75 is an explanatory diagram used for explanation of minimum value determination processing.
Figure 76:
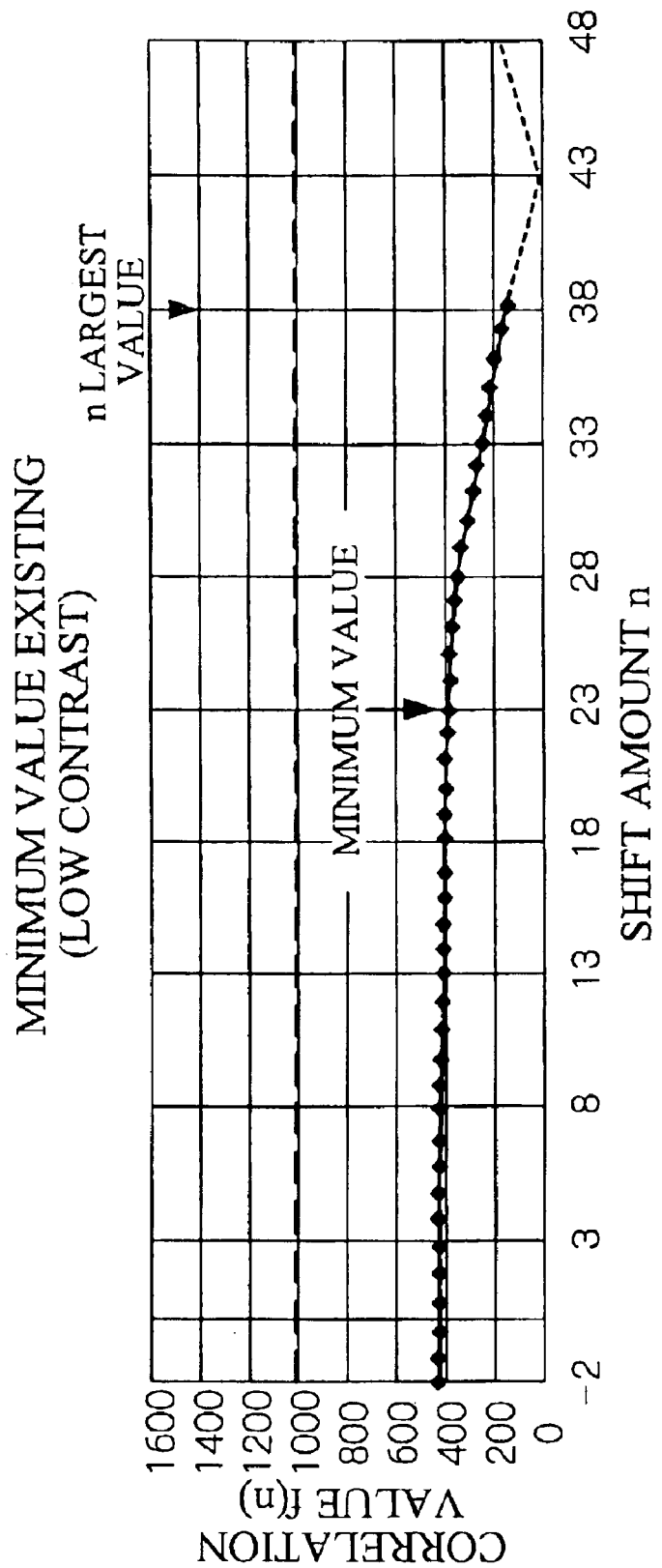
FIG. 76 is an explanatory diagram used for explanation of minimum value determination processing.

However, there may be cases where the minimum value in fact exists even if the subject is located at a distance shorter than the close distance, as shown in FIGS. 75 and 76. to Furthermore, FIG. 75 shows the case of high contrast, while FIG. 76 shows the case of low contrast.

On the other hand, if a minimum value is larger than a predetermined value, it is determined that the value is no longer the minimum value as a basic substance of determination for minimum value determination, and therefore provided that the predetermined value is 1000, there exists no minimum value and thus it is appropriately determined that distance measurement is impossible in the case of FIG. 75.

In the case of FIG. 76, on the other hand, the minimum value is smaller than 1000, and therefore problems occur such that it is determined that the minimum value exists with the above-described substance of determination. Thus, in the minimum value determination of the present invention, a determination is made in the following way to eliminate the above-described problems. If the subject is located in the range in which distance measurement is possible, the smallest minimum value of the correlation value f(n) is also the minimum value. In contrast to this, if the minimum value is detected a distance closer than the shift amount of the smallest minimum value, it can be predicted that the subject is located at a distance shorter than the close distance. Thus, if a correlation value smaller than the smallest minimum value exists at a distance closer than the shift amount of the smallest minimum value (the smaller the shift amount, the shorter the distance), it is determined a short distance warning is provided or distance measurement is impossible.

On the other hand, if the minimum value exists at a distance longer than the shift amount of the smallest minimum value, it can be determined that there is something abnormal (infinite distance is at shift amount n=0, and there should be no distance longer than infinite distance), and therefore it is determined that distance measurement is impossible.

Detailed Description of Interpolated Value Calculation Processing (Step S22 in FIG. 7)

The interpolated value calculation processing in step S22 in FIG. 7 will now be described. The interpolated value calculation processing is processing in which a shift amount of further more accurate highest correlation is detected from adjacent correlation values f(n) of the shift amount nmin providing the highest correlation (highest correlation value fmin) in each divided area. Furthermore, in the description below, the shift amount of highest correlation detected by interpolated value calculation processing is referred to as a shift amount of real highest correlation, and its value is expressed by x.

Figure 77:
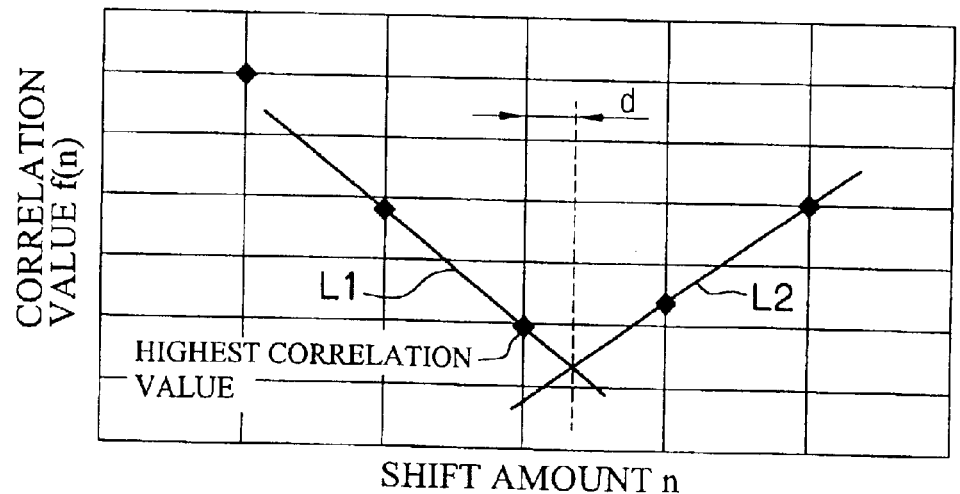
FIG. 77 is an explanatory diagram used for explanation of interpolated value calculation processing.

The CPU 60 carries out the following processing in this interpolated value calculation processing. Assume that the correlation value f(nmin−1) of the shift amount nmin−1 with −1 added relative to the shift amount nmin providing the highest correlation (highest correlation value fmin (f(nmin))

in the employed sensor, and the correlation value f (nmin+1) of the shift amount nmin+1 with +1 added relative to the shift amount nmin satisfy the following inequality (44) as shown in FIG. 77:

$$f(n\text{min}-1) > f(n\text{min}+1) \qquad (44)$$

In this case, the CPU 60 determines an intersection point of a line L1 passing through the correlation value f(nmin) and the correlation value f(nmin−1) of the shift amount nmin and the shift amount nmin−1 and a line L2 passing through the correlation value f(nmin+1) and the correlation value f(nmin+2) of the shift amount nmin+1 and the shift amount nmin+2. Then, the intersection point is defined as the shift amount x of real highest correlation.

Figure 78:
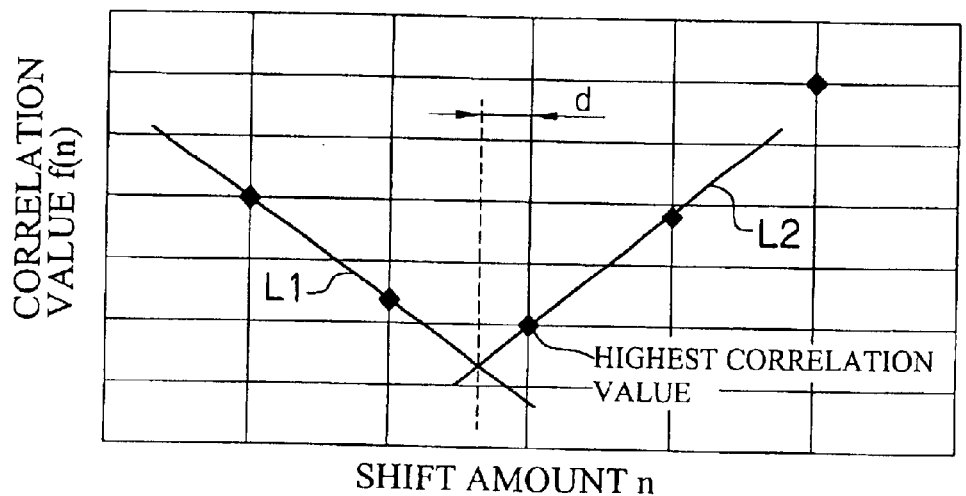
FIG. 78 is an explanatory diagram used for explanation of interpolated value calculation processing.

On the other hand, if the correlation value f(nmin−1) of the shift amount nmin−1 with −1 added relative to the shift amount nmin providing the highest correlation and the correlation value f(nmin+1) of the shift amount nmin with +1 added relative to the shift amount nmin satisfy the following inequality as shown in FIG. 78:

$$f(n\text{min}-1) < f(n\text{min}+1) \qquad (45)$$

In this case, the CPU 60 determines an intersection point of the line L1 passing through the correlation value f(nmin−1) and the correlation value f(nmin−2) of the shift amount nmin−1 and the shift amount nmin−2 and the line L2 passing through the correlation value f(nmin) and the correlation value f(nmin+1) of the shift amount nmin and the shift amount nmin+1. Then, the intersection point is defined as the shift amount x of real highest correlation.

Figure 79:
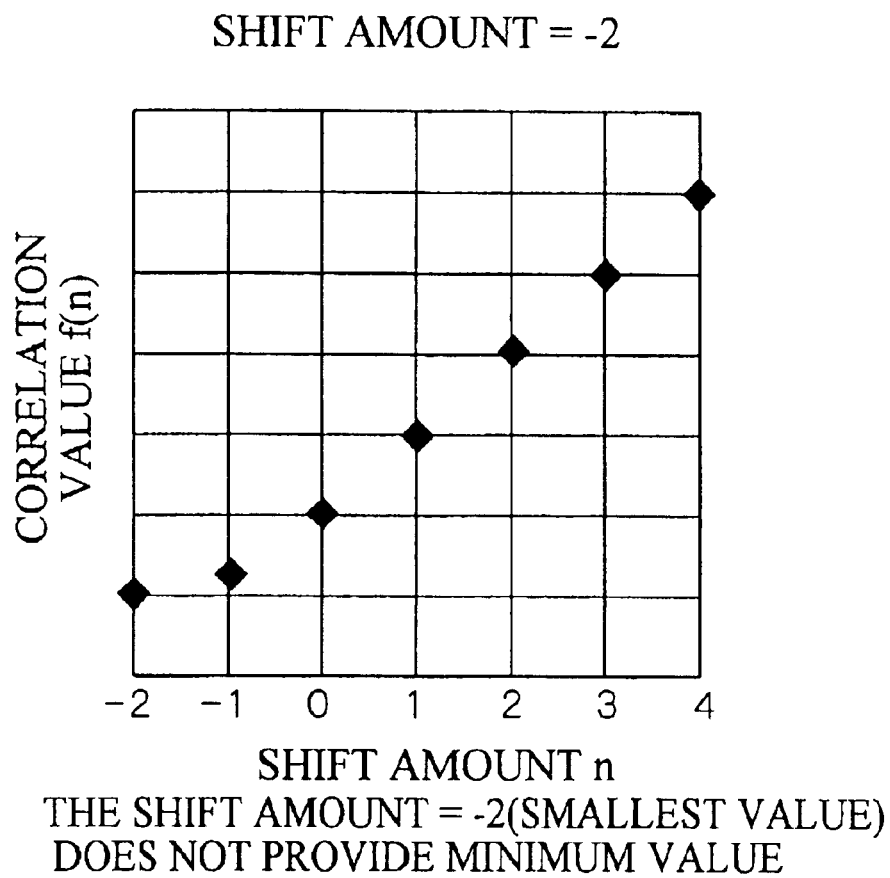
FIG. 79 is an explanatory diagram used for explanation of interpolated value calculation processing.
Figure 80:
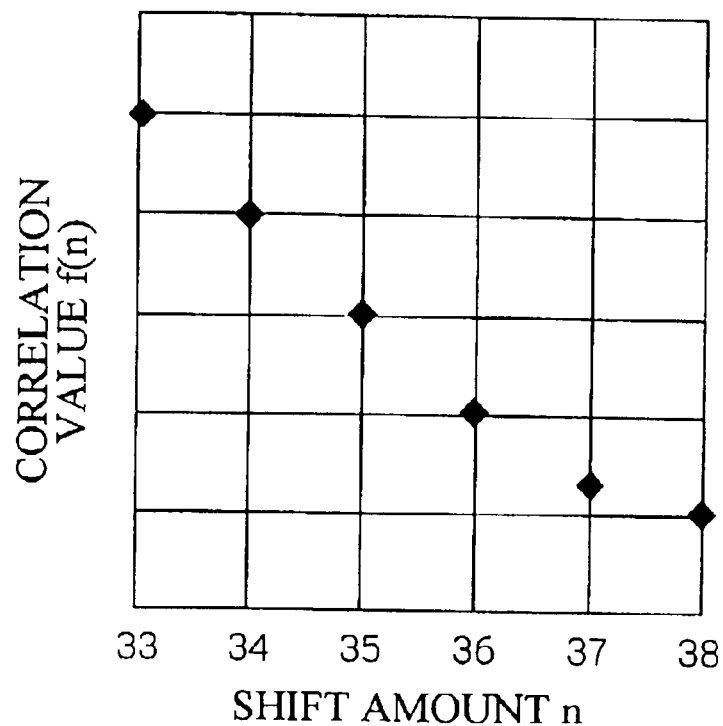
FIG. 80 is an explanatory diagram used for explanation of interpolated value calculation processing.

However, if the smallest value of the shift amount n (shift amount n=−2) provides the smallest value of the correlation value f(n) as shown in FIG. 79, or if the largest value of the shift amount n (shift amount n=38) provides the smallest value of the correlation value f(n) as shown in FIG. 80, the smallest value is not a minimum value, and therefore there is no possibility that calculation of interpolated values is carried out with the smallest value (shift amount n=−2) or largest value (shift amount n=38) of the shift amount n as the shift amount nmin of highest correlation. In this case, it is determined that distance measurement is impossible.

Figure 81A:
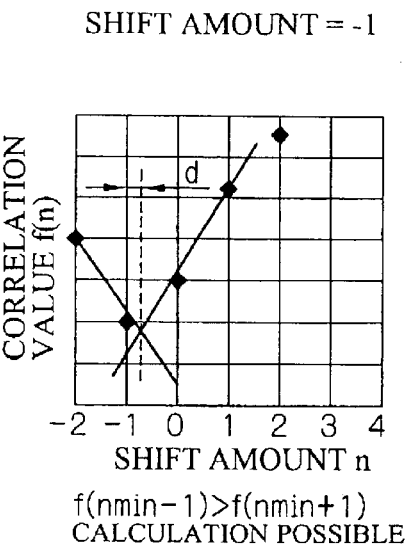
FIGS. 81(A) and 81(B) are explanatory diagrams used for explanation of interpolated value calculation processing.
Figure 81B:
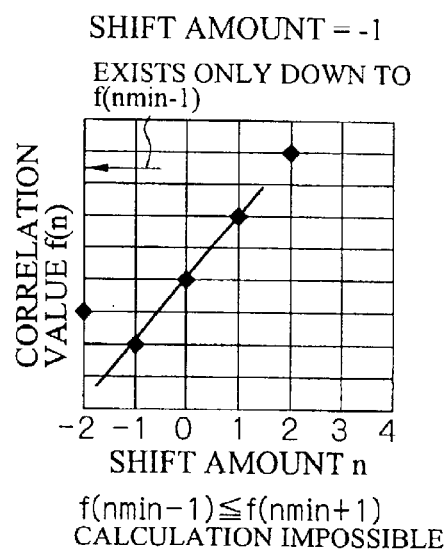

Also, if the shift amount (shift amount n=−1) with +1 added relative to the smallest value of the shift amount n (shift amount n=−2) is the shift amount nmin of highest correlation as shown in FIGS. 81(A) and 81(B), and the above-described inequality (44) is satisfied (case of FIG. 77) as in FIG. 81(A), calculation of interpolated values can be carried out. However, if the above-described inequality (45) is satisfied (case of FIG. 78) as in FIG. 81(B), the line L1 is not defined, and therefore it is determined that distance measurement is impossible without carrying out calculation of interpolated values.

Figure 82A:
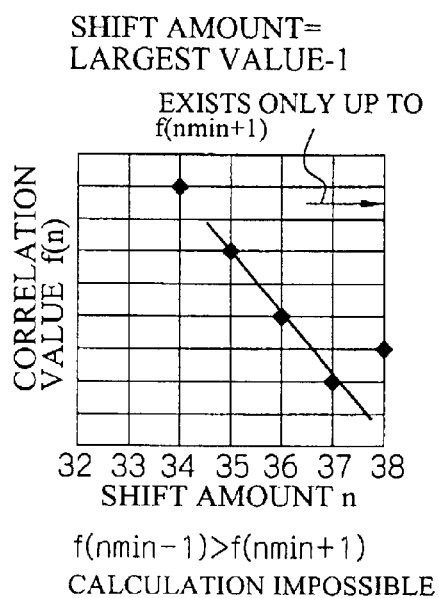
FIGS. 82(A) and 82(B) are explanatory diagrams used for explanation of interpolated value calculation processing.
Figure 82B:
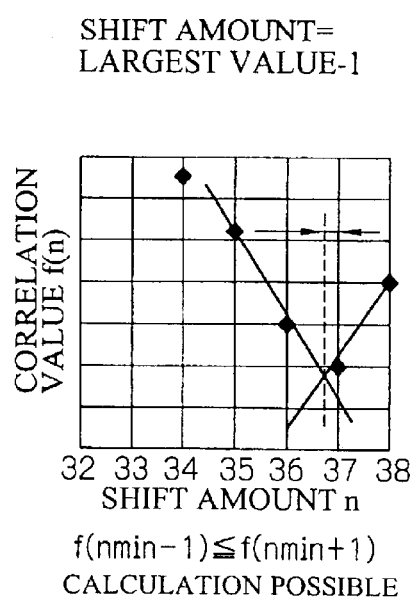

Also, if the largest value −1 of the shift amount n (shift amount n=37) is the shift amount nmin of highest correlation, and the above-described inequality (45) is satisfied (case of FIG. 78) as in FIG. 82(B), calculation of interpolated values can be carried out. However, if the inequality (44) is satisfied (case of FIG. 77) as in FIG. 82(A), the line L2 is not defined, and therefore it is determined that distance measurement is impossible without carrying out calculation of interpolated values.

The above-described processing is general processing, and the shift amount x of real highest correlation is determined by other processing in the following case. For example, assume that when the correlation values f(n) of shift amounts nmin−2, nmin−1, nmin+1 and nmin+2 which are in the range of within ±2 with respect to the shift amount nmin providing the highest correlation are compared, correlation values f(n) are close to one another only for shift amounts n at three continuous points including the shift amount nmin. It is thought that in this case, the correlation value at the middle of those three points is shifted.

Then, in this case, the shift amount x of real highest correlation is detected by interpolated value calculation processing described below instead of the above-described interpolated value calculation processing. Furthermore, the above-described interpolated value calculation processing is referred to as interpolated value normal calculation processing, and the interpolated value calculation processing described below is referred to as per interpolated value calculation processing. Also, a specific method for determining whether correlation values f(n) are close to one another will be described later.

If correlation values f(n) only for shift amounts n at continuous three points have values close to one another as described above, it can be thought that the correlation value of the shift amount at the middle of the three points should be essentially detected as the highest correlation value fmin. Then, the CPU 60 determines an intersection point of the line L1 passing through the correlation values f(ns) and f(ns−1) of the smallest shift amount ns of the shift amounts n at three points, and the shift amount ns−1 with −1 added relative to the shift amount ns, and the line L2 passing through the correlation values (n1) and f(n1+1) of the largest shift amount n1 of the three shift amounts at three points, and the shift amount n1+1 with +1 added relative to the shift amount n1. Then, the intersection point is defined as the shift amount x of highest correlation.

Figure 83:
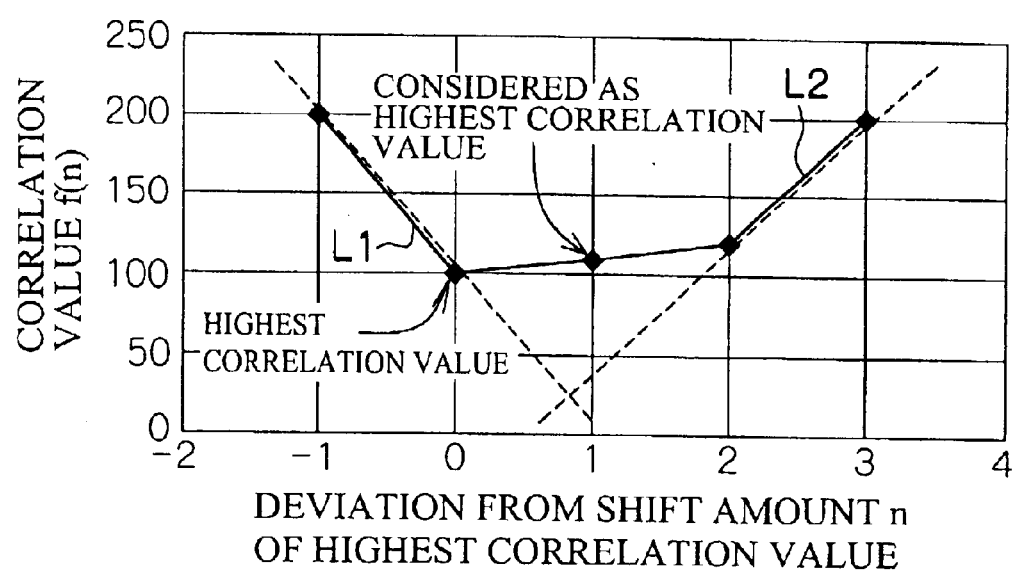
FIG. 83 is an explanatory diagram used for explanation of interpolated value calculation processing.

For example, assume that as shown in FIG. 83, the shift amount nmin of highest correlation is detected at 0, and the highest correlation value f(0) is close to the correlation values f(1) and f(2) of shift amounts 1 and 2 with +1 and +2 added relative to the shift amount nmin of the highest correlation value f(0). In this case, an intersection point of the line L1 passing through the correlation values of shift amounts n=−1 and 0, and the line L2 passing through the correlation values of shift amounts n=2 and 3 is determined, and the intersection point is defined as the shift amount x. Furthermore, processing where the correlation values of shift amounts with +1 and +2 added relative to the shift amount nmin of highest correlation are close to the highest correlation value as in the case of this example is referred to as processing type 1.

Figure 84:
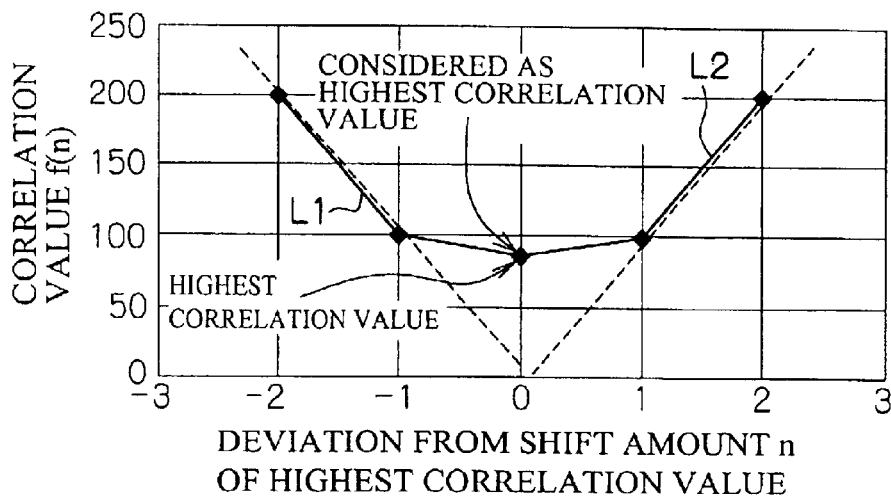
FIG. 84 is an explanatory diagram used for explanation of interpolated value calculation processing.

Also, assume that as shown in FIG. 84, the shift amount nmin of highest correlation is detected at 0, and the highest correlation value f(0) is close to the correlation values f(−1) and f(1) of shift amounts −1 and 1 with −1 and +1 added relative to the shift amount nmin of the highest correlation value f(0). In this case, an intersection point of the line L1 passing through the correlation values of shift amounts n=−2 and −1, and the line L2 passing through the correlation values of shift amounts n=1 and 2 is determined, and the intersection point is defined as the shift amount x. Furthermore, processing where the correlation values of shift amounts with −1 and +1 added relative to the shift amount nmin of highest correlation are close to the highest correlation value as in the case of this example is referred to as processing type 2.

Figure 85:
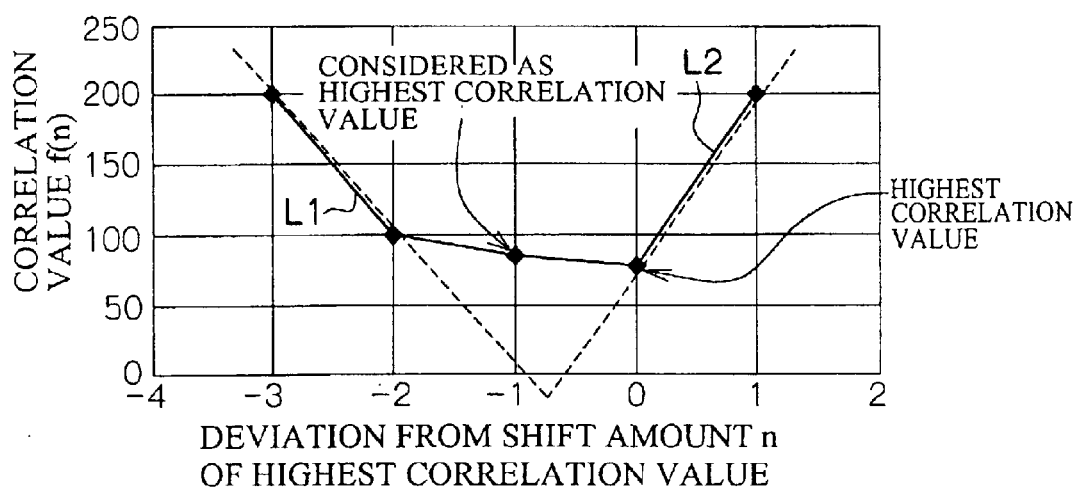
FIG. 85 is an explanatory diagram used for explanation of interpolated value calculation processing.

Also, assume that as shown in FIG. 85, the shift amount nmin of highest correlation is detected at 0, and the highest correlation value f(0) is close to the correlation values f(−2) and f(−1) of shift amounts −2 and −1 with −2 and −1 added relative to the shift amount nmin of the highest correlation value f(0). In this case, an intersection point of the line L1 passing through the correlation values of shift amounts n=−3 and −2, and the line L2 passing through the correlation values of shift amounts n=0 and 1 is determined, and the intersection point is defined as the shift amount x. Furthermore, processing where the correlation values of shift amounts with −2 and −1 added relative to the shift amount nmin of highest correlation are close to the highest correlation value as in the case of this example is referred to as processing type 3.

Figure 86:
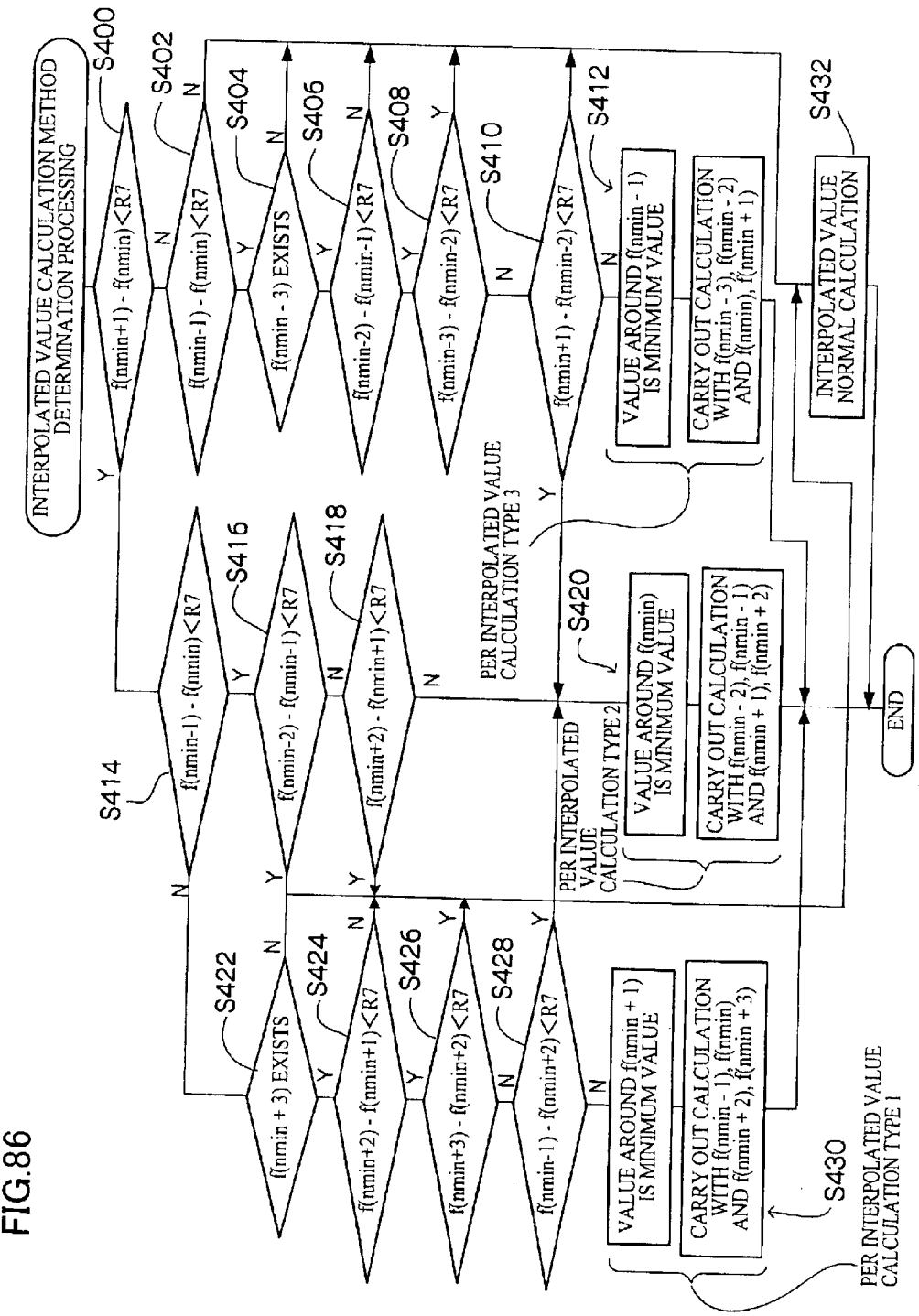
FIG. 86 is a flow chart showing the procedure for identifying processing types 1 to 3 of interpolated value normal calculation and per interpolated value calculation in interpolated value calculation processing.

FIG. 86 is a flow chart showing the procedure for identifying processing types 1 to 3 of the above-described interpolated value normal calculation and per interpolated value calculation in the interpolated value calculation processing. First, the CPU 60 determines whether or not the correlation value difference f(nmin+1)−f(nmin) between the highest correlation value f(nmin) and the correlation value f(nmin+1) of the shift amount nmin+1 with +1 added relative to the shift amount nmin of highest correlation satisfies the following inequality with respect to a reference value R7 (step S400):

$$f(n\text{min}+1)-f(n\text{min})<R7$$

Furthermore, the reference value R7 is an upper limit value by which it can be determined that two correlation values are close to each other. If the result of determination is NO, then whether or not the correlation value difference f(nmin−1)−f(nmin) between the highest correlation value f(nmin) and the correlation value f(nmin−1) of the shift amount nmin−1 with −1 added relative to the shift amount nmin satisfies the following inequality with respect to the reference value R7 is determined (step S402):

$$f(n\text{min}-1)-f(n\text{min})<R7$$

If the result of determination in this determination processing is NO, interpolated value normal calculation processing is carried out (step S432) to detect the shift amount x of real highest correlation, ending this interpolated value calculation processing.

On the other hand, if the result of determination at step S402 is YES, then whether the correlation value f(nmin−3) of the shift amount nmin−3 with −3 added relative to the shift amount nmin of highest correlation exists or not is determined (step S404). If the result of determination is NO, interpolated value normal calculation processing is carried out (step S432). On the other hand, if the result of determination is YES, whether or not the correlation value difference f(nmin−2)−f(nmin−1) between the correlation value f(nmin−1) of the shift amount nmin−1 and the correlation value f(nmin−2) of the shift amount nmin−2 satisfies the following inequality with respect to the reference value R7 is determined (step S406):

$$f(n\text{min}-2)-f(n\text{min}-1)<R7$$

If the result of determination in this determination processing is NO, interpolated value normal calculation processing is carried out (step S432). On the other hand, if the result of determination is YES, whether or not the correlation value difference f(nmin−3)−f(nmin−2) between the correlation value f(nmin−2) of the shift amount nmin−2 and the correlation value f(nmin−3) of the shift amount nmin−3 satisfies the following inequality with respect to the reference value R7 is determined (step S408):

$$f(n\text{min}-3)-f(n\text{min}-2)<R7$$

If the result of determination in this determination processing is YES, interpolated value normal calculation processing is carried out (step S432). On the other hand, if the result of determination is NO, whether or not the correlation value difference f(nmin+1)−f(nmin−2) between the correlation value f(nmin+1) of the shift amount nmin+1 and the correlation value f(nmin−2) of the shift amount nmin−2 satisfies the following inequality with respect to the reference value R7 is determined (step S410):

$$f(n\text{min}+1)-f(n\text{min}-2)<R7$$

If the result of determination in this determination processing is NO, per interpolated value calculation processing of processing type 3 is carried out (step S412). That is, the shift amount x is determined according to the correlation values f(nmin−3), f(nmin−2), f(nmin) and f(nmin+1) assuming that the minimum value (real highest correlation value) exists around the correlation value f(nmin−1) as shown in FIG. 85.

On the other hand, the result of determination in step S410 is YES, per interpolated value calculation processing of processing type 2 is carried out (step S420). That is, the shift amount x is determined according to the correlation values f(nmin−2), f(nmin−1), f(nmin+1) and f(nmin+2) assuming that the minimum value (real highest correlation value) exists around the correlation value f(nmin) as shown in FIG. 84.

If the result of determination in step S400 is YES, the CPU 60 determines whether or not the correlation value difference f(nmin−1)−f(nmin) between the highest correlation value f(nmin) and the correlation value f(nmin−1) of the shift amount nmin−1 with −1 added relative to the shift amount nmin of highest correlation satisfies the following inequality with respect to a reference value R7 (step S414):

$$f(n\text{min}-1)-f(n\text{min})<R7$$

If the result of determination is YES, then whether or not the correlation value difference f(nmin−2)−f(nmin−1) between the correlation value f(nmin−1) of the shift amount nmin−1 and the correlation value f(nmin−2) of the shift amount nmin−2 satisfies the following inequality with respect to the reference value R7 is determined (step S416):

$$f(n\text{min}-2)-f(n\text{min}-1)<R7$$

If the result of determination in this determination processing is YES, interpolated value normal calculation processing is carried out (step S432). On the other hand, if the result of determination is NO, then whether or not the correlation value difference f(nmin+2)−f(nmin+1) between the correlation value f(nmin+1) of the shift amount nmin+1 and the correlation value f(nmin+2) of the shift amount nmin+2 satisfies the following inequality with respect to the reference value R7 is determined (step S418):

$$f(n\text{min}+2)-f(n\text{min}+1)<R7$$

If the result of determination in this determination processing is YES, interpolated value normal calculation processing is carried out (step S432). On the other hand, if the result of determination is NO, per interpolated value calculation processing of processing type 2 is carried out (step S420).

If the result of determination in step S414 is NO, the CPU 60 determines whether the correlation value f(nmin−3) of the shift amount nmin−3 with −3 added relative to the shift amount nmin of highest correlation exists or not (step S422). If the result of determination is NO, interpolated value normal calculation processing is carried out (step S432). On the other hand, if the result of determination is YES, whether or not the correlation value difference f(nmin+2)−f(nmin+1) between the correlation value f(nmin+1) of the shift amount nmin+1 and the correlation value f(nmin+2) of the shift amount nmin+2 satisfies the following inequality with respect to the reference value R7 is determined (step S424):

$$f(n\text{min}+2)-f(n\text{min}+1)<R7$$

If the result of determination is NO, interpolated value normal calculation processing is carried out (step S432). On the other hand, if the result of determination is YES, whether or not the correlation value difference f(nmin+3)−f(nmin+2) between the correlation value f(nmin+2) of the shift amount nmin+2 and the correlation value f(nmin+3) of the shift amount nmin+3 satisfies the following inequality with respect to the reference value R7 is determined (step S426):

$$f(n\text{min}+3)-f(n\text{min}+2)<R7$$

If the result of determination is YES, interpolated value normal calculation processing is carried out (step S432). On the other hand, if the result of determination is NO, then whether or not the correlation value difference f(nmin−1)−f(nmin+2) between the correlation value f(nmin−1) of the shift amount nmin−1 and the correlation value f(nmin+2) of the shift amount nmin+2 satisfies the following inequality with respect to the reference value R7 is determined (step S428):

$$f(n\text{min}-1)-f(n\text{min}+2)<R7$$

If the result of determination is NO, per interpolated value calculation processing of processing type 2 is carried out (step S420). On the other hand, if the result of determination is YES, per interpolated value calculation processing of processing type 1 is carried out (step S430). That is, the shift amount x is determined according to the correlation values f(nmin−1), f(nmin), f(nmin+2) and f(nmin+3) assuming that the minimum value (real highest correlation value) exists around the correlation value f(nmin+1) as shown in FIG. 83.

Detailed Description of AF Error Processing (Step S24 in FIG. 7)

AF error processing in step S24 in FIG. 7 will now be described. The AF error processing is processing in which if it is determined that distance measurement is impossible for all divided areas in the distance measurement area set by three area or five area setting in the distance measurement area setting processing (see step S10 in FIG. 7), the shooting lens is set at a fixed focus so that the focus of the lens is adjusted to a preset subject distance. Furthermore, the processing by the CPU 60 for setting the shooting lens to a fixed focus is referred to as fixed focus processing, and this fixed focus processing will be described below.

Figure 87:
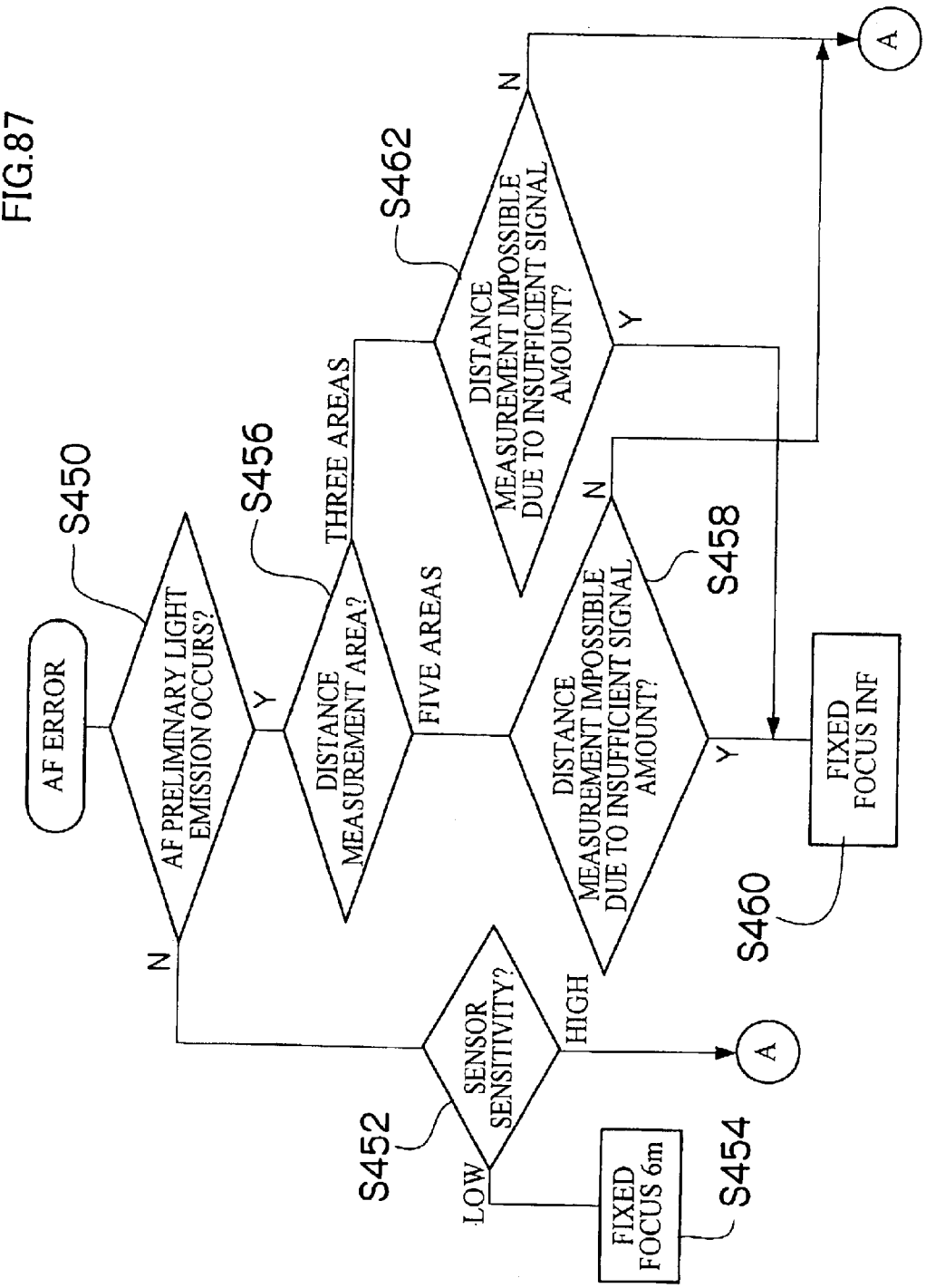
FIG. 87 is a flow chart showing the procedure of fixed focus processing.
Figure 88:
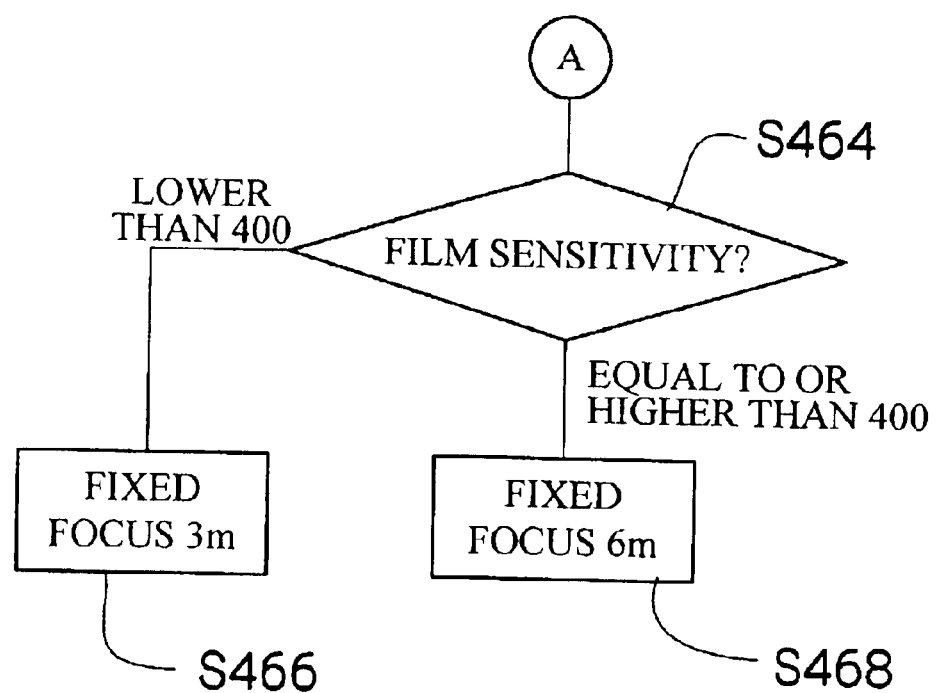
FIG. 88 is a flow chart showing the procedure of fixed focus processing.

If it is determined that distance measurement is impossible for all divided areas in the distance measurement area, the CPU 60 sets the shooting lens to a predetermined fixed focus depending on the reason why it has been determined that distance measurement is impossible, the film sensitivity and the like, as shown in the flow charts of FIGS. 87 and 88.

The CPU 60 first determines whether AF preliminary light emission has occurred or not (step S450), if it is determined that distance measurement is impossible for all divided areas in the distance measurement area. If the result of determination is NO, which sensitivity level, high or low, the sensor sensitivity has been set at is determined (step S452). If it is determined that the sensor sensitivity has been set at low sensitivity, the shooting lens is set at a fixed focus 6m (step S454).

On the other hand, if it is determined that the sensor sensitivity has been set at high sensitivity in step S452, processing proceeds to the processing in the flow chart of FIG. 88, where whether the film sensitivity is lower than ISO400, or equal to or higher than ISO400 is determined (step S464). If it is determined that the film sensitivity is lower than ISO400, the shooting lens is set at a fixed focus 3m (step S466). On the other hand, if it is determined that the film sensitivity is equal to or higher than ISO400, the shooting lens is set at a fixed focus 6m (step S468).

If the result of determination in step S450 is YES, then the CPU 60 determines whether the distance measurement area is set by five area setting or three area setting (step S456). If it is determined that the distance measurement area is set by five area setting, then whether or not the reason why it has been determined that distance measurement is impossible for all the divided areas lies in the insufficient signal amount (dark subject) (step S458). If the result of determination is YES, the shooting lens is set at an infinite position (step S460). On the other hand, if the result of determination is NO, processing proceeds to the processing in the flow chart of FIG. 88, where the shooting lens is set at a fixed focus consistent with the film sensitivity (detailed description is not presented).

If it is determined that the distance measurement area is set by three setting, whether or not the reason why it has been determined that distance measurement is impossible for all the divided areas lies in the insufficient signal amount as in the case of five area setting (step S462). If the result of determination is YES, the shooting lens is set at an infinite position (step S460). On the other hand, if the result of determination is NO, processing proceeds to the processing in the flow chart of FIG. 88, where the shooting lens is set at a fixed focus consistent with the film sensitivity (detailed description is not presented).

Detailed Description of Area Selection Processing (Step S28 in FIG. 7)

Area selection processing in step S28 in FIG. 7 will now be described. The area selection processing is processing in which the subject distance of the divided area to be employed for adjusting the focus of the shooting lens is selected among subject distances calculated for respective divided areas in the distance measurement area. As a general rule, the shortest subject distance of subject distances calculated for divided areas other than the divided areas for which it has been determined that distance measurement is impossible is employed. Furthermore, the subject distance in each divided area is determined by the distance calculation processing in step S26 in FIG. 7, according to the shift amount x of real highest correlation determined by the interpolated value calculation processing in step S22 in FIG. 7.

On the other hand, as an exception, if the subject distance in only one of the left area and right area is extremely short compared to other divide areas, the subject distance is not employed, and instead the shortest subject distance of subject distances in other divided areas is employed.

Specifically, reference values 1 and 2 for dividing the subject distance into three segments of very short distance, short distance and moderate to long distance are set in advance. Furthermore, the reference value 1 is set, for example, at 50 cm (distance for which the short distance warning is provided), and the reference value 2 is set, for example, at 4m. Now, assume that the distance measurement area is set by five area setting, and the subject distance is calculated for each of the middle area, left middle area, left area, right middle area and right area. And, the subject distance in only one of the left area and right area is the very short distance shorter than the reference value 1, and the subject distances in other divided areas (including one of the left and right areas of which subject distance is not the very short distance) are the moderate to long distance longer than the reference value 2. In this case, the subject distance in the left or right area, which is the very short distance, is not employed, and instead the shortest subject distance of subject distances in other areas is employed. If at least one subject distance in any divided area other than the left or right area of which subject distance is the very short distance is the very short or short distance, the subject distance shortest of subject distances in all divided areas is employed according to the general rule.

As a specific example, assume that for the subject distance for each divided area, only the subject distance in the left area is the very short distance shorter than the reference value 1, and subject distances in other divided areas are the moderate to long distance longer than the reference value 2 as shown in FIG. 89(A). In this case, the subject distance in the middle area, which is the shortest of subject distances obtained in divided areas other than the left area is employed.

On the other hand, assume that as shown in FIG. 89(B), the subject distance in the left area is the very short distance shorter than the reference value 1, and the subject distance in the middle area is longer than the reference value 1 and shorter than the reference value 2, and subject distances in other divided areas are the moderate to long distance longer than the reference value 2. In this case, the subject distance in the left area, which is the shortest, is employed according to the general rule.

Assume that as shown in FIG. 89(C), the subject distance in the left area is longer than the reference value 1 and shorter than the reference value 2, and subject distances in other divided areas is the moderate to long distance longer than the reference value 2. In this case, the subject distance in the left area, which is the shortest, is employed according to the general rule.

Just the same goes for the right area, and assume that as shown in FIG. 89(D), only the subject distance in the right area is the very short distance shorter than the reference value 1, and subject distances in other divided areas are the moderate to long distance longer than the reference value 2. In this case, the subject distance in the left area, which is the shortest of subject distances obtained in the divided areas other than the right area, is employed.

On the other hand, assume that as shown in FIG. 89(E), the subject distance in the right area is the very short distance shorter than the reference value 1, and the subject distance in the left area is longer than the reference value 1 and shorter than the reference value 2, and subject distances in other divided areas are the moderate to long distance longer than the reference value 2. In this case, the subject distance in the right area, which is the shortest of subject distances in all divided areas, is employed according to the general rule.

Assume that as shown in FIG. 89(F), the subject distance in the right area is longer than the reference value 1 and shorter than the reference value 2, and subject distances in other divided areas is the moderate to long distance longer than the reference value 2. In this case, the subject distance in the right area, which is the shortest of subject distances in all divided areas, is employed according to the general rule.

The above-described exceptional processing can similarly be applied when the distance measurement area is an area set by three setting. That is, if the subject distance is the very short distance in only one of the endmost right middle area and left middle area of the middle area, right middle area and left middle area constituting the distance measurement area, and the distance measurement is the moderate to long distance in other divided areas, in the case of three setting, the shortest subject distance of subject distances other than the very short distance may be employed.

The above-described embodiment has a configuration such that sensor data is outputted from the AF sensor 74, and the sensor data is converted into AF data by the CPU 60 to carry out processing for calculating correlation values, but alternatively, a configuration such that sensor data is converted into AF data in the AF sensor 74, and is thereafter outputted, and processing for calculating correlation values is carried out in the CPU 60, and a configuration such that sensor data is converted into AF data and processing for calculating correlation values is carried out in the AF sensor 74, and thereafter the distance signal is outputted to the CPU 60 may be used.

Also, the above-described embodiment has been described using an external light-passive distance measuring apparatus as an example, but the present invention may be applied to TTL-passive phase difference system as well.

In addition, the distance measuring apparatus for cameras may be applied to distance measuring apparatuses for use in applications other than cameras.

As described above, according to the distance measuring apparatus of the present invention, the distance of the distance measurement object is three-way divided into the very short distance range, short distance range and moderate to long distance range, and if the distance of an object located at a very short distance is measured in any one of the endmost distance measurement areas of a plurality of distance measurement areas, and all the distances measured in other distance measurement areas belong to the moderate to long distance, the distance belonging to the very short distance range is not employed, and the shortest distance of distances belonging to the moderate to long distance range is employed as a measured distance. On the other hand, if any of the distances measured in other distance measurement areas belongs to the short distance range which is closer than the moderate to long distance range, the object located at the very short distance is likely one of the desired objects for shooting, and therefore the distance belonging to the very short distance range is employed. In this way, a suitable distance can be employed as a measured distance from distances of the distance measurement object measured in a plurality of distance measurement areas, thus making it possible to reduce the frequency of erroneous distance measurement.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A distance measuring apparatus in which a plurality of distance measurement areas are set in an image formation range of a sensor on which an image of a distance measurement object is formed, distances of the distance measurement object are measured for respective distance measurement areas according to signals obtained from the sensor, and any one of the measured distances for respective distance measurement areas is employed as a measured distance, the distance measuring apparatus comprising:

an employed distance selecting device in which the distance of the distance measurement object is three-way divided into a very short distance range, a short distance range and a moderate to long distance range, and a condition of whether a result of measuring distances of the distance measurement object is consistent with a case where only the distance measured in any one of distance measurement areas located at ends of the plurality of distance measurement areas belongs to the very short distance range and all the distances measured in other distance measurement areas belong to the moderate to long distance range is set up, wherein:

if the condition is not satisfied, a closest distance of all distances measured for the plurality of distance measurement areas is employed as the measured distance, and if the condition is satisfied, a closest distance of the distances belonging to the moderate to long distance range of distances measured for the plurality of distance measurement areas is employed as the measured distance.

2. The distance measuring apparatus according to claim 1, wherein the very short distance range is a range in which a short distance warning is given.

3. The distance measuring apparatus according to claim 1, wherein the plurality of distance measurement areas set in the image formation range of the sensor are changed depending on an angle of view.

\* \* \* \* \*